US011221698B2

(12) United States Patent
Dellinger et al.

(10) Patent No.: US 11,221,698 B2
(45) Date of Patent: Jan. 11, 2022

(54) SYSTEMS AND METHODS FOR INTERACTING WITH MULTIPLE APPLICATIONS THAT ARE SIMULTANEOUSLY DISPLAYED ON AN ELECTRONIC DEVICE WITH A TOUCH-SENSITIVE DISPLAY

(71) Applicant: Apple Inc., Cupertino, CA (US)

(72) Inventors: Richard R. Dellinger, San Jose, CA (US); Stephen O. Lemay, San Francisco, CA (US); Brandon M. Walkin, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/939,122

(22) Filed: Mar. 28, 2018

(65) Prior Publication Data

US 2018/0329550 A1    Nov. 15, 2018

Related U.S. Application Data

(60) Provisional application No. 62/514,898, filed on Jun. 4, 2017, provisional application No. 62/506,549, filed on May 15, 2017.

(51) Int. Cl.
*G06F 3/041* (2006.01)
*G06F 3/0484* (2013.01)
(Continued)

(52) U.S. Cl.
CPC .......... *G06F 3/0412* (2013.01); *G06F 3/016* (2013.01); *G06F 3/017* (2013.01); *G06F 3/0486* (2013.01);
(Continued)

(58) Field of Classification Search
CPC ........ G06F 3/0412; G06F 3/016; G06F 3/017; G06F 3/0416; G06F 3/04842;
(Continued)

(56) References Cited

U.S. PATENT DOCUMENTS

2009/0199128 A1    8/2009    Matthews et al.
2010/0248788 A1    9/2010    Yook et al.
(Continued)

FOREIGN PATENT DOCUMENTS

CN    106489112 A    3/2013
CN    103677627 A    3/2014
(Continued)

OTHER PUBLICATIONS

English translation of (KR 20150051757), Inventor Yoon Sung Young, assignee LG Electronic Inc, Publication date May 13, 2015. (Year: 2015).*
(Continued)

*Primary Examiner* — William Boddie
*Assistant Examiner* — Saifeldin E Elnafia
(74) *Attorney, Agent, or Firm* — Morgan, Lewis & Bockius LLP

(57) ABSTRACT

Systems and methods for multitasking using touch-sensitive devices are disclosed. An example method includes: displaying a first application in a display area that occupies substantially all of a touch-sensitive display (TSD). While displaying the first application: displaying a dock overlaying a first portion of the display area; detecting a contact over a first affordance displayed within the dock, and the first affordance is associated with a second set of applications; detecting movement of the contact away from the dock. Upon detecting a liftoff of the contact from the TSD while the contact is over a second portion of the display area different from the first portion, the method further includes:
(Continued)

displaying (i) the first set of application and (ii) at least some of the second set of applications in the display area that occupies substantially all of the touch-sensitive display.

36 Claims, 108 Drawing Sheets

(51) Int. Cl.
  *G06F 3/01* (2006.01)
  *G06F 3/0488* (2013.01)
  *G06F 3/0486* (2013.01)
(52) U.S. Cl.
  CPC ...... *G06F 3/04842* (2013.01); *G06F 3/04883* (2013.01); *G06F 3/04886* (2013.01); *G06F 2203/04803* (2013.01)
(58) Field of Classification Search
  CPC ............... G06F 3/0486; G06F 3/04883; G06F 3/04886; G06F 2203/04803
  See application file for complete search history.

(56) References Cited

U.S. PATENT DOCUMENTS

| | | | |
|---|---|---|---|
| 2013/0117715 | A1 | 5/2013 | Williams et al. |
| 2013/0120295 | A1 | 5/2013 | Kim et al. |
| 2014/0068518 | A1 | 3/2014 | Liu et al. |
| 2014/0164991 | A1 | 6/2014 | Kim et al. |
| 2014/0337794 | A1* | 11/2014 | Vranjes ................. G06F 3/0481 715/800 |
| 2014/0351748 | A1 | 11/2014 | Xia et al. |
| 2014/0368734 | A1* | 12/2014 | Hoffert ................... H04L 65/60 348/564 |
| 2015/0109400 | A1 | 4/2015 | Wang |
| 2015/0325211 | A1 | 11/2015 | Lee et al. |
| 2015/0365306 | A1* | 12/2015 | Chaudhri .............. G06F 3/0484 715/736 |
| 2016/0034155 | A1* | 2/2016 | Vranjes ............... G06F 3/04842 715/803 |
| 2016/0034159 | A1 | 2/2016 | Vranjes et al. |
| 2016/0062552 | A1 | 3/2016 | Jeong et al. |
| 2016/0132188 | A1 | 5/2016 | Li et al. |
| 2016/0196588 | A1 | 7/2016 | Wei et al. |

FOREIGN PATENT DOCUMENTS

| | | | |
|---|---|---|---|
| CN | 104238949 | A | 12/2014 |
| CN | 104956301 | A | 9/2015 |
| CN | 106462413 | A | 2/2017 |
| EP | 2 741 201 | A2 | 6/2014 |
| JP | 2005-227951 | A | 8/2005 |
| JP | 2005-321915 | A | 11/2005 |
| JP | 2013-092952 | A | 5/2013 |
| JP | 2014-116010 | A | 6/2014 |
| JP | 2014-191832 | A | 10/2014 |
| KR | 2014-0039575 | A | 4/2014 |
| KR | 2014-0073380 | A | 6/2014 |
| KR | 2015-0051457 | A | 5/2015 |
| KR | 2015-0111167 | A | 10/2015 |

OTHER PUBLICATIONS

Office Action, dated May 30, 2018, received in Danish Patent Application No. 201770562, which corresponds with U.S. Appl. No. 15/939,122, 3 pages.
Invitation To Pay Additional Fees, dated Aug. 3, 2018, received in International Patent Application No. PCT/US2018/032661, which corresponds with U.S. Appl. No. 15/939,122, 12 pages.
Tesla Family, "Tesla Display Split Screen Shortcut Drag and Drop", http://www.youtube.com/watch?v=HnzK-JODa6k, Dec. 5, 2016, 2 pages.
Tesla Support, "Model S Touchscreen", https://web.archive.org/web/20161225005220/https://www.tesla.com/da_DK/support, Dec. 25, 2016, 1 pages.
Office Action, dated Oct. 27, 2017, received in Danish Patent Application No. 201770562, which corresponds with U.S. Appl. No. 15/939,122, 11 pages.
Office Action, dated Feb. 18, 2019, received in Danish Patent Application No. 201770562, which corresponds with U.S. Appl. No. 15/939,122, 4 pages.
International Search Report and Written Opinion, dated Sep. 27, 2018, received in International Patent Application No. PCT/US2018/032661, which corresponds with U.S. Appl. No. 15/939,122, 18 pages.
Intention to Grant, dated Sep. 20, 2019, received in Danish Patent Application No. 201770532, which corresponds with U.S. Appl. No. 15/939,122, 3 pages.
Office Action, dated Jun. 1, 2020, received in Australian Patent Application No. 2018169159, which corresponds with U.S. Appl. No. 15/939,122, 4 pages.
Office Action, dated Jan. 15, 2020, received in Chinese Patent Application No. 2019113502047, which corresponds with U.S. Appl. No. 15/939,122, 3 pages.
Notice of Allowance, dated Feb. 3, 2020,, received in Danish Patent Application No. 201770562, which corresponds with U.S. Appl. No. 15/939,122, 2 pages.
Patent, dated May 15, 2020, received in Danish Patent Application No. 201770562, which corresponds with U.S. Appl. No. 15/939,122, 4 pages.
Office Action, dated Feb. 14, 2020, received in European Patent Application No. 18727987.2, which corresponds with U.S. Appl. No. 15/939,122, 8 pages.
Office Action, dated Nov. 26, 2020, received in Chinese Patent Application No. 2019113502047, which corresponds with U.S. Appl. No. 15/939,122, 18 pages.
Office Action, dated Oct. 12, 2020, received in Japanese Patent Application No. 2019-561132, which corresponds with U.S. Appl. No. 15/939,122, 7 pages.
Office Action, dated Oct. 9, 2020, received in Korean Patent Application No. 2019-7034250, which corresponds with U.S. Appl. No. 15/939,122, 8 pages.
Notice of Allowance, dated Jan. 18, 2021, received in Australian Patent Application No. 2018169159, which corresponds with U.S. Appl. No. 15/939,122, 3 pages.
Certificate of Grant, dated May 20, 2021, received in Australian Patent Application No. 2018169159, which corresponds with U.S. Appl. No. 15/939,122, 4 pages.
Office Action, dated May 18, 2021, received in Chinese Patent Application No. 2019113502047, which corresponds with U.S. Appl. No. 15/939,122, 1 page.
Intention to Grant, dated Aug. 13, 2020, received in European Patent Application No. 18727987.2, which corresponds with U.S. Appl. No. 15/939,122, 7 pages.
Decision to Grant, dated Jan. 11, 2021, received in European Patent Application No. 18727987.2, which corresponds with U.S. Appl. No. 15/939,122, 2 pages.
Patent, dated Jan. 20, 2021, received in European Patent Application No. 18727987.2, which corresponds with U.S. Appl. No. 15/939,122, 3 pages.
Office Action, dated May 21, 2021, received in Japanese Patent Application No. 2019-561132, which corresponds with U.S. Appl. No. 15/939,122, 2 pages.
Notice of Allowance, dated Apr. 9, 2021, received in Korean Patent Application No. 2019-7034250, which corresponds with U.S. Appl. No. 15/939,122, 2 pages.
Patent, dated Jul. 9, 2021, received in Korean Patent Application No. 2019-7034250, which corresponds with U.S. Appl. No. 15/939,122, 4 pages.
Extended European Search Report, dated Feb. 26, 2021, received in European Patent Application No. 20212749.4, which corresponds with U.S. Appl. No. 15/939,122, 11 pages.

(56) References Cited

OTHER PUBLICATIONS

Office Action, dated Jul. 29, 2021, received in Chinese Patent Application No. 2019113502047, which corresponds with U.S. Appl. No. 15/939,122, 7 pages.

* cited by examiner

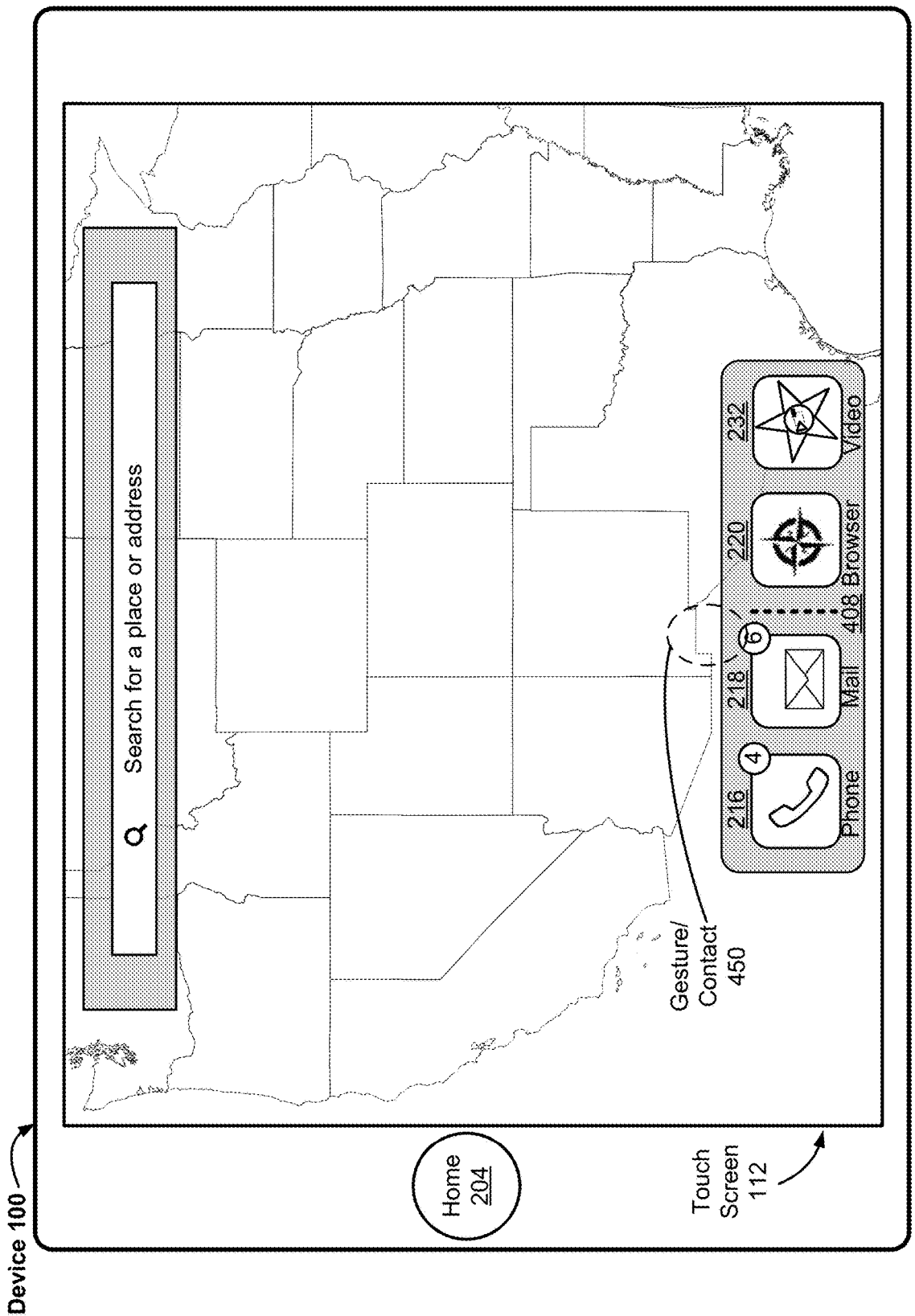

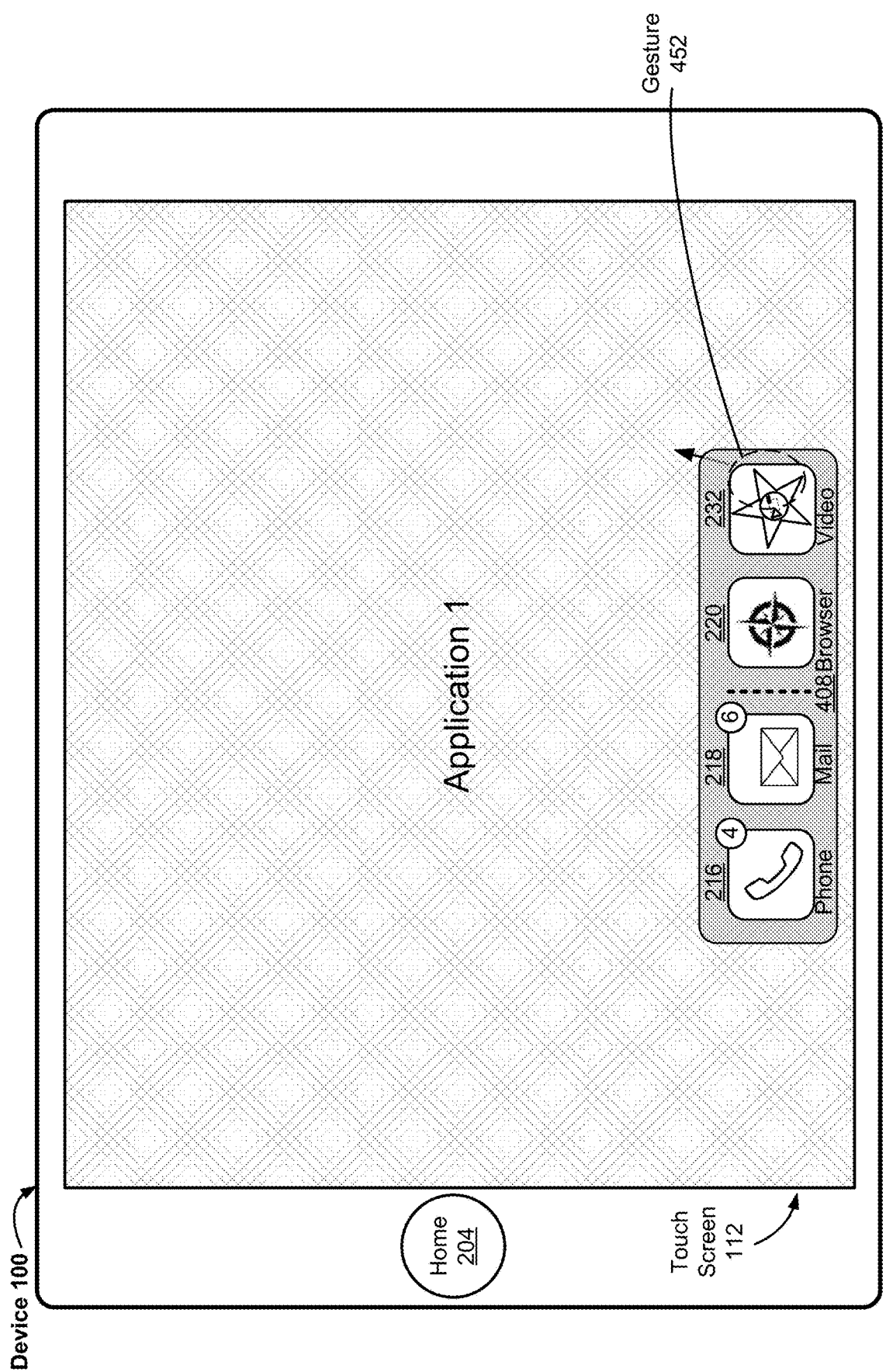

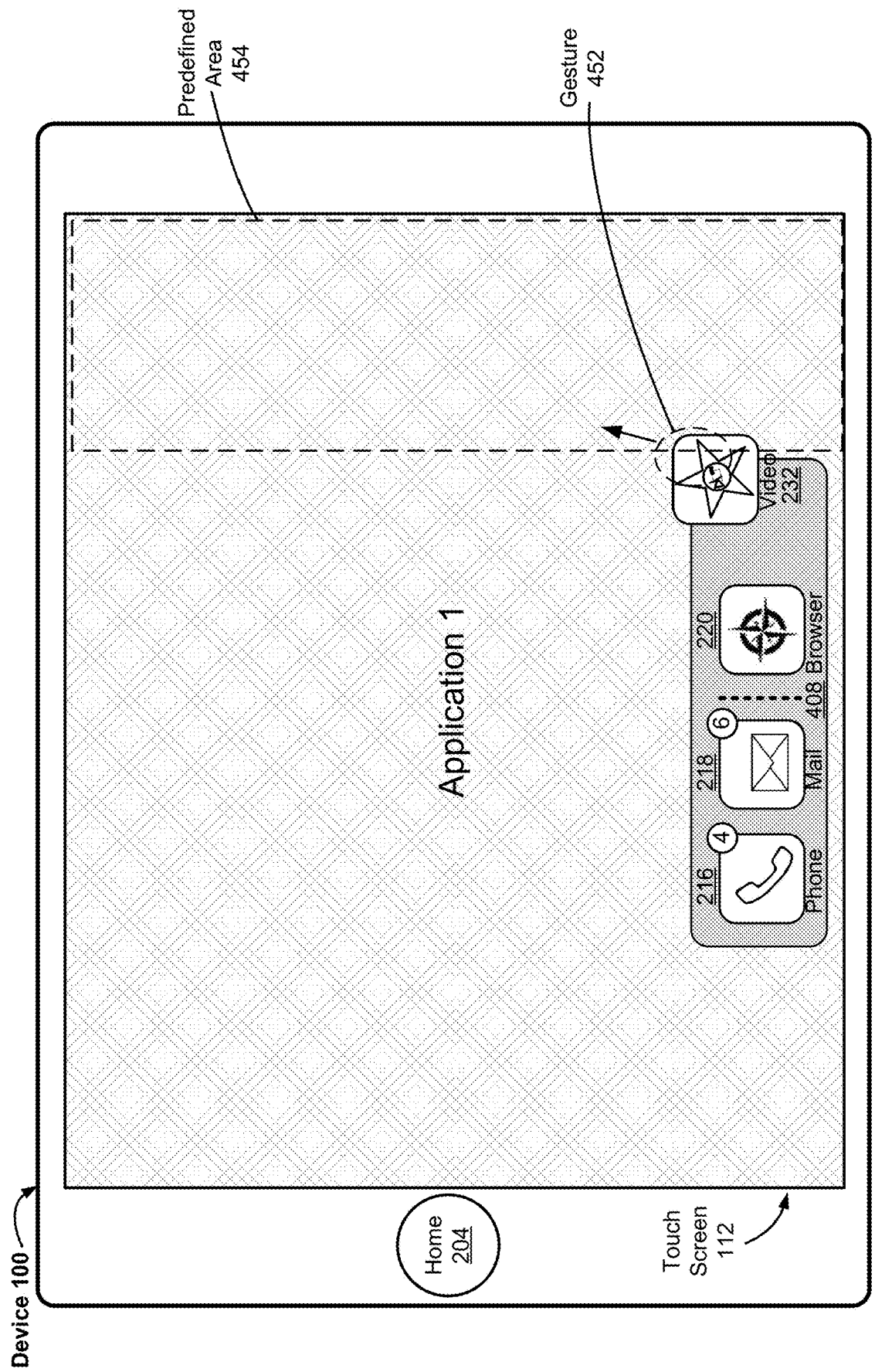

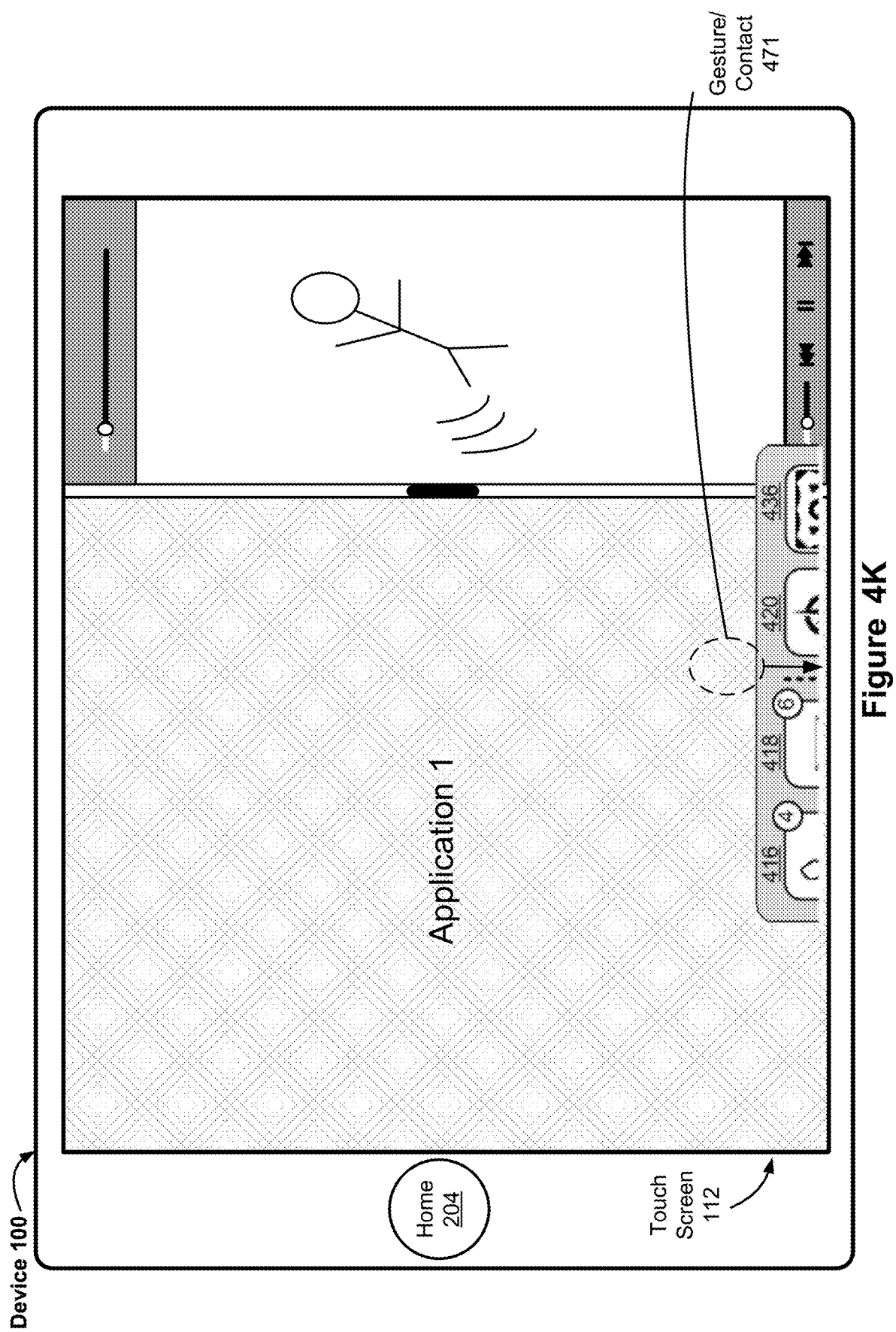

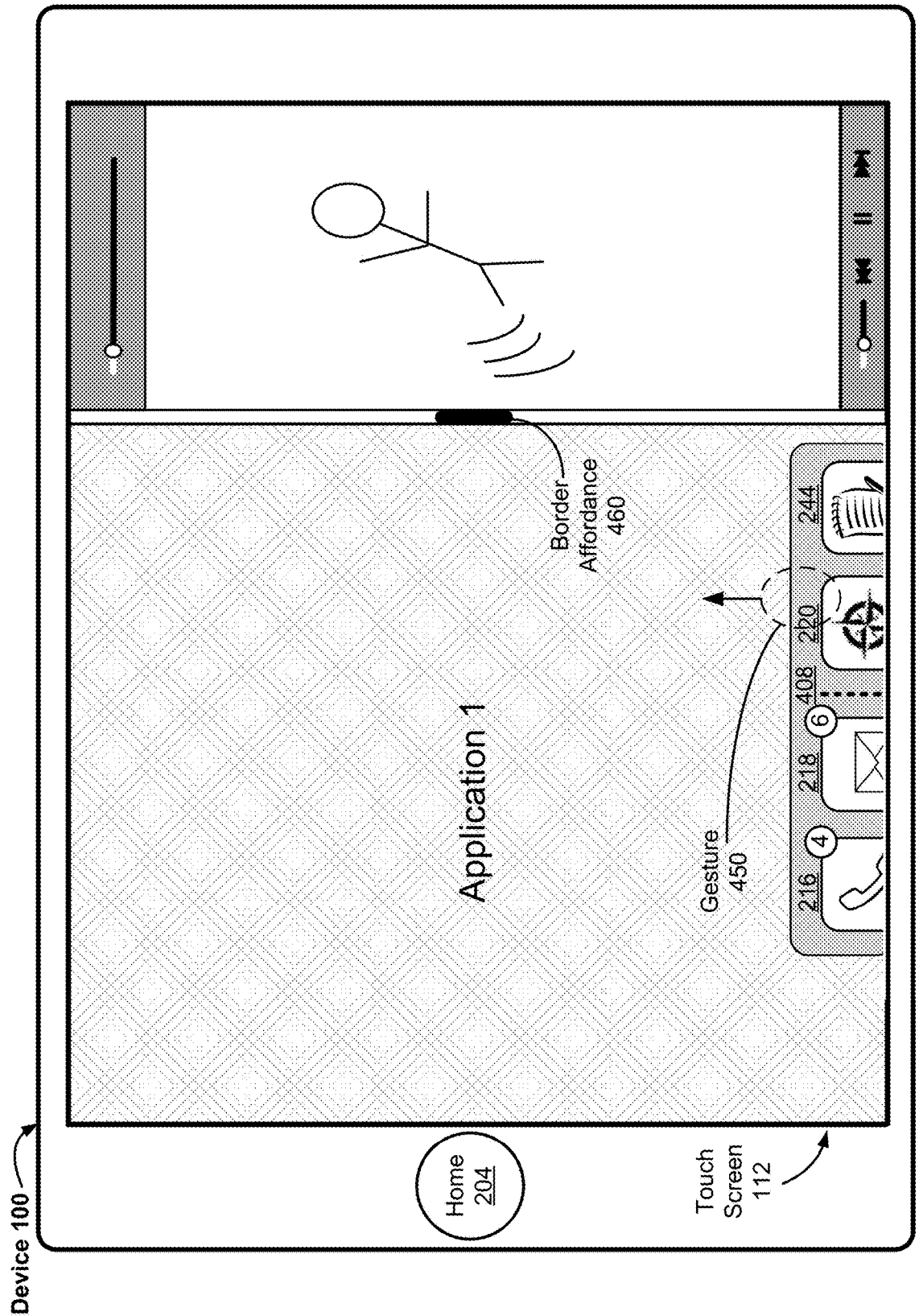

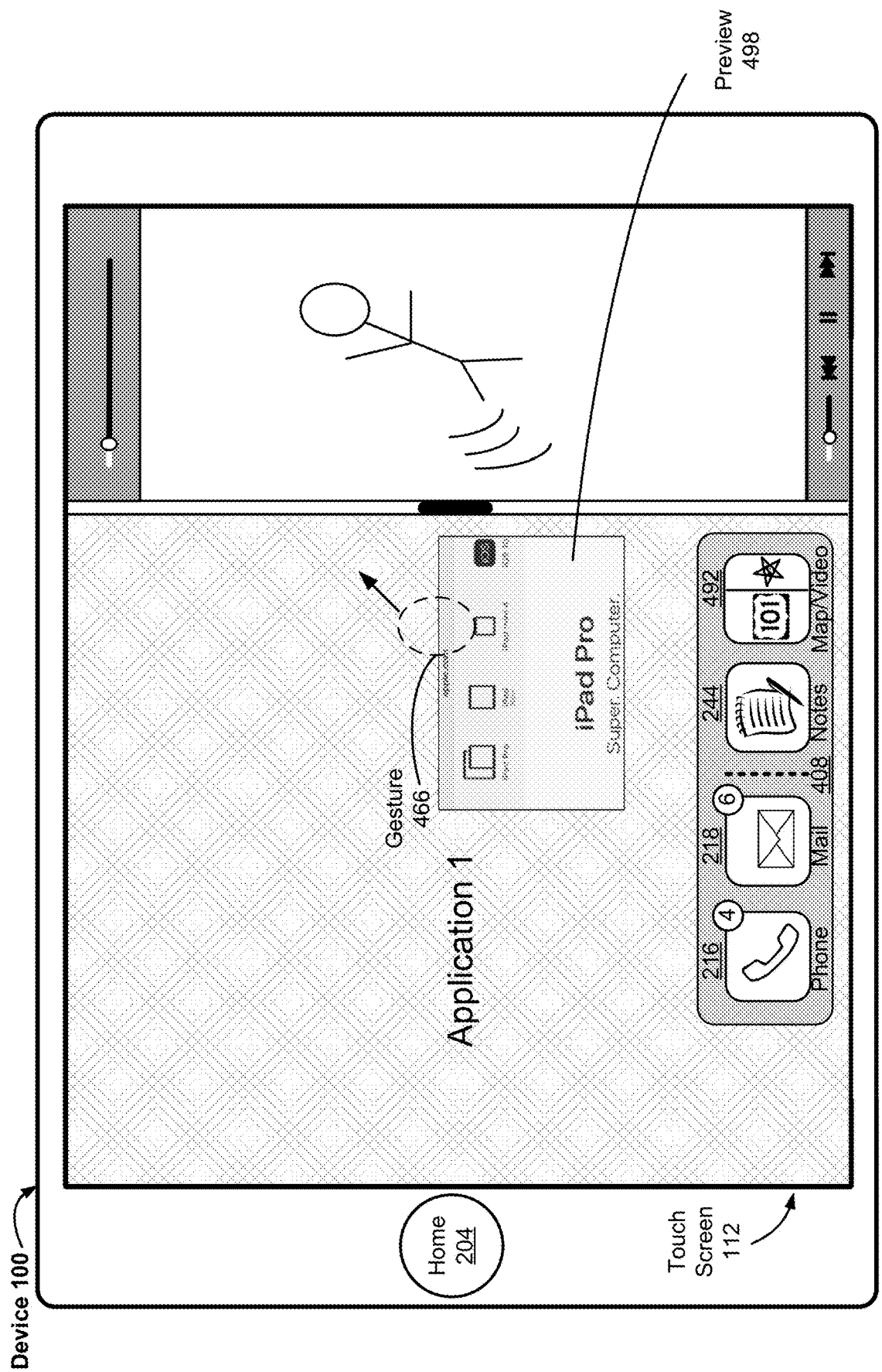

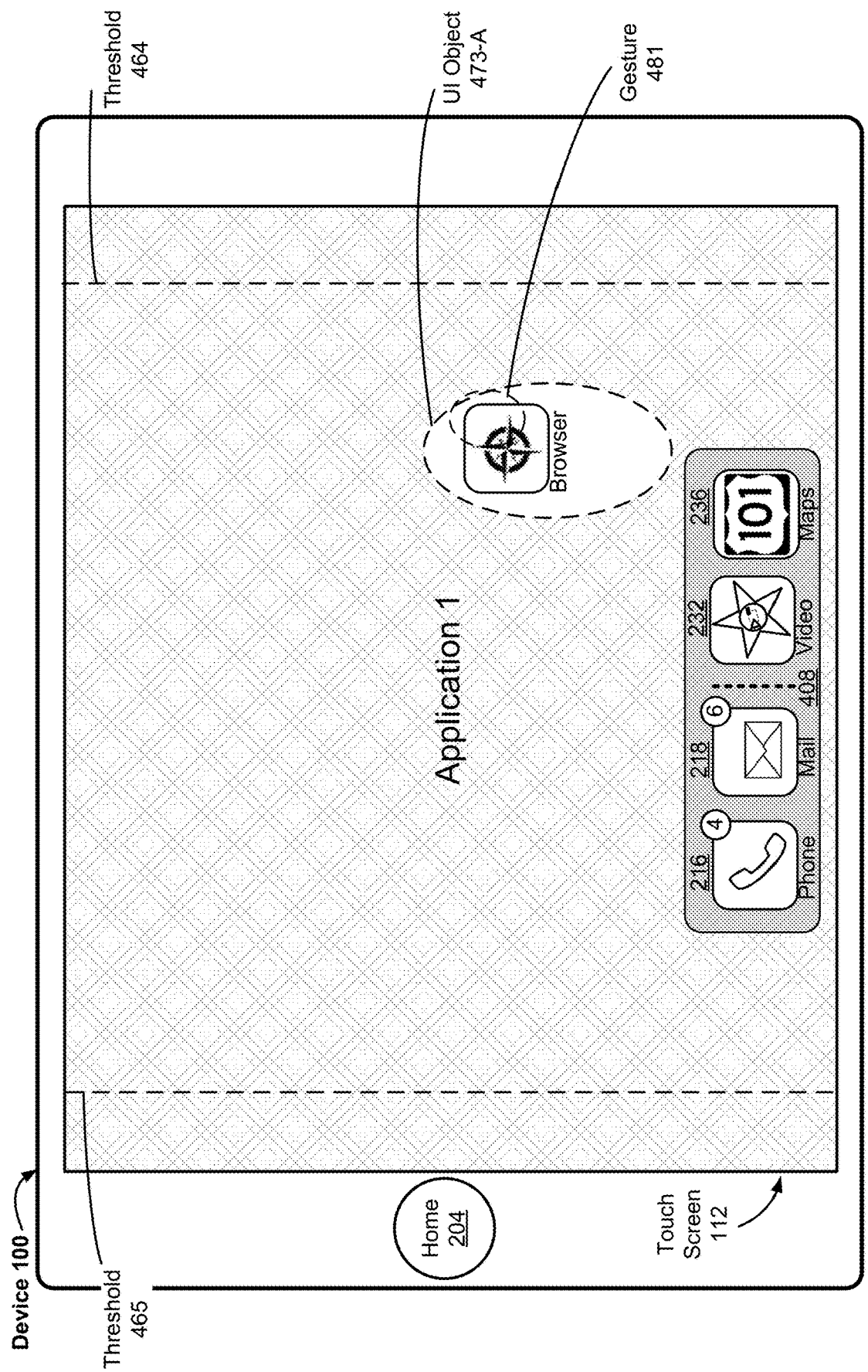

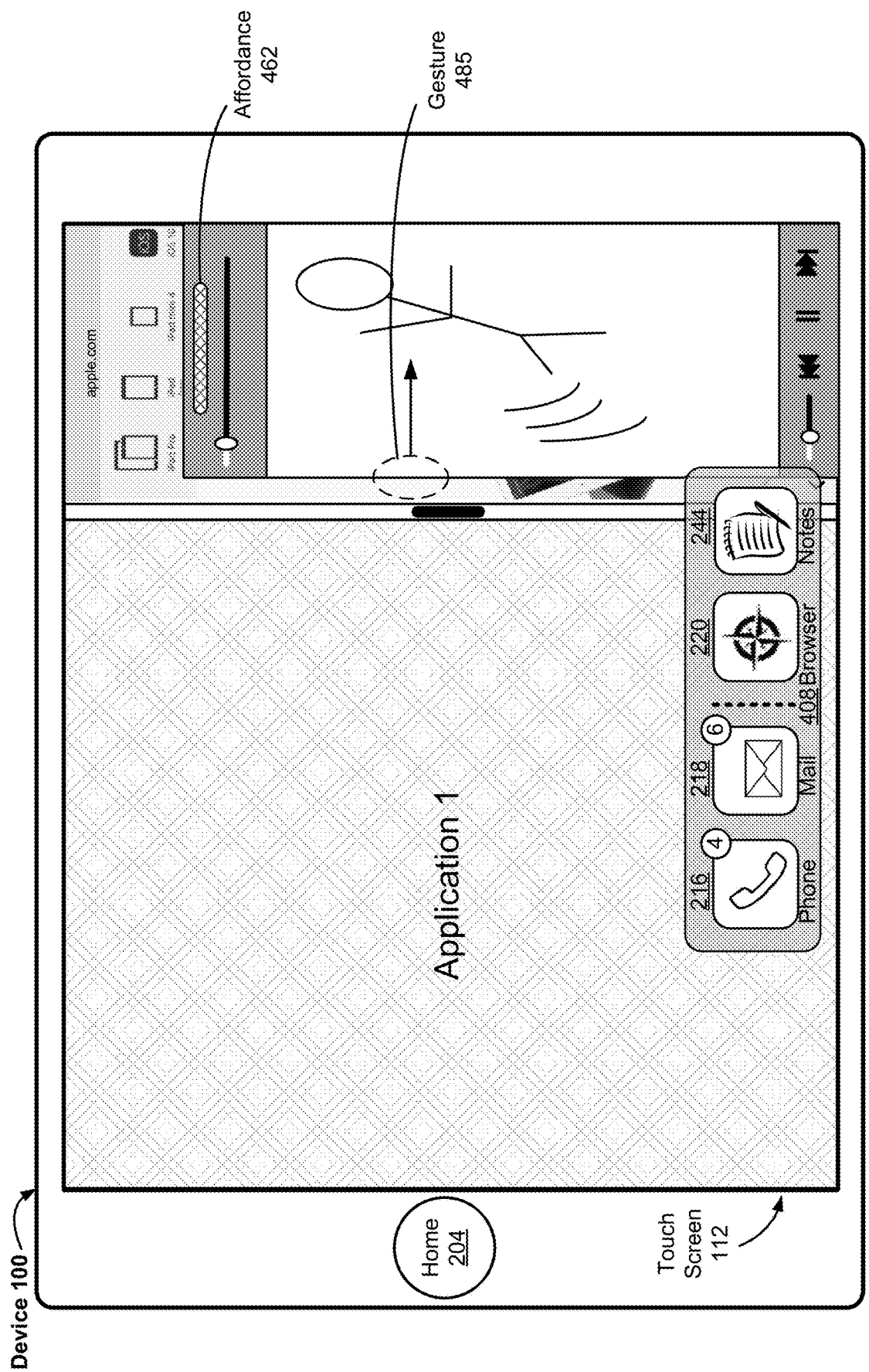

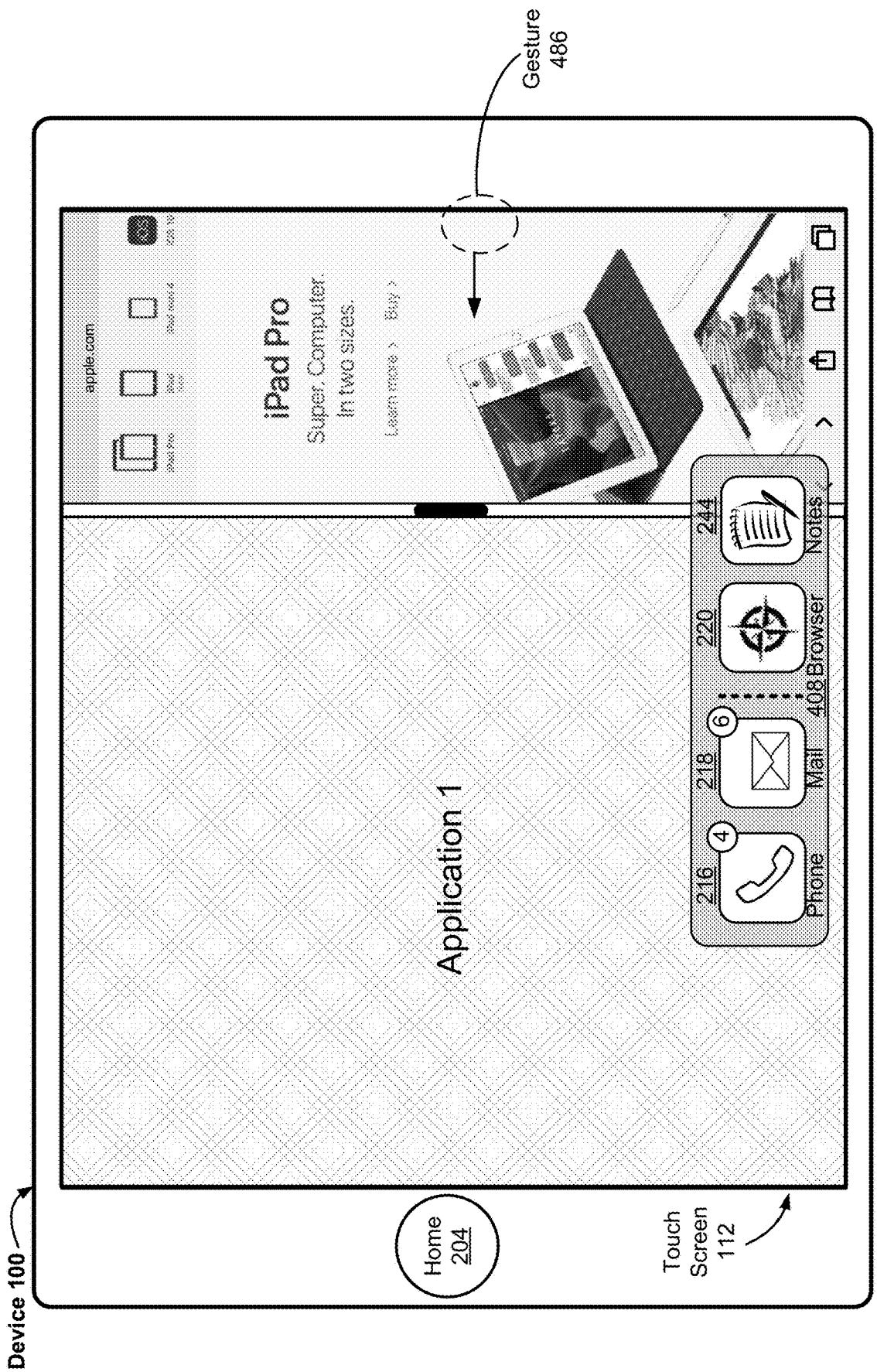

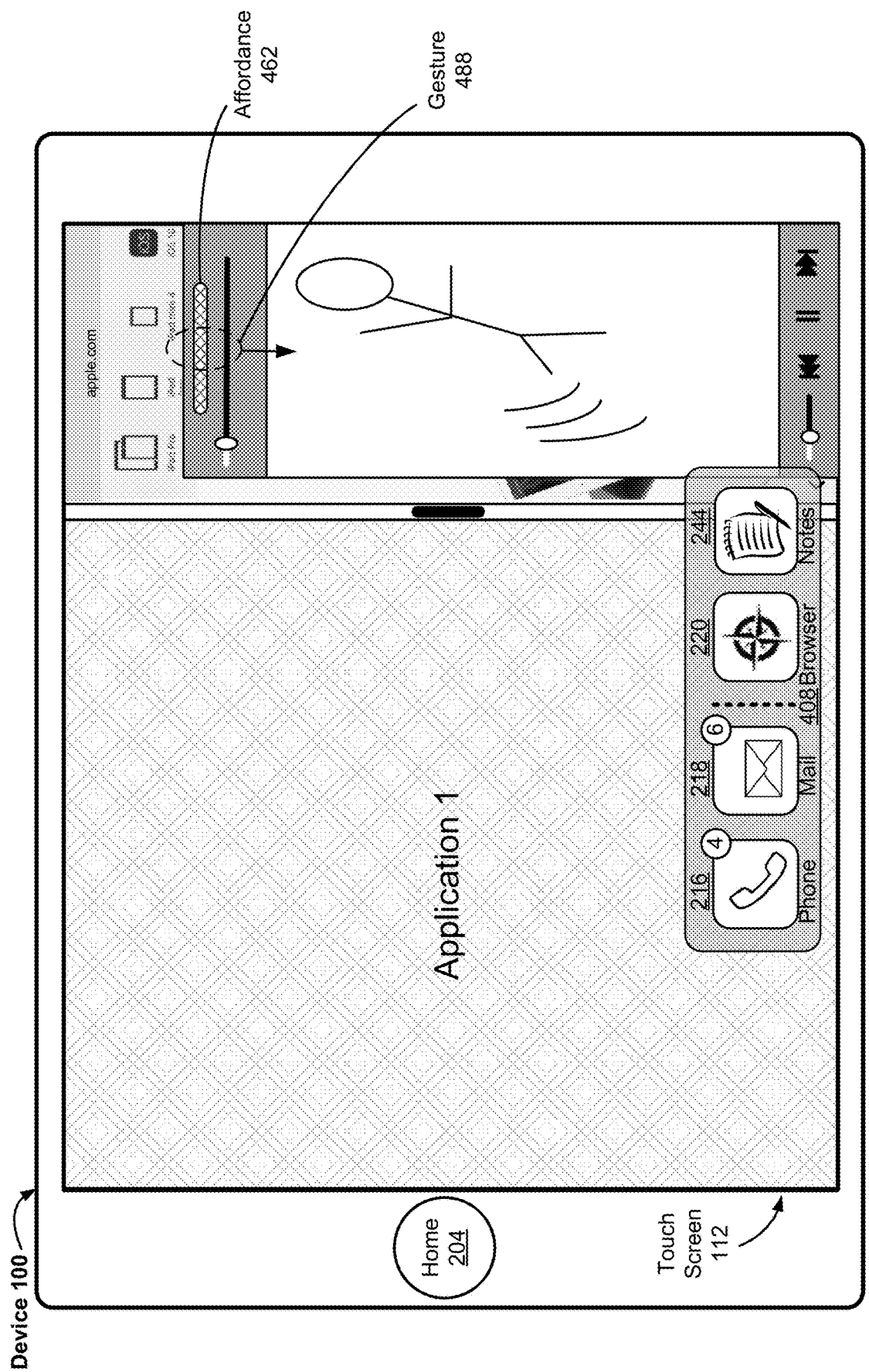

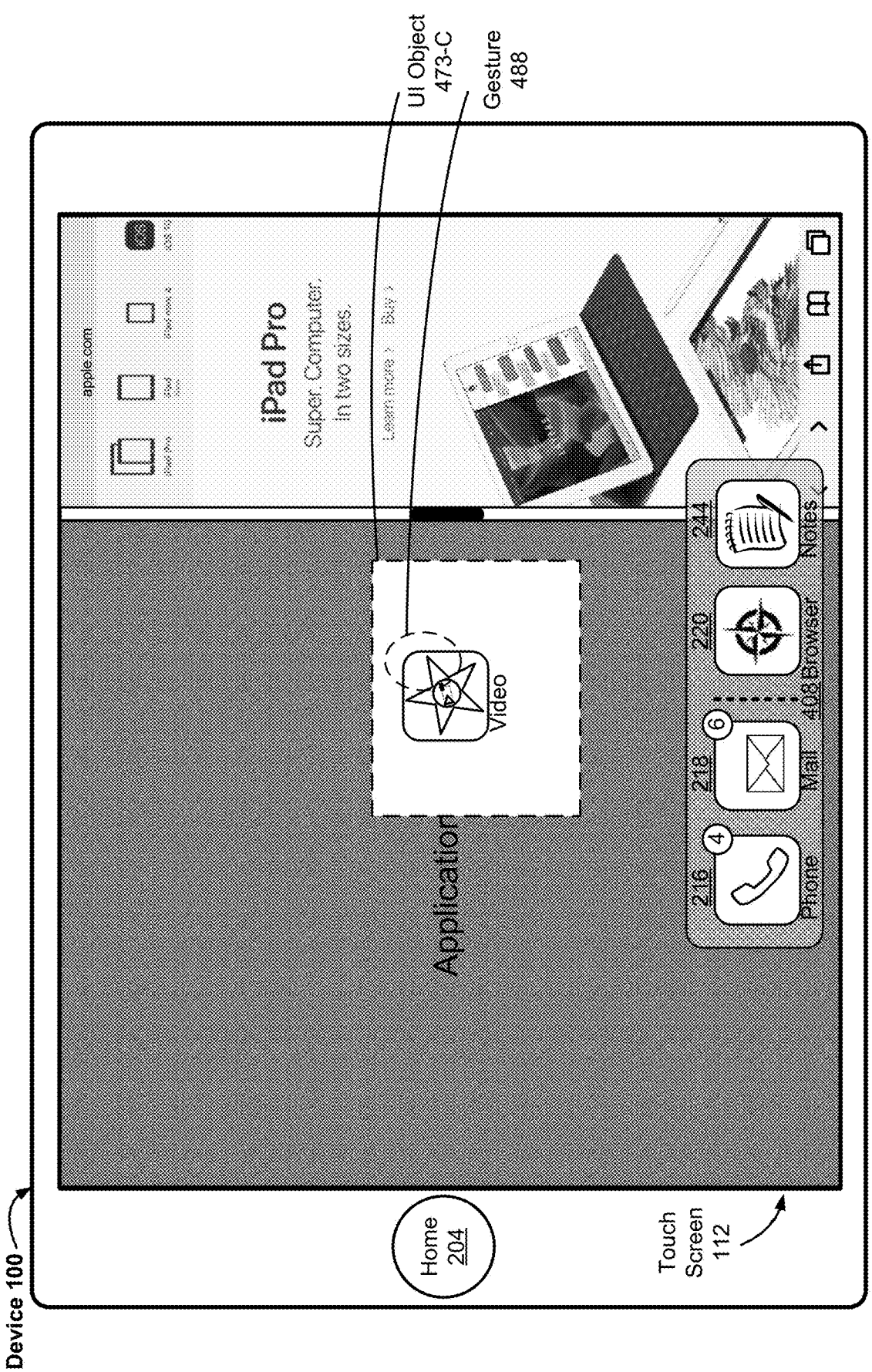

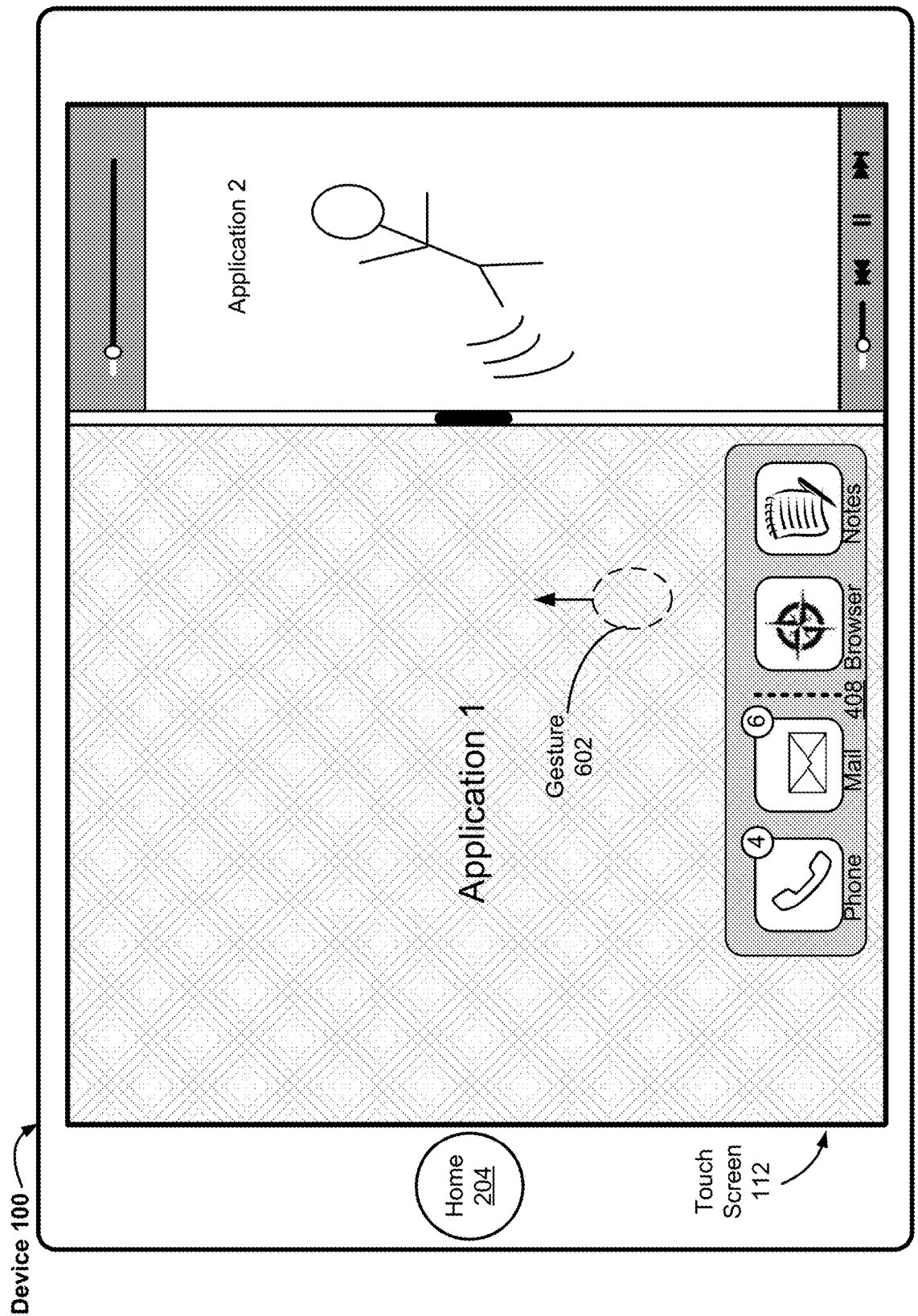

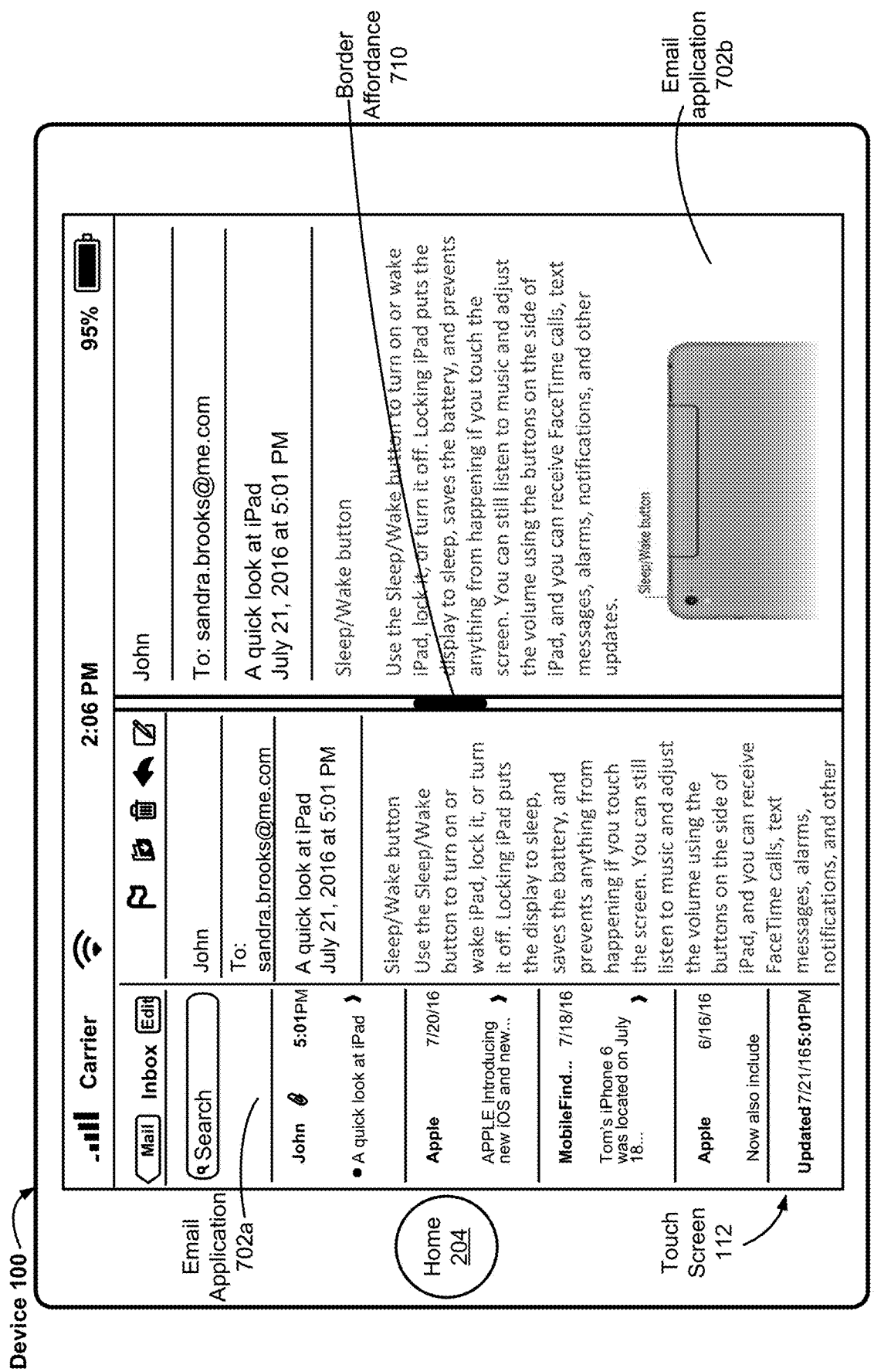

800

Before detecting liftoff of the contact and after the contact moves at least a threshold distance away from the dock, resize the first set of one or more applications to reveal the second portion of the display area adjacent to the resized first set of one or more applications — 820

Displaying (i) at least some of the first set of one or more applications and (ii) at least some of the second set of one or more applications in the display area that occupies substantially all of the touch-sensitive display includes: displaying the at least some of the second set of one or more applications in the second portion of the display area, and displaying the at least some of the first set of one or more applications in a remaining portion of the display area that is adjacent to the second portion of the display area — 822

Before detecting liftoff of the contact and after the contact moves to within a threshold distance from an edge of the touch-sensitive display that borders at least some of the first set of one or more applications or at least some of the second set of one or more applications, resizing the first set of one or more applications to reveal the second portion of the display area adjacent to the resized first set of one or more applications — 820A Displaying (i) at least some of the first set of one or more applications and (ii) at least some of the second set of one or more applications in the display area that occupies substantially all of the touch-sensitive display includes: displaying the at least some of the second set of one or more applications in the second portion of the display area, and displaying the at least some of the first set of one or more applications in a remaining portion of the display area that is adjacent to the second portion of the display area — 822A

> The first set comprises one first application, the second set
> comprises one second application, the affordance is associated
> with the one second application, and upon detecting the lift-off of  ─ 824
> the contact while the contact is located within a threshold distance
> of an edge of the touch-sensitive display that borders the one first
> application, the first and second applications are displayed side-by-
> side in the display area > Upon detecting the lift-off of the contact while the contact is located  ─ 825
> over the one first application, the second application is displayed
> overlaying the first application in the display area > The first set comprises at least a first application and a second  ─ 826
> application, the second set comprises one third application, and
> the affordance is associated with the one third application. In
> accordance with determining that the liftoff of the contact occurs
> over the second application, replace the second application with the
> third application on the touch-sensitive display.

> In accordance with determining that the liftoff of the contact occurs
> over a border between the first application and the second  ─ 827
> application, display the one third application overlaying the first
> application or the second application on the touch-sensitive display.

> The first set comprises a first group of at least two pinned
> applications, the second set comprises a second group of at least  ─ 828
> two pinned applications, and the affordance is associated with the
> second group of at least two pinned applications. In accordance
> with a determination that liftoff of the contact occurs over the first
> group of applications, replacing the first group of at least two pinned
> applications with the second group of at least two pinned
> applications.

> The first set of one or more applications comprises an instance of a  ─ 830
> first application, the second set of one or more applications
> comprises an additional instance of the first application, and
> the instance and the additional instance are distinct instances of the
> first application

922 — While the second application overlays the resized first application, detect user input at the resized first application 924 — Respond to the user input via the first application 926 — In response to a request to open a third application, distinct from the first and the second applications, display: (i) the third application in a portion of the display area previously occupied by the first application and (ii) the second application overlaying the third application (B)

928 — The second application is initially displayed as bordering a first edge of the touch-sensitive display. Moving the second application within the display area includes: moving the second application in the second direction until the second application borders a second edge, opposite to the first edge, of the touch-sensitive display; and displaying the first application in a remaining portion of the display area, distinct from a portion occupied by the second application, so that the first application borders the first edge of the touch-sensitive display 930 — Before moving the second application until the second application borders the second edge, a preview of the portion occupied by the second application is revealed next to the first application

932 — After resizing the first application and displaying the second application overlaying the resized first application: detecting an additional contact over the affordance and movement of the additional contact in a third direction that is opposite to the first direction; and in response to detecting that the additional contact has moved the threshold distance in the third direction, ceasing to display the second application overlaying the resized first application and re-displaying the first application and the second application in the display area that occupies substantially all of the touch-sensitive display

934 — After resizing the first application and displaying the second application overlaying the resized first application: detecting an additional contact over the affordance and movement of the additional contact in the first direction; and in response to detecting that the additional contact has moved a second threshold distance across the touch-sensitive display, scaling down content associated with the second application in accordance with movement of the additional contact until a user interface object with a representation of an affordance corresponding to the second application is displayed 936 — In accordance with a determination that the additional contact moves over a dock and is lifted off from the touch-sensitive display, dismissing the second application and displaying the first application occupying substantially all of the touch-sensitive display; and In accordance with a determination that the additional contact moves to within a threshold distance of an edge of the touch-sensitive display and is lifted off from the touch-sensitive display, re-displaying the first application and the second application in the display area that occupies substantially all of the touch-sensitive display

Figure 9C

SYSTEMS AND METHODS FOR INTERACTING WITH MULTIPLE APPLICATIONS THAT ARE SIMULTANEOUSLY DISPLAYED ON AN ELECTRONIC DEVICE WITH A TOUCH-SENSITIVE DISPLAY

RELATED APPLICATIONS

This application claims priority to U.S. Provisional Application Ser. No. 62/514,898, filed Jun. 4, 2017, and U.S. Provisional Application Ser. No. 62/506,549, filed May 15, 2017, each of which is hereby incorporated by reference in its respective entirety.

TECHNICAL FIELD

The embodiments herein generally relate to electronic devices with touch-sensitive displays and, more specifically, to systems and methods for multitasking on an electronic device with a touch-sensitive display (e.g., a portable multifunction device with a touch-sensitive display).

BACKGROUND

Handheld electronic devices with touch-sensitive displays are ubiquitous. While these devices were originally designed for information consumption (e.g., web-browsing) and communication (e.g., email), they are rapidly replacing desktop and laptop computers as users' primary computing devices. When using desktop or laptop computers, these users are able to routinely multitask by accessing and using different running applications (e.g., cutting-and-pasting text from a document into an email). While there has been tremendous growth in the scope of new features and applications for handheld electronic devices, the ability to multitask and swap between applications on handheld electronic devices requires entirely different input mechanisms than those of desktop or laptop computers.

Moreover, the need for multitasking is particularly acute on handheld electronic devices, as they have smaller screens than traditional desktop and laptop computers. Some conventional handheld electronic devices attempt to address this need by recreating the desktop computer interface on the handheld electronic device. These attempted solutions, however, fail to take into account: (i) the significant differences in screen size between desktop computers and handled electronic devices, and (ii) the significant differences between keyboard and mouse interaction of desktop computers and those of touch and gesture inputs of handled electronic devices with touch-sensitive displays. Other attempted solutions require complex input sequences and menu hierarchies that are even less user-friendly than those provided on desktop or laptop computers. As such, it is desirable to provide an intuitive and easy-to-use systems and methods for simultaneously accessing multiple functions or applications on handheld electronic devices.

SUMMARY

The embodiments described herein address the need for systems, methods, and graphical user interfaces that provide intuitive and seamless interactions for multitasking on a handheld electronic device. Such methods and systems optionally complement or replace conventional touch inputs or gestures.

(A1) In accordance with some embodiments, a method is performed at an electronic device (e.g., portable multifunction device 100, FIG. 1A) with a touch-sensitive display (e.g., touch screen 112, FIG. 1C). The method includes displaying a first set of one or more applications in a display area that occupies substantially all of a touch-sensitive display. While displaying the first set of one or more applications, the method also includes: (i) displaying a dock overlaying a first portion of the display area, (ii) detecting a contact on the touch-sensitive display over a first affordance displayed within the dock, and the first affordance is associated with a second set of one or more applications, and (iii) detecting movement of the contact away from the dock. Upon detecting a liftoff of the contact from the touch-sensitive display while the contact is over a second portion of the display area different from the first portion, the method further includes: displaying (i) at least some of the first set of one or more applications and (ii) at least some of the second set of one or more applications in the display area that occupies substantially all of the touch-sensitive display. In some instances, users of computing systems must employ inefficient and time-consuming interactions to operate two or more applications. Allowing a user to use a single and simple gesture (e.g., dragging an affordance from a dock and on to a main display area using a single finger) enables users to easily and efficiently activate a mode in which two or more applications are displayed and operated simultaneously. Enabling users to easily and efficiently activate this mode enhances operability of the device and makes the human-machine interface more efficient (e.g., by enabling the users to activate the mode using a single gesture). Additionally, this enables a sustained interaction with the touch-sensitive display that would not otherwise be possible due to having to employ multiple gestures to access two or more applications.

(A1.5) In some embodiments, before detecting liftoff of the contact: after the contact moves to within a threshold distance from an edge of the touch-sensitive display that borders at least some of the first set of one or more applications or at least some of the second set of one or more applications, resizing the first set of one or more applications to reveal the second portion of the display area adjacent to the resized first set of one or more applications.

(A2) In some embodiments of the method of A1, the method includes: after the contact moves at least a threshold distance away from the dock, resizing the first set of one or more applications to reveal the second portion of the display area adjacent to the resized first set of one or more applications. In some instances, users of computing systems may not appreciate the changes that will result from certain interactions on the touch-sensitive display. Providing clear visual feedback (e.g., resizing the first set of one or more applications to reveal the second portion of the display area) gives the user an opportunity to preview changes that will occur after they release (or liftoff) the contact. Providing this clear visual feedback enhances operability of the device and makes the human-machine interface more efficient (e.g., by enabling the users to understand changes that will occur and to avoid having to reverse unwanted changes). Additionally, this enables a sustained interaction with the touch-sensitive display that would not otherwise be possible due to users having to repeatedly undo or reverse undesired changes that they were not able to anticipate.

(A3) In some embodiments of the method of any one of A1.5 or A2, displaying (i) at least some of the first set of one or more applications and (ii) at least some of the second set of one or more applications in the display area that occupies substantially all of the touch-sensitive display includes: displaying the at least some of the second set of one or more applications in the second portion of the display area, and displaying the at least some of the first set of one or more applications in a remaining portion of the display area that is adjacent to the second portion of the display area.

(A4) In some embodiments of the method of any one of A1-A3, the method further includes, before detecting liftoff of the contact: displaying a representation of the affordance in proximity to the contact until the contact moves a threshold distance away from the dock; and in accordance with determining that the contact has moved at least the threshold distance away from the dock, ceasing to display the representation of the affordance and displaying a thumbnail of content associated with the second application in proximity to the contact. In this way, the user is provided with additional visual feedback that helps them appreciate and understand changes that will occur after they release (or liftoff) the contact. Providing this additional visual feedback enhances operability of the device and makes the human-machine interface more efficient (e.g., by enabling the users to better understand changes that will occur and to avoid having to reverse unwanted changes). Additionally, this enables a sustained interaction with the touch-sensitive secondary display that would not otherwise be possible due to users having to repeatedly undo or reverse undesired changes that they were not able to anticipate.

(A5) In some embodiments of the method of A4, the method further includes: resizing the thumbnail to match a display size of the first portion or the second portion, as the contact is moved on top of the first portion or the second portion, respectively. In this way, the user is provided with further visual feedback that helps them appreciate and understand changes that will occur after they release (or liftoff) the contact. Providing this further visual feedback enhances operability of the device and makes the human-machine interface more efficient (e.g., by enabling the users to better understand changes that will occur and to avoid having to reverse unwanted changes). Additionally, this enables a sustained interaction with the touch-sensitive secondary display that would not otherwise be possible due to users having to repeatedly undo or reverse undesired changes that they were not able to anticipate.

(A6) In some embodiments of the method of any one of claims A1-A5, displaying the dock includes: detecting an initial contact on the touch-sensitive display; and in response to detecting movement of the initial contact in a direction that is substantially perpendicular to a bottom portion of the touch-sensitive display, displaying the dock in the first portion of the touch-sensitive display. Allowing the user to employ a simple, easy-to-use, and repeatable gesture to activate the dock helps to ensure that the user interface is made to operate more efficiently, as the user does not need to waste time searching for application-specific affordances, and is instead able to quickly access the dock and open application-specific affordances using the dock. This also helps to ensure that the user has a sustained interaction with the electronic device as they are able to fluidly move from accessing the dock to activating a split-view mode of operation in which the user is able to simultaneously interact with two different applications (as discussed in more detail below).

(A6.1) In some embodiments of the method of any one of A1-A4, the method includes, before detecting liftoff of the contact: displaying a representation of the first affordance in proximity to the contact until the contact moves a threshold distance away from the dock; and in accordance with determining that the contact has moved at least the threshold distance away from the dock, displaying a user interface object surrounding the representation of the first affordance in proximity to the contact.

(A6.2) In some embodiments of the method of A6.1, the user interface object has a first shape, and the method further comprises, before detecting the liftoff of the contact: modifying the user interface object to have a second shape or a third shape as the contact is moved on top of the first portion or the second portion, respectively, and the first shape is distinct from the second and third shapes.

(A7) In some embodiments of the method of any one of claims A1-A6, the first set comprises one first application, the second set comprises one second application, the affordance is associated with the one second application, and upon detecting the lift-off of the contact (e.g., while the contact is located within a threshold distance of an edge of the touch-sensitive display that borders the one first application), the first and second applications are displayed side-by-side in the display area. In instances in which the first set comprises one first application and the second set comprises one second application, users of computing systems are able to activate a split-view mode in which the first application and the second application are displayed together by simply dragging an affordance corresponding to the second application over the second portion of the display. Providing clear visual feedback (e.g., revealing the second portion of the display area after the contact moves the threshold distance) gives the user an opportunity to preview changes that will occur after they release (or liftoff) the contact. Providing this clear visual feedback enhances operability of the device and makes the human-machine interface more efficient (e.g., by enabling the users to understand that releasing the contact will activate a split-view mode that includes the first and second applications). Additionally, this enables a sustained interaction with the touch-sensitive display that would not otherwise be possible due to users having to repeatedly undo or reverse undesired changes that they were not able to anticipate.

(A7.1) In some embodiments of the method of A7, upon detecting the lift-off of the contact while the contact is located over the one first application, the second application is displayed overlaying the first application in the display area.

(A8) In some embodiments of the method of any one of A1-A7, the first set comprises at least a first application and a second application, the second set comprises one third application, and the affordance is associated with the one third application. In instances in which the first set comprises a first application and a second application and the second set comprises one second application, then users of computing systems are able to add a new application to a split-view mode in which the first application and the second application are displayed together by simply dragging an affordance corresponding to a third application on to the display. Providing clear visual feedback (e.g., revealing the second portion of the display area after the contact moves the threshold distance) gives the user an opportunity to preview changes that will occur after they release (or liftoff) the contact. Additionally, this enables a sustained interaction with the touch-sensitive display that would not otherwise be possible due to users having to repeatedly undo or reverse undesired changes that they were not able to anticipate.

(A9) In some embodiments of the method of A8, the method further includes, in accordance with determining that the liftoff of the contact occurs over the second application, replacing the second application with the third application on the touch-sensitive display. In this way, the users are provided with the ability to replace the second application with the third application in the split-view mode, thereby enable a sustained interaction in which the user is able to quickly and easily substitute in a new application to be viewed simultaneously with the first application.

(A9.1) In some embodiments of the method of A9, the method further includes: upon detecting the lift-off of the contact while the contact is located over the one first application, the second application is displayed overlaying the first application in the display area.

(A10) In some embodiments of the method of any one of A1-A9, the first set comprises a first group of at least two pinned applications, the second set comprises a second group of at least two pinned applications, and the affordance is associated with the second group of at least two pinned applications. In instances in which the first and second sets each comprise groups of pinned applications, then users of computing systems are able to add a new group of pinned applications to a split-view mode by simply dragging an affordance corresponding to the second group on to the display. Providing clear visual feedback (e.g., revealing the second portion of the display area after the contact moves the threshold distance) gives the user an opportunity to preview changes that will occur after they release (or liftoff) the contact. Additionally, this enables a sustained interaction with the touch-sensitive display that would not otherwise be possible due to users having to repeatedly undo or reverse undesired changes that they were not able to anticipate.

(A11) In some embodiments of the method of A10, the method further includes: in accordance with a determination that liftoff of the contact occurs over the first group of applications, replacing the first group of at least two pinned applications with the second group of at least two pinned applications. In this way, the users are provided with the ability to quickly switch a first group of pinned applications for a second group of pinned applications, thereby enabling a sustained interaction in which the user is able to quickly and easily substitute in new groups of pinned applications on to the display.

(A12) In some embodiments of the method of any one of claims A1-A11, the first set of one or more applications comprises an instance of a first application, the second set of one or more applications comprises an additional instance of the first application, and the instance and the additional instance are distinct instances of the first application. In instances in which the first and second sets each comprise different instances of the same first application, then users of computing systems are able to pin two different instances of a single application next to each other. Allowing pinning of two different instances together, offers users an improved man-machine interface (e.g., by ensuring that users are able to interact with different features of a single application simultaneously, such as, e.g., editing a message in a messaging application while also copying content from a different message in that same messaging application). Additionally, this enables a sustained interaction with the touch-sensitive display that would not otherwise be possible due to users having to repeatedly undo or reverse undesired changes that they were not able to anticipate.

(A13) In yet another aspect, an electronic device is provided and the electronic device includes a touch-sensitive display, one or more processors, and memory storing one or more programs, which when executed by the one or more processors cause the electronic device to perform the method described in any one of A1-A12.

(A14) In an additional aspect, an electronic device is provided, the electronic device including: a touch-sensitive display and means for performing the method described in any one of A1-A12.

(A15) In still one more aspect, a non-transitory computer-readable storage medium is provided. The non-transitory computer-readable storage medium stores executable instructions that, when executed by an electronic device with a touch-sensitive display, cause the electronic device to perform the method described in any one of A1-A12.

(A16) In another aspect, a graphical user interface on an electronic device with a touch-sensitive display is provided. The graphical user interface includes user interfaces displayed in accordance with the method described in any one of A1-A12.

(B1) In accordance with some embodiments, a method is performed at an electronic device (e.g., portable multifunction device 100, FIG. 1A) with a touch-sensitive display (e.g., touch screen 112, FIG. 1C). The method includes displaying a first application and a second application in a display area that occupies substantially all of a touch-sensitive display. While displaying the first application and the second application in the display area, the method also includes displaying an affordance near an edge of the second application and detecting a contact over the affordance that moves in a direction across the touch-sensitive display. In accordance with a determination that the direction is a first direction, the method further includes: resizing the first application to occupy substantially all of the display area and displaying the second application overlaying the resized first application. In accordance with a determination that the direction is a second direction, substantially perpendicular to the first direction, the method includes moving the second application within the display area. In some instances, users of computing systems must employ inefficient and time-consuming interactions to operate two or more applications. Allowing a user to interact with a handle to either activate a slide-over mode or move a particular application within the display area enables users to easily and efficiently move applications around and switch between a side-by-side view or a slide-over view. Enabling users to easily and efficiently move applications around and to switch between different modes of using two or more applications at the same time enhances operability of the device and makes the human-machine interface more efficient (e.g., by enabling the users to choose how to interact with the two or more applications at the same time, e.g., using a side-by-side view or using a slide-over/overlay mode). Additionally, this enables a sustained interaction with the touch-sensitive display that would not otherwise be possible due to having to employ multiple gestures to customize simultaneous interactions with two or more applications.

(B2) In some embodiments of the method of B1, the method further includes while the second application overlays the resized first application, detecting user input at the first application; and responding to the user input via the first application. Allowing users to interact with the first application, even while the second application is overlaid on top of the first application enables users to customize how they want to simultaneously interact with two applications that are displayed at the same time. Enabling users to customize their user experiences in this way enhances operability of the device and makes the human-machine interface more efficient (e.g., their customized selections will allow them to use various features more efficiently instead of having to make a default arrangement work). Additionally, this enables a sustained interaction with the touch-sensitive display that would not otherwise be possible due to users being forced to interact with two or more applications that are displayed together in a default way and without any user-specific customizations.

(B3) In some embodiments of the method of B2, the method includes, after the determination that the direction is the first direction, in response to a request to open a third application, distinct from the first and the second applications, (i) displaying the third application in a portion of the display area previously occupied by the first application and (ii) displaying the second application overlaying the third application. Allowing an overlaid application to remain displayed after users have opened up a new application helps to ensure that a sustained interaction is maintained with features of the electronic device (e.g., features accessed by the user through the overlaid application that may have to be re-opened again if the overlaid application did not remain displayed). Because users are also able to avoid having to re-open features of the overlaid application, the operability of the device is improved and the human-machine interface is also made to operate more efficiently.

(B4) In some embodiments of the method of any one of B1-B3, the second application is initially displayed as bordering a first edge of the touch-sensitive display, and moving the second application within the display area includes: (i) moving the second application in the second direction until the second application borders a second edge, opposite to the first edge, of the touch-sensitive display; and (ii) displaying the first application in a remaining portion of the display area, distinct from a portion occupied by the second application, so that the first application borders the first edge of the touch-sensitive display. Allowing users to move around an application by dragging the affordance (e.g., a handle that is displayed over the overlaid application) helps to enable users to customize how they want to simultaneously interact with two applications that are displayed at the same time. Enabling users to customize their user experiences in this way enhances operability of the device and makes the human-machine interface more efficient (e.g., their customized selections with respect to where each application should be displayed allows them to use various features more efficiently instead of having to make a default arrangement work). Additionally, this enables a sustained interaction with the touch-sensitive display that would not otherwise be possible due to users being forced to interact with two or more applications that are displayed together in a default way and without any user-specific customizations.

(B5) In some embodiments of the method of B4, before moving the second application until the second application borders the second edge, a preview of the portion occupied by the second application is revealed next to the first application. In some instances, users of computing systems may not appreciate the changes that will result from certain interactions on the touch-sensitive display. Providing clear visual feedback (e.g., showing a preview of where the second application will be move to) gives the user an opportunity to preview changes that will occur after they release (or liftoff) the contact. Providing this clear visual feedback enhances operability of the device and makes the human-machine interface more efficient (e.g., by enabling the users to understand changes that will occur and to avoid having to reverse unwanted changes). Additionally, this enables a sustained interaction with the touch-sensitive display that would not otherwise be possible due to users having to repeatedly undo or reverse undesired changes that they were not able to anticipate.

(B6) In some embodiments of the method of any one of B1-B5, the first direction is a downward direction, relative to the edge of the second application, and the second direction is a lateral direction that is substantially perpendicular to the downward direction. Allowing users to move a handle in different directions helps to offer users additional and simple ways to flexibly customize how they want to simultaneously interact with two applications that are displayed at the same time. Enabling users to customize their user experiences in this way enhances operability of the device and makes the human-machine interface more efficient (e.g., their customized selections with respect to where each application should be displayed allows them to use various features more efficiently instead of having to make a default arrangement work). Additionally, this enables a sustained interaction with the touch-sensitive display that would not otherwise be possible due to users being forced to interact with two or more applications that are displayed together in a default way and without any user-specific customizations.

(B7) In some embodiments of the method of any one of B1-B6, the method includes, before displaying the affordance, detecting user input at the edge of the second application and displaying the affordance in response to detecting the user input. In this way, the users are provided with a simple gesture that is used to activate display of the handle, thereby enhancing operability of the device (e.g., by ensuring that the handle is only displayed when it is needed by a user).

(B8) In some embodiments of the method of B7, the user input includes a contact at the edge of the second application and movement of the contact in the first direction across the touch-sensitive display. As discussed above, this provides users with a simple gesture that is used to activate display of the handle, thereby enhancing operability of the device (e.g., by ensuring that the handle is only displayed when it is needed by a user).

(B8.1) In some embodiments of the method of any one of claims B1-B8, after resizing the first application and displaying the second application overlaying the resized first application: detecting an additional contact over the affordance and movement of the additional contact in a third direction that is opposite to the first direction; in response to detecting that the additional contact has moved the threshold distance in the third direction, ceasing to display the second application overlaying the resized first application and re-displaying the first application and the second application in the display area that occupies substantially all of the touch-sensitive display.

(B8.2) In some embodiments of the method of any one of claims B1-B8, the method further includes, after resizing the first application and displaying the second application overlaying the resized first application: detecting an additional contact over the affordance and movement of the additional contact in the first direction; and in response to detecting that the additional contact has moved a second threshold distance across the touch-sensitive display, scaling down content associated with the second application in accordance with movement of the additional contact until a user interface object with a representation of an affordance corresponding to the second application is displayed.

(B8.3) In some embodiments of the method of B8.2, in accordance with a determination that the additional contact moves over a dock and is lifted off from the touch-sensitive display, dismissing the second application and displaying the first application occupying substantially all of the touch-sensitive display; and in accordance with a determination that the additional contact moves to within a threshold distance of an edge of the touch-sensitive display and is lifted off from the touch-sensitive display, re-displaying the first application and the second application in the display area that occupies substantially all of the touch-sensitive display.

(B9) In some embodiments of the method of any one of B1-B8, displaying the first and second applications in the display area includes simultaneously displaying the first and second applications side-by-side in the display area.

(B10) In yet another aspect, an electronic device is provided and the electronic device includes a touch-sensitive display, one or more processors, and memory storing one or more programs, which when executed by the one or more processors cause the electronic device to perform the method described in any one of B1-B9.

(B11) In an additional aspect, an electronic device is provided, the electronic device including: a touch-sensitive display and means for performing the method described in any one of B1-B9.

(B12) In still one more aspect, a non-transitory computer-readable storage medium is provided. The non-transitory computer-readable storage medium stores executable instructions that, when executed by an electronic device with a touch-sensitive display, cause the electronic device to perform the method described in any one of B1-B9.

(B13) In another aspect, a graphical user interface on an electronic device with a touch-sensitive display is provided. The graphical user interface includes user interfaces displayed in accordance with the method described in any one of B1-B9.

(C1) In accordance with some embodiments, a method is performed at an electronic device (e.g., portable multifunction device 100, FIG. 1A) with a touch-sensitive display (e.g., touch screen 112, FIG. 1C) and one or more processors. The method includes displaying at least two applications in a display area that occupies substantially all of the touch-sensitive display. The method further includes receiving user input that corresponds to a request to display an application-switcher user interface. In response to receiving the user input, the method further includes displaying the application-switcher user interface on the touch-sensitive display, where the application-switcher user interface includes respective representations of at least some applications that were recently used on the electronic device, and the respective representations include a representation of the display area with the at least two applications.

(C2) In some embodiments of the method of C1, displaying the application-switcher user interface includes displaying a dock that includes a plurality of affordances corresponding to applications available on the electronic device. In some embodiments, the method further includes: (i) detecting contact over an affordance of the plurality of affordances included in the dock; (ii) detecting movement of the contact towards the representation of the display area; and (iii) upon detecting liftoff of the contact over a first application of the at least two applications included in the representation of the display area, the method further includes ceasing to display the first application in the representation of the display area and instead displaying an additional application corresponding to the affordance within the representation of the display area.

(C3) In some embodiments of the method of any one of C1-C2, while displaying the application-switcher user interface, the method further includes: (i) detecting additional user input over a first application of the at least two applications included in the representation of the display area; (ii) in response to detecting the additional user input, displaying a dismiss affordance over at least a portion of the first application; and (iii) upon detecting a selection of the dismiss affordance, closing the first application and displaying an updated representation of a remainder of the at least two applications other than the first application in the application-switcher user interface.

(C4) In some embodiments of the method of any one of C1-C3, the method further includes: (i) detecting a contact over a first application of the at least two applications included in the representation of the display area; (ii) detecting movement of the contact away from the representation of the display area; and (iii) upon detecting that the contact has moved to a predefined area within the application-switcher user interface, ceasing to display the first application in the representation and displaying an updated representation of a remainder of the at least two applications other than the first application in the application-switcher user interface.

(C5) In some embodiments of the method of C4, a dock is displayed overlaying at least the predefined area of the application-switcher user interface, the dock including affordances corresponding to a plurality of applications available on the electronic device.

(C6) In some embodiments of the method of any one of C1-C5, displaying the application-switcher user interface includes gradually decreasing a size of the display area until it reaches a predefined size associated with the representation.

(C7) In some embodiments of the method of any preceding claim, the respective representations include an additional representation of an additional application that is associated with an overlaid application, and the additional representation does not show the overlaid application.

(C8) In some embodiments of the method of any preceding claim, displaying the at least two applications in the display area includes simultaneously displaying the at least two applications side-by-side in the display area, and displaying the representation of the display area with the at least two applications includes simultaneously displaying the at least two applications side-by-side in the representation of the display area.

(C9) In yet another aspect, an electronic device is provided and the electronic device includes a touch-sensitive display, one or more processors, and memory storing one or more programs, which when executed by the one or more processors cause the electronic device to perform the method described in any one of C1-C8.

(C10) In an additional aspect, an electronic device is provided, the electronic device including: a touch-sensitive display and means for performing the method described in any one of C1-C8.

(C11) In still one more aspect, a non-transitory computer-readable storage medium is provided. The non-transitory computer-readable storage medium stores executable instructions that, when executed by an electronic device with a touch-sensitive display, cause the electronic device to perform the method described in any one of C1-C8.

(C12) In still another aspect, an information processing apparatus for use in an electronic device with a touch-sensitive display is provided. The information processing apparatus includes means for performing the method described in any one of C1-C8.

(C13) In another aspect, a graphical user interface on an electronic device with a touch-sensitive display is provided.

The graphical user interface includes user interfaces displayed in accordance with the method described in any one of C1-C8.

(D1) In accordance with some embodiments, a method for activating two or more instances of the same application. For example, a first instance of a mail application (e.g., displaying an inbox) is open on one side of the screen, while a second instance of the same mail application (e.g., displaying an individual email reply) is open on the other side of the screen. An instance is a concrete single occurrence of an object, existing usually during the runtime of a computer program, e.g., each time a program or application runs, it is an instance of that program. In some embodiments, the method is performed at an electronic device (e.g., portable multifunction device 100, FIG. 1A) with a touch-sensitive display (e.g., touch screen 112, FIG. 1C) and one or more processors. In this embodiment, initially, a first instance of an application is displayed on substantially all of the touch-sensitive display. Then, a contact is detected over an affordance displayed within the first instance of the application. Movement of the contact is then detected across the touch-sensitive display. Upon detecting a liftoff of the contact after the contact has moved across the touch-sensitive display, and to within a predefined portion of the touch-sensitive display, activating a split-view mode of operation for the electronic device that includes simultaneously displaying: (i) a second instance, distinct from the first instance, of the application is displayed with content associated with the affordance, and (ii) at least a portion of the first instance of the application, wherein the second instance and the portion of the first instance are displayed as occupying substantially all of the touch-sensitive display.

In some embodiments, the first and second instances of the application are distinct executable processes that are executing on the one or more processors of the electronic device (e.g., two distinct instantiations of the application that are both separately executing on the one or more processors of the electronic device). Stated another way, after detecting the liftoff, the second instance of the application is instantiated and then displayed side-by-side with the first instance of the application, thereby enabling a user to easily/conveniently view and use content from the first instance while also interacting with the second instance.

In some instances, users of computing systems lose access to certain features of an application after selecting to open other features within an application (e.g., users may be unable to view a received email after selecting an option to reply to that received email). Opening multiple instances of a single application allows users to continue viewing and using these certain features. Enabling users to continue viewing and using these certain features enhances operability of the device and makes the human-machine interface more efficient (e.g., by enabling the users to use these certain features without having to provide multiple inputs in order to re-open these certain features after they have been closed). Additionally, this enables a sustained interaction with the touch-sensitive display that would not otherwise be possible due to having to employ multiple gestures or inputs to figure out how to re-open or access these certain features after they have been closed or are no longer displayed.

(D2) In some embodiments of the method of D1, before activating the split-view mode, the system detects at least one of: (i) that the contact has moved at least a threshold distance (e.g., 1-2 centimeters) across the touch-sensitive display, and (ii) the contact has moved to a predefined portion of the touch-sensitive display. In other words, in some embodiments the system determines whether the contact has moved at least a threshold distance (e.g., 1-2 centimeters) across the touch-sensitive display, while in other embodiments, the system determines whether the contact has moved to a predefined portion of the touch-sensitive display (e.g., the right third to half of the screen). In yet other embodiments, the system determines whether either of these movements has occurred, while in other embodiments the system determines whether both of these movements have occurred. In response to detecting that the contact has moved at least the threshold distance or to a predefined portion of the screen, (i) the first instance of the application is resized to occupy a first portion of the touch-sensitive display, and (ii) the predefined portion of the touch-sensitive display adjacent to the first portion is revealed. In this way, users of computing systems are provided with a preview that reveals the second portion of the display, to provide them with a visual preview as to how a split-view mode will look. This enhances operability of the device as users are able to make a decision as to whether to activate the split-view mode or not after viewing the preview, thereby ensuring users are able to discover how to activate a split-view mode and ensuring that users are able to preview such a mode before activating it.

(D3) In some embodiments of the method of D2, activating the split-view mode of operation includes displaying the second instance of the application in the predefined portion of the touch-sensitive display.

(D4) In some embodiments of the method of D1, before detecting movement of the contact across the touch-sensitive display, a preview of content associated with the affordance is displayed beneath the contact. In some embodiments, the preview is displayed only after the contact has remained over the affordance for predetermined period of time (e.g., 1 or 2 seconds). In other embodiments, the preview is displayed only after an intensity of the contact exceeds an intensity threshold (e.g., a hard or deep press).

(D5) In some embodiments of the method of D4, the application is an email application, the affordance is a representation of a message displayed in the first instance of the email application, and the preview is displayed upon detecting that the contact has an intensity of contact that is greater than a predefined intensity threshold.

(D6) In some embodiments of the method of D4, the application is an email application, the affordance is a representation of a message displayed in the first instance of the email application, and the preview is displayed upon detecting that the contact remains on the affordance on the touch-sensitive display for more than a predefined amount of time (e.g., 1, 2, or 3 seconds).

(D7) In some embodiments of the methods of D1-D4, the application is an email application, and the contact over the affordance is a contact over a link (e.g., a reply, a reply all, or a compose new message link) displayed in the first instance of the email application.

(D8) In yet another aspect, an electronic device is provided and the electronic device includes a touch-sensitive display, one or more processors, and memory storing one or more programs, which when executed by the one or more processors cause the electronic device to perform the method described in any one of D1-D7.

(D9) In an additional aspect, an electronic device is provided, the electronic device including: a touch-sensitive display and means for performing the method described in any one of D1-D7.

(D10) In still one more aspect, a non-transitory computer-readable storage medium is provided. The non-transitory computer-readable storage medium stores executable instructions that, when executed by an electronic device with a touch-sensitive display, cause the electronic device to perform the method described in any one of D1-D7.

(D11) In another aspect, a graphical user interface on an electronic device with a touch-sensitive display is provided. The graphical user interface includes user interfaces displayed in accordance with the method described in any one of D1-D7.

(E1) In accordance with some embodiments, a method is performed at an electronic device (e.g., portable multifunction device 100, FIG. 1A) with a touch-sensitive display (e.g., touch screen 112, FIG. 1C). The method includes: displaying content on the touch-sensitive display and detecting movement of a contact in a direction substantially perpendicular to an edge of the touch-sensitive display. The method also includes upon determining that movement of the contact satisfies a first movement-based threshold (e.g., the contact has moved beyond a first threshold distance away from the edge), displaying a dock overlaying at least a portion of the content, the dock including a plurality of affordances that, when selected, cause the electronic device to open a respective application that is available on the electronic device. While displaying the dock and in accordance with a determination that the contact satisfies a second movement-based threshold (e.g., the contact has moved beyond a second threshold distance greater than the first threshold distance away from the edge), the method further includes activating an application-switcher user interface that includes respective selectable representations of at least some applications that were recently used on the electronic device. By providing a single gesture that is used to activate a dock and then an application-switcher user interface, operability of the device is enhanced and the human-machine interface is made to operated more efficiently (e.g., because users are able to provide a single input to activate a dock and an application-switch user interface, instead of having to employ multiple, inefficient, and time-wasting inputs to separately access a dock and then access an application-switcher user interface at some later point in time).

(E1.5) In some embodiments of the method of E1, the first and second movement-based threshold are selected from the group consisting of distance thresholds, velocity thresholds, or acceleration thresholds.

(E2) In yet another aspect, an electronic device is provided and the electronic device includes a touch-sensitive display, one or more processors, and memory storing one or more programs, which when executed by the one or more processors cause the electronic device to perform the method described in any one of E1 to E1.5.

(E3) In an additional aspect, an electronic device is provided, the electronic device including: a touch-sensitive display and means for performing the method described in any one of E1 to E1.5.

(E4) In still one more aspect, a non-transitory computer-readable storage medium is provided. The non-transitory computer-readable storage medium stores executable instructions that, when executed by an electronic device with a touch-sensitive display, cause the electronic device to perform the method described in any one of E1 to E1.5.

(E5) In another aspect, a graphical user interface on an electronic device with a touch-sensitive display is provided. The graphical user interface includes user interfaces displayed in accordance with the method described in any one of E1 to E1.5.

Note that the various embodiments described above can be combined with any other embodiments described herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments section below, in conjunction with the following drawings in which like reference numerals refer to corresponding parts throughout the drawings.

FIGS. 7A-7L are schematics of a touch-sensitive display used to illustrate example user interfaces and gestures for activating two or more instances of the same application.

FIGS. 8A-8C are a flowchart representation of a method of activating a split-view mode (in which multiple applications are simultaneously displayed and available for use) by dragging an affordance out of a dock, in accordance with some embodiments.

FIGS. 9A-9C are a flowchart representation of a method of interacting with a single affordance to switch between a split-view mode (in which two applications are pinned together and displayed side-by-side on the display) and a slide over mode (in which one application is displayed overlaying another application on the display), in accordance with some embodiments.

DESCRIPTION OF EMBODIMENTS

Figure 3A:
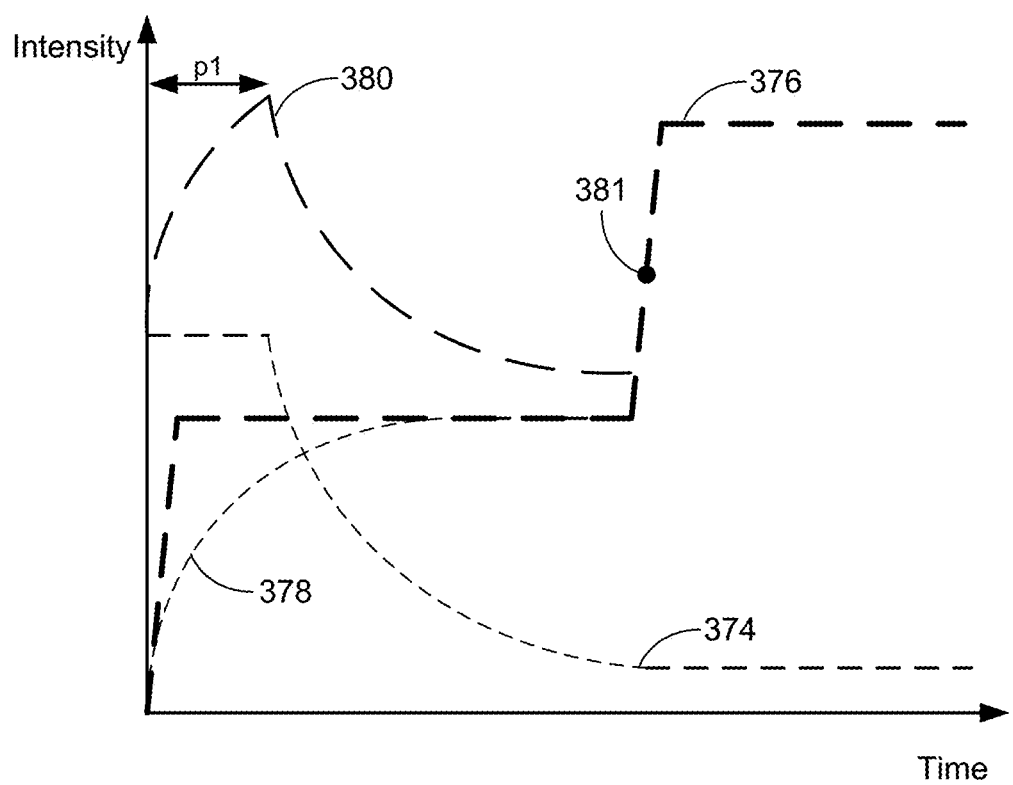
FIGS. 3A-3C illustrate examples of dynamic intensity thresholds in accordance with some embodiments.
Figure 3B:
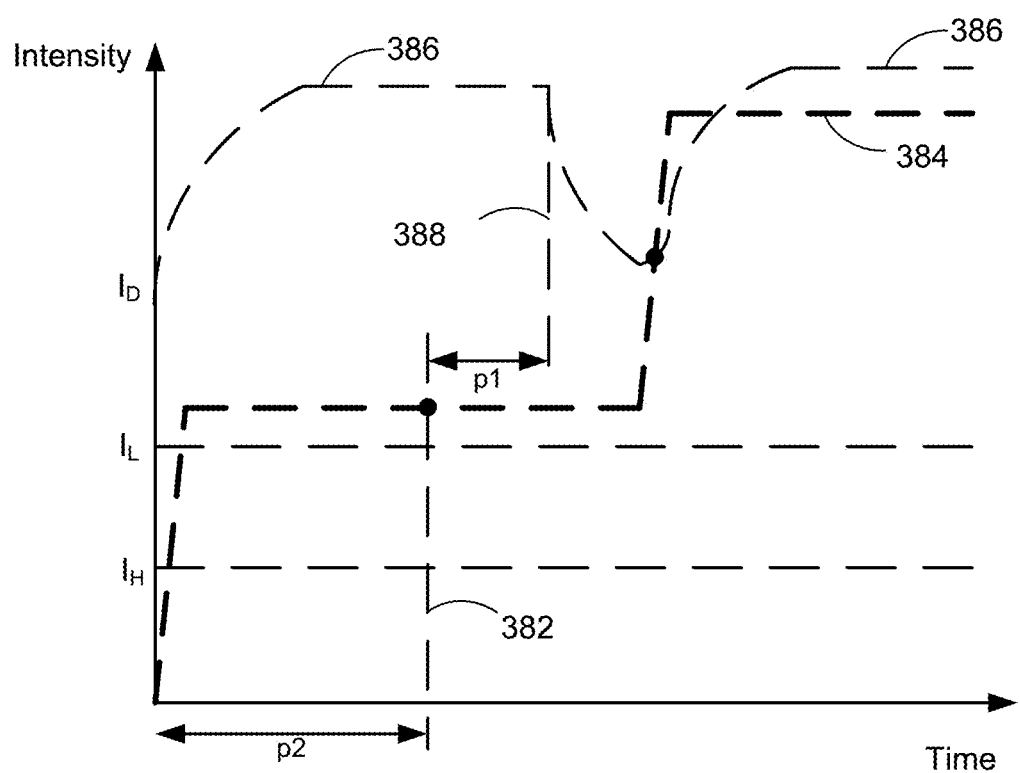
Figure 3C:
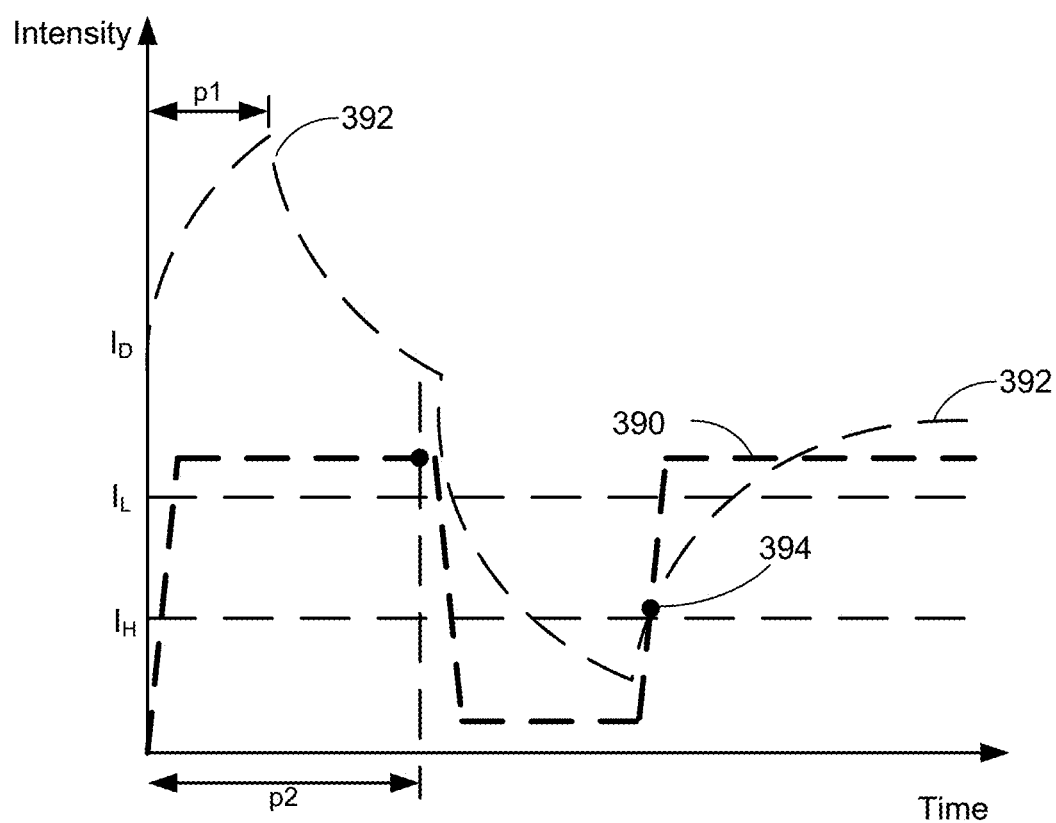
Figure 4A:
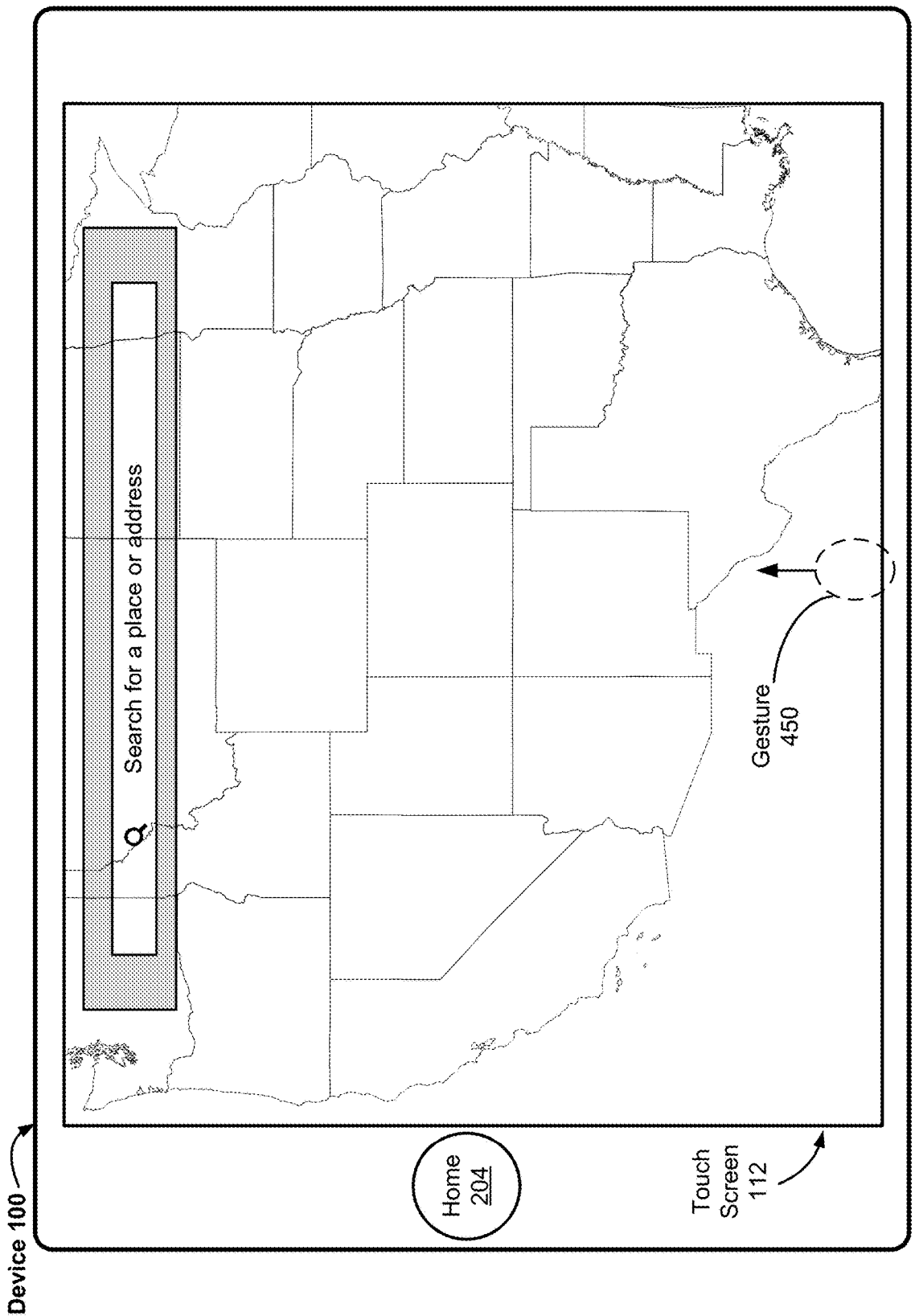
FIG. 4A-4AR are schematics of a touch-sensitive display used to illustrate user interfaces for simultaneously interacting with multiple applications (and gestures used to activate a split-view mode in which simultaneous interactions with multiple applications are available), in accordance with some embodiments.
Figure 5A:
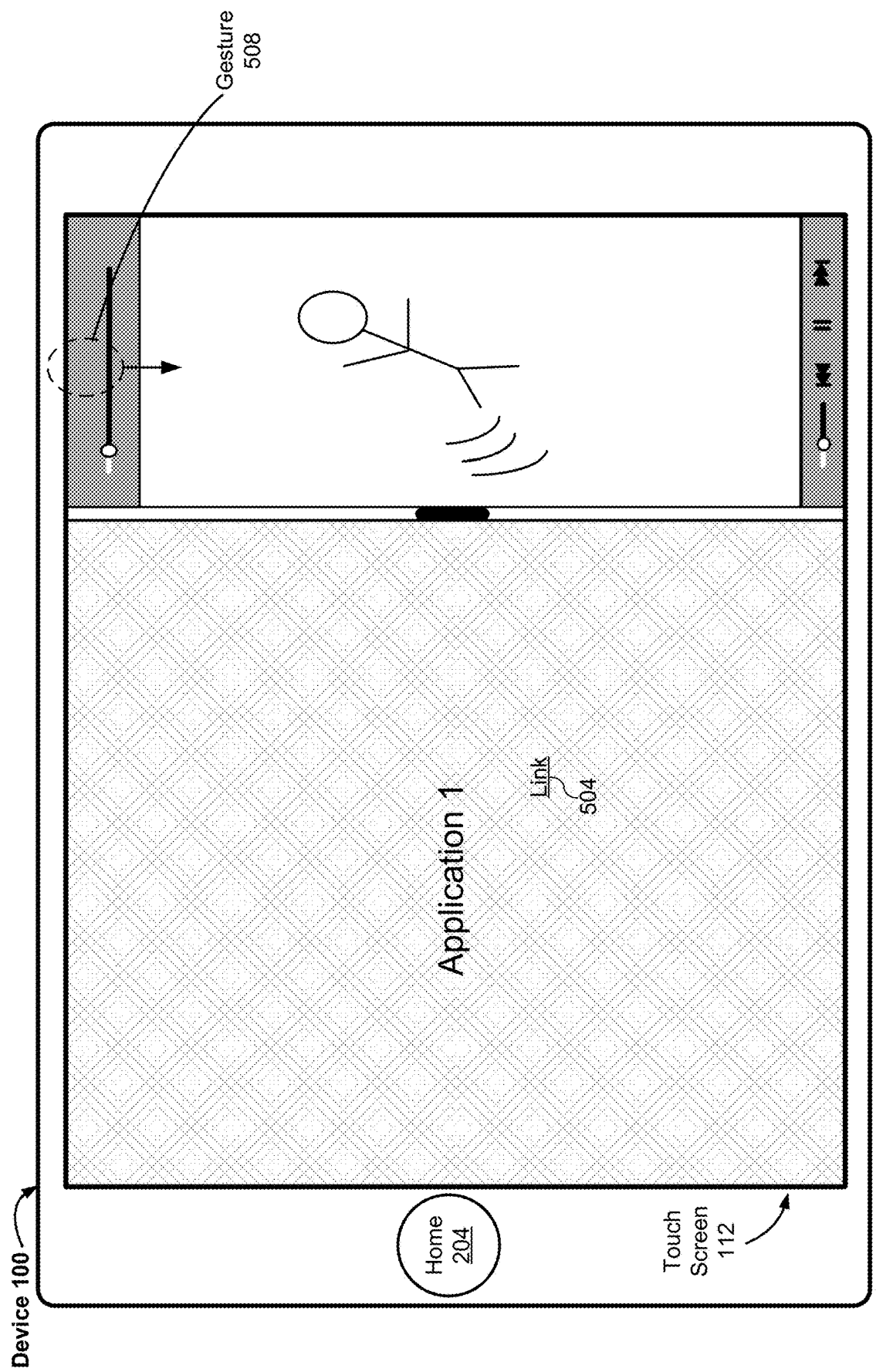
FIGS. 5A-5O are schematics of a touch-sensitive display used to illustrate user interfaces for switching between a split-view mode (in which two applications are pinned together and displayed side-by-side on the display) and a slide over mode (in which one application is displayed overlaying another application on the display), in accordance with some embodiments.

FIGS. 1A-1D and 2 provide a description of example devices. FIGS. 3A-3C illustrate examples of dynamic intensity thresholds. FIG. 4A-4AA are schematics of a touch-sensitive display used to illustrate user interfaces for simultaneously interacting with multiple applications (and gestures used to activate a split-view mode in which simultaneous interactions with multiple applications are available), and these figures are used to illustrate the methods/processes shown in FIGS. 8A-8C. FIGS. 5A-5O are schematics of a touch-sensitive display used to illustrate user interfaces for switching between a split-view mode (in which two applications are pinned together and displayed side-by-side on the display) and a slide over mode (in which one application is displayed overlaying another application on the display), and these figures are used to illustrate the methods/processes of FIGS. 9A-9B. FIGS. 6A-6Q are schematics of a touch-sensitive display used to illustrate a continuous gesture that allows for first activating a dock and then activating an application-switcher user interface on the display, and these figures are used to illustrate the methods/processes of FIGS. 10A-10C and FIG. 12. FIGS. 7A-7L are schematics of a touch-sensitive display used to illustrate user interfaces for simultaneously interacting with multiple instances of a single application (e.g., multiple, distinct executable instances of a single email application), and these figures are used to illustrate the methods/processes of FIGS. 11A-11B.

DETAILED DESCRIPTION

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The disclosure herein interchangeably refers to detecting a touch input on, at, over, on top of, or substantially within a particular user interface element or a particular portion of a touch-sensitive display. As used herein, a touch input that is detected "at" a particular user interface element could also be detected "on," "over," "on top of," or "substantially within" that same user interface element, depending on the context. In some embodiments and as discussed in more detail below, desired sensitivity levels for detecting touch inputs are configured by a user of an electronic device (e.g., the user could decide (and configure the electronic device to operate) that a touch input should only be detected when the touch input is completely within a user interface element).

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the IPHONE®, IPOD TOUCH®, and IPAD® devices from APPLE Inc. of Cupertino, Calif. Other portable electronic devices, such as laptops or tablet computers with touch-sensitive surfaces (e.g., touch-sensitive displays and/or touch pads), are, optionally, used. It should also be understood that, in some embodiments, the device is not a portable communications device, but is a desktop computer with a touch-sensitive surface (e.g., a touch-sensitive display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a fitness application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
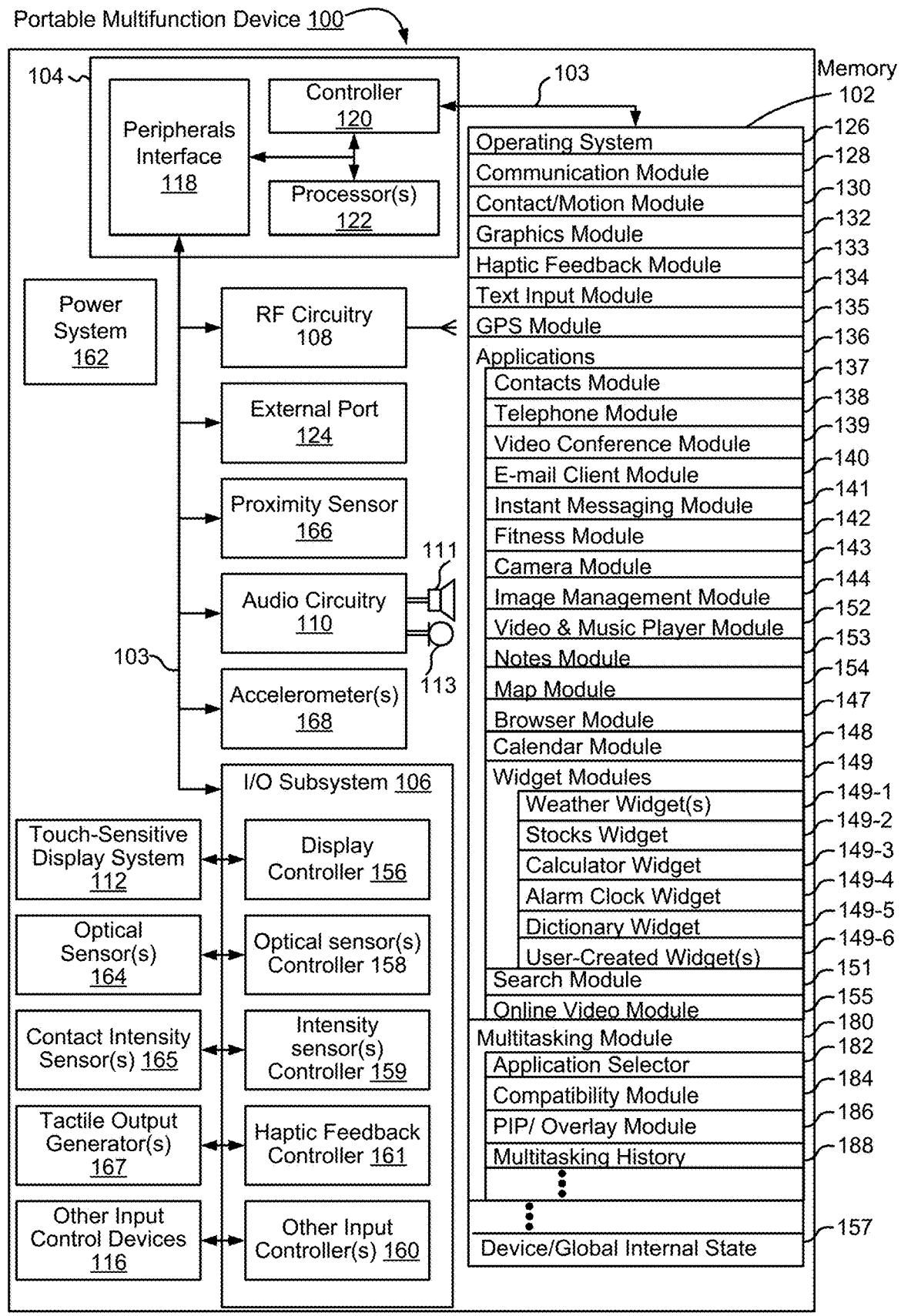
FIG. 1A is a high-level block diagram of a computing device with a touch-sensitive display, in accordance with some embodiments.

Attention is now directed toward embodiments of portable electronic devices with touch-sensitive displays. FIG. 1A is a block diagram illustrating portable multifunction device 100 (also referred to interchangeably herein as electronic device 100 or device 100) with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), controller 120, one or more processing units (CPU's) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, CPU 122, and controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.1 1 a, IEEE 802.1 lb, IEEE 802.11 g and/or IEEE 802.1 ln).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an example embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the IPHONE®, IPOD TOUCH®, and IPAD® from APPLE Inc. of Cupertino, Calif.

Touch screen 112 optionally has a video resolution in excess of 400 dpi. In some embodiments, touch screen 112 has a video resolution of at least 600 dpi. In other embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIG. 1A. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (e.g., orientation of the device). In some embodiments, device/global internal state 157 communicates with multitasking module 180 to keep track of applications activated in a multitasking mode (also referred to as a shared screen view, shared screen mode, or multitask mode). In this way, if device 100 is rotated from portrait to landscape display mode, multitasking module 180 is able to retrieve multitasking state information (e.g., display areas for each application in the multitasking mode) from device/global internal state 157, in order to reactivate the multitasking mode after switching from portrait to landscape. Additional embodiments of stateful application behavior in multitasking mode are discussed in reference to FIGS. 43A-45C below.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-sensitive display can be set to any of a large range of predefined thresholds values without changing the trackpad or touch-sensitive display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

Figure 1B:
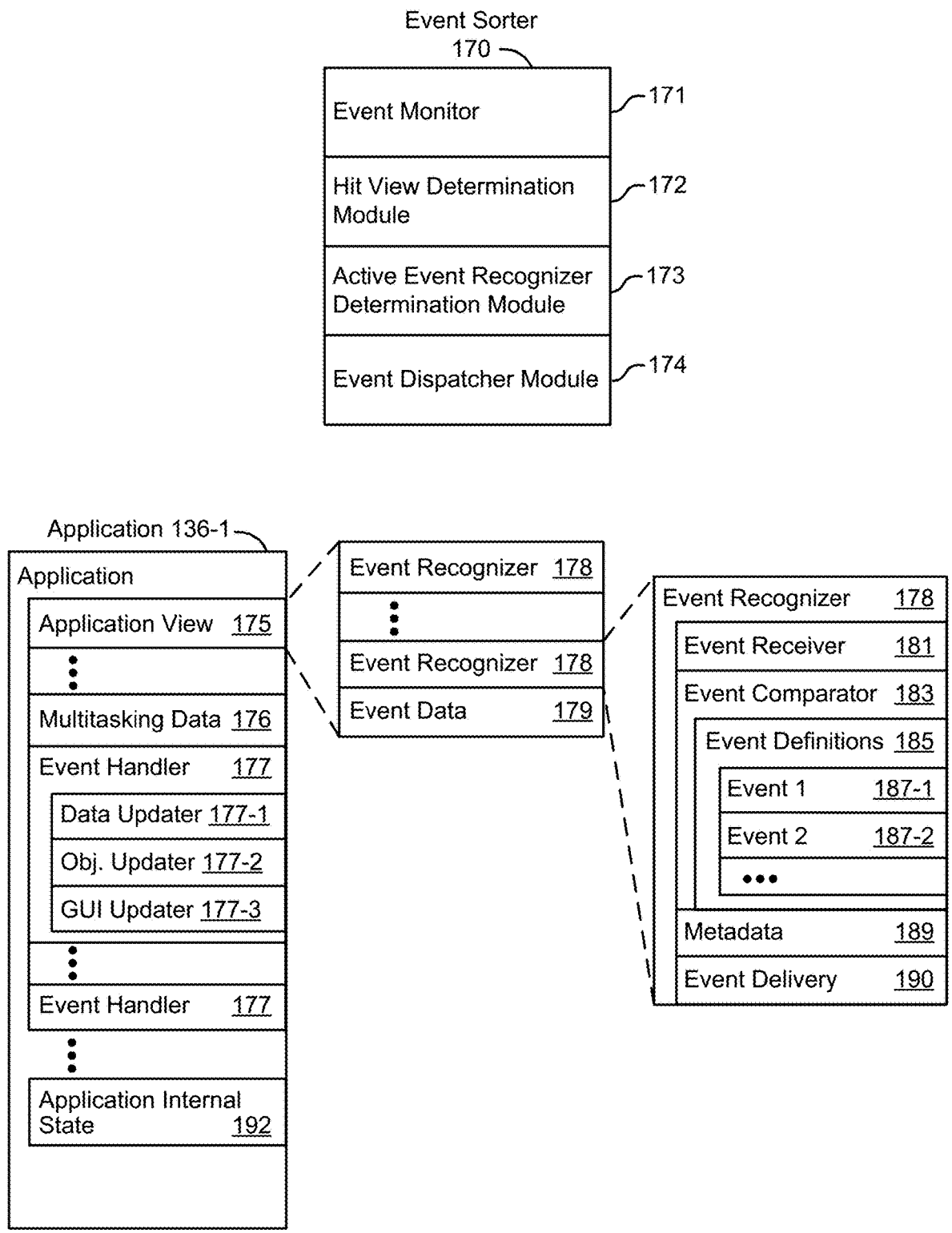
FIG. 1B is a block diagram of example components for event handling, in accordance with some embodiments.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156. In some embodiments, graphics module 132 retrieves graphics stored with multitasking data 176 of each application 136 (FIG. 1B). In some embodiments, multitasking data 176 stores multiple graphics of different sizes, so that an application is capable of quickly resizing while in a shared screen mode (resizing applications is discussed in more detail below with reference to FIGS. 6A-6J, 37A-37G, and 40A-40D).

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
fitness module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 146, fitness module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 1A, portable multifunction device 100 also includes a multitasking module 180 for managing multitasking operations on device 100 (e.g., communicating with graphics module 132 to determine appropriate display areas for concurrently displayed applications). Multitasking module 180 optionally includes the following modules (or sets of instructions), or a subset or superset thereof:

application selector 182;
compatibility module 184;
picture-in-picture (PIP)/overlay module 186; and
multitasking history 188 for storing information about a user's multitasking history (e.g., commonly-used applications in multitasking mode, recent display areas for applications while in the multitasking mode, applications that are pinned together for display in the split-view/multitasking mode, etc.).

In conjunction with touch screen 112, display controller 156, contact module 130, graphics module 132, and contact intensity sensor(s) 165, application selector 182 includes executable instructions to display affordances corresponding to applications (e.g., one or more of applications 136) and allow users of device 100 to select affordances for use in a multitasking/split-view mode (e.g., a mode in which more than one application is displayed and active on touch screen 112 at the same time). In some embodiments, the application selector 182 is a dock (e.g., the dock 408 described below).

In conjunction with touch screen 112, display controller 156, contact module 130, graphics module 132, and application selector 182, compatibility module 184 includes executable instructions to determine whether a particular application is compatible with a multitasking mode (e.g., by checking a flag, such as a flag stored with multitasking data 176 for each application 136, as pictured in FIG. 1B).

In conjunction with touch screen 112, display controller 156, contact module 130, graphics module 132, and contact intensity sensor(s) 165, PIP/overlay module 186 includes executable instructions to determine reduced sizes for applications that will be displayed as overlaying another application and to determine an appropriate location on touch screen 112 for displaying the reduced size application (e.g., a location that avoids important content within an active application that is overlaid by the reduced size application).

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating example components for event handling in accordance with some embodiments. In some embodiments, memory 102 (in FIG. 1A) includes event sorter 170 (e.g., in operating system 126) and a respective application 136-1 selected from among the applications 136 of portable multifunction device 100 (FIG. 1A) (e.g., any of the aforementioned applications stored in memory 102 with applications 136).

Event sorter 170 receives event information and determines the application 136-1 and application view 175 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 175 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user. In some embodiments, application internal state 192 is used by multitasking module 180 to help facilitate multitasking operations (e.g., multitasking module 180 retrieves resume information from application internal state 192 in order to re-display a previously dismissed side application).

In some embodiments, each application 136-1 stores multitasking data 176. In some embodiments, multitasking data 176 includes a compatibility flag (e.g., a flag accessed by compatibility module 184 to determine whether a particular application is compatible with multitasking mode), a list of compatible sizes for displaying the application 136-1 in the multitasking mode (e.g., ¼, ⅓, ½, or full-screen), and various sizes of graphics (e.g., different graphics for each size within the list of compatible sizes).

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 178). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 181.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 177 and one or more application views 175, each of which includes instructions for handling touch events that occur within a respective view of the application's user interface. Each application view 175 of the application 136-1 includes one or more event recognizers 180. Typically, a respective application view 175 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 177 includes one or more of: data updater 177-1, object updater 177-2, GUI updater 177-3, and/or event data 179 received from event sorter 170. Event handler 177 optionally utilizes or calls data updater 177-1, object updater 177-2 or GUI updater 177-3 to update the application internal state 192. Alternatively, one or more of the application views 175 includes one or more respective event handlers 177. Also, in some embodiments, one or more of data updater 177-1, object updater 177-2, and GUI updater 177-3 are included in a respective application view 175.

A respective event recognizer 178 receives event information (e.g., event data 179) from event sorter 170, and identifies an event from the event information. Event recognizer 178 includes event receiver 181 and event comparator 183. In some embodiments, event recognizer 178 also includes at least a subset of: metadata 189, and event delivery instructions 190 (which optionally include sub-event delivery instructions).

Event receiver 181 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from portrait to landscape, or vice versa), and the event information includes corresponding information about the current orientation (also called device attitude) of the device.

Event comparator 183 compares the event information to predefined event or sub-event definitions and, based on the comparison, determines an event or sub-event, or determines or updates the state of an event or sub-event. In some embodiments, event comparator 183 includes event definitions 185. Event definitions 185 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 177.

In some embodiments, event definition 186 includes a definition of an event for a respective user-interface object. In some embodiments, event comparator 183 performs a hit test to determine which user-interface object is associated with a sub-event. For example, in an application view in which three user-interface objects are displayed on touch-sensitive display 112, when a touch is detected on touch-sensitive display 112, event comparator 183 performs a hit test to determine which of the three user-interface objects is associated with the touch (sub-event). If each displayed object is associated with a respective event handler 177, the event comparator uses the result of the hit test to determine which event handler 177 should be activated. For example, event comparator 183 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 178 determines that the series of sub-events do not match any of the events in event definitions 185, the respective event recognizer 178 enters an event impossible, event failed, or event ended state, after which it disregards subsequent sub-events of the touch-based gesture. In this situation, other event recognizers, if any remain active for the hit view, continue to track and process sub-events of an ongoing touch-based gesture.

In some embodiments, a respective event recognizer 178 includes metadata 189 with configurable properties, flags, and/or lists that indicate how the event delivery system should perform sub-event delivery to actively involved event recognizers. In some embodiments, metadata 189 includes configurable properties, flags, and/or lists that indicate how event recognizers interact, or are enabled to interact, with one another. In some embodiments, metadata 189 includes configurable properties, flags, and/or lists that indicate whether sub-events are delivered to varying levels in the view or programmatic hierarchy.

In some embodiments, a respective event recognizer 178 activates event handler 177 associated with an event when one or more particular sub-events of an event are recognized. In some embodiments, a respective event recognizer 178 delivers event information associated with the event to event handler 177. Activating an event handler 177 is distinct from sending (and deferred sending) sub-events to a respective hit view. In some embodiments, event recognizer 178 throws a flag associated with the recognized event, and event handler 177 associated with the flag catches the flag and performs a predefined process.

In some embodiments, event delivery instructions 190 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 177-1 creates and updates data used in application 136-1. For example, data updater 177-1 updates the telephone number used in contacts module 137, or stores a video file used in video and music player module 145. In some embodiments, object updater 177-2 creates and updates objects used in application 136-1. For example, object updater 177-2 creates a new user-interface object or updates the position of a user-interface object. GUI updater 177-3 updates the GUI. For example, GUI updater 177-3 prepares display information and sends it to graphics module 132 for display on a touch-sensitive display. In some embodiments, GUI updater 177-3 communicates with multitasking module 180 in order to facilitate resizing of various applications displayed in a multitasking mode.

In some embodiments, event handler(s) 177 includes or has access to data updater 177-1, object updater 177-2, and GUI updater 177-3. In some embodiments, data updater 177-1, object updater 177-2, and GUI updater 177-3 are included in a single module of a respective application 136-1 or application view 175. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof is optionally utilized as inputs corresponding to sub-events which define an event to be recognized.

Figure 1C:
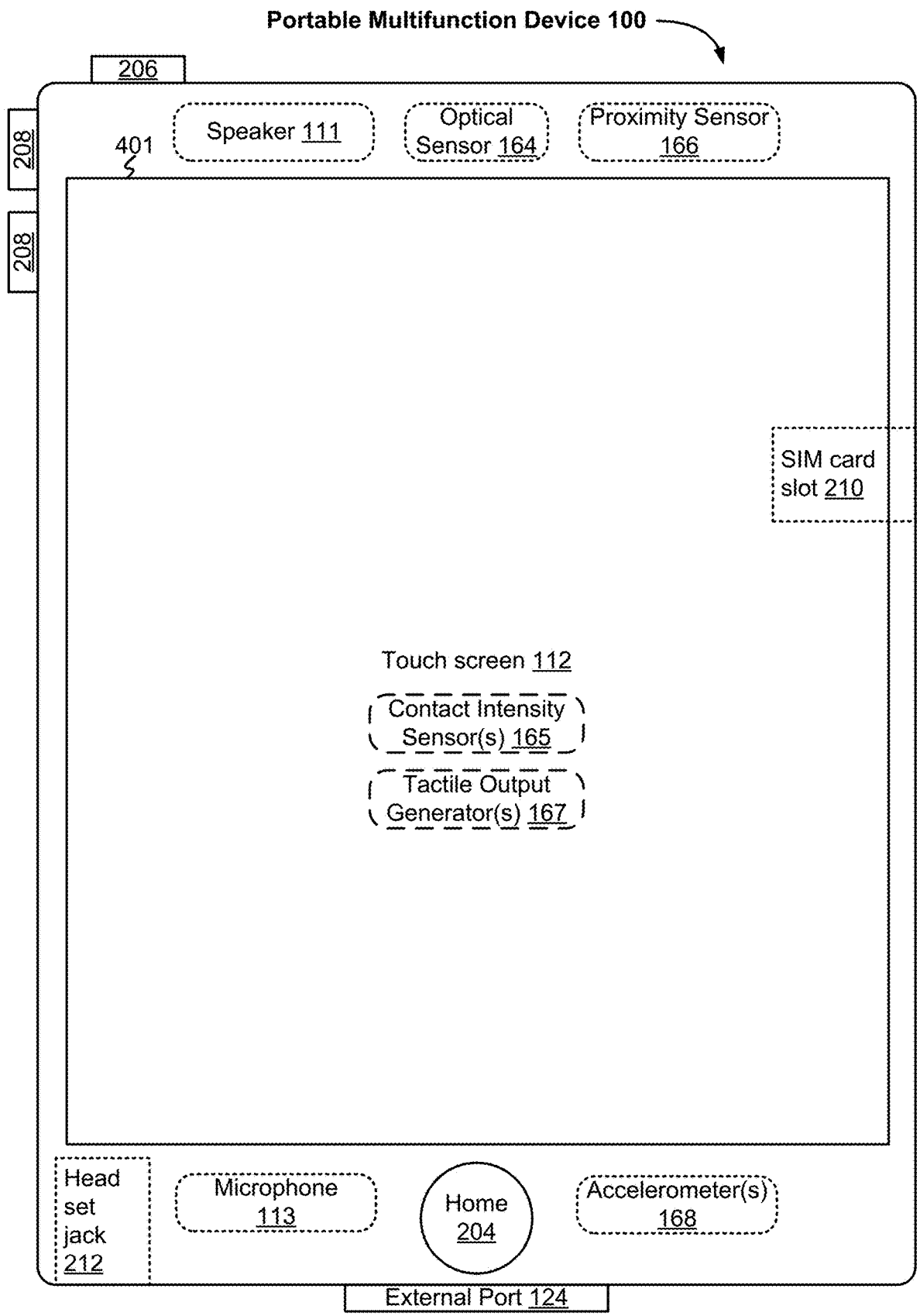
FIG. 1C is a schematic of a portable multifunction device having a touch-sensitive display, in accordance with some embodiments.

FIG. 1C is a schematic of a portable multifunction device (e.g., portable multifunction device 100) having a touch-sensitive display (e.g., touch screen 112) in accordance with some embodiments. The touch-sensitive display optionally displays one or more graphics within user interface (UI) 201a. In this embodiment, as well as others described below, a user can select one or more of the graphics by making a gesture on the screen, for example, with one or more fingers or one or more styluses. In some embodiments, selection of one or more graphics occurs when the user breaks contact with the one or more graphics (e.g., by lifting a finger off of the screen). In some embodiments, the gesture optionally includes one or more tap gestures (e.g., a sequence of touches on the screen followed by liftoffs), one or more swipe gestures (continuous contact during the gesture along the surface of the screen, e.g., from left to right, right to left, upward and/or downward), and/or a rolling of a finger (e.g., from right to left, left to right, upward and/or downward) that has made contact with device 100. In some implementations or circumstances, inadvertent contact with a graphic does not select the graphic. For example, a swipe gesture that sweeps over an application affordance (e.g., an icon) optionally does not launch (e.g., open) the corresponding application when the gesture for launching the application is a tap gesture.

Device 100 optionally also includes one or more physical buttons, such as a "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112. Additional details and alternative configurations of the home button 204 are also provided below in reference to FIG. 5J below.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 1D:
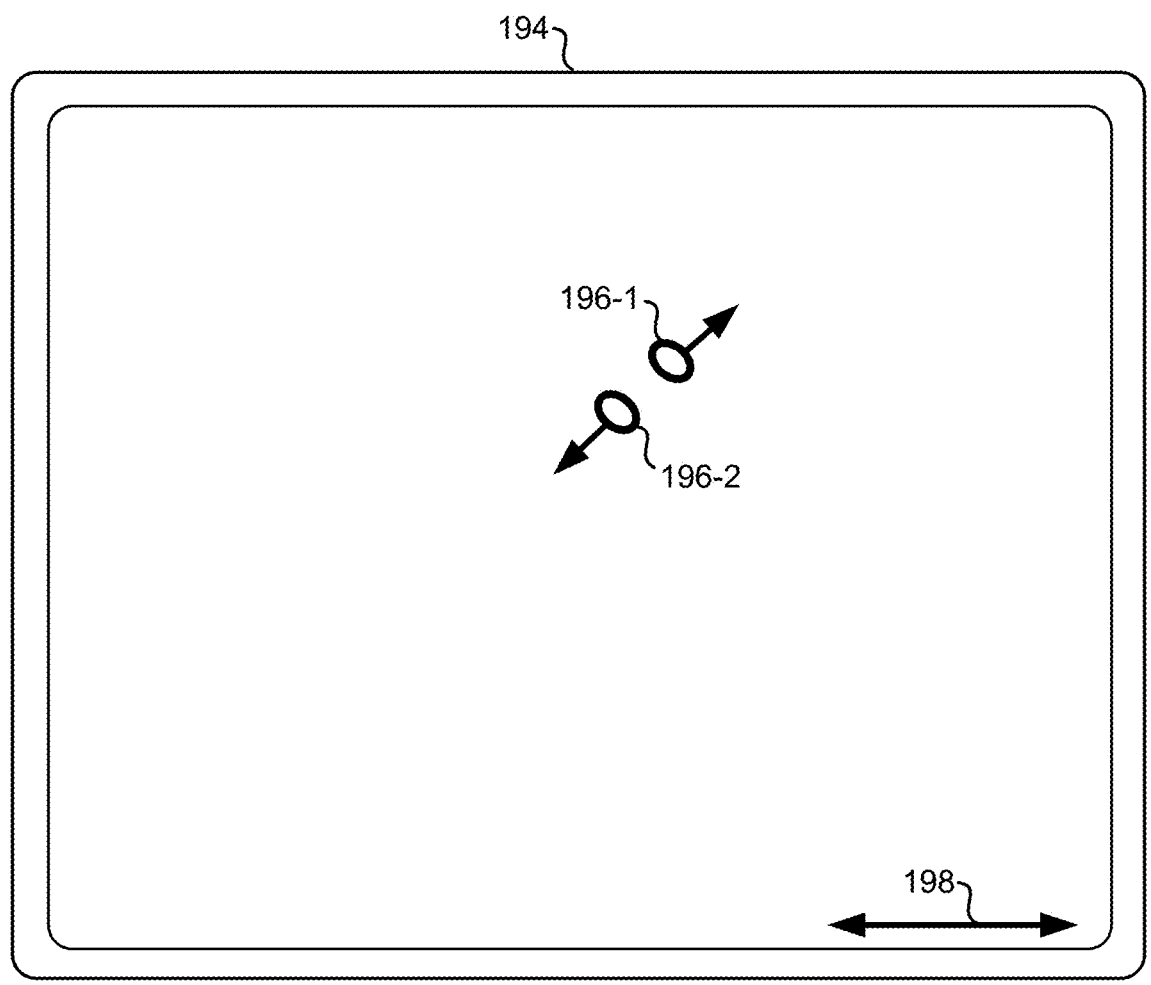
FIG. 1D is a schematic used to illustrate a computing device with a touch-sensitive surface that is separate from the display, in accordance with some embodiments.
Figure 1D:
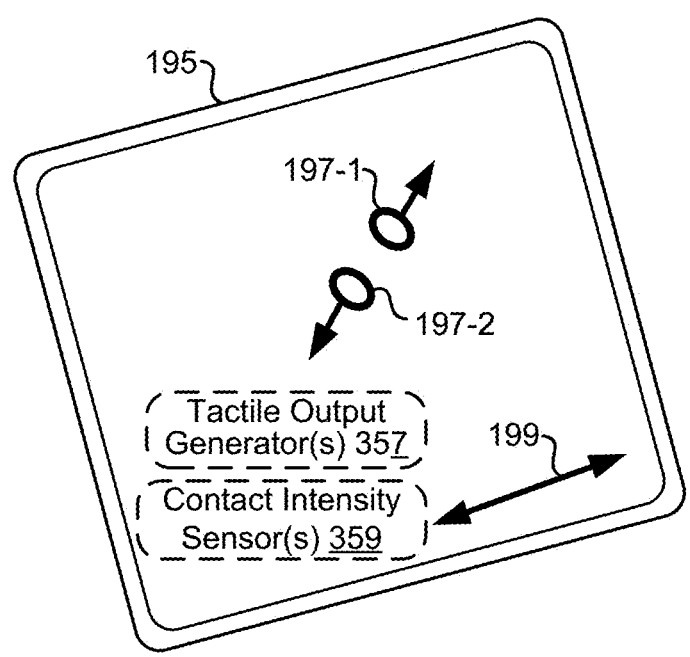

FIG. 1D is a schematic used to illustrate a user interface on a device (e.g., device 100, FIG. 1A) with a touch-sensitive surface 195 (e.g., a tablet or touchpad) that is separate from the display 194 (e.g., touch screen 112). In some embodiments, touch-sensitive surface 195 includes one or more contact intensity sensors (e.g., one or more of contact intensity sensor(s) 359) for detecting intensity of contacts on touch-sensitive surface 195 and/or one or more tactile output generator(s) 357 for generating tactile outputs for a user of touch-sensitive surface 195.

Although some of the examples which follow will be given with reference to inputs on touch screen 112 (where the touch sensitive surface and the display are combined), in some embodiments, the device detects inputs on a touch-sensitive surface that is separate from the display, as shown in FIG. 1D. In some embodiments the touch sensitive surface (e.g., 195 in FIG. 1D) has a primary axis (e.g., 199 in FIG. 1D) that corresponds to a primary axis (e.g., 198 in FIG. 1D) on the display (e.g., 194). In accordance with these embodiments, the device detects contacts (e.g., 197-1 and 197-2 in FIG. 1D) with the touch-sensitive surface 195 at locations that correspond to respective locations on the display (e.g., in FIG. 1D, 197-1 corresponds to 196-1 and 197-2 corresponds to 196-2). In this way, user inputs (e.g., contacts 197-1 and 197-2, and movements thereof) detected by the device on the touch-sensitive surface (e.g., 195 in FIG. 1D) are used by the device to manipulate the user interface on the display (e.g., 194 in FIG. 1D) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touch-sensitive surface 195 in FIG. 1D (touch-sensitive surface 195, in some embodiments, is a touchpad)) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch-sensitive display) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of the portable computing system 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an un-weighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments one or more predefined intensity thresholds are used to determine whether a particular input satisfies an intensity-based criterion. For example, the one or more predefined intensity thresholds include (i) a contact detection intensity threshold $IT_0$, (ii) a light press intensity threshold $IT_L$, (iii) a deep press intensity threshold $IT_D$ (e.g., that is at least initially higher than $I_L$), and/or (iv) one or more other intensity thresholds (e.g., an intensity threshold $I_H$ that is lower than $I_L$). As used herein, $IT_L$ and $I_L$ refer to a same light press intensity threshold, $IT_D$ and $I_D$ refer to a same deep press intensity threshold, and $IT_H$ and $I_H$ refer to a same intensity threshold. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 3A illustrates a dynamic intensity threshold 380 that changes over time based in part on the intensity of touch input 376 over time. Dynamic intensity threshold 380 is a sum of two components, first component 374 that decays over time after a predefined delay time p1 from when touch input 376 is initially detected, and second component 378 that trails the intensity of touch input 376 over time. The initial high intensity threshold of first component 374 reduces accidental triggering of a "deep press" response, while still allowing an immediate "deep press" response if touch input 376 provides sufficient intensity. Second component 378 reduces unintentional triggering of a "deep press" response by gradual intensity fluctuations of in a touch input. In some embodiments, when touch input 376 satisfies dynamic intensity threshold 380 (e.g., at point 381 in FIG. 3A), the "deep press" response is triggered.

FIG. 3B illustrates another dynamic intensity threshold 386 (e.g., intensity threshold $I_D$). FIG. 3B also illustrates two other intensity thresholds: a first intensity threshold $I_H$ and a second intensity threshold $I_L$. In FIG. 3B, although touch input 384 satisfies the first intensity threshold $I_H$ and the second intensity threshold $I_L$ prior to time p2, no response is provided until delay time p2 has elapsed at time 382. Also in FIG. 3B, dynamic intensity threshold 386 decays over time, with the decay starting at time 388 after a predefined delay time p1 has elapsed from time 382 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 3C illustrate yet another dynamic intensity threshold 392 (e.g., intensity threshold $I_D$). In FIG. 3C, a response associated with the intensity threshold $I_L$ is triggered after the delay time p2 has elapsed from when touch input 390 is initially detected. Concurrently, dynamic intensity threshold 392 decays after the predefined delay time p1 has elapsed from when touch input 390 is initially detected. So a decrease in intensity of touch input 390 after triggering the response associated with the intensity threshold $I_L$, followed by an increase in the intensity of touch input 390, without releasing touch input 390, can trigger a response associated with the intensity threshold $I_D$ (e.g., at time 394) even when the intensity of touch input 390 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

Example User Interfaces and Associated Processes

Attention is now directed towards embodiments of user interfaces ("UI") and associated processes that may be implemented on an electronic device with a display and a touch-sensitive surface, such as device 100.

Figure 2:
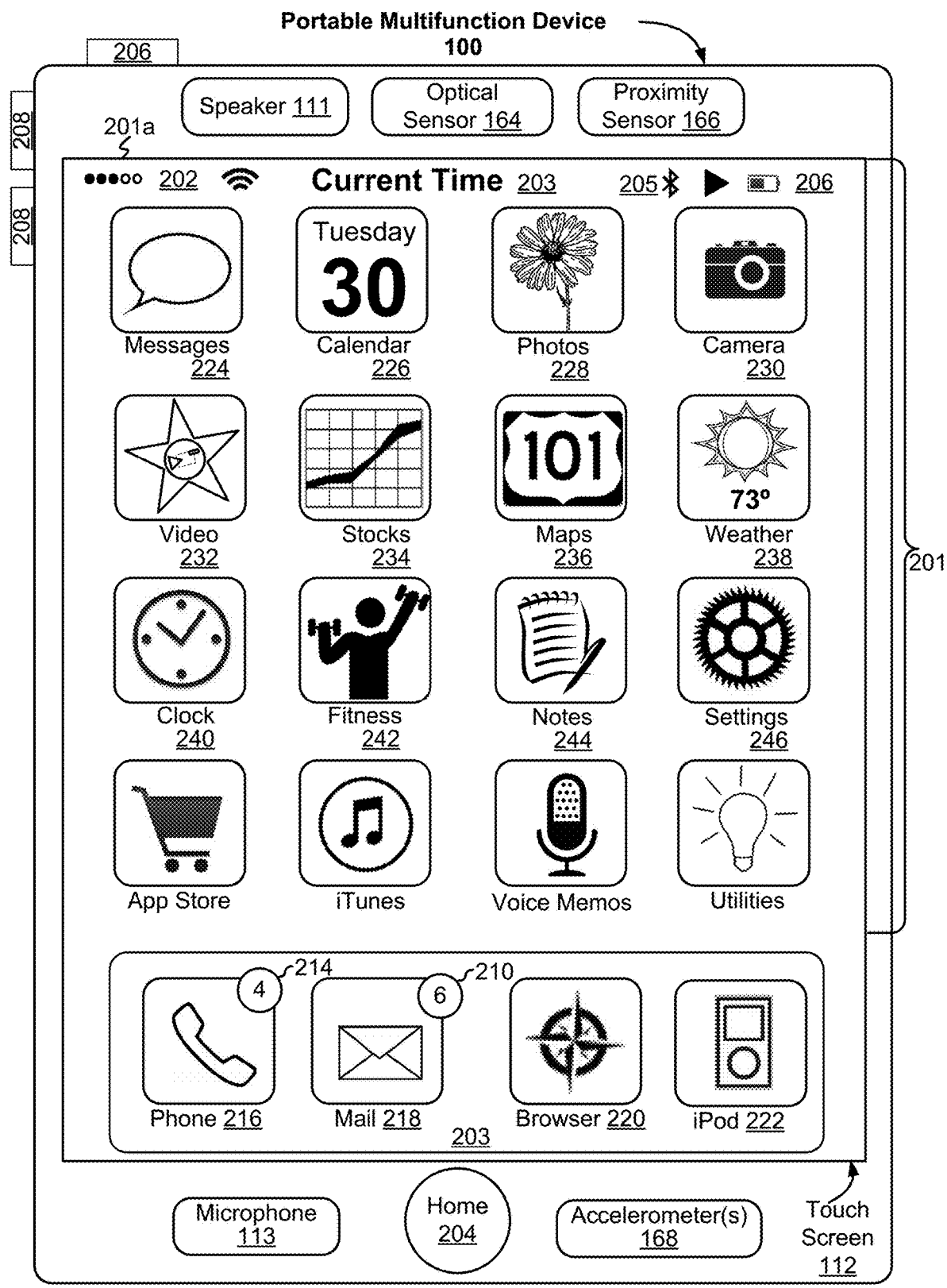
FIG. 2 is a schematic of a touch-sensitive display used to illustrate a user interface for a menu of applications, in accordance with some embodiments.

FIG. 2 is a schematic of a touch-sensitive display used to illustrate a user interface for a menu of applications, in accordance with some embodiments. Similar user interfaces are, optionally, implemented on device 100 (FIG. 1A). In some embodiments, user interface 201*a* includes the following elements, or a subset or superset thereof:

Signal strength indicator(s) 202 for wireless communication(s), such as cellular and Wi-Fi signals;
Time;
Bluetooth indicator 205;
Battery status indicator 206;
Tray 203 with icons for frequently used applications, such as:
  Icon 216 for telephone module 138, labeled "Phone," which optionally includes an indicator 214 of the number of missed calls or voicemail messages;
  Icon 218 for e-mail client module 140, labeled "Mail," which optionally includes an indicator 210 of the number of unread e-mails;
  Icon 220 for browser module 147, labeled "Browser;" and
  Icon 222 for video and music player module 152 (also referred to herein as a video or video-browsing application), also referred to as IPOD (trademark of APPLE Inc.) module 152, labeled "iPod;" and
Icons for other applications, such as:
  Icon 224 for IM module 141, labeled "Messages;"
  Icon 226 for calendar module 148, labeled "Calendar;"
  Icon 228 for image management module 144, labeled "Photos;"
  Icon 230 for camera module 143, labeled "Camera;"
  Icon 232 for online video module 155, labeled "Online Video"
  Icon 234 for stocks widget 149-2, labeled "Stocks;"
  Icon 236 for map module 154, labeled "Maps;"
  Icon 238 for weather widget 149-1, labeled "Weather;"
  Icon 240 for alarm clock widget 149-4, labeled "Clock;"
  Icon 242 for fitness module 142, labeled "Fitness;"
  Icon 244 for notes module 153, labeled "Notes;"
  Icon 246 for a settings application or module, which provides access to settings for device 100 and its various applications; and
  Other icons for additional applications, such as App Store, iTunes, Voice Memos, and Utilities.

It should be noted that the icon labels illustrated in FIG. 2 are merely examples. Other labels are, optionally, used for various application icons. For example, icon 242 for fitness module 142 is alternatively labeled "Fitness Support," "Workout," "Workout Support," "Exercise," "Exercise Support," or "Health." In some embodiments, a label for a respective application icon includes a name of an application corresponding to the respective application icon. In some embodiments, a label for a particular application icon is distinct from a name of an application corresponding to the particular application icon.

In some embodiments, the home screen includes two regions: a tray 203 and an icon region 201. As shown in FIG. 2, the icon region 201 is displayed above the tray 203. However, the icon region 201 and the tray 203 are optionally displayed in positions other than those described herein.

The tray 203 optionally includes icons of the user's favorite applications on the computing device 100. Initially, the tray 203 may include a set of default icons. The user may customize the tray 203 to include other icons than the default icons. In some embodiments, the user customizes the tray 203 by selecting an icon from the icon region 201 and dragging and dropping the selected icon into the tray 203 to add the icon to the tray 203. To remove an icon from the tray 203, the user selects an icon displayed in the favorites region for a threshold amount of time which causes the computing device 100 to display a control to remove the icon. User selection of the control causes the computing device 100 to remove the icon from the tray 203. In some embodiments, the tray 203 is replaced by a dock 408 (as described in more detail below) and, therefore, the details provided above in reference to tray 203 may also apply to the dock 408 may supplement descriptions of the dock 408 that are provided in more detail below.

Figure 4B:
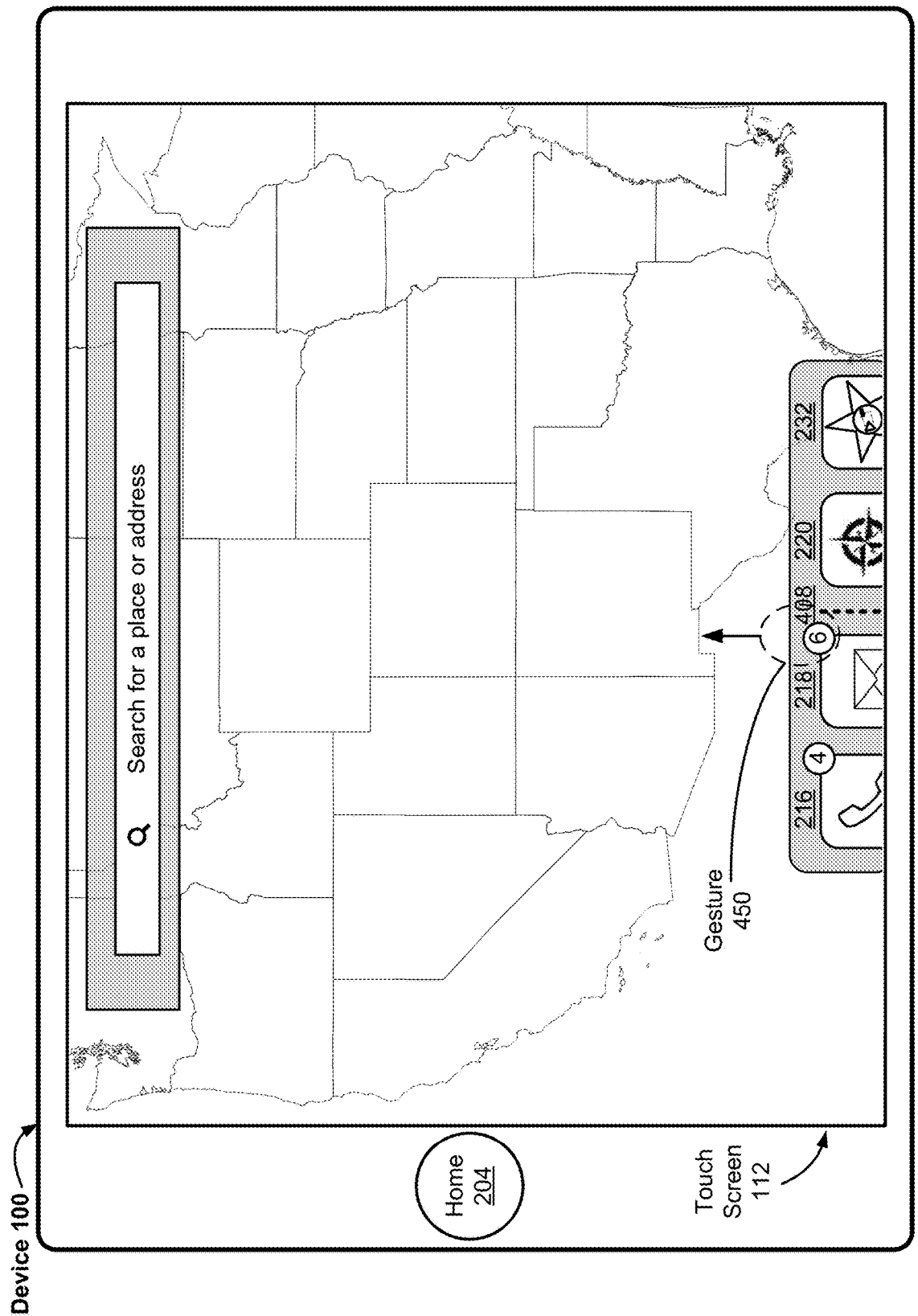
Figure 4D:
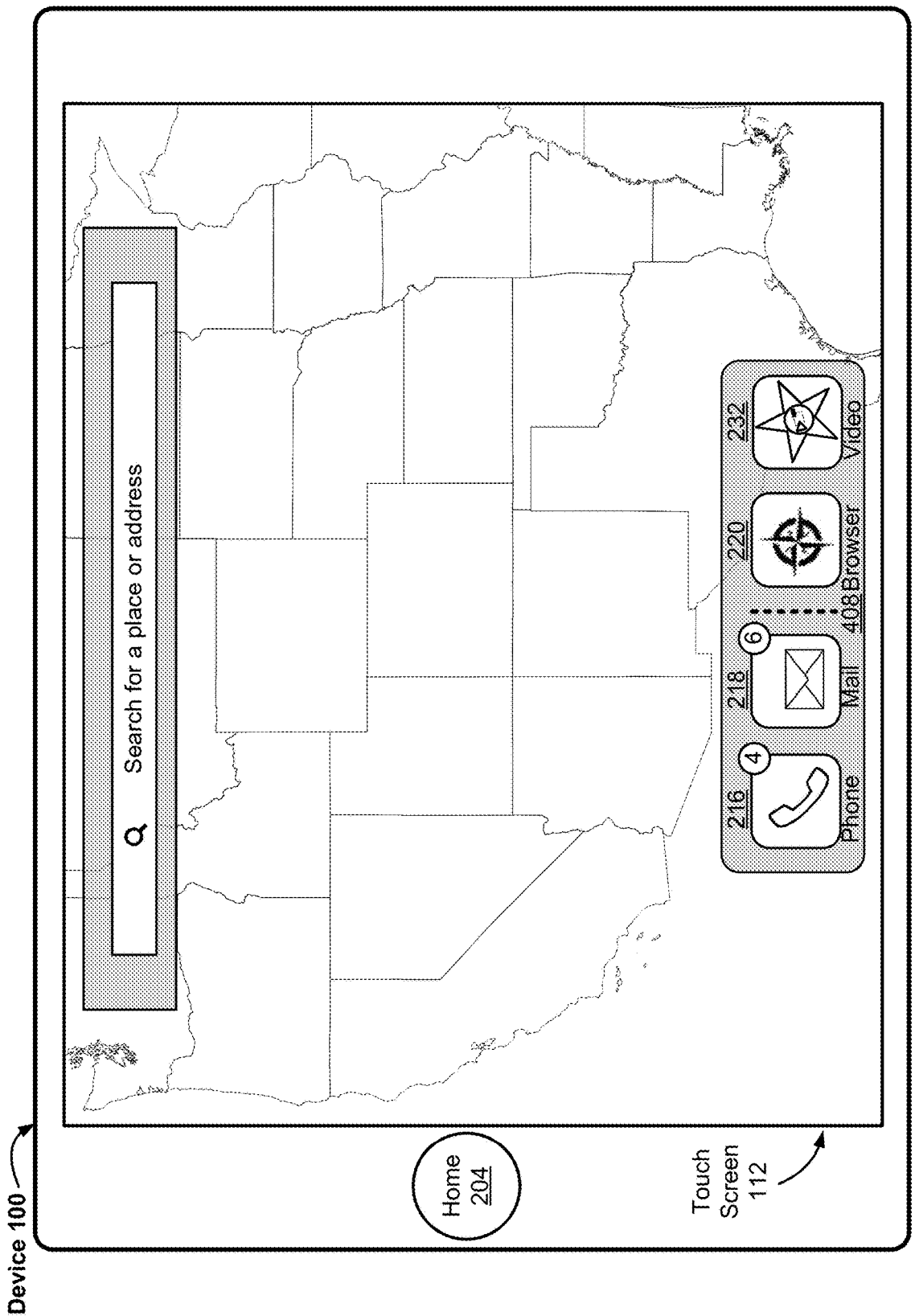
Figure 4G:
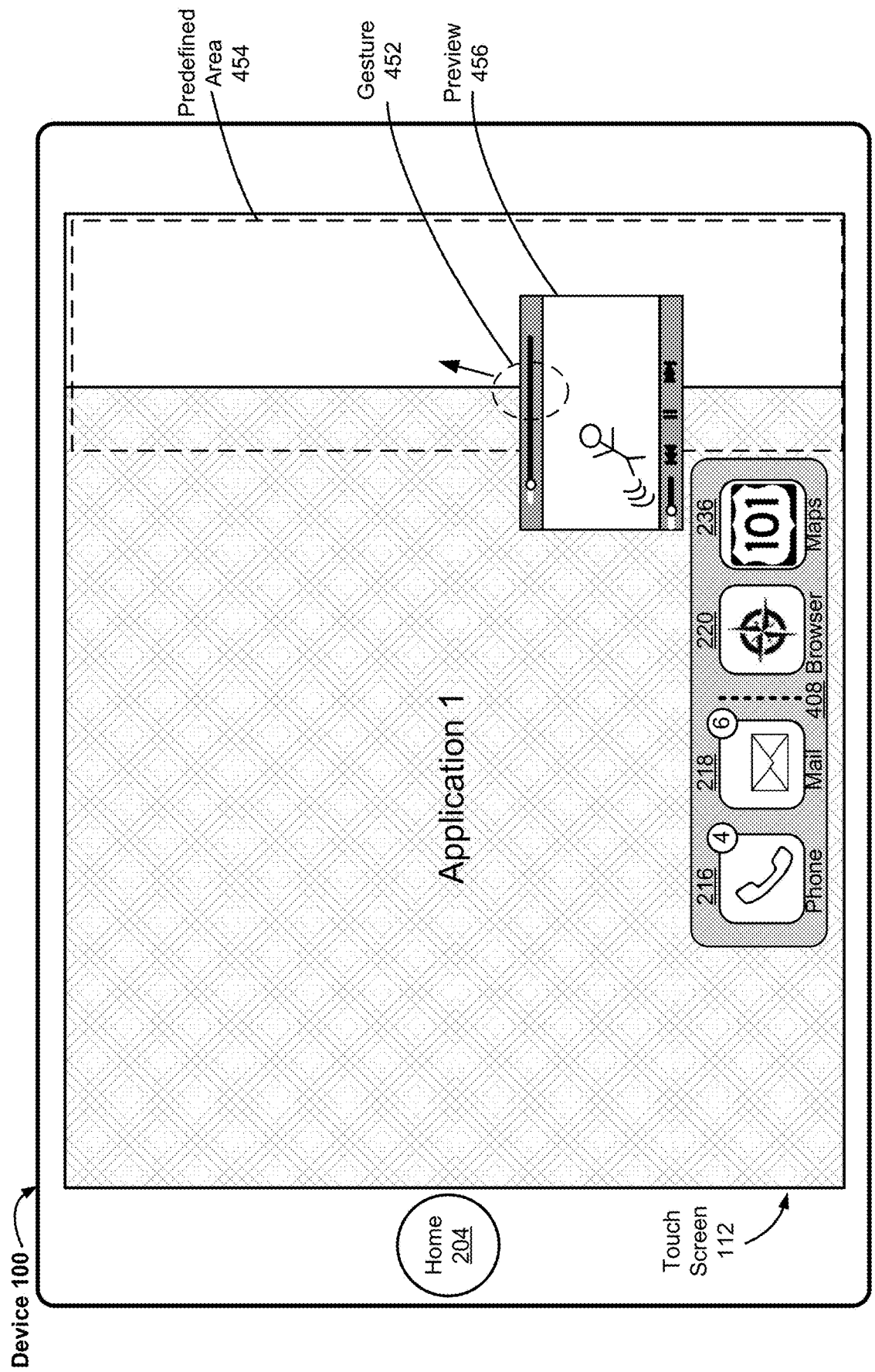
Figure 4H:
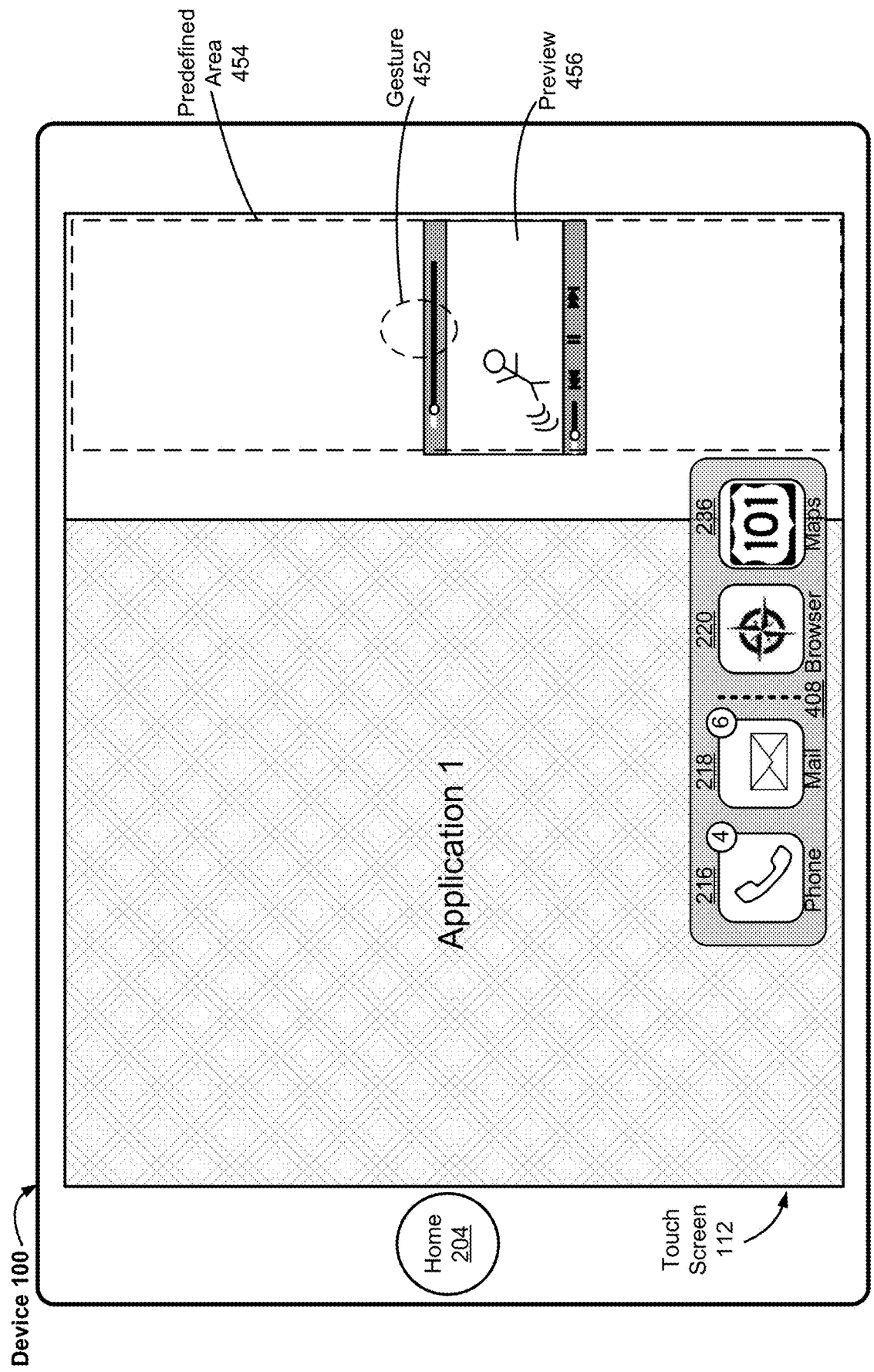
Figure 4I:
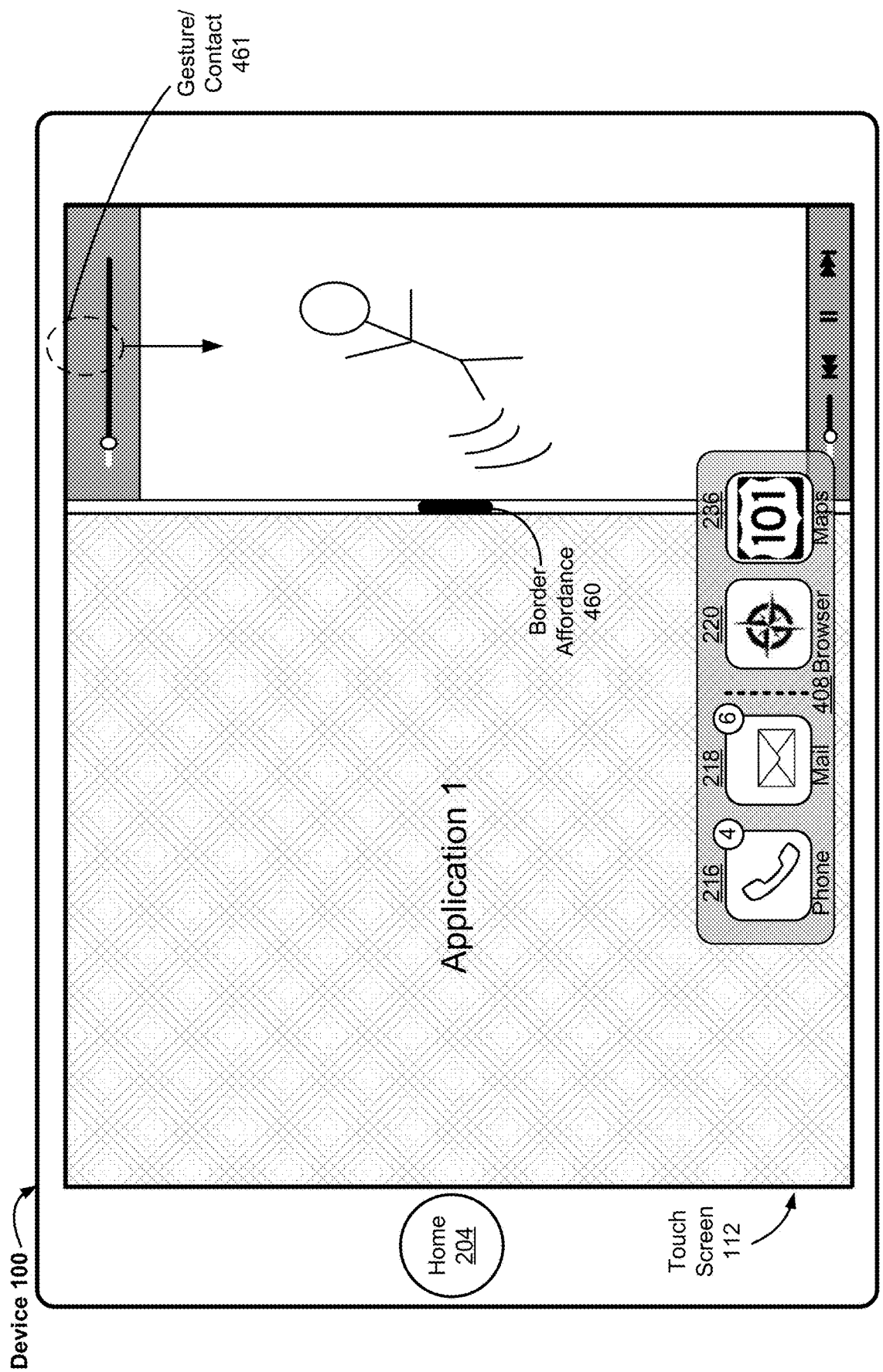

In the present disclosure, references to a "split-view mode" refer to a mode in which at least two applications are simultaneously displayed side-by-side on the display 112, and in which both applications may be interacted with (e.g., Application 1 and a video-browsing application are displayed in a split-view mode in FIG. 4I). The at least two applications may also be "pinned" together, which refers to an association (stored in memory of the device 100) between the at least two applications that causes the two applications to open together when either of the at least two applications are launched. In some embodiments, an affordance (e.g., affordance 506, FIG. 5B) may be used to un-pin applications and instead display one of the at least two applications as overlaying the other, and this overlay display mode by be referred to as a slide-over display mode (e.g., the video-browsing application is displayed as overlaying Application 1, in the slide-over mode shown in FIG. 5C). Users may also be able to use a border affordance that is a displayed within a border that runs between the at least two applications while they are displayed in the split-view mode to un-pin or dismiss one of the at least two applications (e.g., by dragging the border affordance until it reaches an edge of the display 112 that borders a first application of the at least two applications, then that first application is dismissed and the at least two applications are then un-pinned). The use of a border affordance (or a gesture at a border between two applications) to dismiss a pinned application is discussed in more detail in commonly-owned U.S. patent application Ser. No. 14/732,618 (e.g., at FIGS. 37H-37M and in the associated descriptive paragraphs), which is hereby incorporated by reference in its entirety.

FIG. 4A-4AA are schematics of a touch-sensitive display used to illustrate examples of user interfaces for simultaneously interacting with multiple applications (and gestures used to activate a split-view mode in which simultaneous interactions with multiple applications are available), in accordance with some embodiments.

In some embodiments, an application is displayed on a touch-sensitive display, such as the example maps application that is displayed on the touch-sensitive display 112 in FIG. 4A, and which includes a map of the United States and a search box that allows for searching for various locations using the maps application. While the maps application is displayed, a gesture 450 is detected near an edge of the touch-sensitive display 112 (e.g., a bottom-most edge of the touch-sensitive display relative to a viewer).

As shown in FIG. 4B, in response to detecting that the gesture 450 has traveled more than a threshold distance away from the edge (e.g., more than about 1 centimeter, but may depend on the size of the touch-sensitive display 112), a dock 408 is revealed on the touch-sensitive display as overlaying the maps application. As used herein, a dock is a user interface element that contains affordances (e.g., system-selected (such as based on how recently a respective affordance has been used)) or user-selected affordances (selected by a user for inclusion in the dock)), that when activated, launch a corresponding function or application. As the gesture 450 moves towards an opposing edge of the touch-sensitive display (e.g., upward), more of the dock 408 is revealed and is displayed as overlaying the maps application. Once the gesture 450 has traveled at least a second threshold distance away (e.g., 2-4 centimeters, but may depend on the size of the touch-sensitive display 112) from the edge of the touch-sensitive display, the dock 408 is presented in a predefined area of the touch-sensitive display and no longer follows movement of the gesture 450. For example, as shown in FIG. 4C, after the gesture travels more than at least the second threshold distance away from the edge of the touch-sensitive display, the dock 408 is then displayed in the predefined area. In some embodiments, after an end of the gesture 450 (e.g., a contact is released or lifted off from the touch-sensitive display and the gesture 450 ends), the dock 408 remains displayed and stationary in the predefined portion.

As is also shown in FIG. 4E, application-specific affordances displayed within the dock 408 may be selected in order to open a respective application (e.g., an application corresponding to whichever application-specific affordance was selected) and application-specific affordances may also be dragged out of the dock 408 using a gesture (e.g., gesture 452, FIG. 4E). For example, in some embodiments, a simple tap on the affordance 232 will launch the application associated with the affordance and display it under the dock. Also, in some embodiments, a contact followed by a dragging movement away from the dock, as shown by gesture 452, will launch the application associated with the affordance and display it under the dock.

Moreover, in some embodiments, as shown in FIG. 4F, using the gesture 452, the application-specific affordance 232 is dragged off or out of the dock and towards a predefined area 452 of the touch-sensitive display. In some embodiments, the predefined area 454 is an area of the touch-sensitive display that is reserved for pinning an application next to a currently displayed application (e.g., Application 1, FIG. 4F). In some embodiments, pinning an application involves creating an association between at least two different applications, so that those applications are then subsequently launched together. For example, when, launched, one of the pinned applications is displayed in the predefined area 454. As explained in more detail below, dragging a respective application-specific affordance towards the predefined area 454 launches the associated application, initially displays that application in a preview while the application-specific affordance is dragged, and then displays the associated application in the predefined area 454 (upon lift-off of the contact) while simultaneously displaying Application 1. In some embodiments, displaying the associated application in the predefined area 454 causes Application 1 to resize or scale to accommodate the display of the associated application in the predefined area 454.

Turning back to FIG. 4F, the gesture 452 continues moving across the touch-sensitive display 112 in FIG. 4G and moves beyond a border of the dock 408 (e.g., a contact associated with gesture 452 moves outside of the border of the dock 408). Upon detecting that the gesture 452 has moved beyond the border of the dock 408, in some embodiments, the application-specific affordance 232 is no longer displayed as moving with the gesture 452 and instead a preview 456 of content associated with an application associated with the application-specific affordance 232 (e.g., a video-browsing application and content) is displayed as following the gesture 452. Additionally, in some embodiments, the predefined area 454 is revealed adjacent to the currently displayed application (e.g., Application 1, FIG. 4G).

In some embodiments, instead of displaying the preview 456, a user interface object that includes the application-specific affordance (e.g., affordance 232) is displayed as the gesture moves beyond the border of the dock 408. Examples of these user interface objects are shown in FIGS. 4AC-4AE (e.g., user interface objects 473-A and 473-B) and are described in more detail below.

As shown in FIG. 4H, as the gesture 452 continues to move, so does the preview 456 and more of the predefined area 454 is revealed adjacent to Application 1. In conjunction with revealing the predefined area 454, the Application 1 is also resized (as shown in FIGS. 4G-4H) to occupy a remaining portion of the touch-sensitive display 112, other than the predefined area 454.

FIG. 4I illustrates that upon detecting an end of the gesture 452 (e.g., a contact for the gesture is lifted off of the touch-sensitive display), the video-browsing application is displayed as occupying the predefined area 454 and is also now pinned next to Application 1 (e.g., the two applications are now associated and will be opened together when either application is launched). A border affordance 460 is also shown in FIG. 4I and is available in some embodiments to allow users to resize pinned applications (e.g., in response to detecting a contact over the border affordance 460 and movement of the contact in a substantially right-to-left direction across the touch-sensitive display (such as gesture 464 in FIGS. 4L-4M), Application 1 is reduced in size or scaled and the video application is increased in size or scaled (as shown in FIGS. 4L-4M)). Additional details regarding use of a border affordance (or dragging a border) to resize and/or dismiss pinned applications is also provided in commonly-owned U.S. patent application Ser. No. 14/732,618, in particular at FIGS. 37H-37M and in the associated descriptive paragraphs, which has been incorporated by reference in its entirety above.

In some embodiments, the predefined area 454 is not revealed until the gesture (e.g., gesture 452) travels beyond a threshold that is located on either a left-hand or right-hand portion of the touch-sensitive display 112 (e.g., thresholds 464 and 465, FIGS. 4AB-4AE). In this way, users are able to decide whether to end the gesture over a currently displayed application (e.g., liftoff a gesture 481 over a currently displayed Application 1, FIG. 4AH) to activate a slide-over mode in which an overlaid application is displayed over the currently displayed application, or to continue moving the gesture towards one of the thresholds 464, 465 to activate a split-view mode in which pinned applications are displayed (e.g., as shown in FIGS. 4AE-4AF, gesture 472 moves towards left-hand threshold 465 and then upon detecting a lift-off of a contact associated with the gesture 472, then the two applications shown in FIG. 4AF are pinned next to each other). Additional details regarding these features of certain embodiments are provided below in reference to FIGS. 4AB-4AI.

FIG. 4I also shows a gesture 461 that includes an initial contact near a top-most edge of the display 112 (relative to the viewpoint of a user looking down at the display 112) followed by movement of the contact in a substantially downward direction across the touch-sensitive display. In response to detecting that the gesture has travelled at least a threshold distance in the substantially downward direction (e.g., 1-2 centimeters), then an affordance 462 (FIG. 4J) is displayed as overlaying the application over which the gesture 461 was detected (e.g., the video application shown in FIG. 4I and 4J).

Figure 4J:
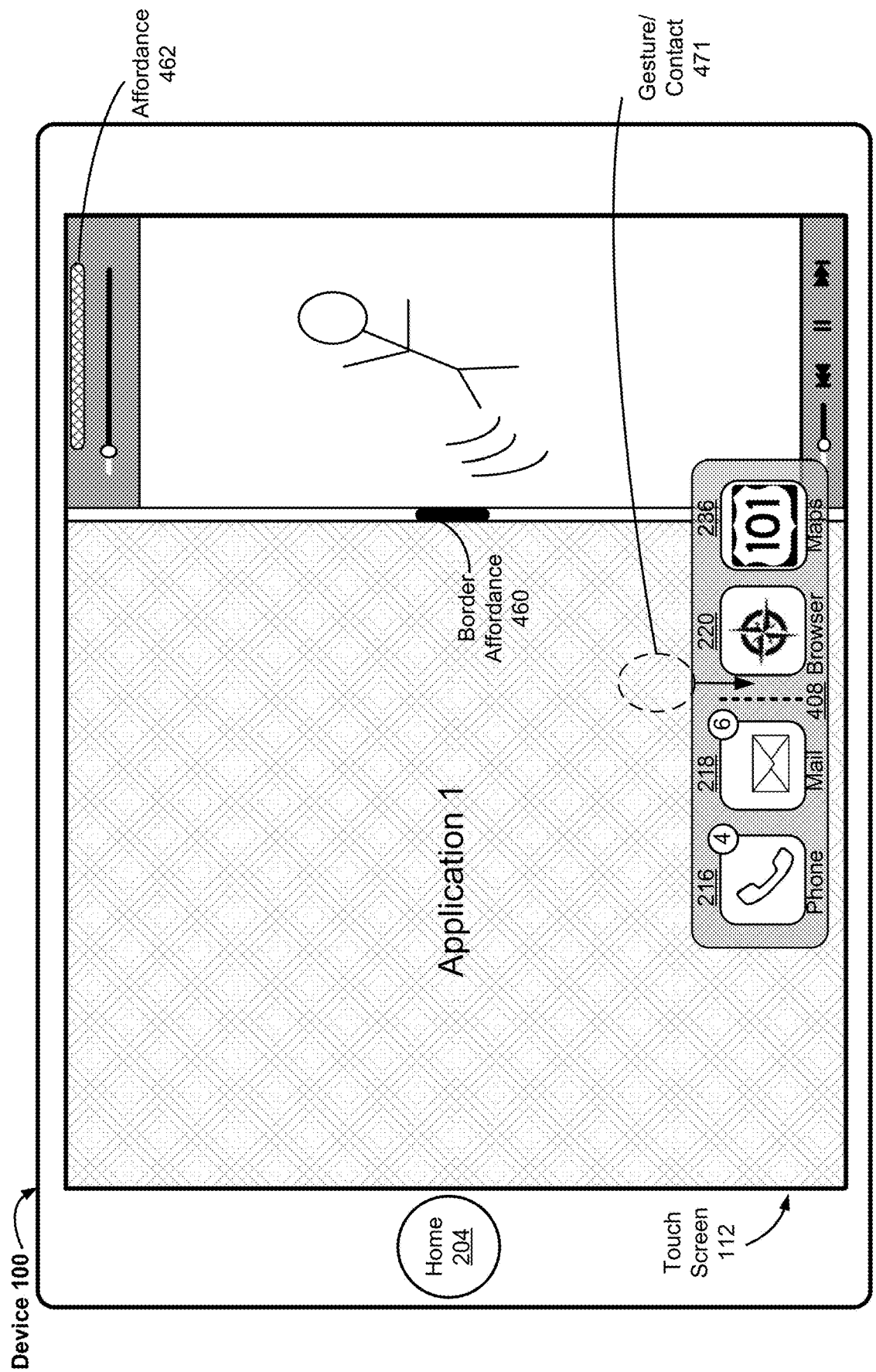
Figure 4L:
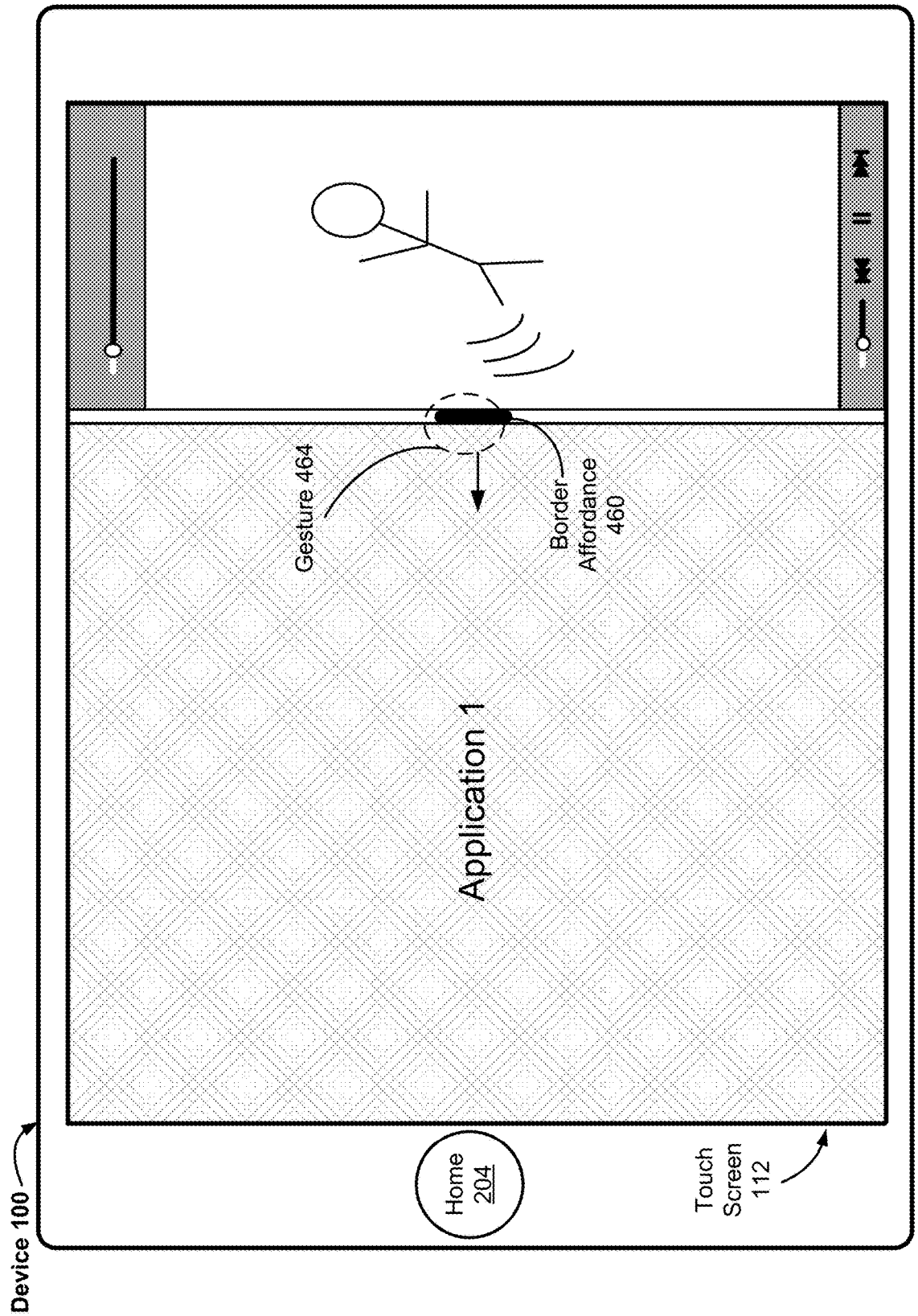
Figure 4M:
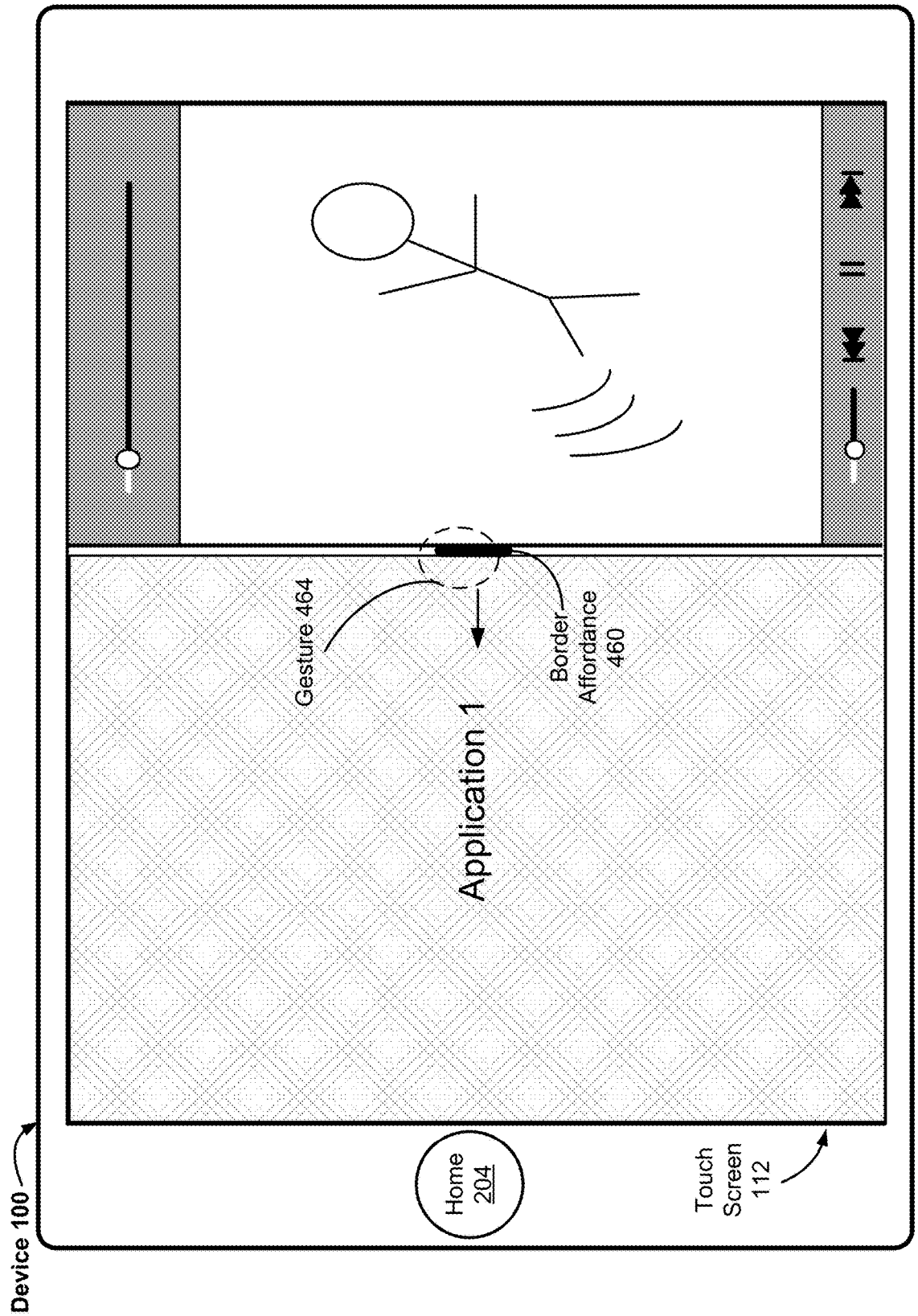

FIGS. 4J-4L also show a gesture 471 (the gesture 471 may include an initial contact near the dock 408 followed by movement of the contact in a substantially downward direction) that is used to move the dock 408 off of the touch-sensitive display while at least two applications are currently displayed side-by-side on the display 112 (e.g., the at least two applications are pinned together/displayed in a split-view mode). In this way, the dock 408 may be hidden so that the user may choose to just interact with the applications displayed behind the dock 408. Similar to the gesture used to activate the dock while a single application is displayed on the display 112 (e.g., gesture 450 of FIGS. 4A-4C), the gesture 450 may also be used to activate the dock while more than one application is displayed on the display 112 (e.g., while Application 1 is pinned next to a video application, as shown 4N-4P).

Figure 4N:
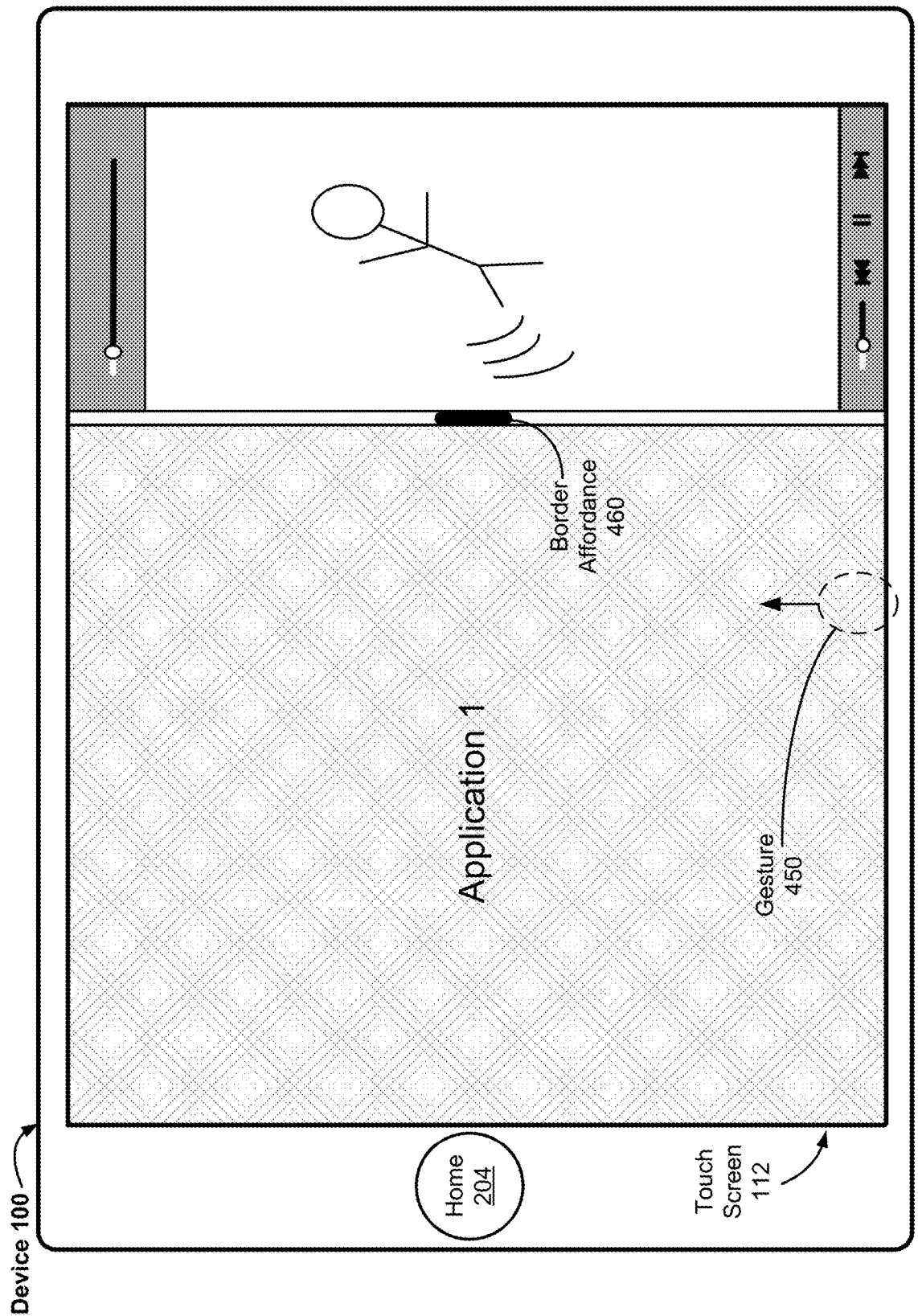
Figure 4P:
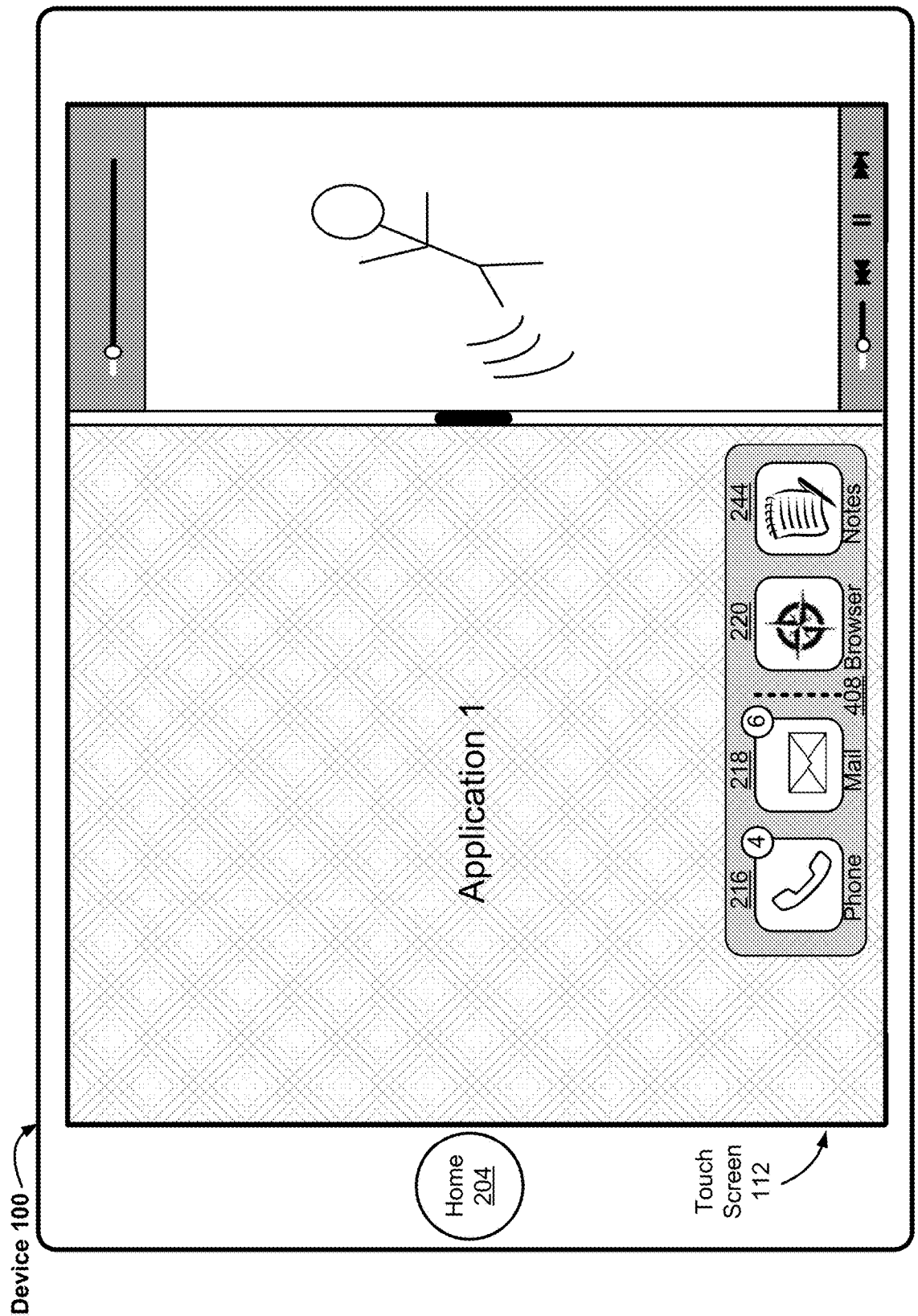
Figure 4Q:
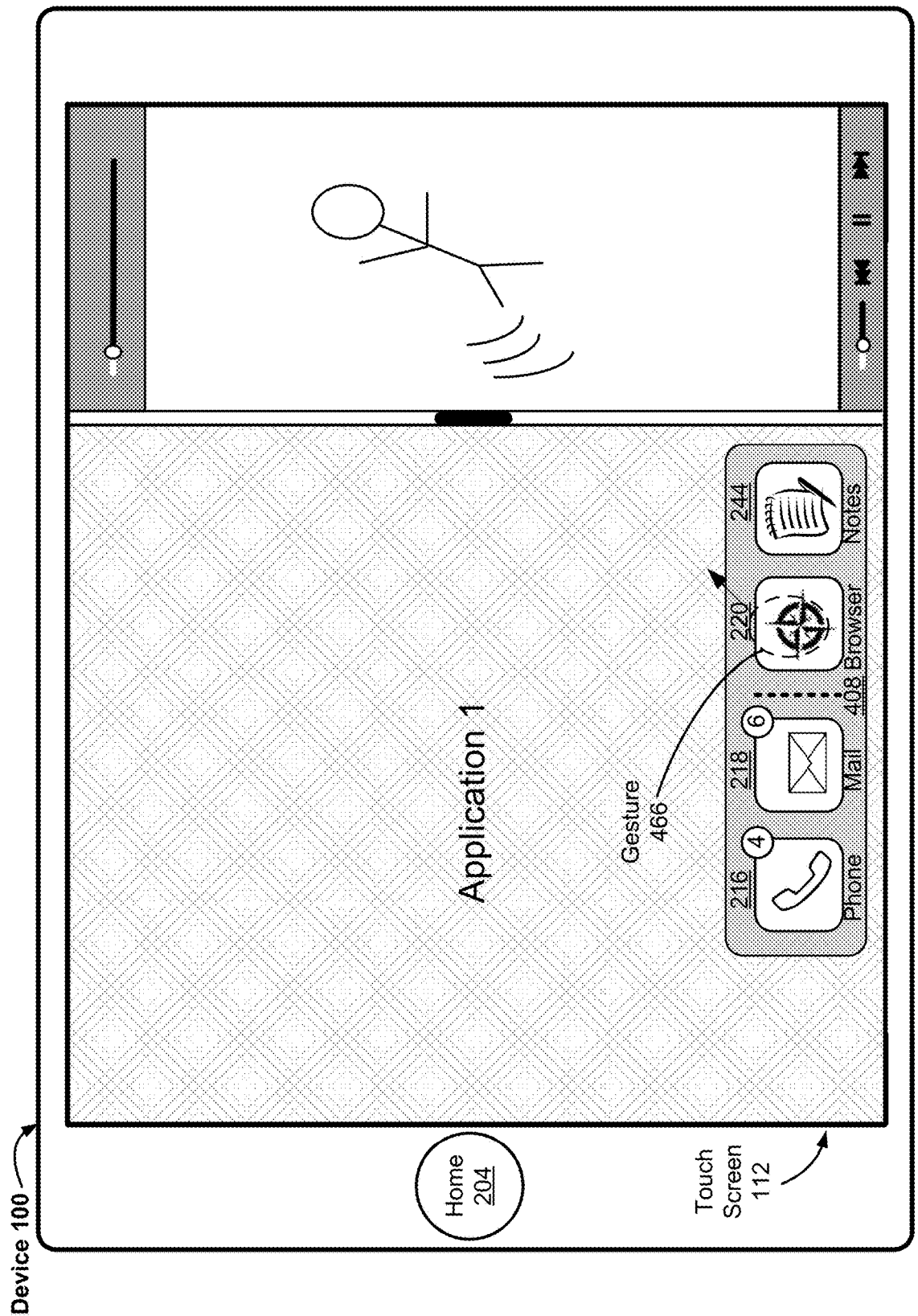
Figure 4R:
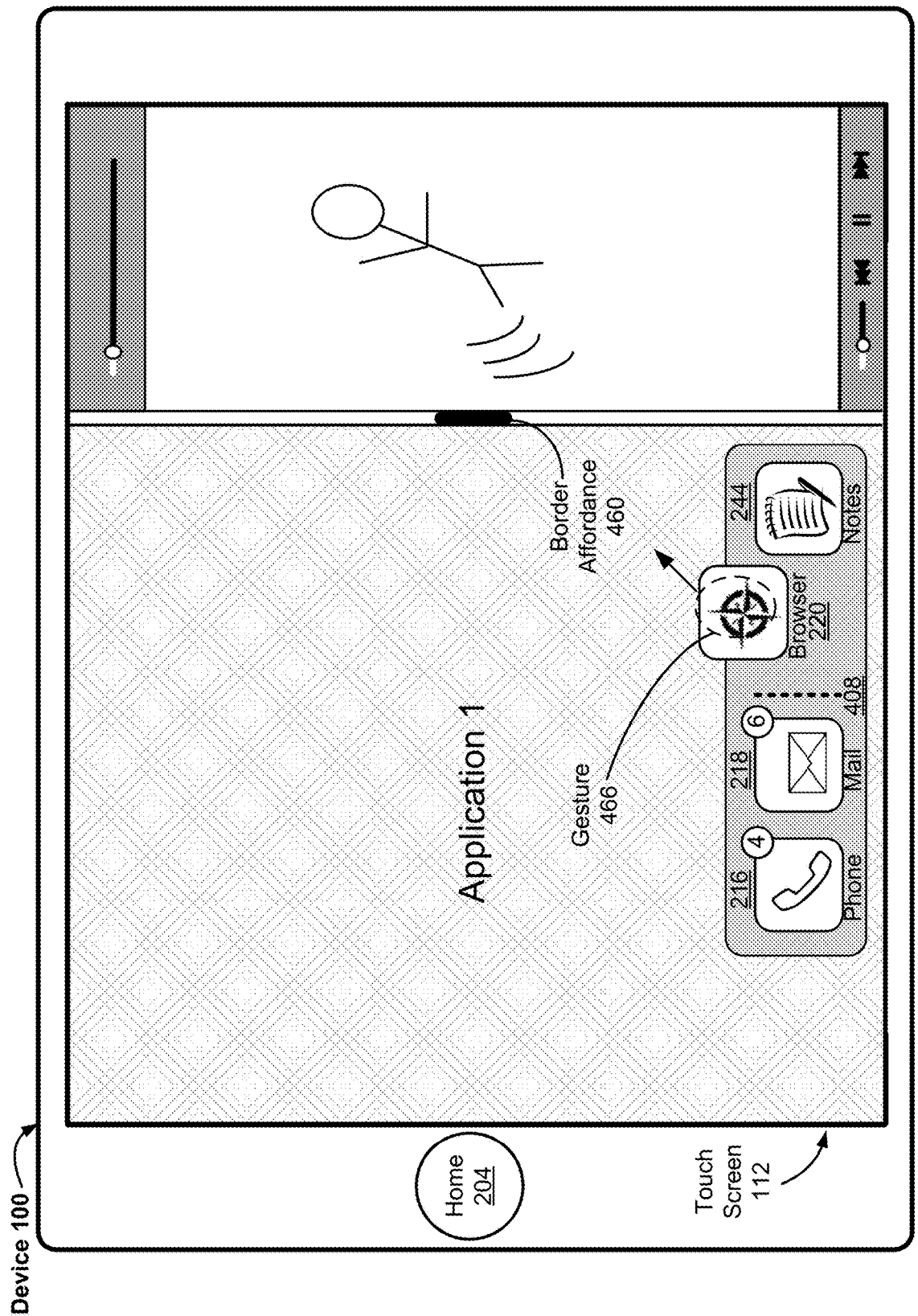

Turning now to FIG. 4Q, while multiple applications are simultaneously displayed on the touch-sensitive display 112, a gesture 466 is detected over one of the application-specific affordances displayed within the dock 408. For example, the gesture 466 includes an initial contact over the affordance 220 corresponding to a web browsing application, followed by movement of the initial contact across the touch-sensitive display 112. The gesture 466 continues moving in FIG. 4R and the application-specific affordance moves in accordance with movement of the gesture 466 until the gesture 466 crosses past a border of the dock 408. Upon detecting that the gesture 466 has moved past the border of the dock 408, in some embodiments, the application-specific affordance is no longer displayed beneath the gesture 466 and a preview 498 of content associated with the web browsing application is displayed in its place (FIG. 4S).

As is also shown in FIG. 4S, in some embodiments, a new affordance is added to the dock once the gesture 466 moves beyond the border of the dock 408 (e.g., the affordance 492 corresponding to a pinned state of a map application and a video application is displayed in a position within the dock 408 previously occupied by the affordance for the web browsing application). In some other embodiments, the new affordance is not added to the dock 408 until an end of the gesture 466 is detected (in other words, the affordance 492 is not added to the dock 408 until liftoff of the gesture 466 is detected between FIGS. 4T-4U). In some embodiments, a user may choose to return an affordance to the dock instead of continuing the drag gesture (or they may end the gesture before reaching the predefined area 454 or move the gesture away from the predefined area). In this way, users are provided with an improved man-machine interface and with the ability to engage in sustained interactions with the devices that would not otherwise be possible if they needed to reverse unintended actions.

Figure 4T:
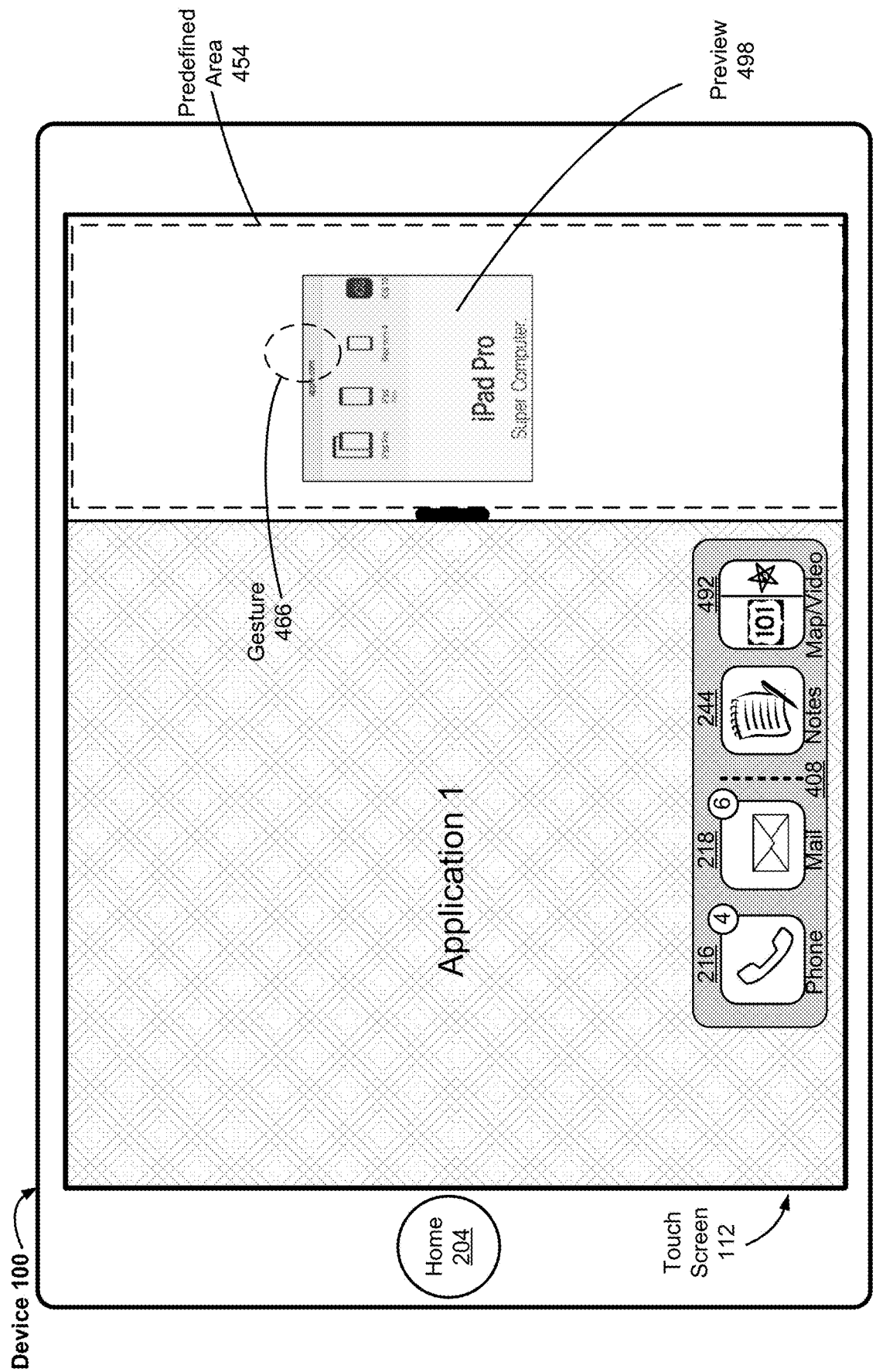

Returning back to the description of the example gesture 466, in some embodiments, the preview 498 is resized depending on which application the gesture is currently travelling over. For example, as shown in FIG. 4S, while the gesture 466 is over Application 1, the preview 498 has a first display size; and, as shown in FIG. 4T, while the gesture 466 is over the video application, the preview 498 is resized to have a second display size, distinct from the first display size. As shown in FIGS. 4S-4T, the first display size is wider (as compared to the second display size) to match dimensions of Application 1, and the second display size is narrower (as compared to the first display size) to match dimensions of the video application.

Figure 4U:
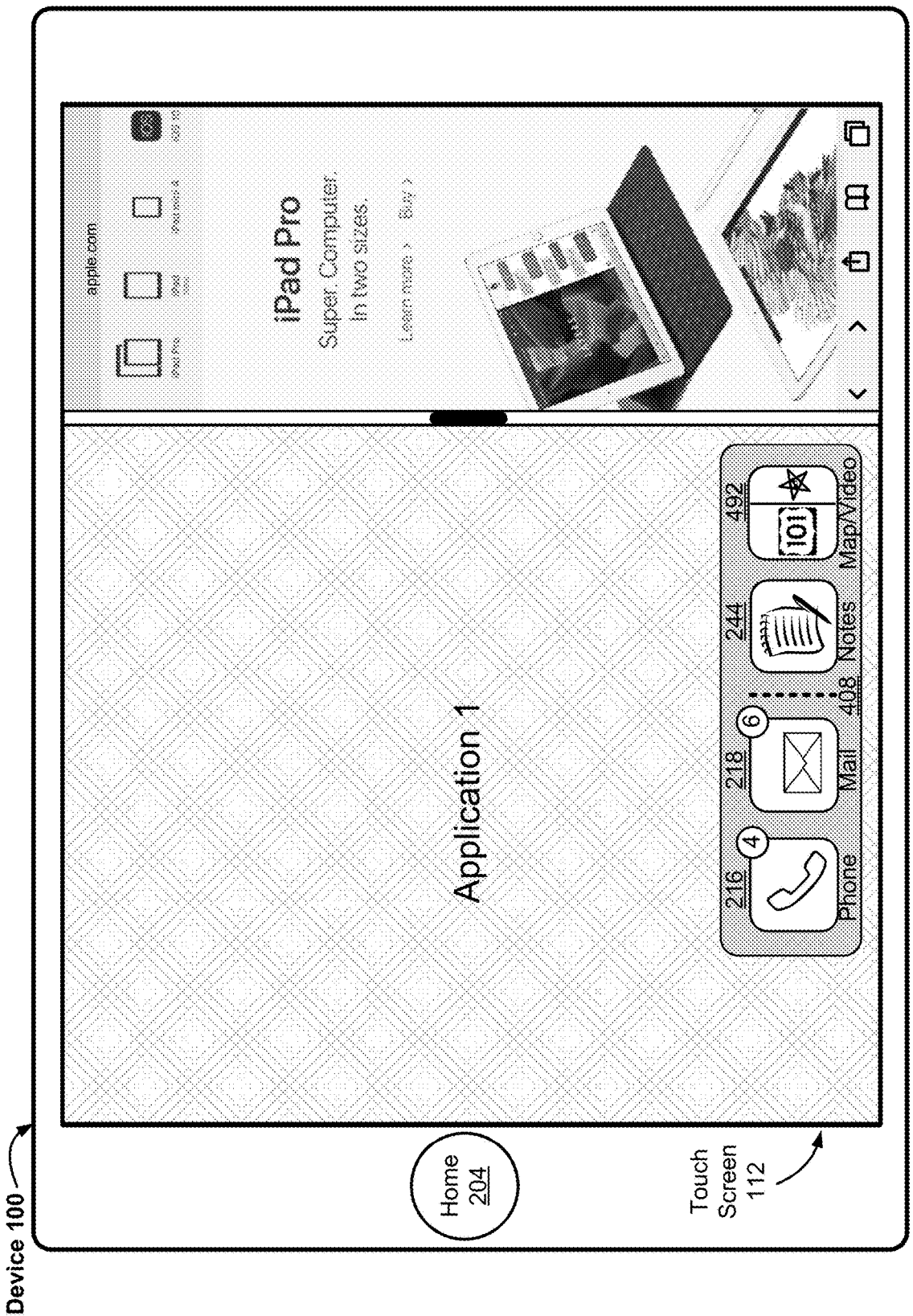

Upon detecting an end of the gesture 466 (e.g., a lift off of the gesture from the touch-sensitive display while the gesture 466 is over the video application), the web browsing application is then displayed in an area of the touch-sensitive display 112 previously occupied by the video application (FIG. 4U).

Figure 4V:
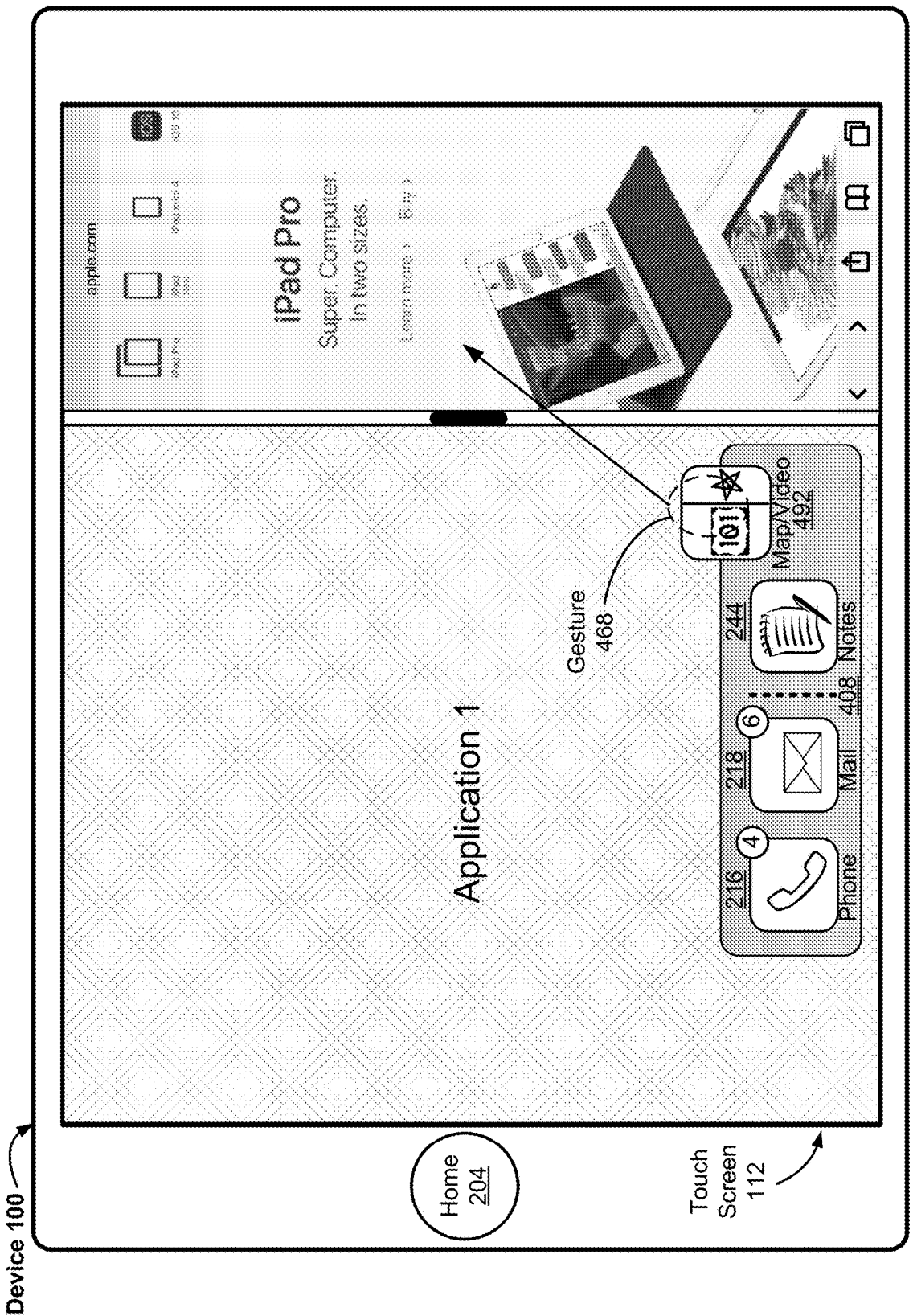
Figure 4W:
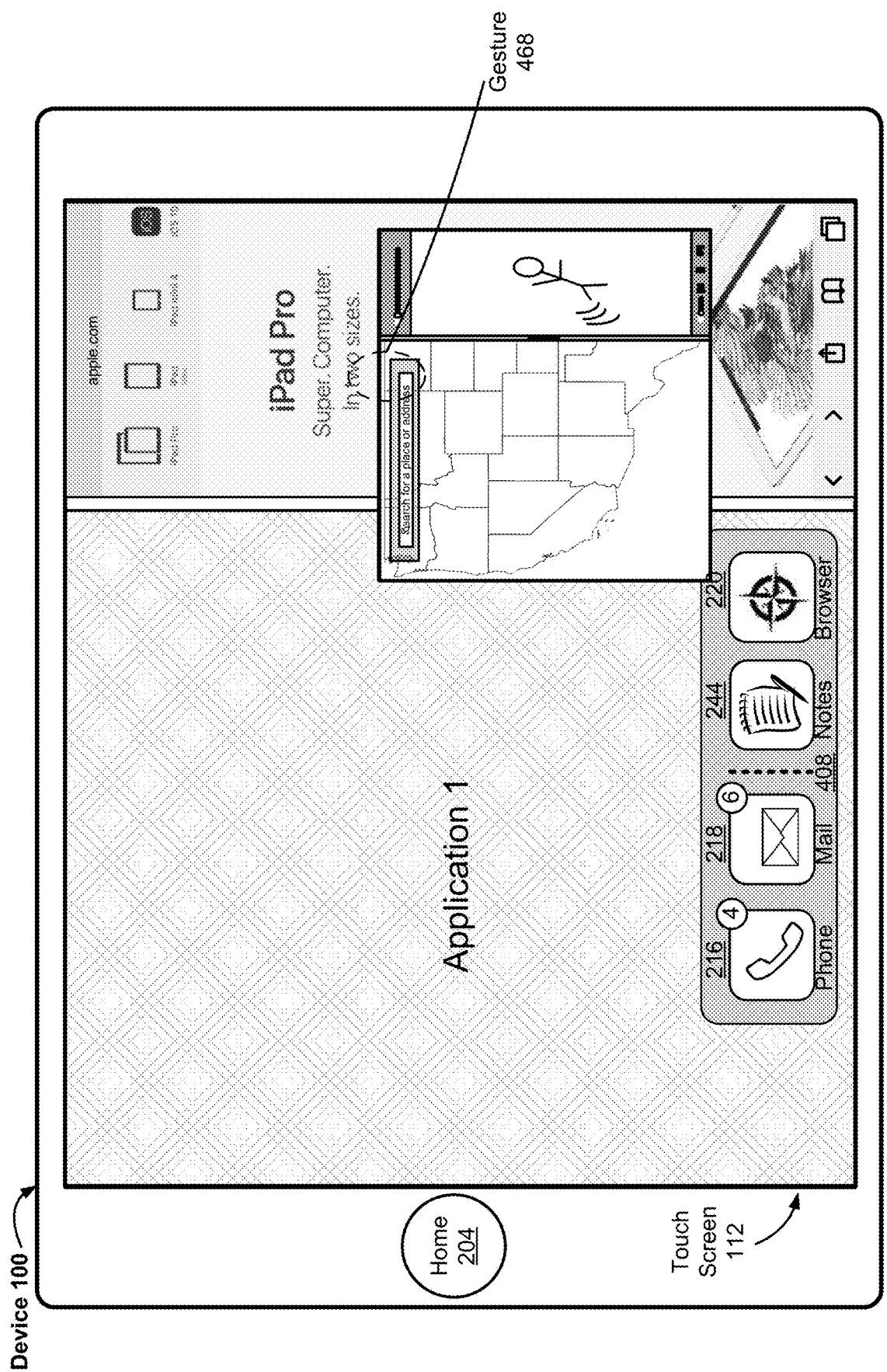
Figure 4X:
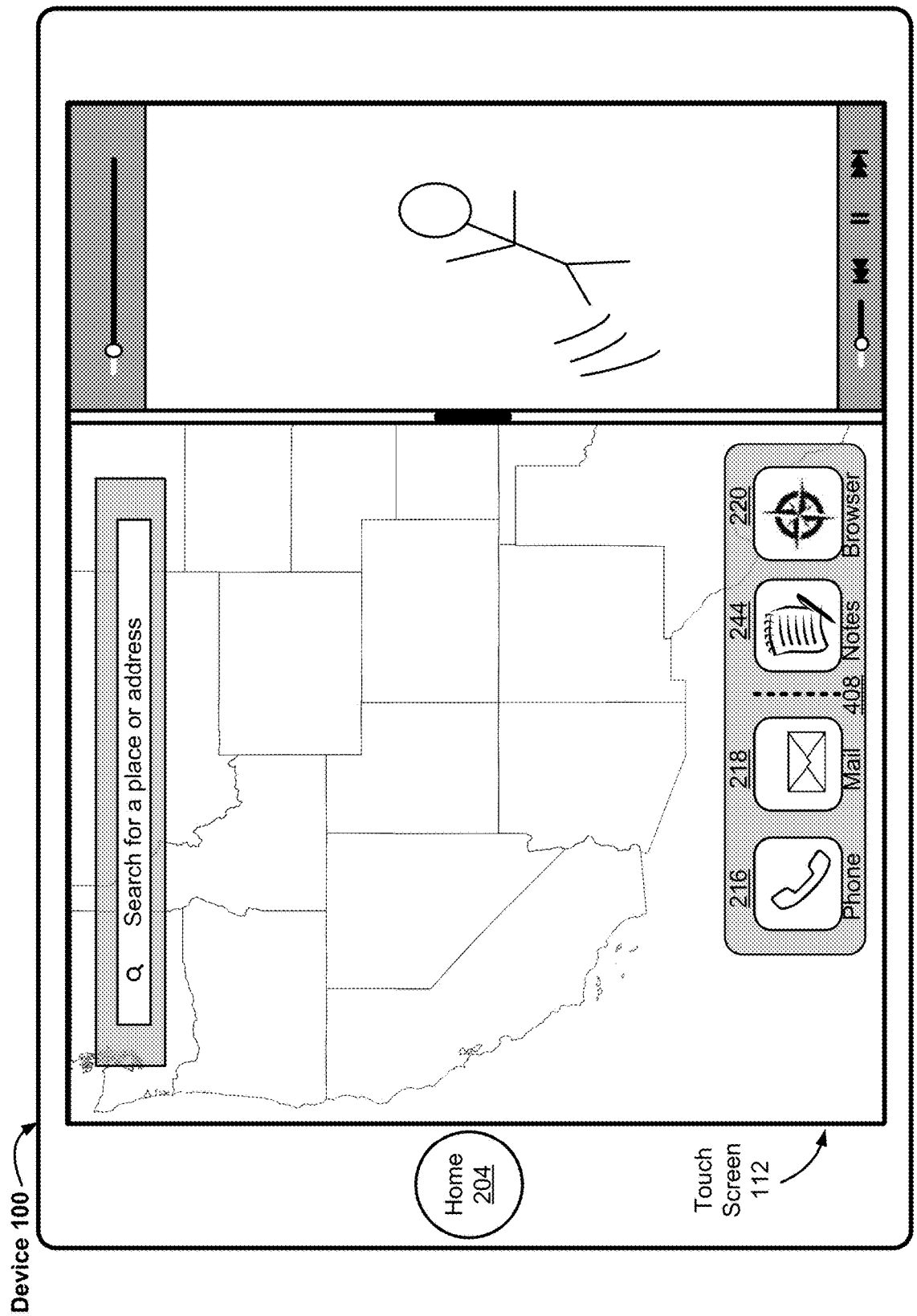

In some embodiments, a gesture (e.g., gesture 468, FIG. 4V) may also be used to drag an affordance corresponding to pinned applications out of the dock 408 and over the touch-sensitive display 112 while it is already displaying multiple applications (e.g., two pinned applications, such as Application 1 and a web browsing application, FIG. 4V). After the gesture 468 crosses a border of the dock 408, a preview of content corresponding to the affordance is displayed (FIG. 4W) and then the content is displayed upon detecting a lift off of the gesture 468 from the touch-sensitive display 112 (FIG. 4X). In some embodiments, the content is displayed as occupying substantially all of the touch-sensitive display 112, and the previously displayed multiple applications are no longer displayed. In other embodiments, the content and the multiple applications are both displayed (e.g., the content is displayed above the multiple applications, thereby allowing users to interact with more than one set of pinned applications simultaneously). In some embodiments, this feature is only available on devices that have larger displays (e.g., displays that have a diagonal dimension of at least 9.7 inches).

Figure 4Y:
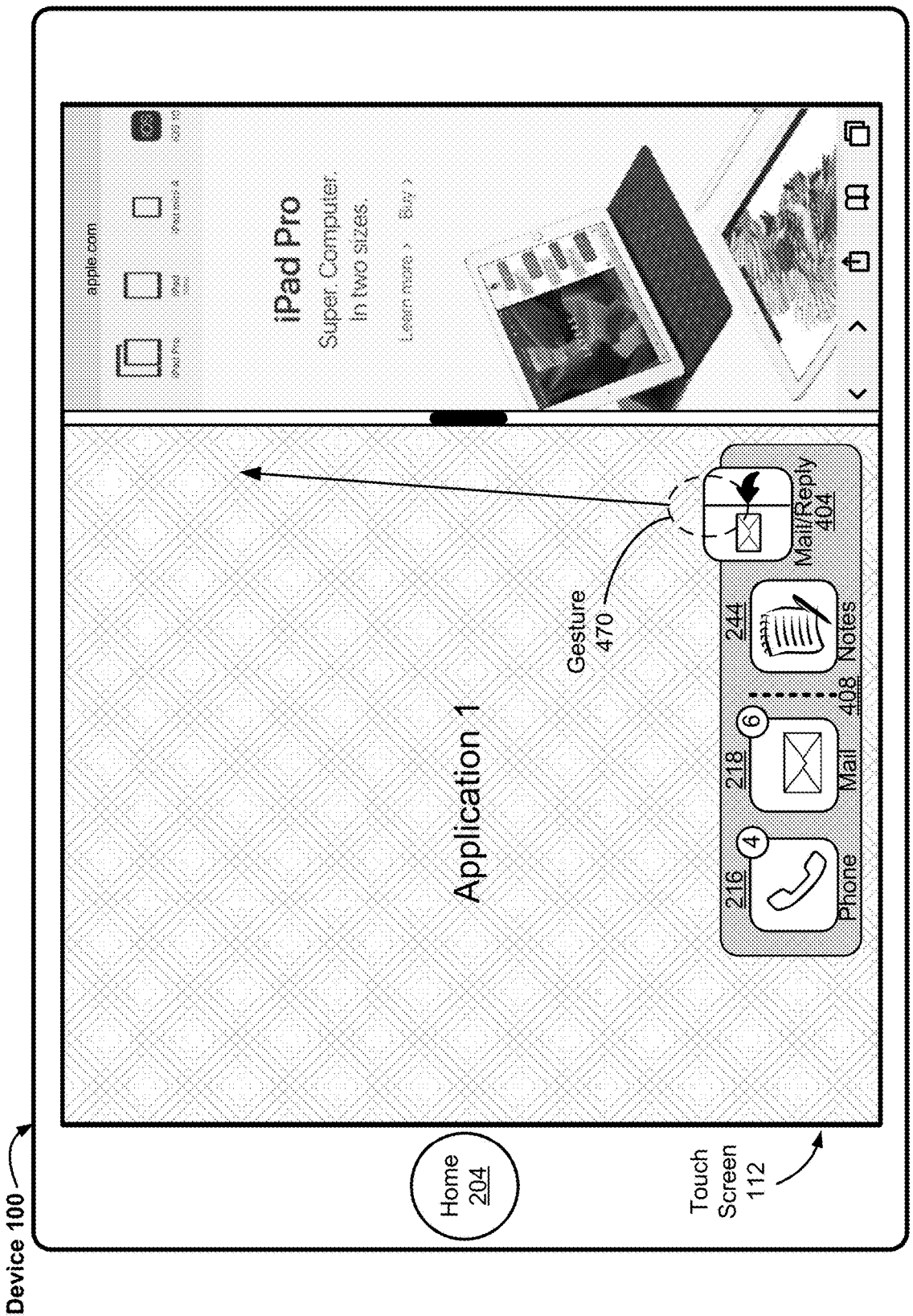
Figure 4Z:
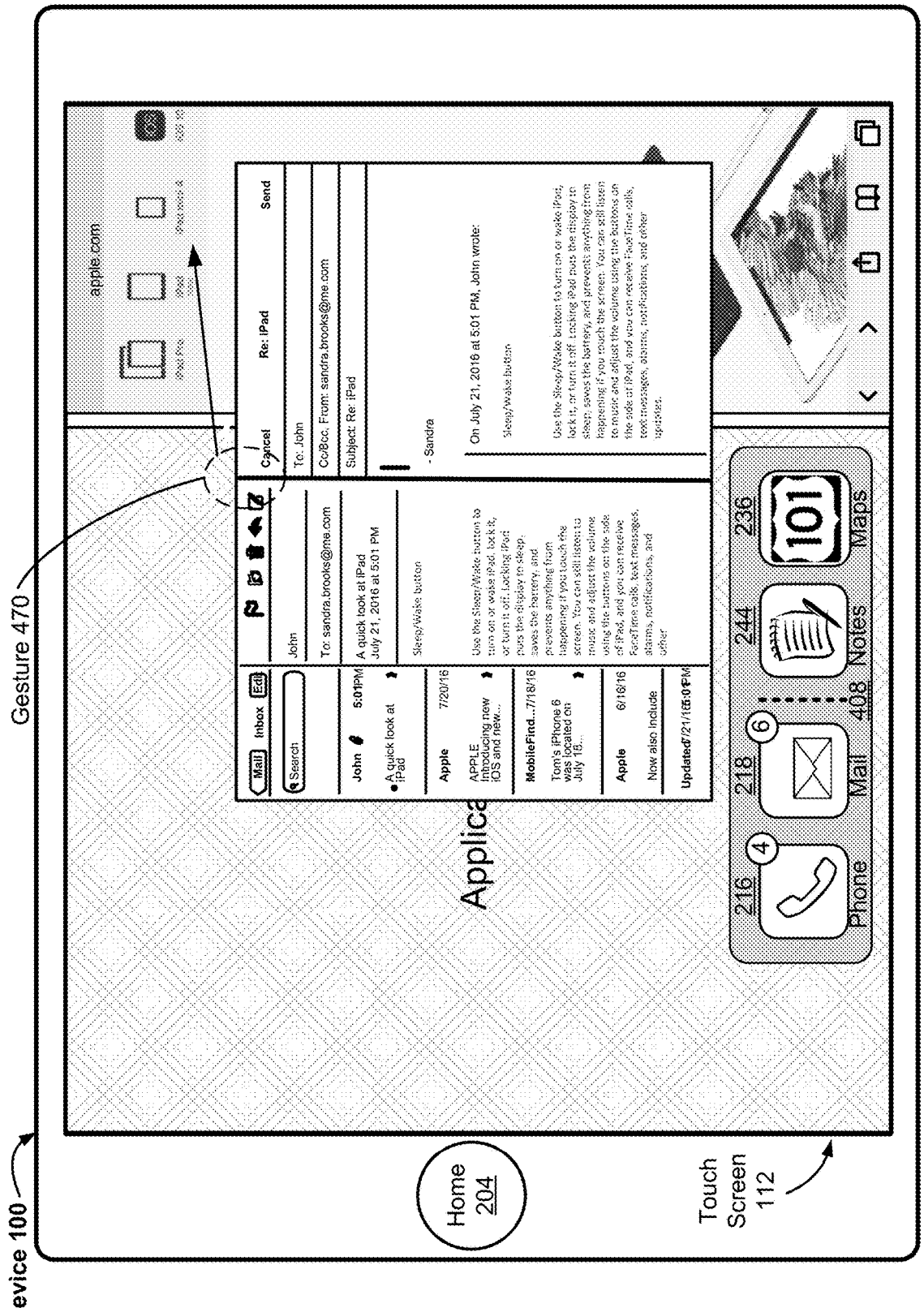
Figure 4A:
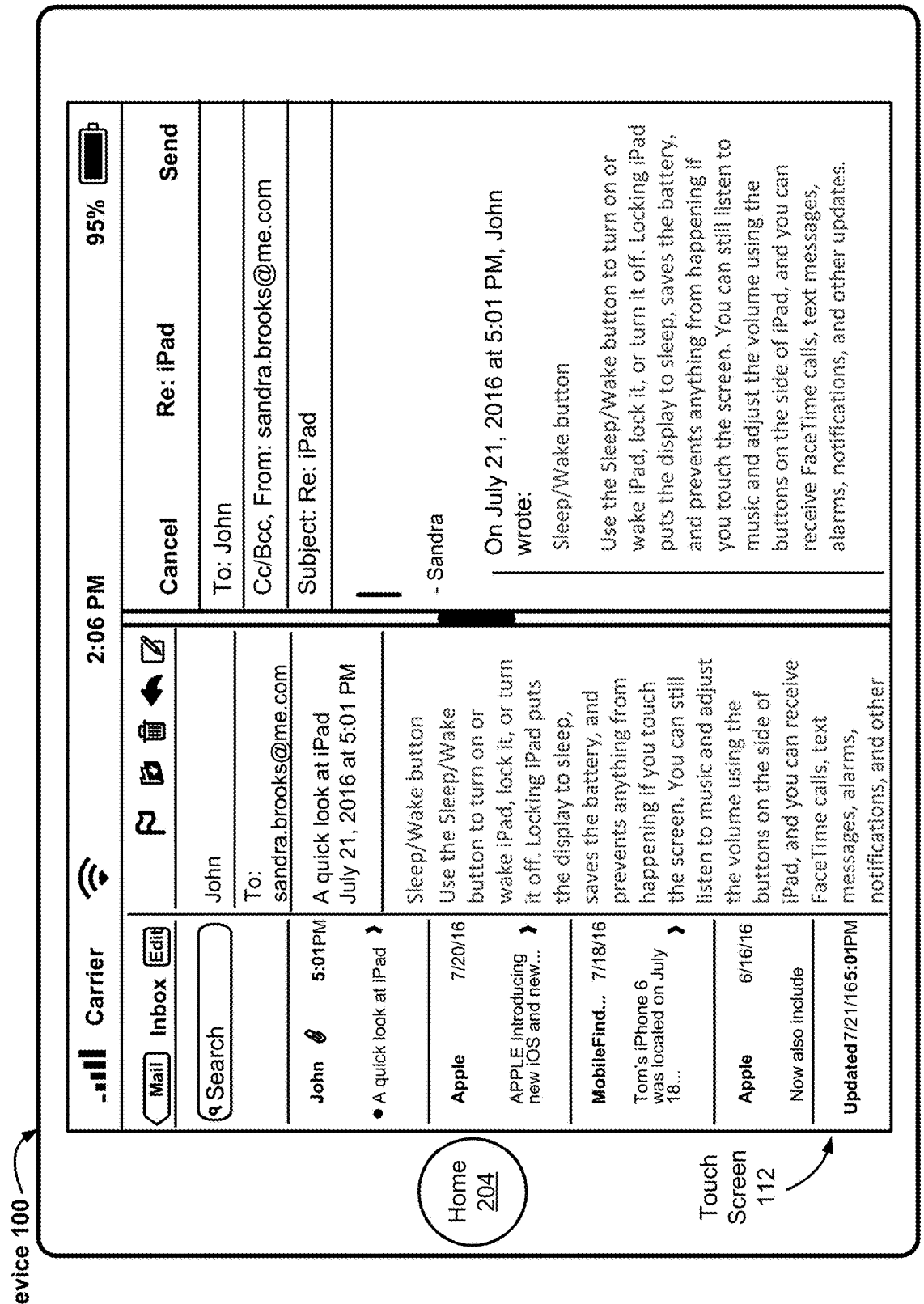
Figure 4A:
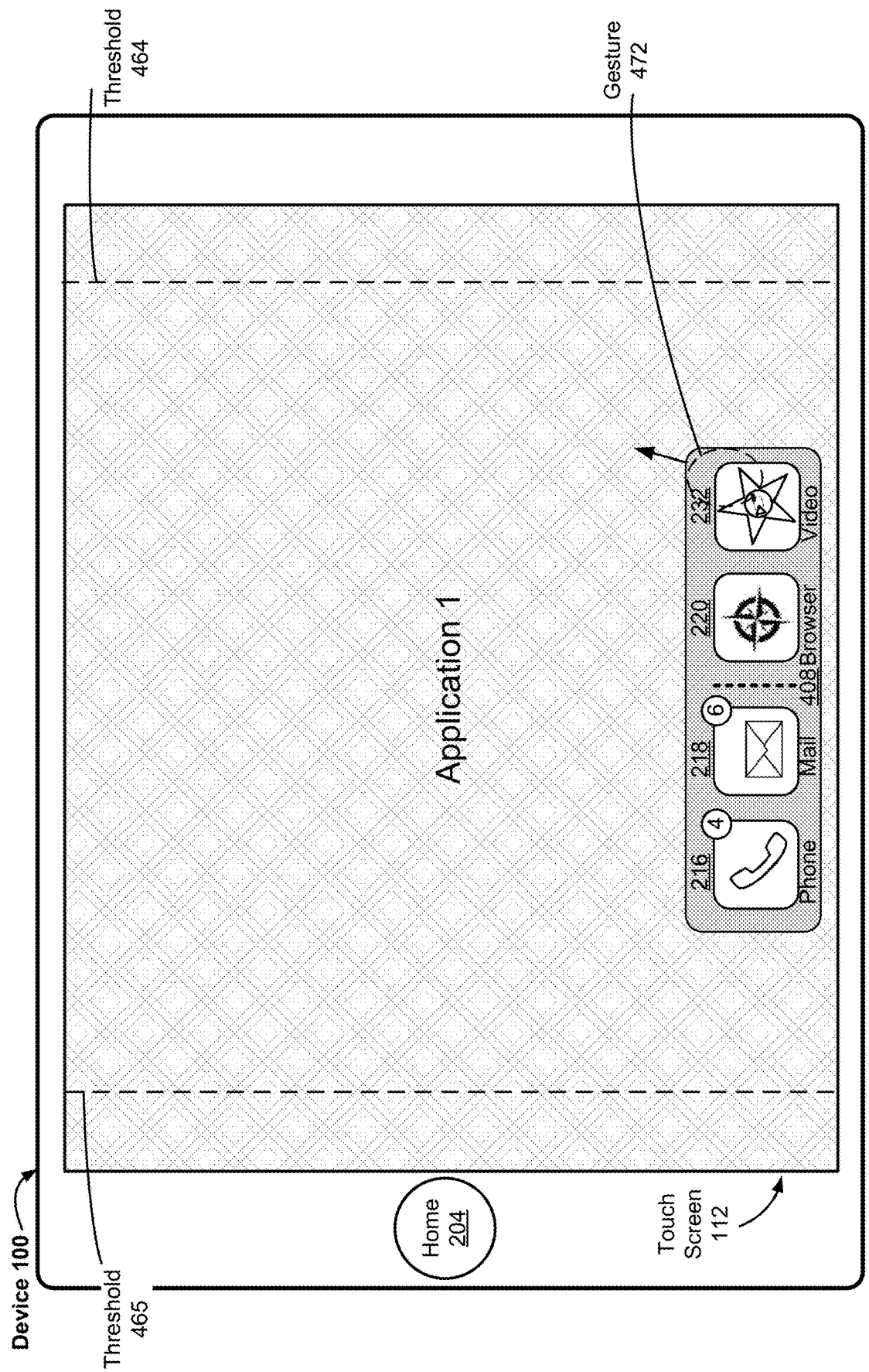
Figure 4A:
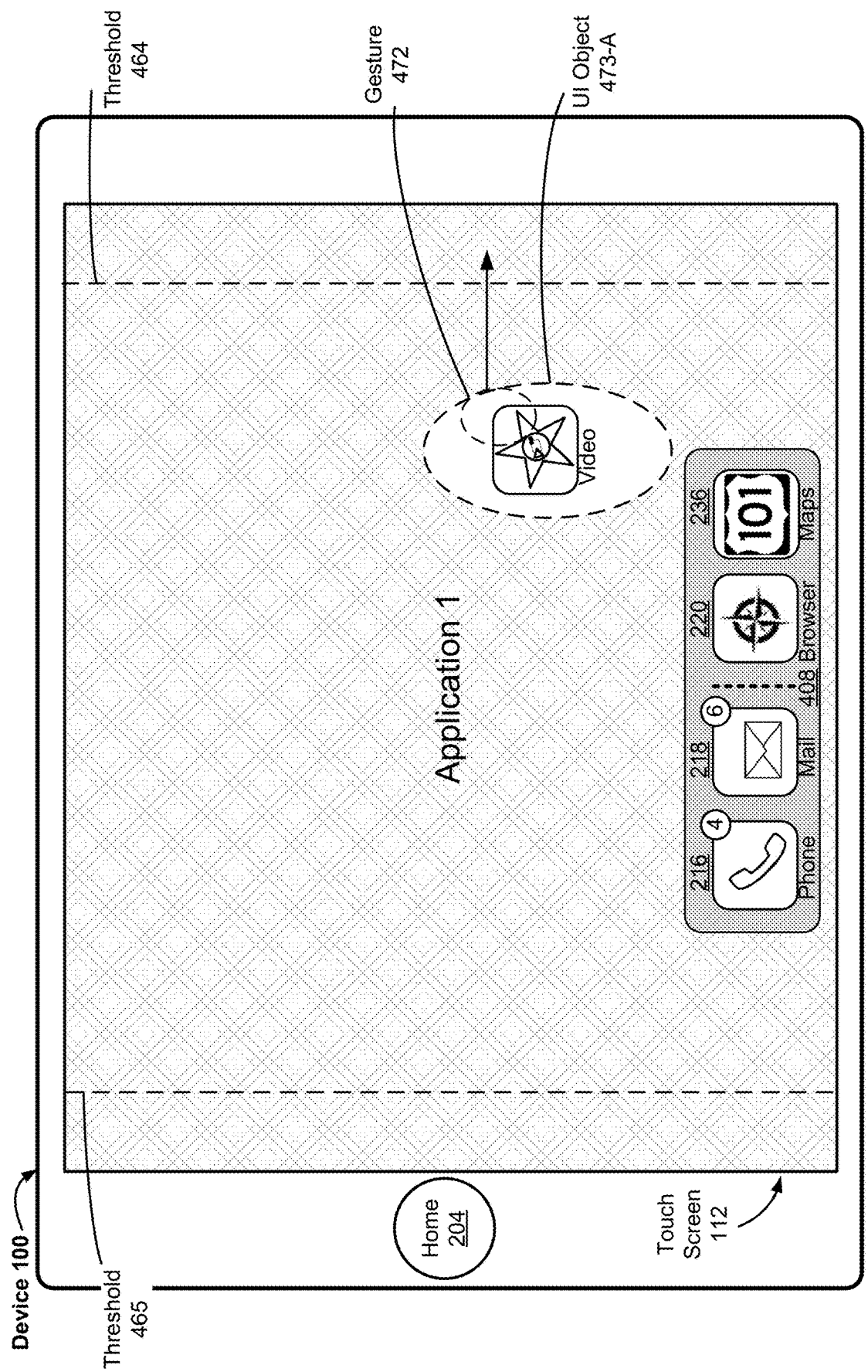
Figure 4A:
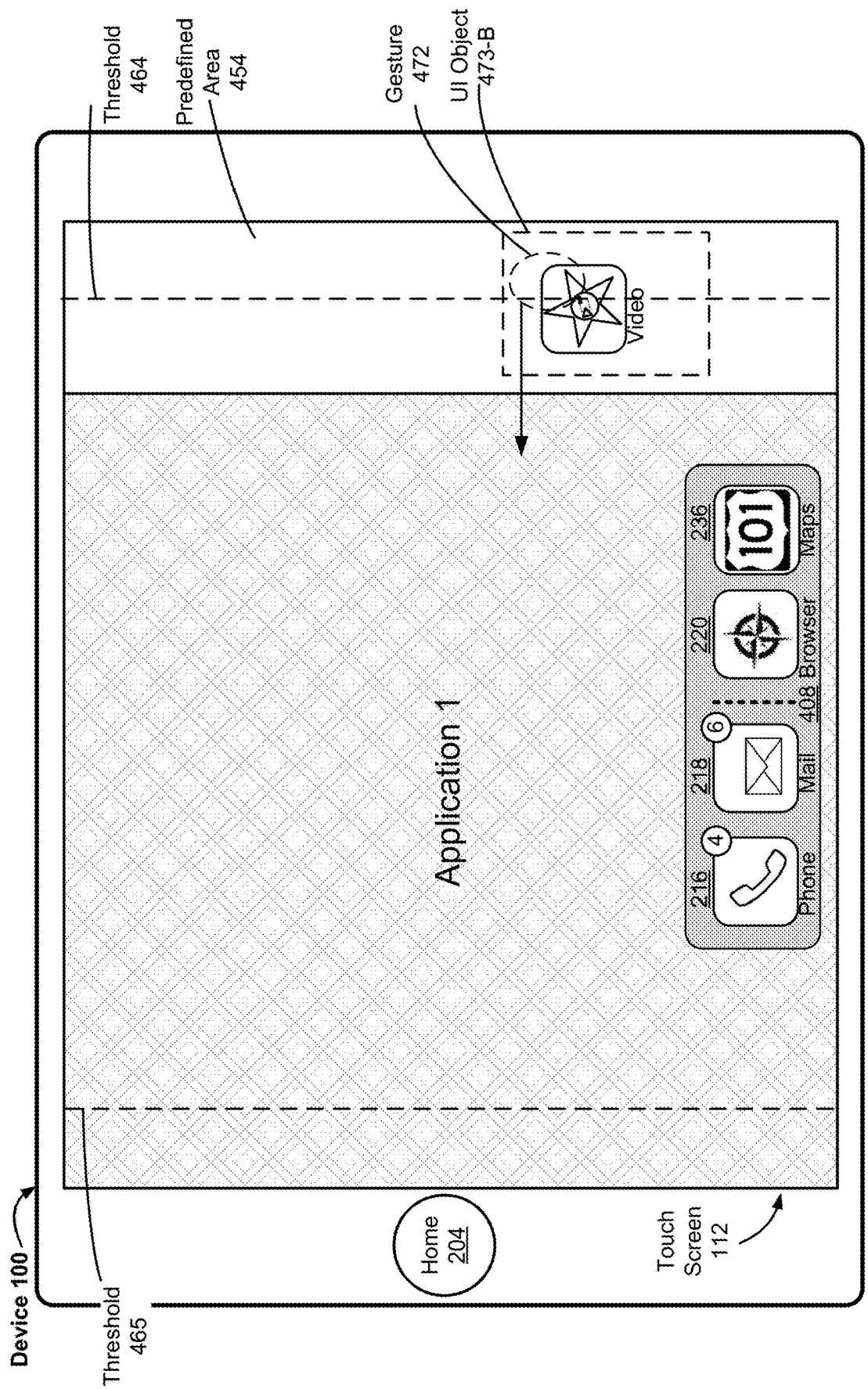
Figure 4A:
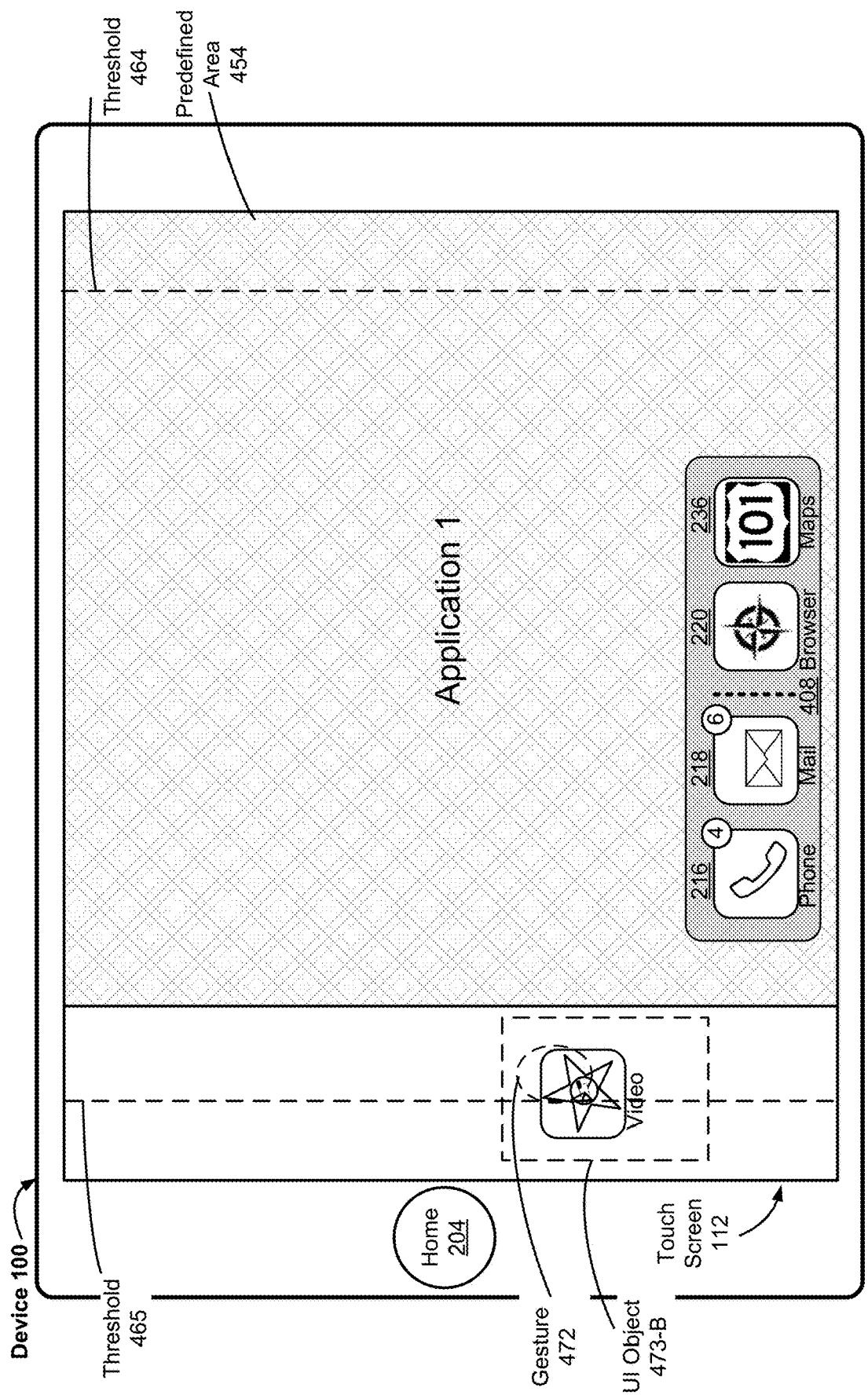
Figure 4A:
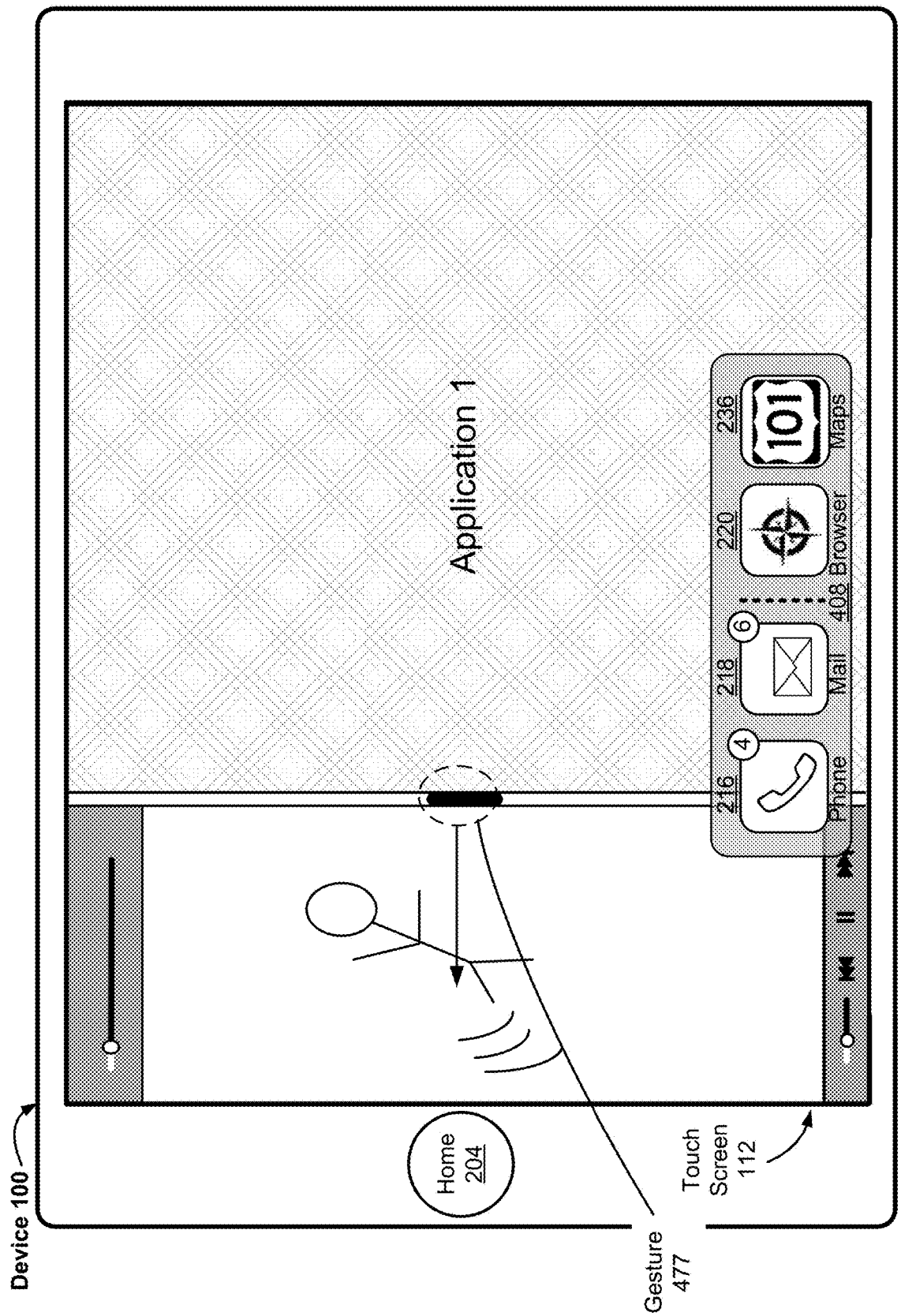
Figure 4A:
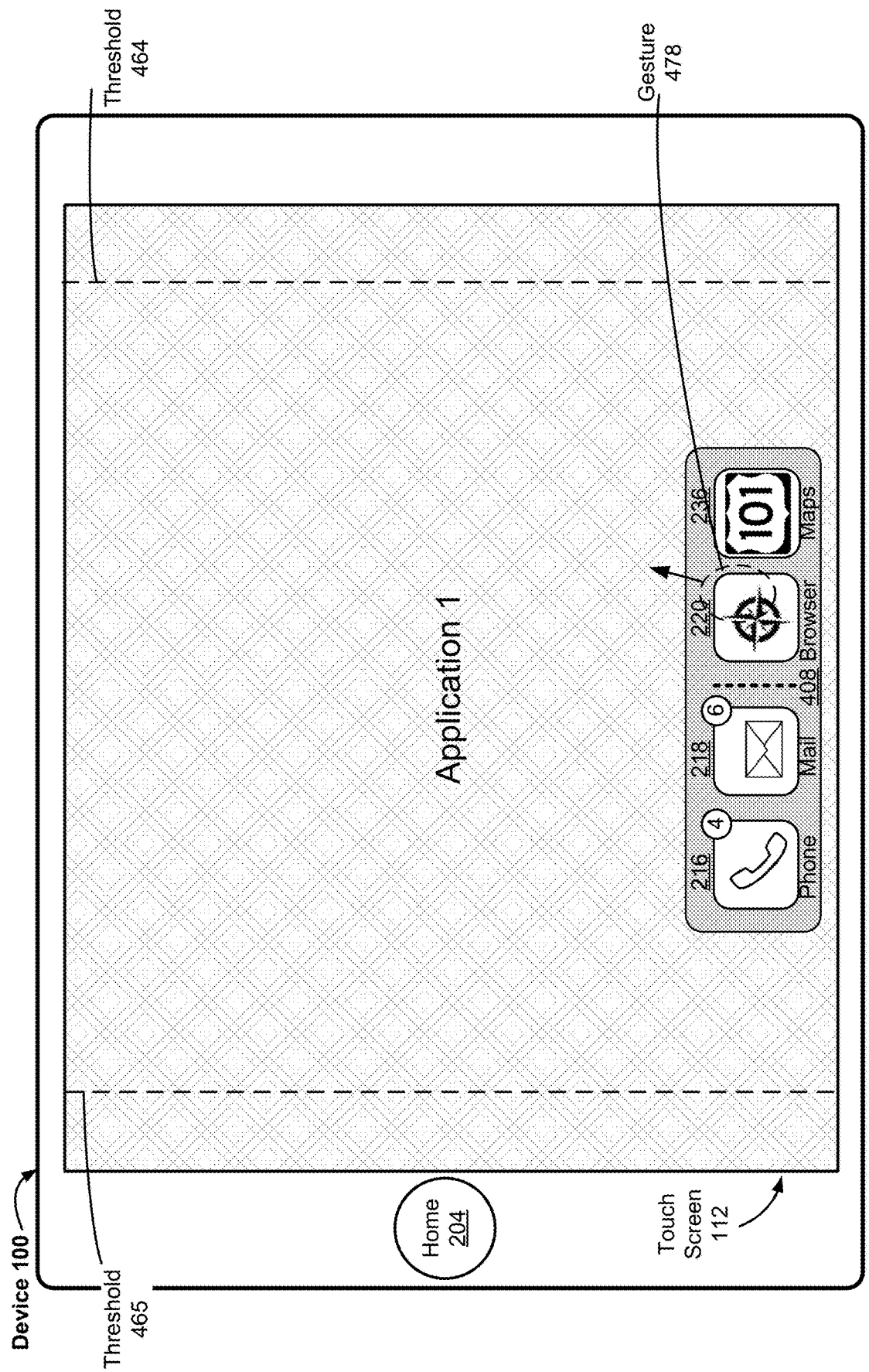
Figure 4A:
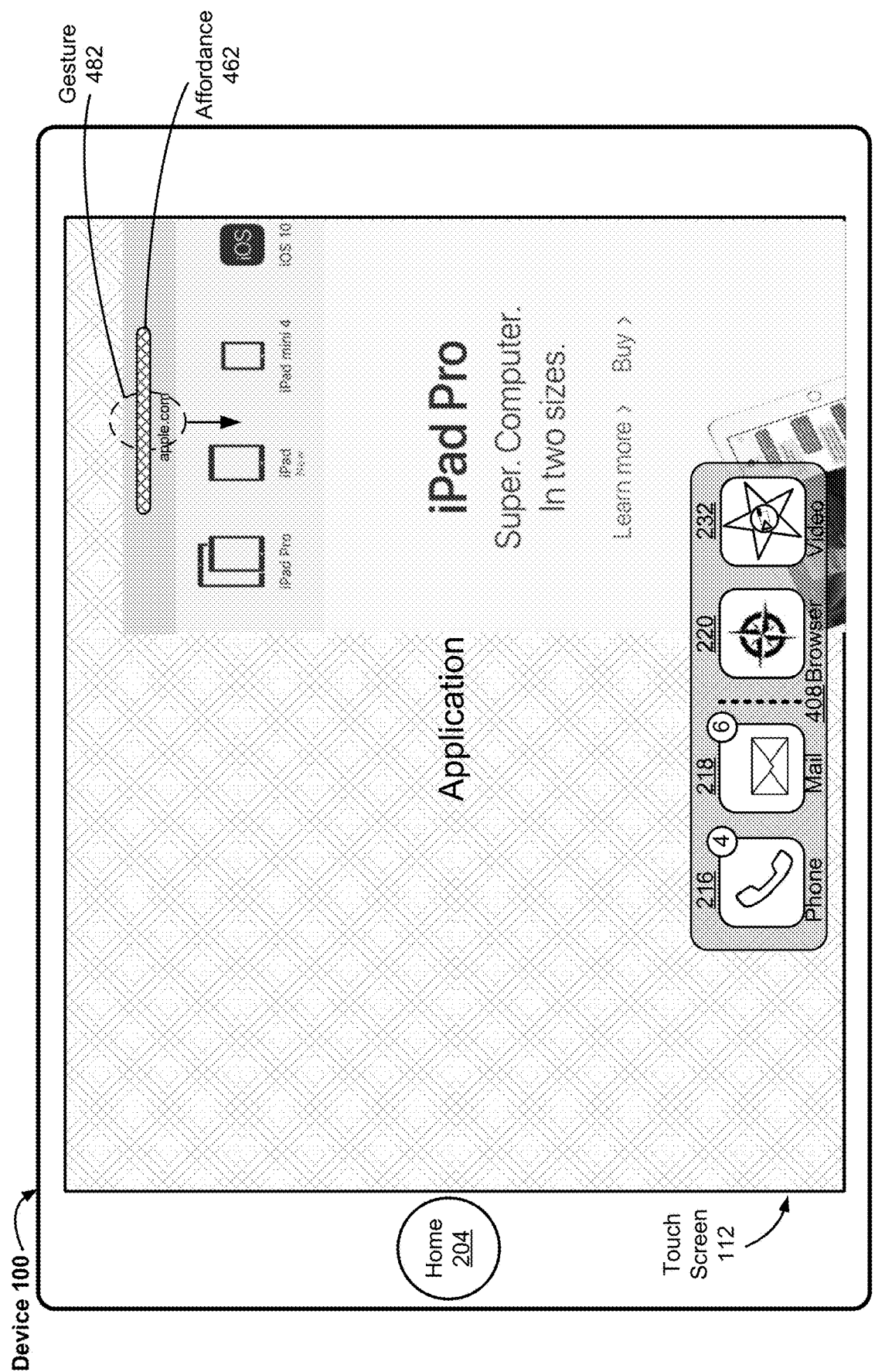
Figure 4A:
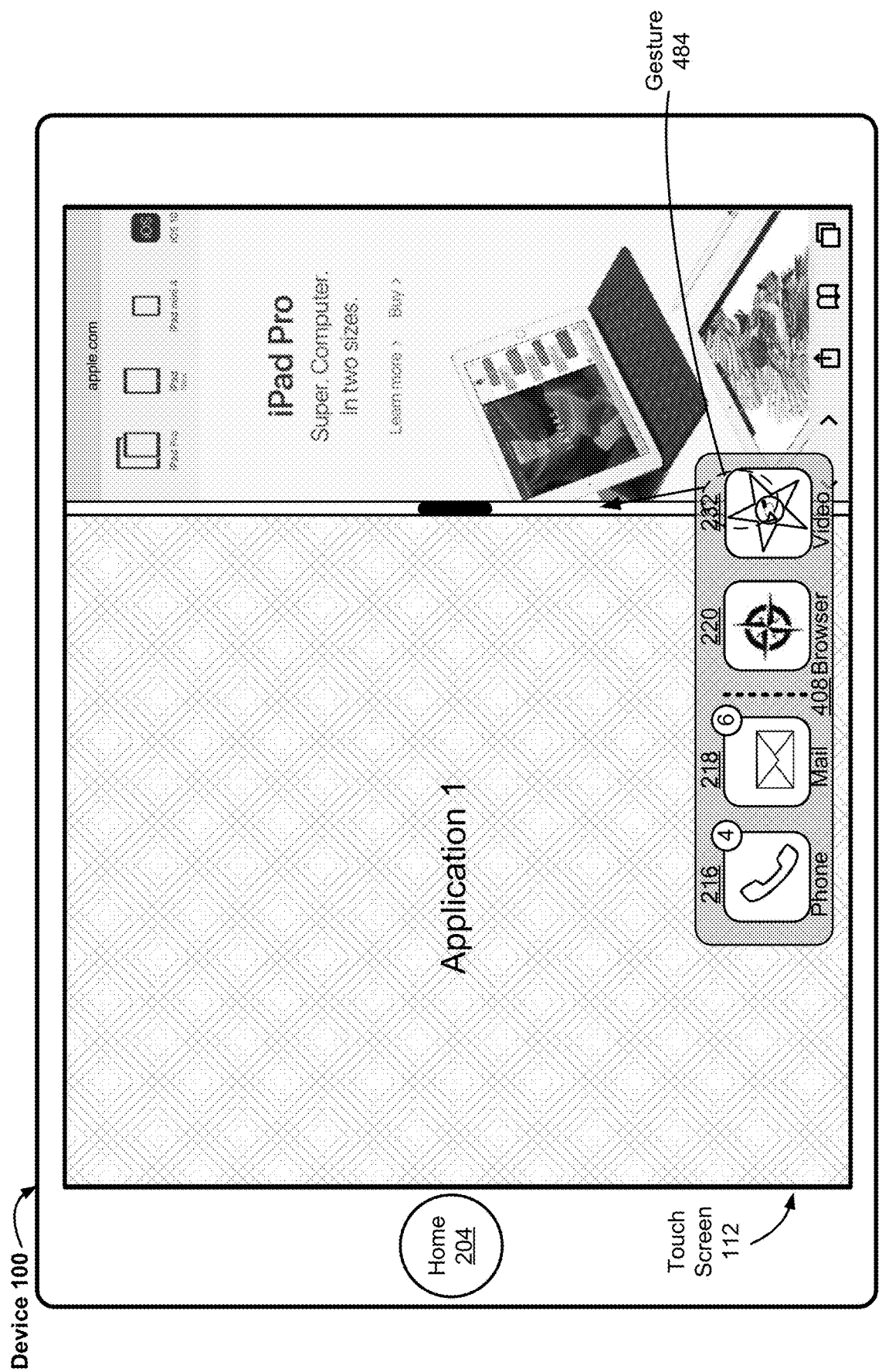
Figure 4A:
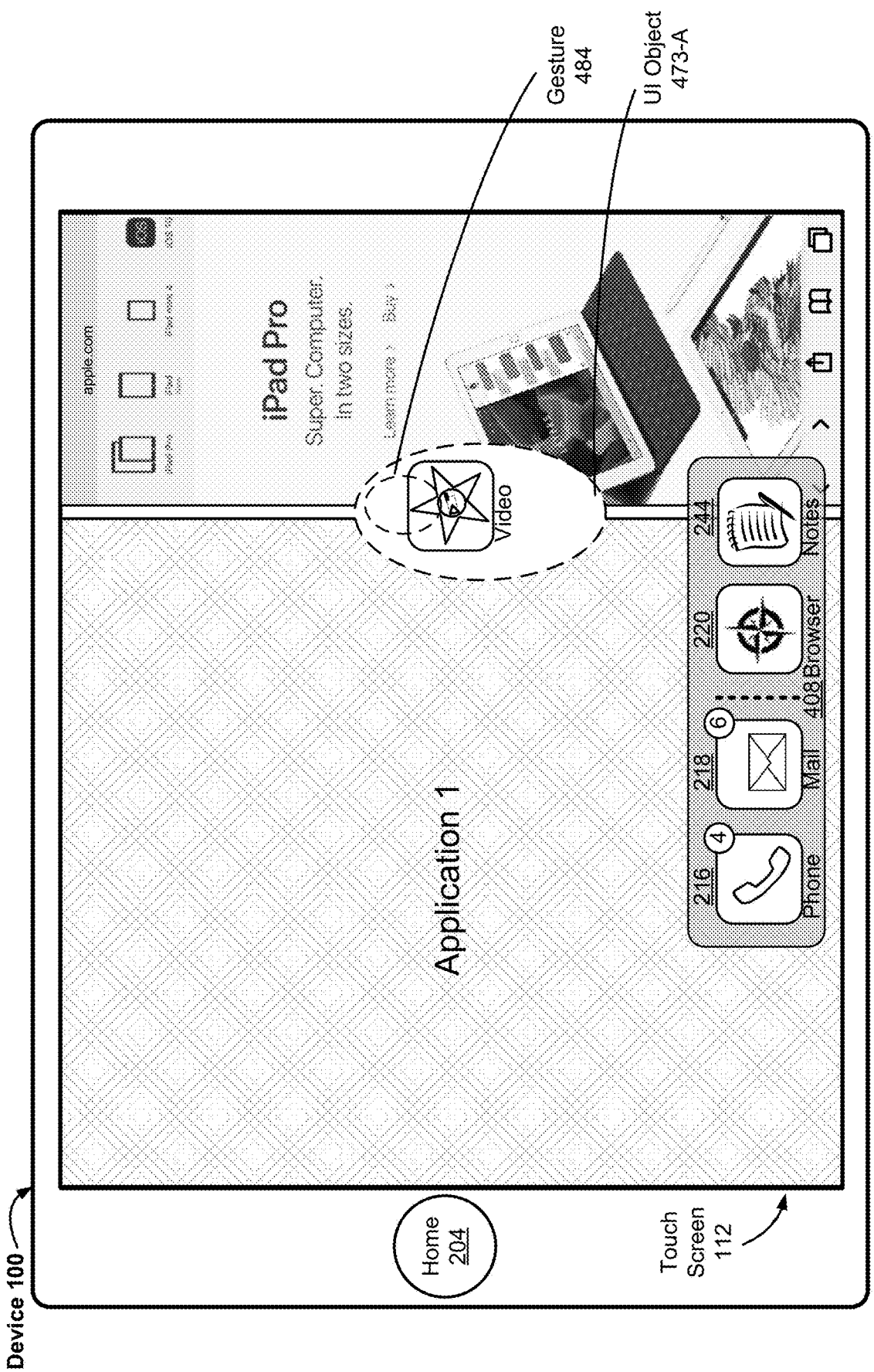
Figure 4A:
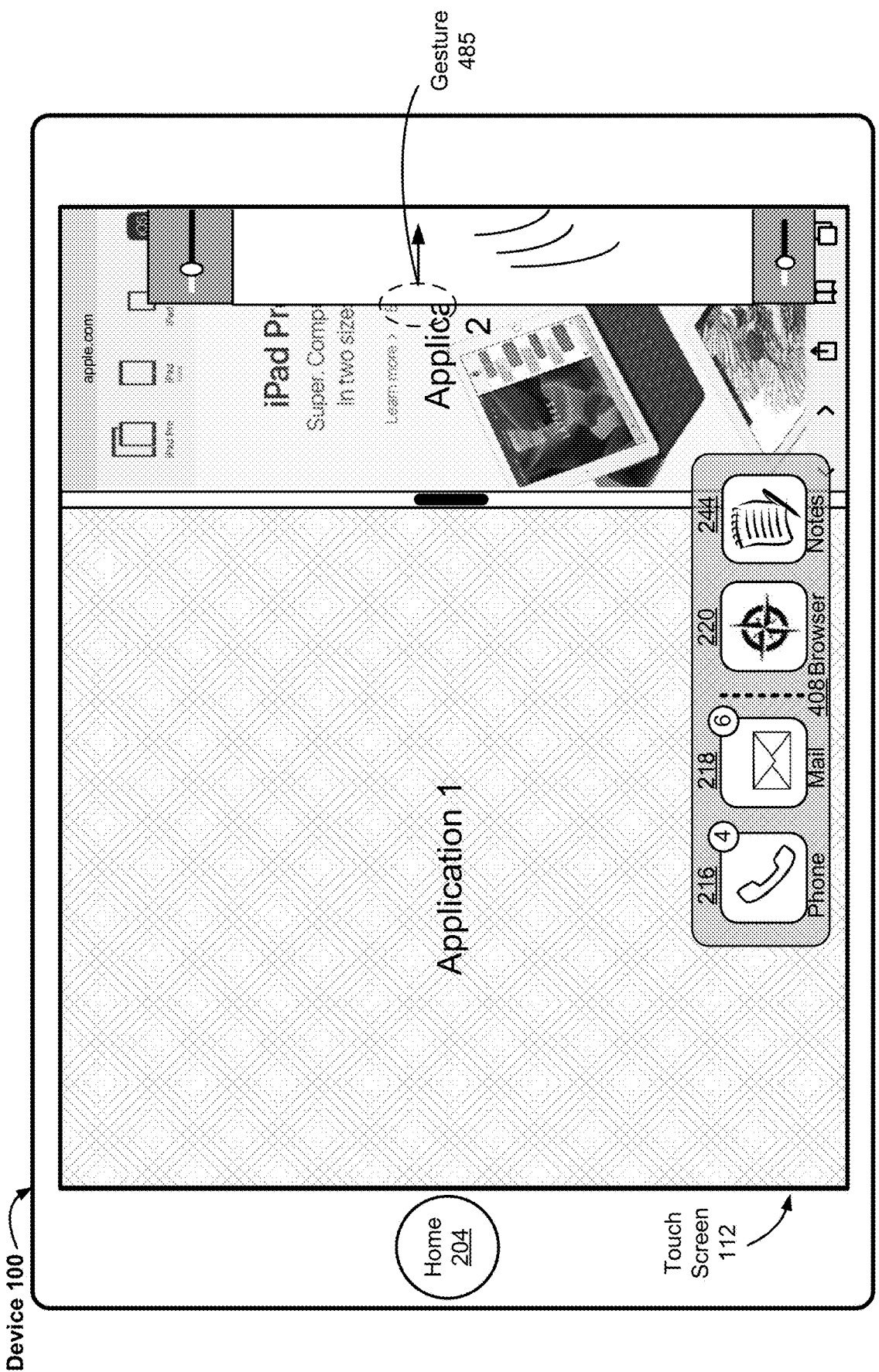
Figure 4A:
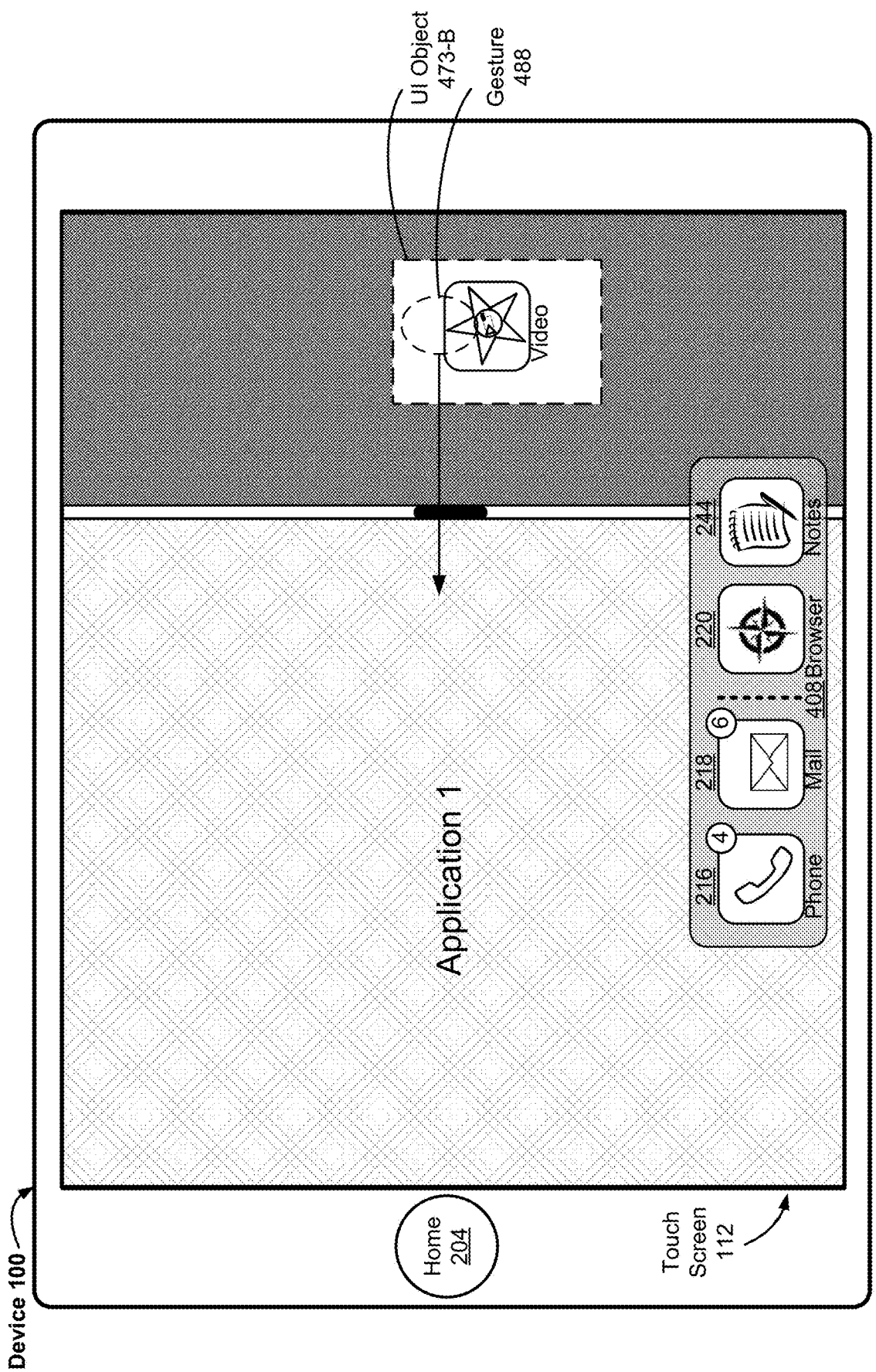
Figure 4A:
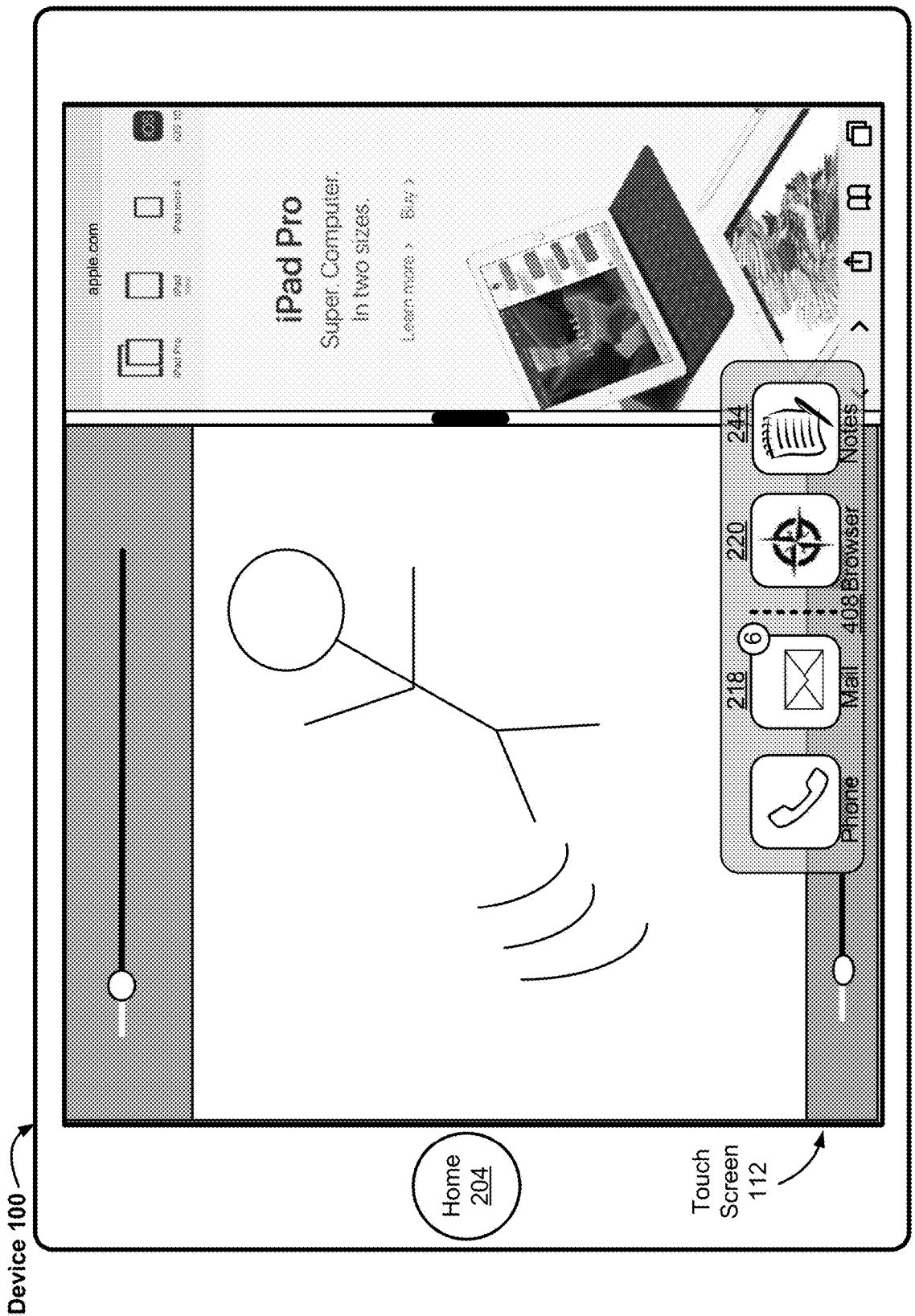

In some embodiments, multiple instances of a single application may also be pinned together and an affordance that corresponds to multiple instances of a single application (e.g., affordance 404) may also be dragged out of the dock 408 using a gesture 470 (FIGS. 4Y-4AA).

Although not pictured in FIGS. 4A-4AA, some embodiments also allow users to drag an affordance out of the dock and onto an overlaid application that is not currently displayed (e.g., to drag the affordance towards an edge of the touch-sensitive display to temporarily display a hidden overlaid application (an overlaid application that the user has swiped off of the display)) and to then drop the affordance over the temporarily displayed overlaid application. For example, a user could drag the application-specific affordance 244 corresponding to a notes application from the dock 408 shown in FIG. 4AN towards a right-most edge of the touch-sensitive display 112 and, upon reaching a threshold distance from the right-most edge, the hidden overlaid video application (that was hidden using gesture 485 in FIGS. 4AL-4AM) would be temporarily revealed and the user could then drop the dragged affordance on top of the hidden overlaid application, thereby replacing the video application with the notes application. In this way, a user is able to use a simple drag gesture to replace an overlaid application that may not currently be visible.

Turning now to FIG. 4AB, example thresholds 464 and 465 are illustrated near the right-most and left-most edges, respectively, of the touch-sensitive display 112. In some embodiments, the thresholds are located approximately 1-2 centimeters away from respective edges of the display 112, and these thresholds are utilized to help determine when to reveal a predefined area of the display 454 that provides a user with an indication that an application may then be pinned in that predefined area. For example, as shown in FIGS. 4AB-4AF, a gesture 472 is detected over an application-specific affordance 232 corresponding to a video-browsing application. The gesture 472 then moves beyond a border of the dock 408 in FIG. 4A, and, in response to detecting that the gesture 472 has moved beyond the border of the dock, the application-specific affordance 232 is no longer displayed beneath a contact corresponding to the gesture 472, and, instead, a user interface object 473-A is displayed beneath the contact.

In some embodiments, the user interface object 473-A has a first shape (e.g., a substantially ellipsoid shape that has a representation of the application-specific affordance located inside it) while the contact corresponding to the gesture 472 has not crossed over the thresholds 464, 465 (FIG. 4AC). In some embodiments, in response to detecting that the gesture 472 has crossed over one of the thresholds 464, 465 (and while the contact remains over the threshold), then a predefined area 454 is revealed and a user interface object 473-B is displayed beneath the contact instead of the user interface object 473-A (FIGS. 4AD and 4AE). In some embodiments, the user interface object 473-B has a second shape (e.g., a substantially rectangular shape that includes a representation of the application-specific affordance located inside) that is distinct from the first shape of user interface object 473-A. By revealing the predefined area 454 and changing the shape of the user interface object 473, a user is provided with clear visual indications that they may now pin an application/activate a split-view mode on the display 112. Providing these clear visual indications improves the man-machine interface by ensuring that new features are discoverable and enables sustained interactions with the display 112, that may not otherwise be possible due to users having to continuously undo actions that they were unable to anticipate.

As shown in FIGS. 4AE-4AF, the user may then decide to end the gesture (e.g., by lifting off the contact corresponding to the gesture 472 from the display 112) and, in response, the application corresponding to the application-specific affordance being dragged during the gesture 472 (e.g., the video-browsing application) is then pinned next to Application 1 on the display 112 (FIG. 4AF).

FIG. 4AF also shows an example of a gesture (e.g., gesture 477) that may be used to dismiss an application after it has been pinned. As shown, the example gesture 477 involves a contact followed by movement of the contact towards an edge (e.g., a left-most edge of the display 112 relative to a user looking down on the display 112). In response to detecting that the gesture 477 has moved to within a predetermined distance of the edge (e.g., within 1-2 centimeters of the edge), then the pinned application is dismissed as shown in FIG. 4AG (and, in some embodiments, memory of the device 100 is updated to reflected that the video application and Application 1 are no longer pinned together). Additional details regarding dismissing a pinned application using a gesture are provided in commonly owned U.S. application Ser. No. 14/732,618 (e.g., at FIGS. 37K-37M, and in the associated paragraphs describing these figures), which has been incorporated by reference in its entirety above. In other embodiments, detecting that the gesture 477 has moved at above a predetermined velocity or acceleration towards the edge will dismiss the pinned application.

FIG. 4AG also illustrates a gesture 478 that may be used to activate a slide-over mode in which an application is displayed overlaying another application. For example, a contact associated with a gesture 478 is initially detected over application-specific affordance 220 corresponding to a web-browsing application and, in response to detecting movement of the contact to beyond a border of the dock 408, a UI object 473-A is displayed in conjunction with the application-specific affordance 220. In FIG. 4AH, lift-off of the contact from the touch-sensitive display 112 is also detected over Application 1 (and without the contact having crossed either of threshold 464 or 465) and, in response, the web-browsing application is then displayed overlaying Application 1 (as is shown in FIG. 4AI).

FIG. 4AI also shows an embodiment where a gesture 482 is shown that moves in a substantially downward direction towards a bottom-most edge of the display 112 and, in response to detecting that the gesture has moved a predetermined distance in the downward direction (e.g., 1-2 centimeters), the web-browsing application is then pinned next to Application 1 (as shown in FIG. 4AJ). In some embodiments, this downward swipe gesture to pin an overlaid application is available in addition to the gesture 518 described below in reference to FIGS. 5D-5F (while, in other embodiments, the downward swipe gesture is an alternative to the upward swipe gesture of FIGS. 5D-5F). In some embodiments, the gesture must be initiated at or near the top of the overlaid application (e.g., over the displayed affordance 462 that is near the top of the overlaid application).

As shown in FIGS. 4AJ-4AL, in some embodiments, users are also able to overlay an application on top of two pinned applications. For example, in response to detecting an end of a gesture 484 over a border between the two pinned applications (FIG. 4AK), an application is then displayed overlaying the two pinned applications (e.g., the video-browsing application is shown overlaying a web-browsing application that is pinned next to Application 1, FIG. 4AL). Additionally, in some embodiments in which picture-in-picture video is available, a user is also able to have picture-in-picture video content displayed on top of the overlaid application that is on top of the two pinned applications. In other words, the picture-in-picture video is always the topmost layer. Picture-in-picture video features are described in more detail in commonly owned U.S. application Ser. No. 14/732,618 (e.g., at FIGS. 48A-52D, and in the associated paragraphs describing these figures), which has been incorporated by reference in its entirety above.

To make efficient user of space, in some embodiments, users are also able to hide an overlaid application temporarily. For example, as shown in FIGS. 4AL-4AN, a gesture (e.g., gesture 485) may be used to swipe in a substantially left-to-right direction across the touch-sensitive display 112 over the overlaid application to cause the overlaid application to be hidden temporarily. Users can then redisplay the overlaid application using another gesture (e.g., gesture 486) that moves in an opposite direction to the gesture that was used to hide the overlaid application (e.g., gesture 486 moves in a substantially right-to-left direction across the touch-sensitive display 112). FIG. 4AO shows an example of an overlaid application that has been redisplayed in response to the gesture 486.

To allow users to easily pin an application that is currently overlaid and thereby efficiently and easily adjust their workspace on the display 112 (which leads to an improved man-machine interface and allows users to engage in sustained interactions with the applications displayed on the display 112), a gesture may be provided that allows users to easily switch an application from an overlaid to a pinned state. For example, a contact over an affordance 506 displayed with an overlaid application may be detected and that contact may then move in a substantially downward direction across the touch-sensitive display towards a bottom-most edge of the touch-sensitive display 112 (e.g., gesture 487, FIG. 4AO). In response to detecting that the gesture 488 has moved at least a predetermined distance across the touch-sensitive display (e.g., 4-5 centimeters), the overlaid application is no longer displayed and instead a UI object 473-B is then displayed underneath the contact associated with the gesture 488. In some embodiments, a gradual scaling down of content corresponding to the overlaid application is shown until the content is no longer displayed and only the UI object 473-A remains on the display 112.

In some embodiments, the predetermined distance used to determine when to display the UI object 473-B is greater than the predetermined distance used to determine when to switch from an overlaid to a pinned state in response to a downward swipe gesture. In some embodiments and as also described below in reference to method 1200, a velocity or acceleration-based threshold may be utilized instead of a distance-based threshold. In these embodiments, the velocity or acceleration threshold that is used to determine when to display the UI object 473-B corresponds to a faster velocity (e.g., 8 centimeters/second) or acceleration than that used to determine when to switch from the overlaid to the pinned state in response to the downward swipe gesture (e.g., 4 centimeters/second).

In some embodiments, the gesture 488 then continues with the user dragging the UI object 473-B across the touch-sensitive display 112. As shown in FIGS. 4AP-4AQ, the gesture 488 may move over Application 1 and, in response, a shape of the UI object 473-B may then change (so that UI object 473-B becomes UI object 473-C that has a shape that is distinct from a shape of UI object 473-B and UI object 473-A discussed earlier) to provide the user with an indication that if a lift-off of the contact occurs the video-browsing application will replace Application 1 on the display 112.

As shown in FIGS. 4AP and 4AQ, as the gesture 488 moves over the web-browsing application and then over Application 1, content corresponding to each of these application is blurred (as indicated by the darkening of each of the content corresponding to each of these applications in FIGS. 4AP and 4AQ) to provide another visual indication (in addition to changing of a shape of the UI object 473) to users that dropping the UI object over either application will cause a change.

In some embodiments, upon detecting an end of the gesture 488 (e.g., a lift-off of the contact associated with the gesture 488 occurs over Application 1), the video-browsing application replaces Application 1 on the display 112 and is now pinned next to the web-browsing application (memory of the device 100 may also be updated to reflect that the web-browsing application and Application 1 are no longer pinned together, and that now the web-browsing application and the video-browsing application are pinned together). An example of this is shown in FIG. 4AR, in which the video-browsing application is now pinned next to the web-browsing application on the display 112.

Allowing users to easily pin an application that is currently overlaid and thereby efficiently and easily adjust their workspace on the display 112, ensures that the man-machine interface is improved (e.g., by ensuring a consistent user experience between dragging an application out of the dock and dragging an overlaid application to switch it to a pinned state) and also allows users to engage in sustained interactions with the applications displayed on the display 112 (e.g., by ensuring that content for the pinned applications is not completely obscured during the dragging gesture to switch between overlaid and pinned states).

In some embodiments, to dismiss the video-browsing application during the gesture 488 discussed above, a user may end the gesture 488 over the dock 408. In these embodiments, in response to detecting the end of the gesture 488 over the dock 408 (e.g., lift-off of a contact associated with the gesture 488 over the dock), then the overlaid video-browsing application is dismissed and a split-view mode, including Application 1 and the web-browsing application, remains displayed on the display 112.

In some embodiments, each of the applications installed on device 100 (shown in memory of the device in FIG. 1A) may be associated with an indication as to whether they are compatible with a split-view display mode. In accordance with a determination that a particular application is not compatible (e.g., by checking the indication associated with the particular application and determining that it indicates that the particular application is not compatible) with the split-view display mode, then no display changes are made while an application-specific affordance corresponding to the particular application is dragged out of the dock 408. Instead, dragging the application-specific affordance corresponding to the particular application and then dropping it over applications displayed in a split-view mode (or over a single application) will cause the particular application to then occupy all of the touch-sensitive display (instead of having the particular application displayed in the split-view mode or as overlaying any of the applications). In some embodiments, application-specific affordances corresponding to incompatible applications (such as the particular application used as an example here) may not be dragged out of the dock 408 at all (instead, these applications may only be tapped on to let users know that these applications are not available for use in conjunction with split-view or slide-over display modes).

Additional descriptions regarding FIGS. 4A-4AR are provided below in reference to method 800.

FIGS. 5A-5O are schematics of a touch-sensitive display used to illustrate user interfaces for switching between a split-view mode (in which two applications are pinned together and displayed side-by-side on the display) and a slide over mode (in which one application is displayed overlaying another application on the display), in accordance with some embodiments.

In FIG. 5A, two applications are displayed in a split-view mode on the touch-sensitive display 112 and a gesture 508 is detected near an edge of the display 112, the edge bordering a first application of the two applications displayed in the split-view mode. The gesture may first travel from off of a bezel surrounding the display 112 and across the edge of the display 112, and then continue traveling in a substantially downward direction (relative to a user looking down upon the display 112). In response to detecting that the gesture 508 has traveled at least a threshold distance (e.g., 1-2 centimeters) in the substantially downward direction, then an affordance 506 is displayed as overlaying the first application (e.g., the affordance 506 overlays the video application in FIG. 5B). The video application is also referred to interchangeably herein as a video-browsing application.

Figure 5B:
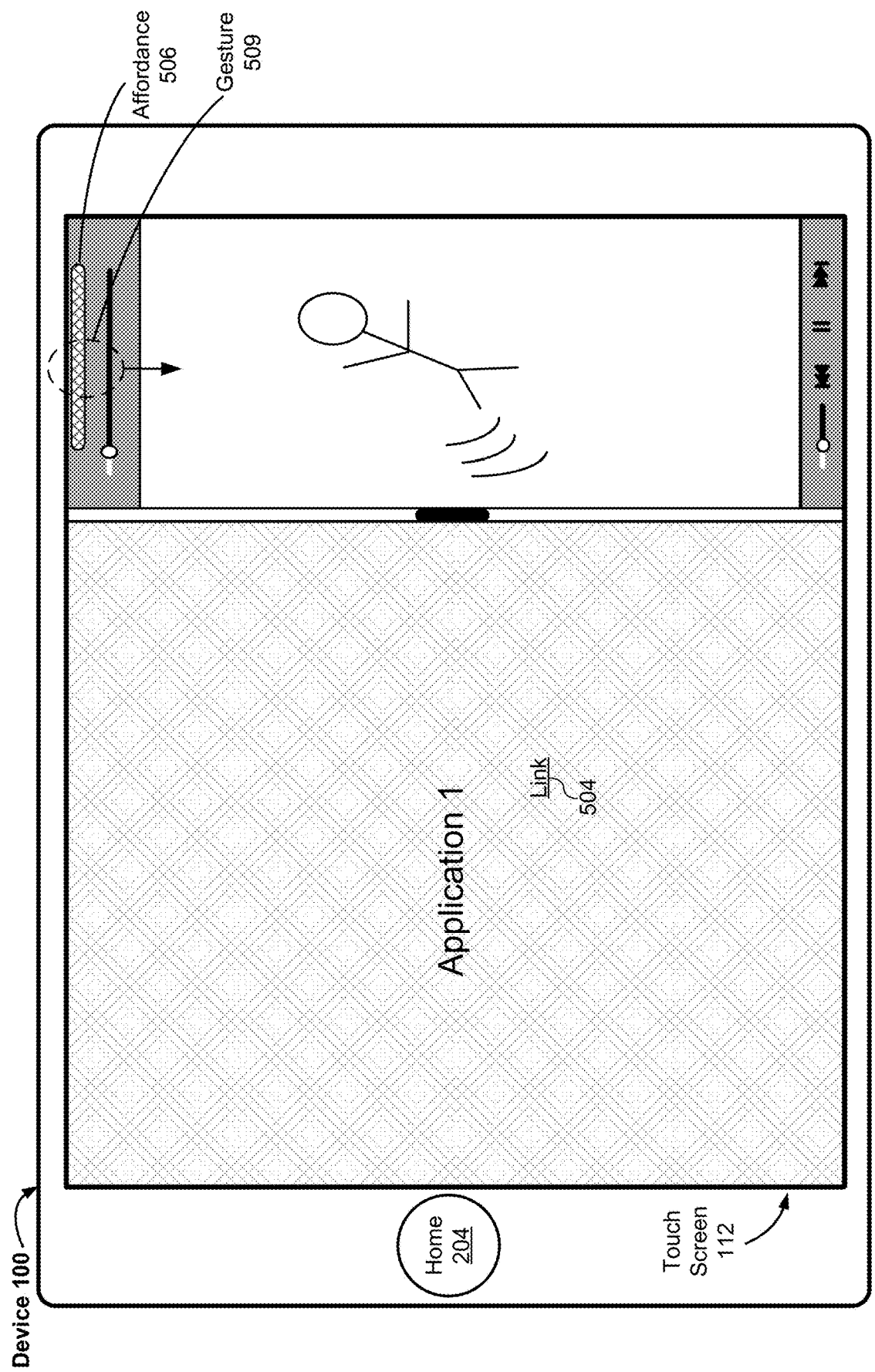
Figure 5C:
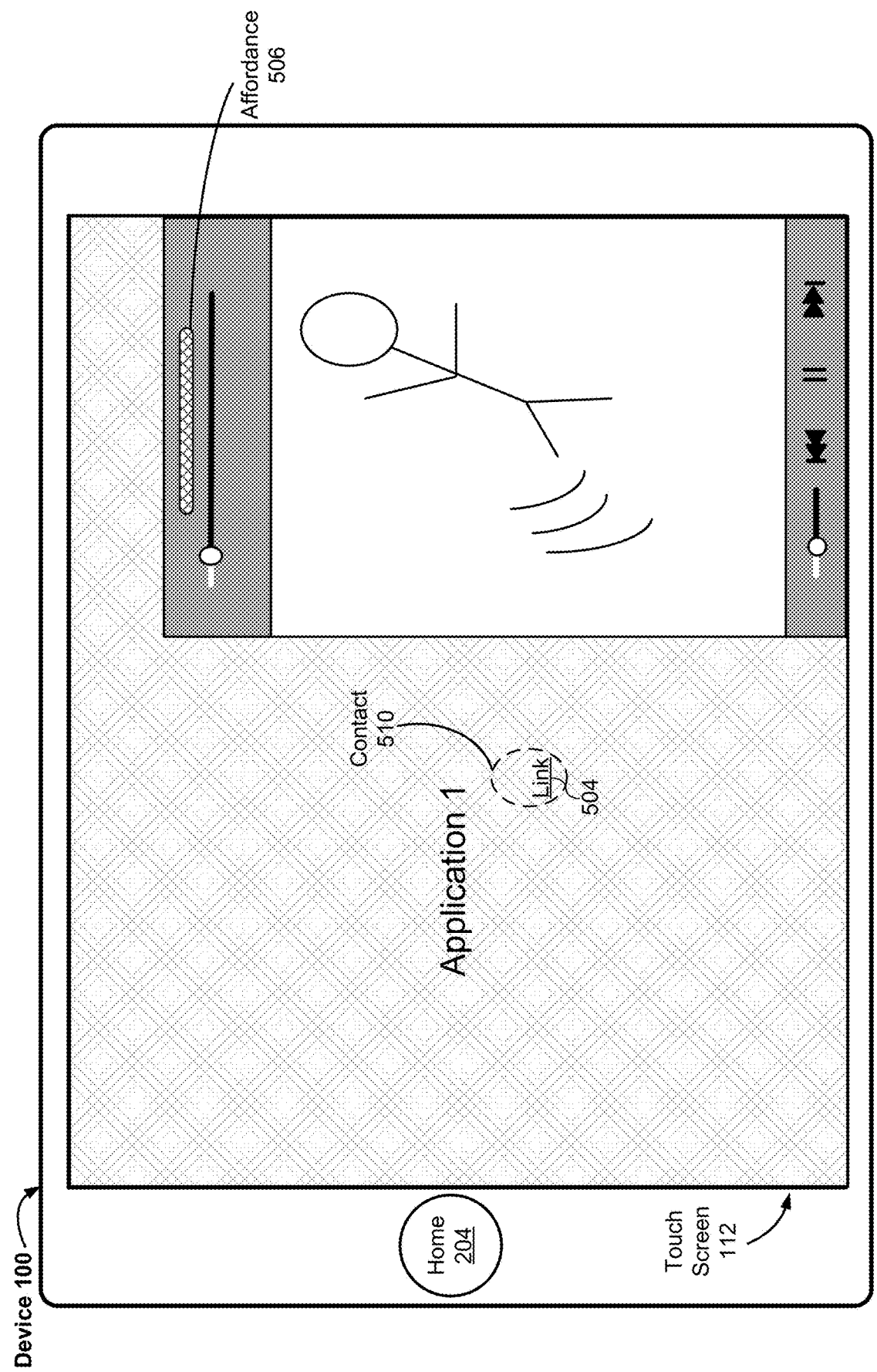

As shown in FIG. 5B, a gesture 509 may be performed over the affordance 506, the gesture allowing a user to switch between split-view and slide-over modes (and this switching allows a user to pin and un-pin an application). The gesture 509 may include an initial contact over the affordance 506 followed by movement of the initial contact in a substantially downward direction over the first application (e.g., the video-browsing application shown in FIG. 5B). As shown in FIG. 5C, after the gesture 509 has move at least a threshold distance in the substantially downward direction (e.g., 1-2 centimeters), then the split-view mode is exited a slide-over mode is instead entered in which the first application is displayed as overlaying another application (e.g., the video-browsing application is displayed as overlaying Application 1 in FIG. 5C). In conjunction with existing the split-view mode, the first application may also be un-pinned from Application 1 (e.g., memory of the device 100 may be updated to remove an association between the first application and Application 1).

While the applications are displayed in the slide-over mode, Application 1 may still be available and responsive to user inputs (even while the video-browsing application overlays Application 1). For example, in response to detecting a contact 510 over link 504 within Application 1, the contact 510 is processed and Application 1 responds by accessing and displaying content associated with the link 504 (FIG. 5D).

Figure 5D:
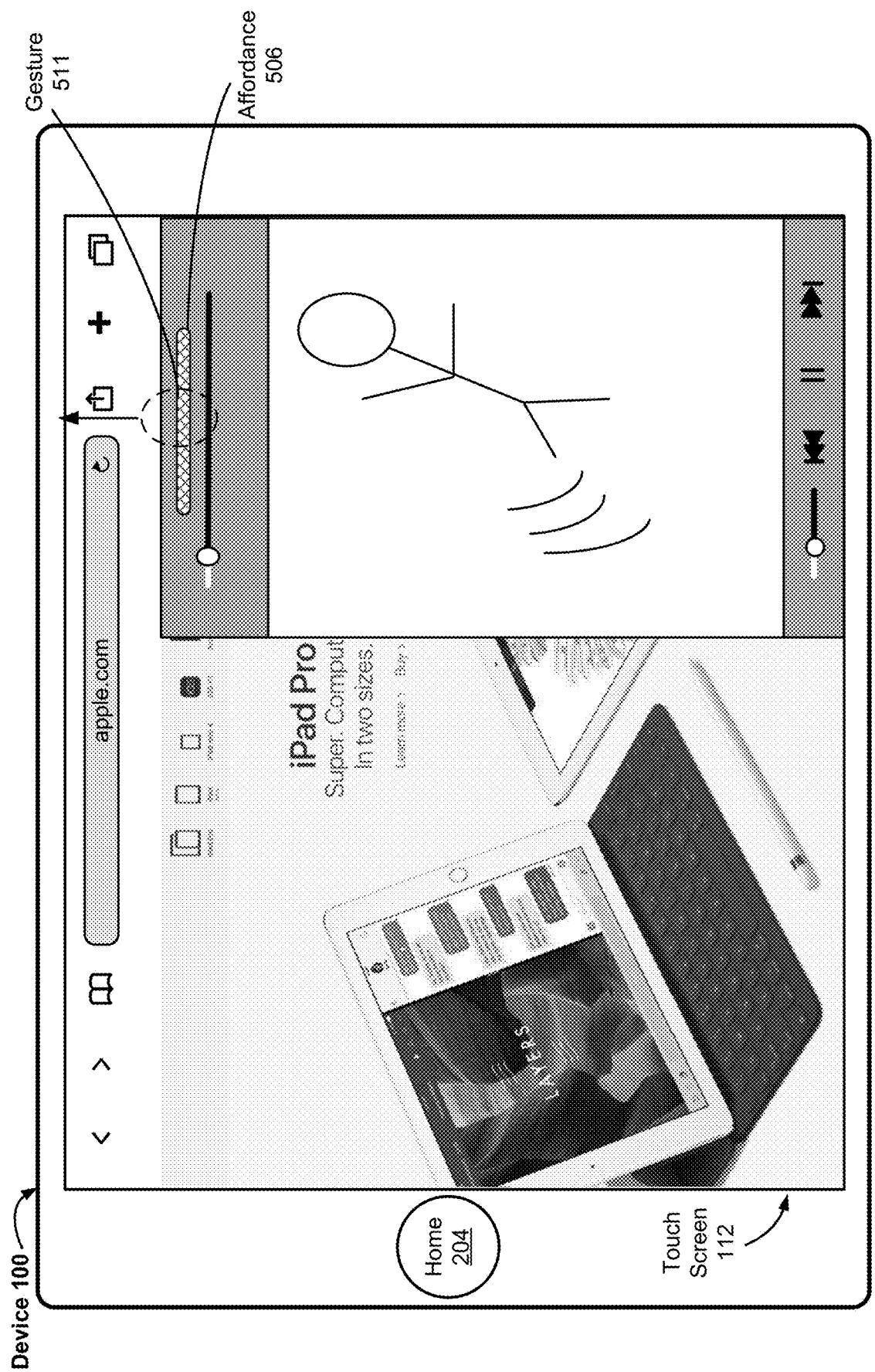
Figure 5E:
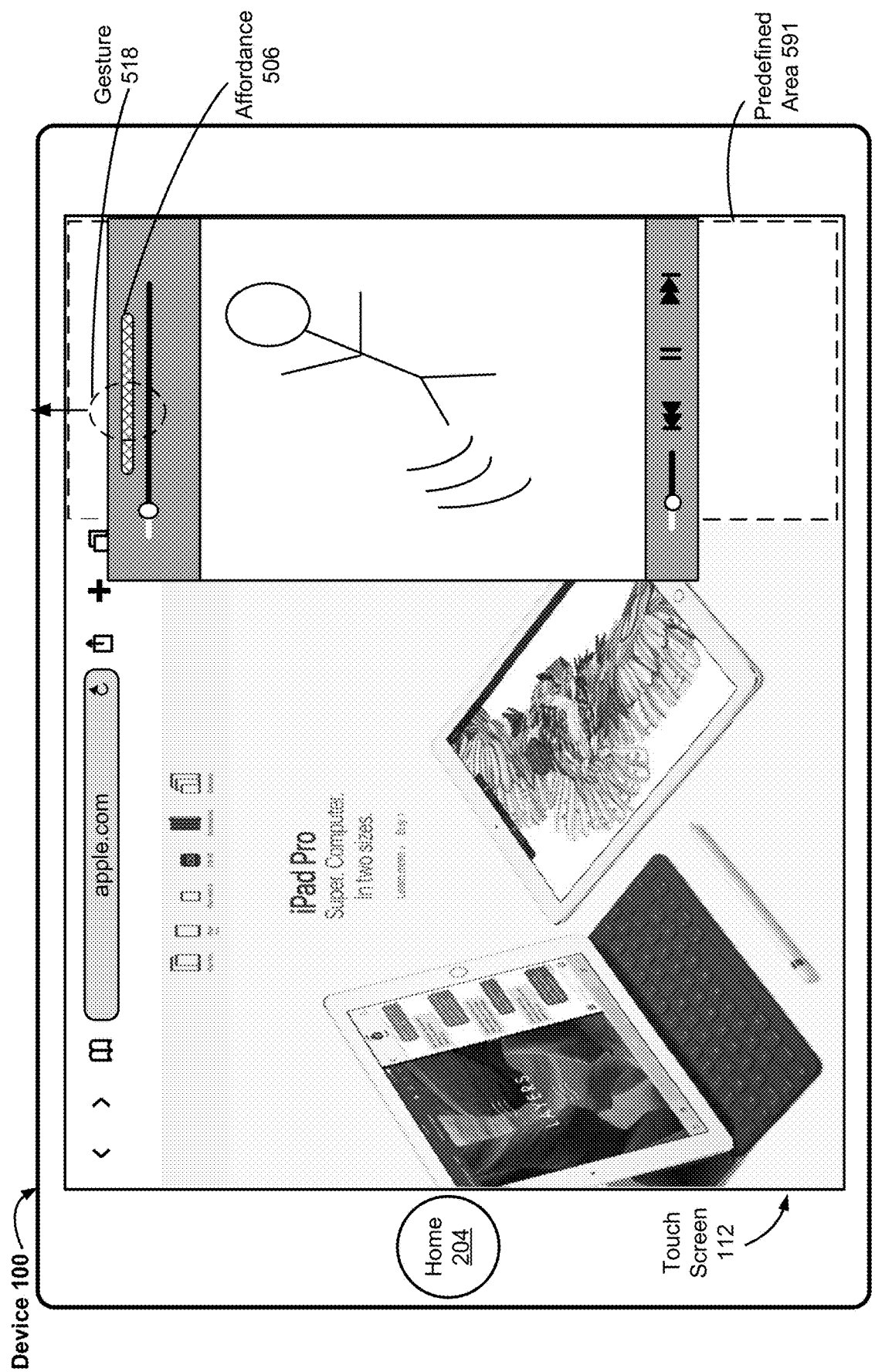
Figure 5F:
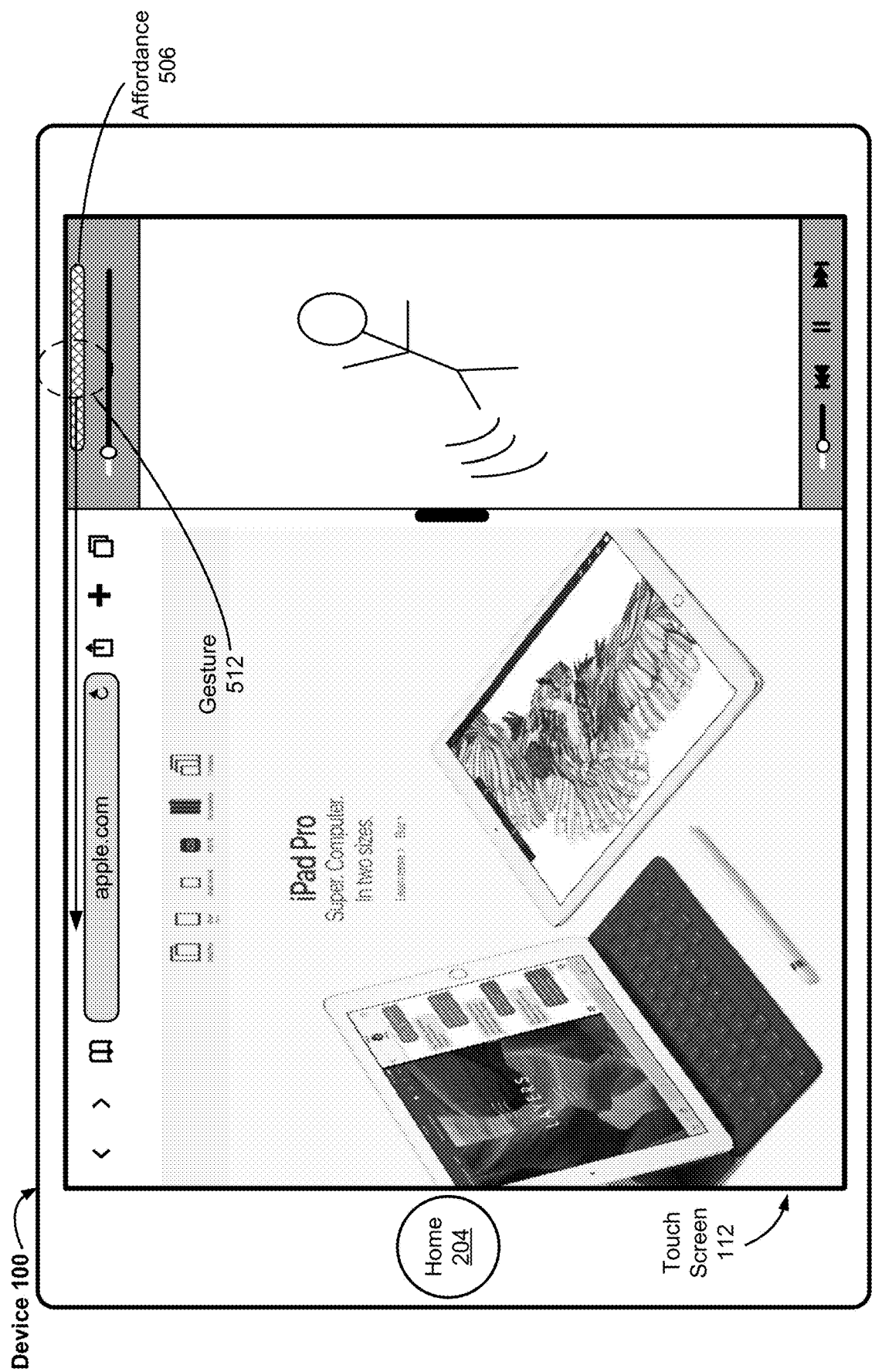

FIG. 5D also illustrates that a gesture 511 may be used to switch back to the split-view mode and to exit the slide-over mode. The gesture 511 may include an initial contact over the affordance 506 followed by movement of the contact in a substantially upward direction towards a top-most edge of the touch-sensitive display 112. In response to detecting that the gesture 511 has moved at least a threshold distance in the substantially upward direction (e.g., 1-2 centimeters), then the video-application is again displayed in split-view mode adjacent to Application 1 on the touch-sensitive display 112 (as is shown in FIG. 5F). Memory of the device 100 may also be updated to again include an association between the video-browsing application and Application 1 that indicates that the two applications are pinned together. In some embodiments, while the gesture 511 is detected and moving in the substantially upward direction, a predefined area is revealed on the touch-sensitive display (e.g., predefined area 591, FIG. 5E) is shown and that predefined area is the area in which the video-browsing application is then displayed after detecting an end of the gesture 511.

Figure 5G:
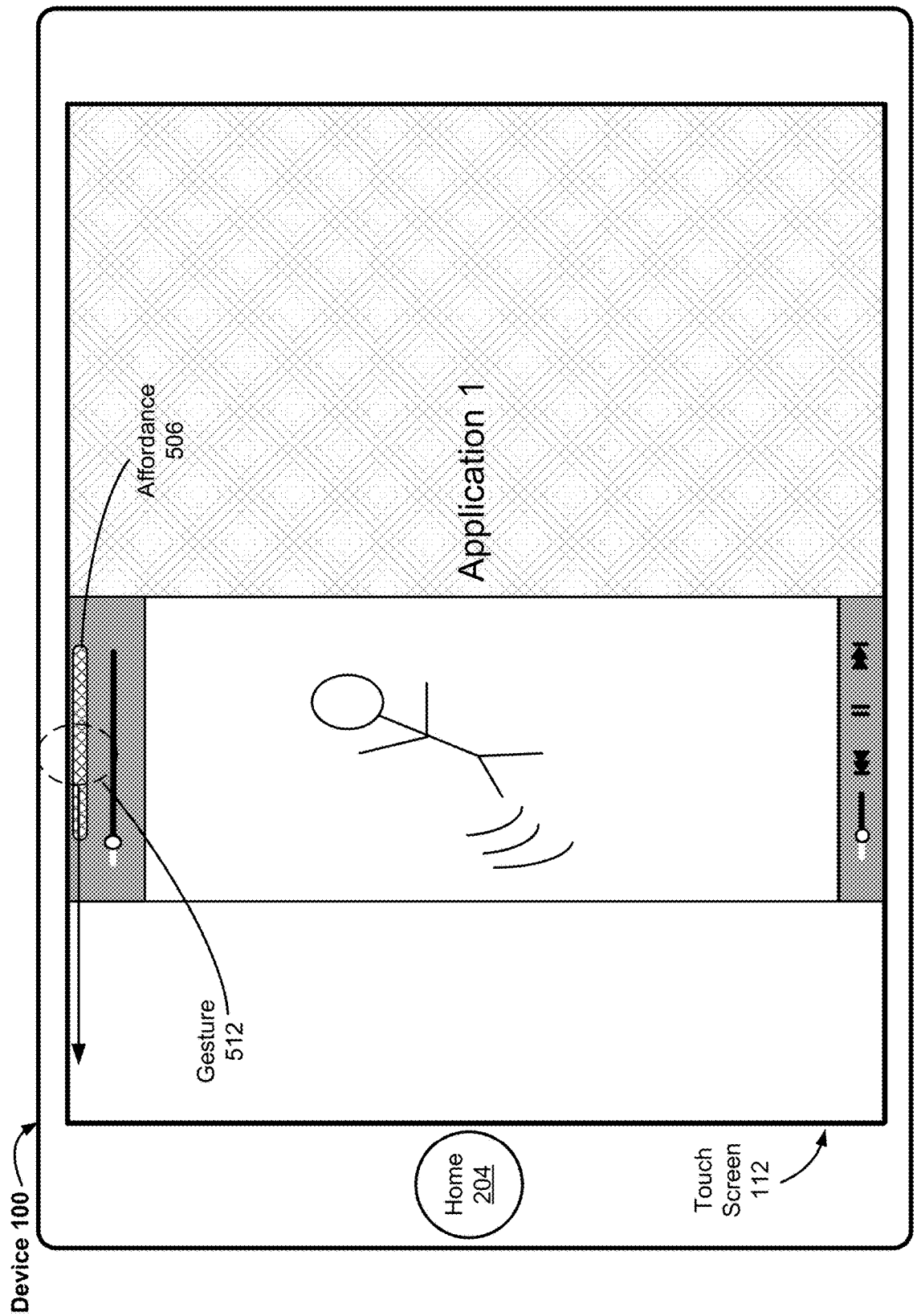
Figure 5H:
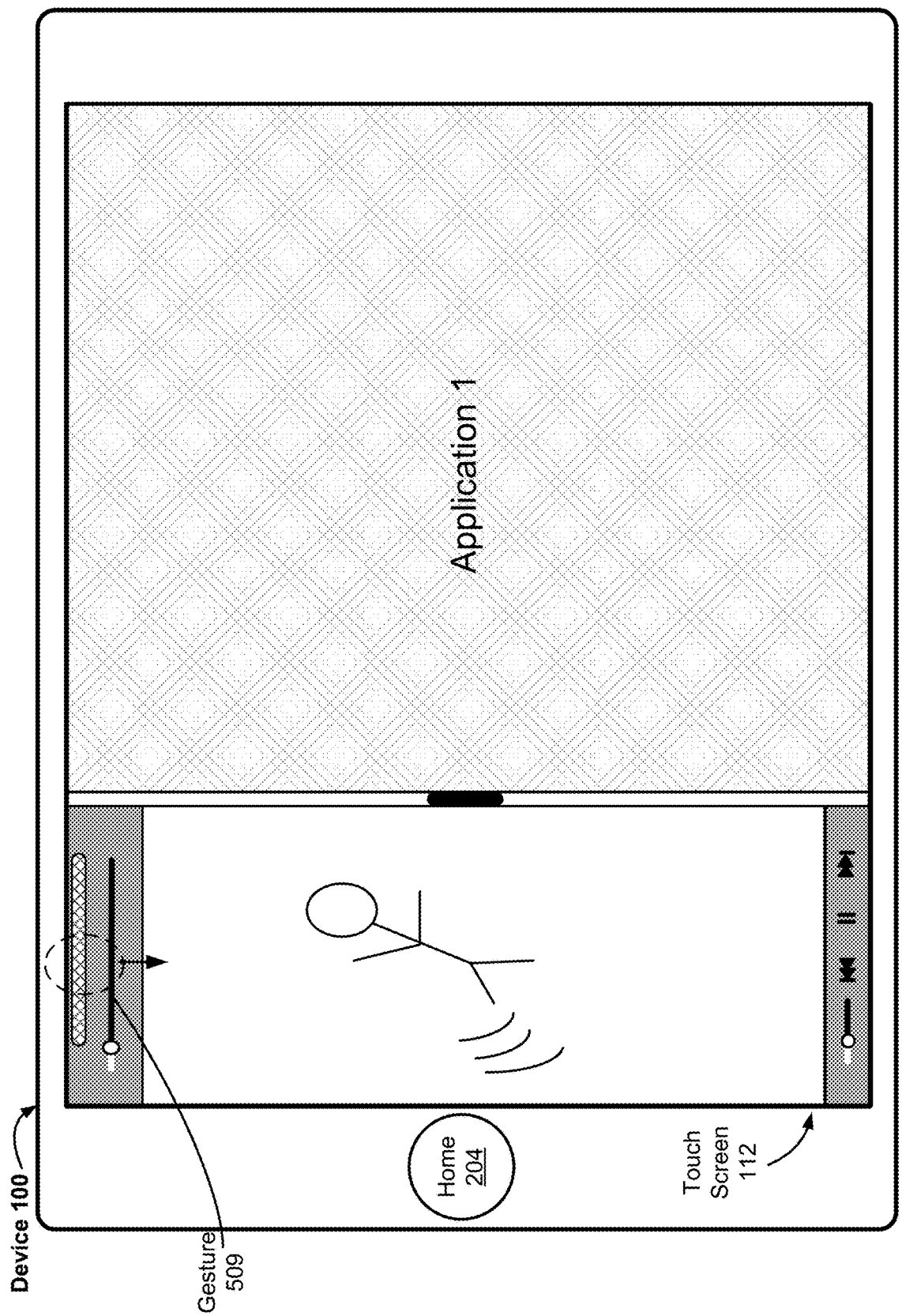

FIG. 5F additionally illustrates that a gesture 512 may be used to move the pinned video-browsing application to a different position on the touch-sensitive display 112. The gesture 512 may include an initial contact over the affordance 506 followed by movement of the contact in a substantially lateral direction that is substantially parallel (e.g., within +/−5 degrees of parallel) to the top-most edge of the touch-sensitive display 112. FIG. 5G illustrates that as the gesture 512 continues to travel in the substantially lateral direction, the video-browsing application moves in accordance with the gesture 512 across the touch-sensitive display until a position at an opposite side of Application 1 is reached (e.g., as shown in FIG. 5H the video-browsing application is then displayed on a left side of the Application 1 upon detecting a lift-off of the gesture 512. The association between the two applications may also be updated to reflect that the video-browsing application is now pinned on the left side of Application 1.

Figure 5I:
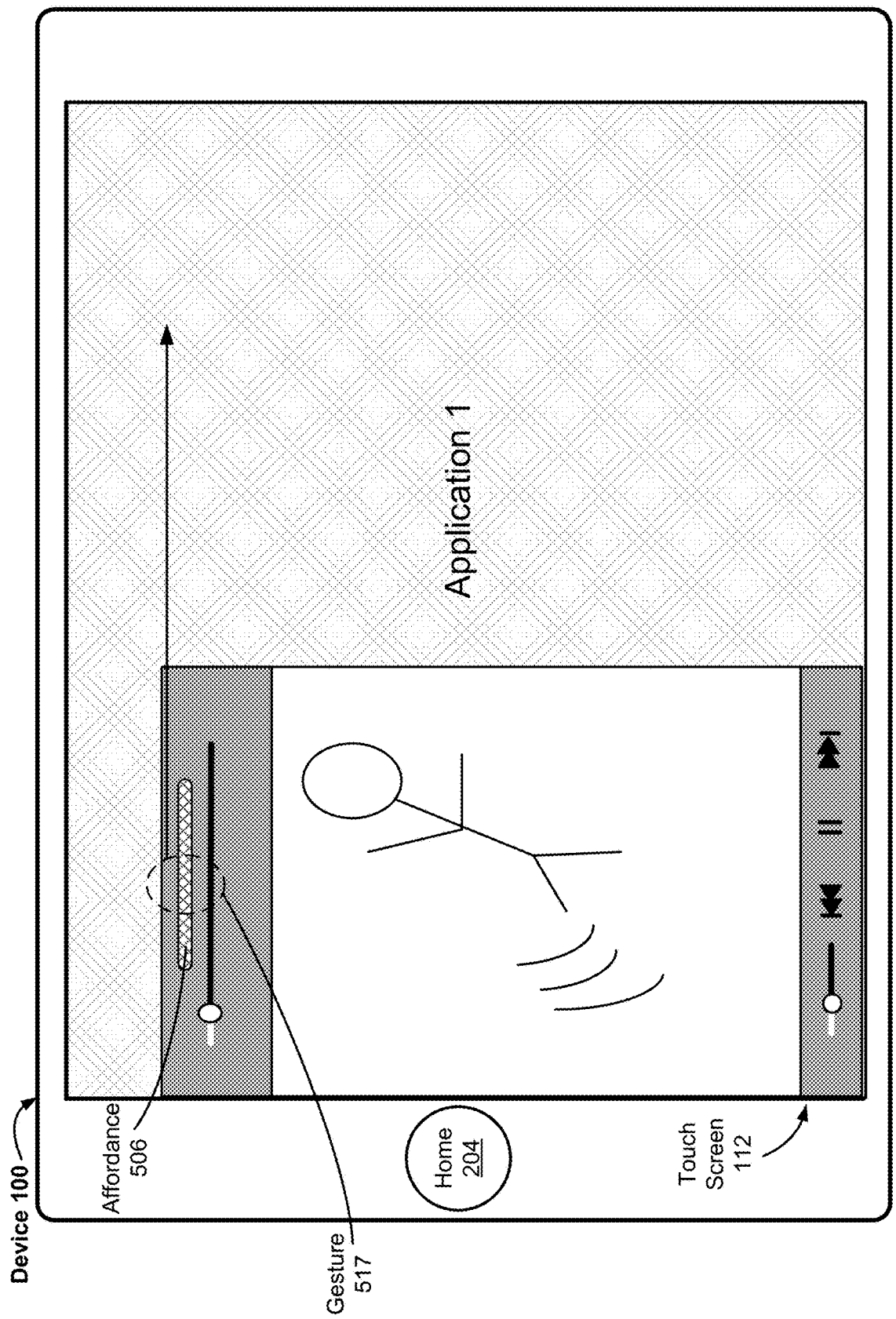

FIG. 5H illustrates that while the video-browsing is pinned to the left of Application 1, the gesture 509 may be used to switch from the split-view mode to a slide-over mode. For example, after detecting that the gesture 509 has traveled at least a threshold distance in a substantially downward direction (e.g., 1-2 centimeters in the substantially downward direction), then the split-view mode is exited and the video-browsing application is displayed as overlaying Application 1 (FIG. 5I). As is also shown in FIG. 5I, a gesture 517 (similar to the gesture 512 discussed above) may be used to drag the overlaid video-browsing application to a different position on the touch-sensitive display 112 (as shown in FIG. 5J).

Figure 5J:
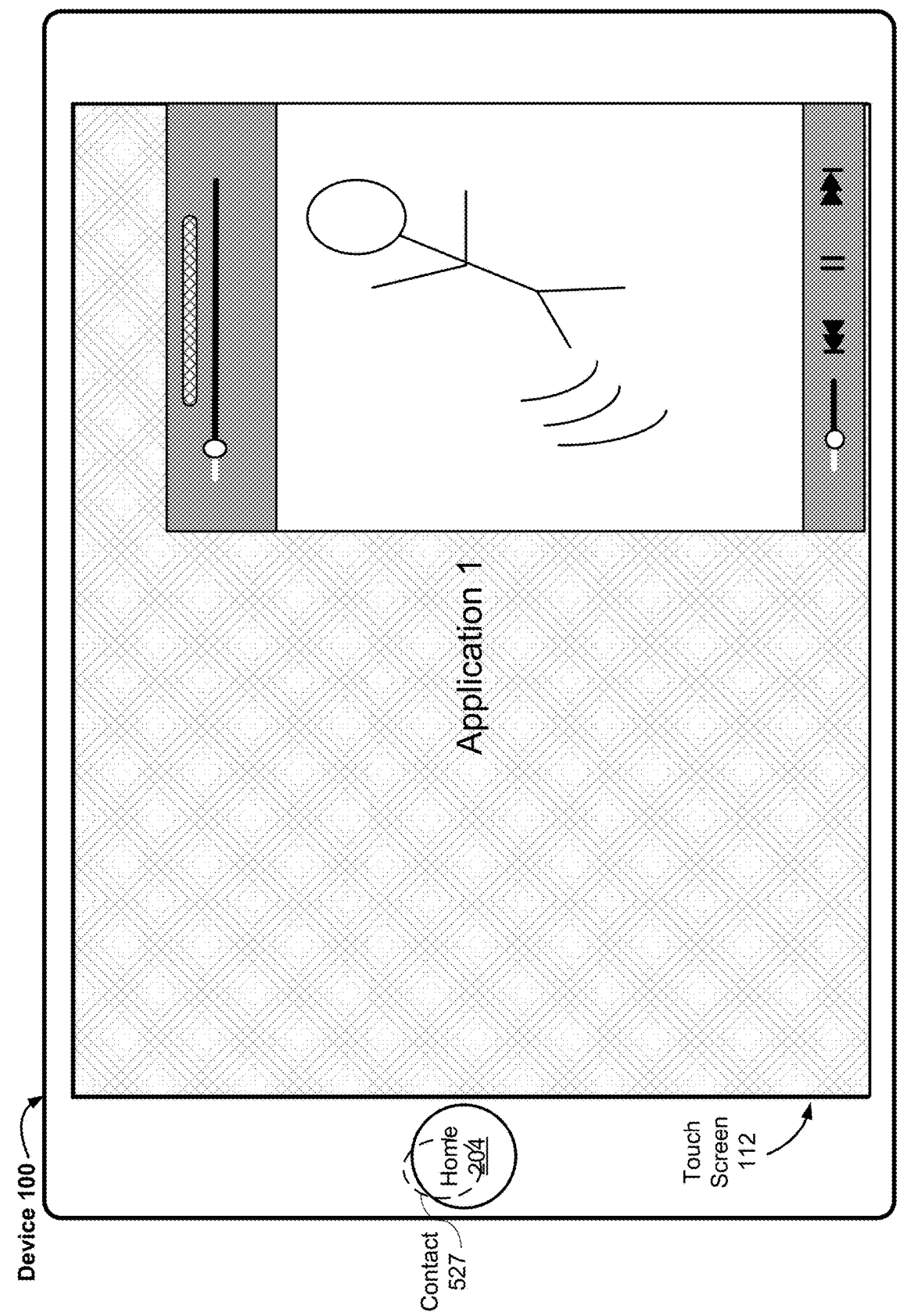
Figure 5K:
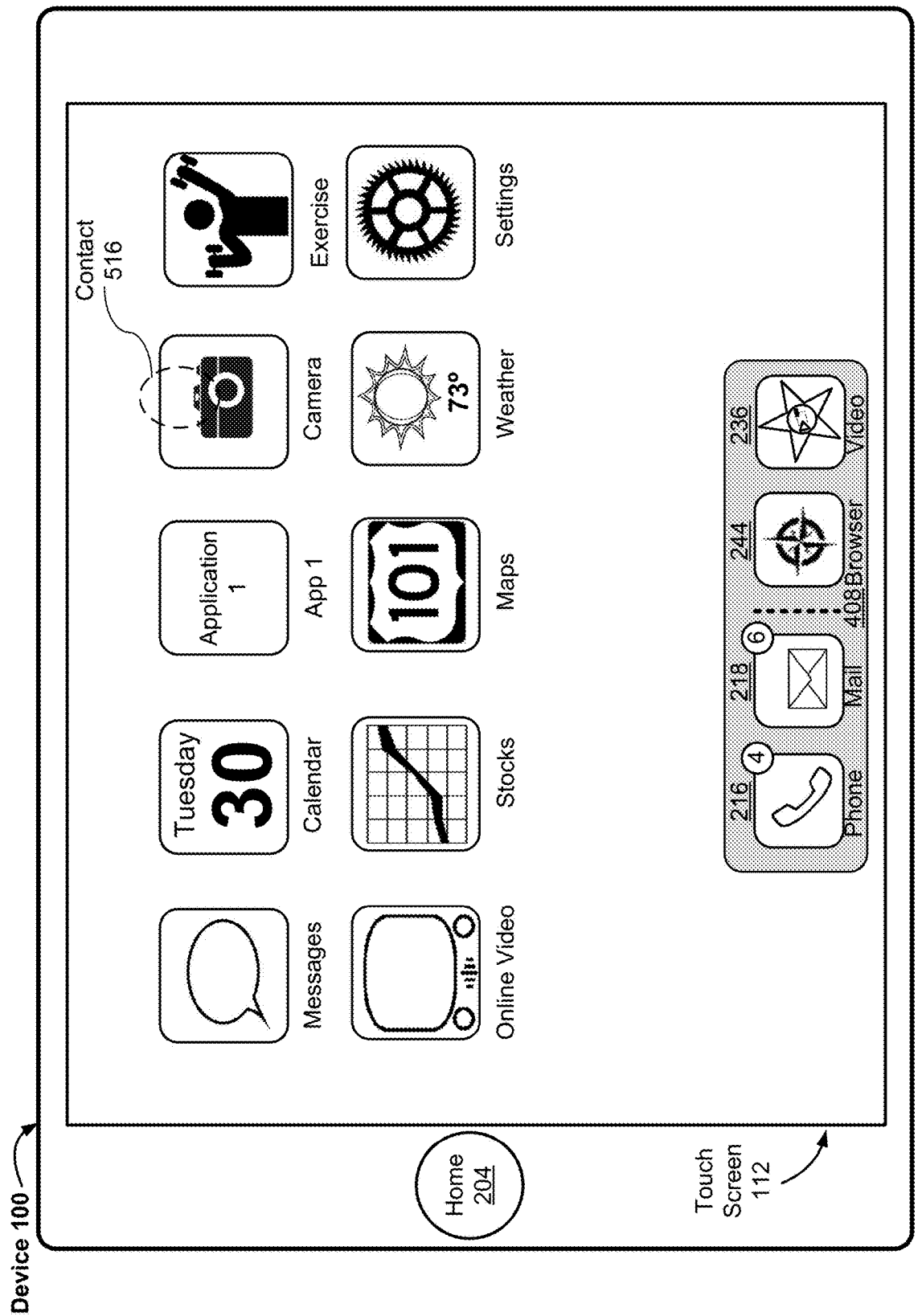
Figure 5L:
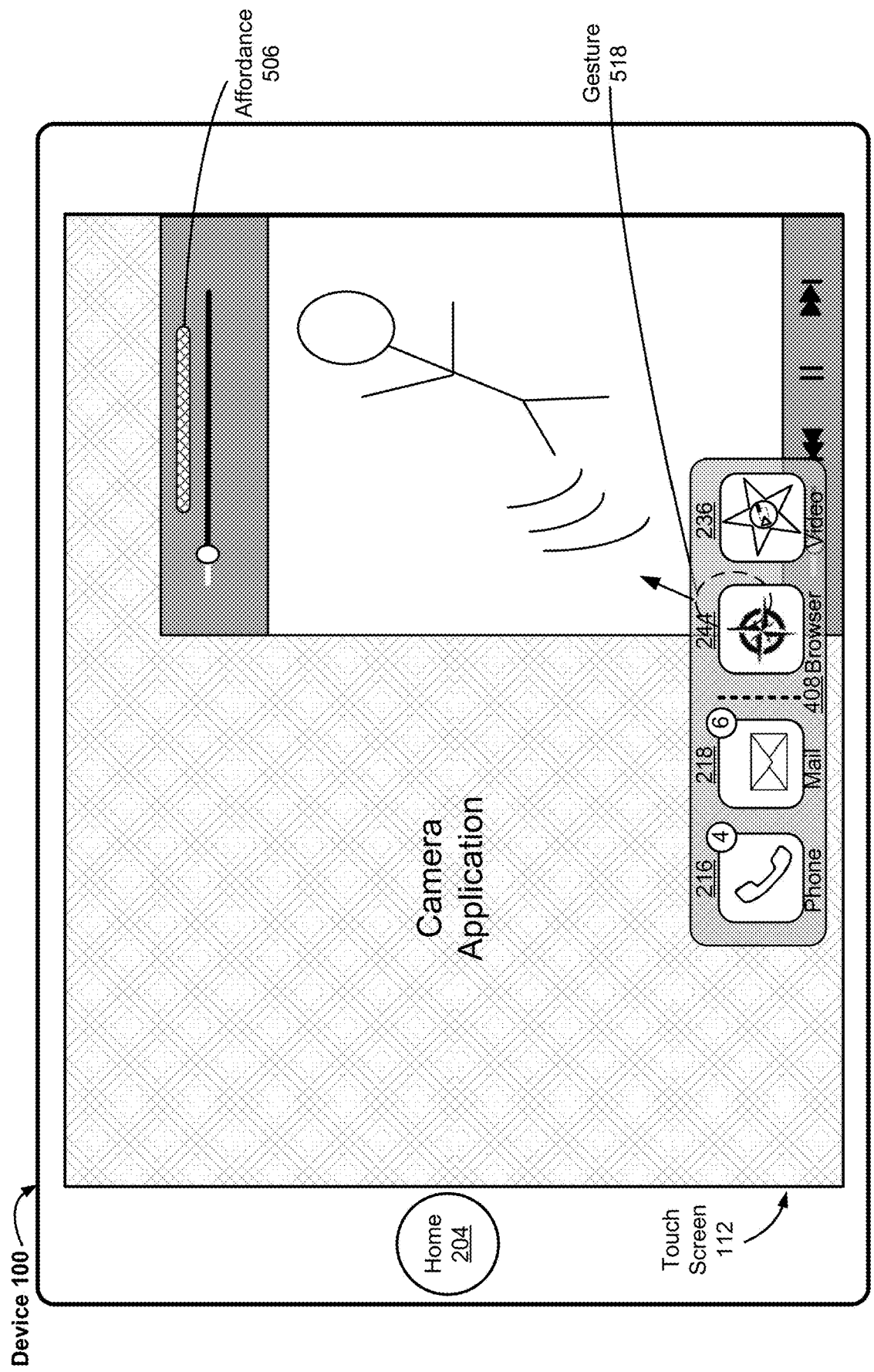

FIG. 5J also shows a contact 527 over a home button 204 (which may be a physical hardware button that moves when pressed, a solid-state button that doesn't move when pressed but simulates movement by providing haptic feedback, or a button displayed on the touch-sensitive display 112 which may simulate movement by also providing haptic feedback). In response to detecting the contact 527 over the home button 204, then home screen is then displayed (FIG. 5K). While the home screen is displayed, a contact 516 (FIG. 5K) is detected over an affordance corresponding to a camera application and, in response, the camera application is opened with the video-browsing application overlaid on top (FIG. 5L). In this way, users are able to have overlaid applications that are displayed with an application that is launched (from the home screen or from an application-switcher user interface), so that they have a sustained and uninterrupted interaction with the overlaid application while also changing an application that is displayed behind.

Figure 5M:
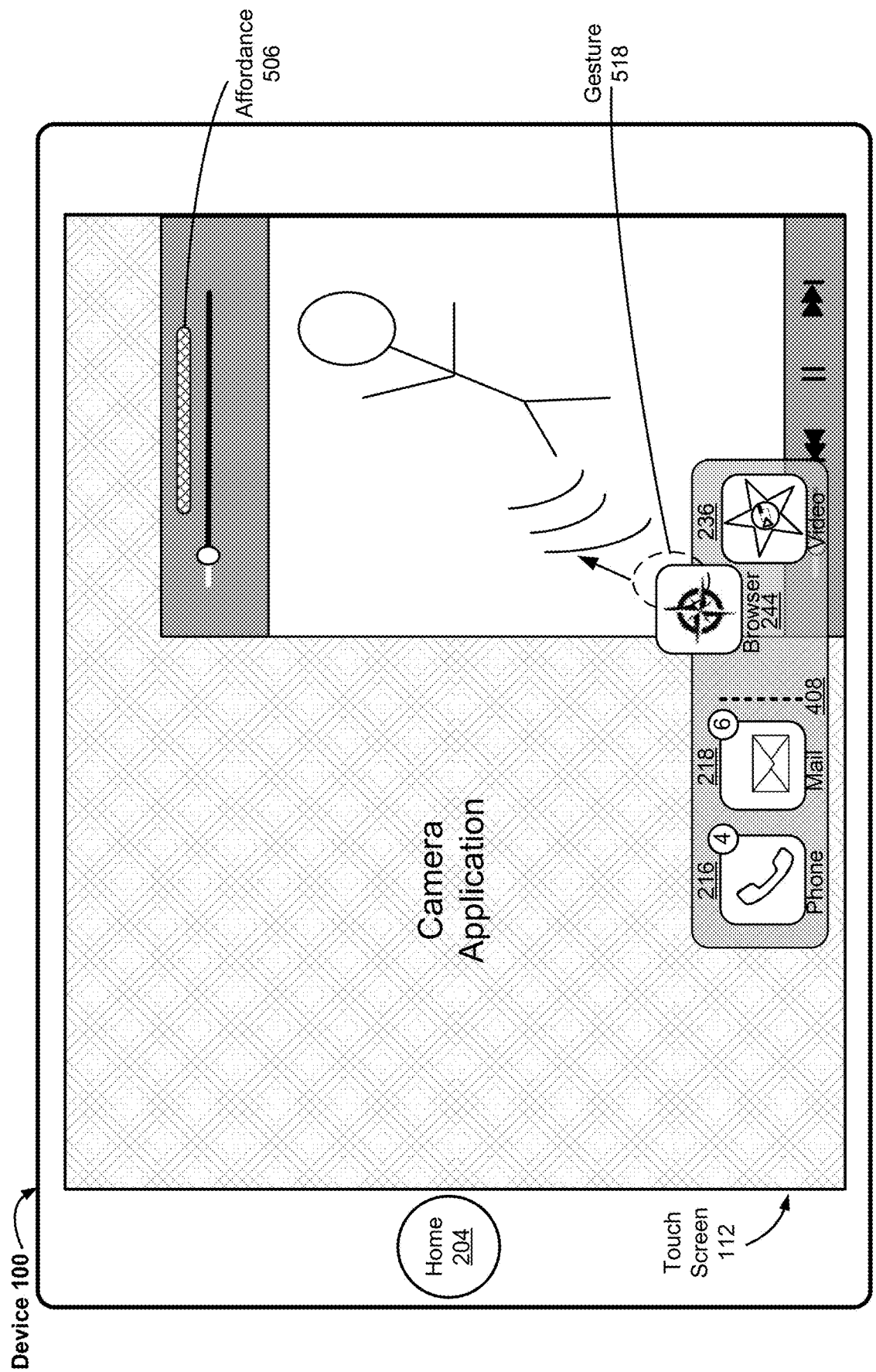
Figure 5N:
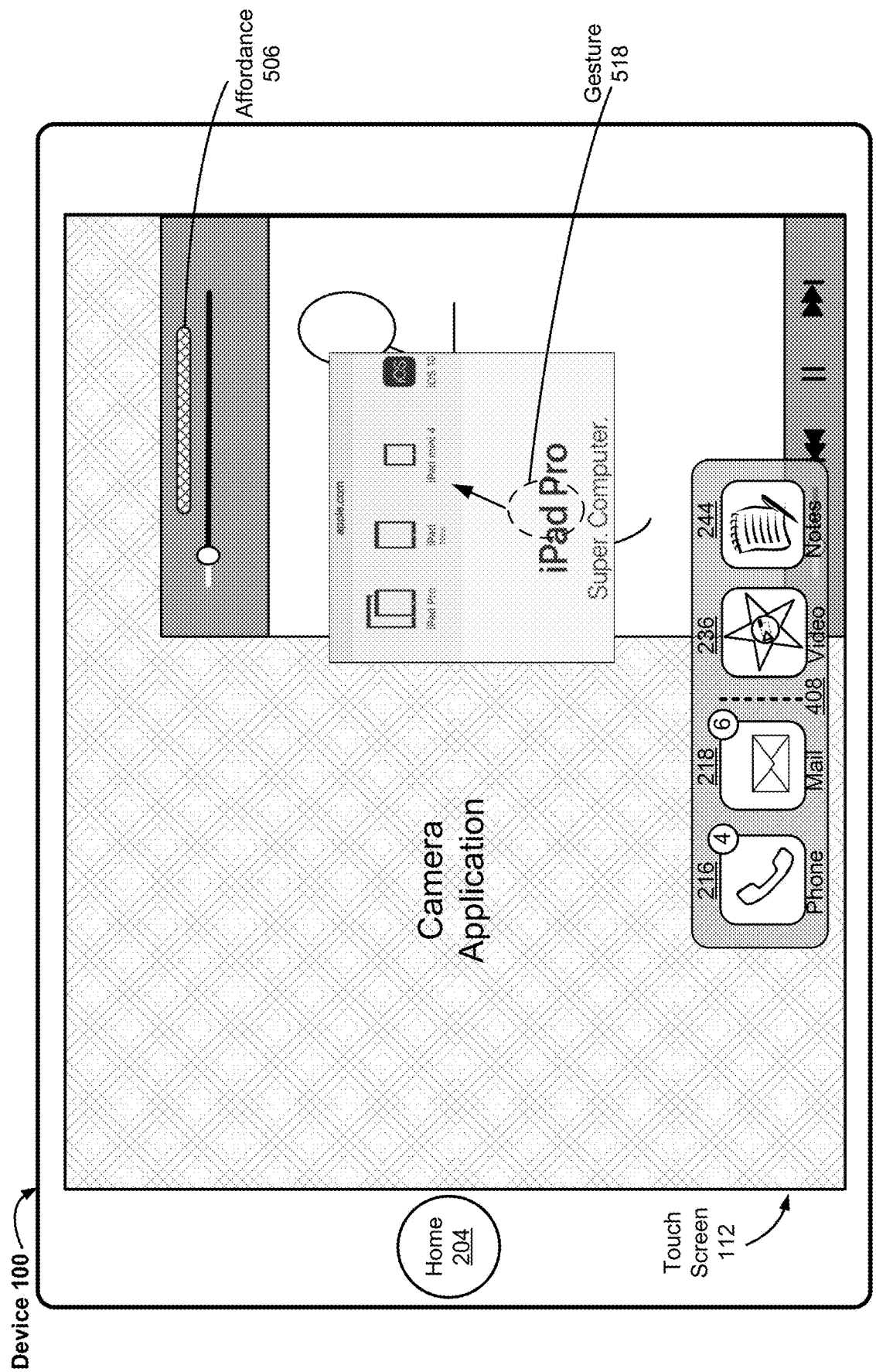
Figure 5O:
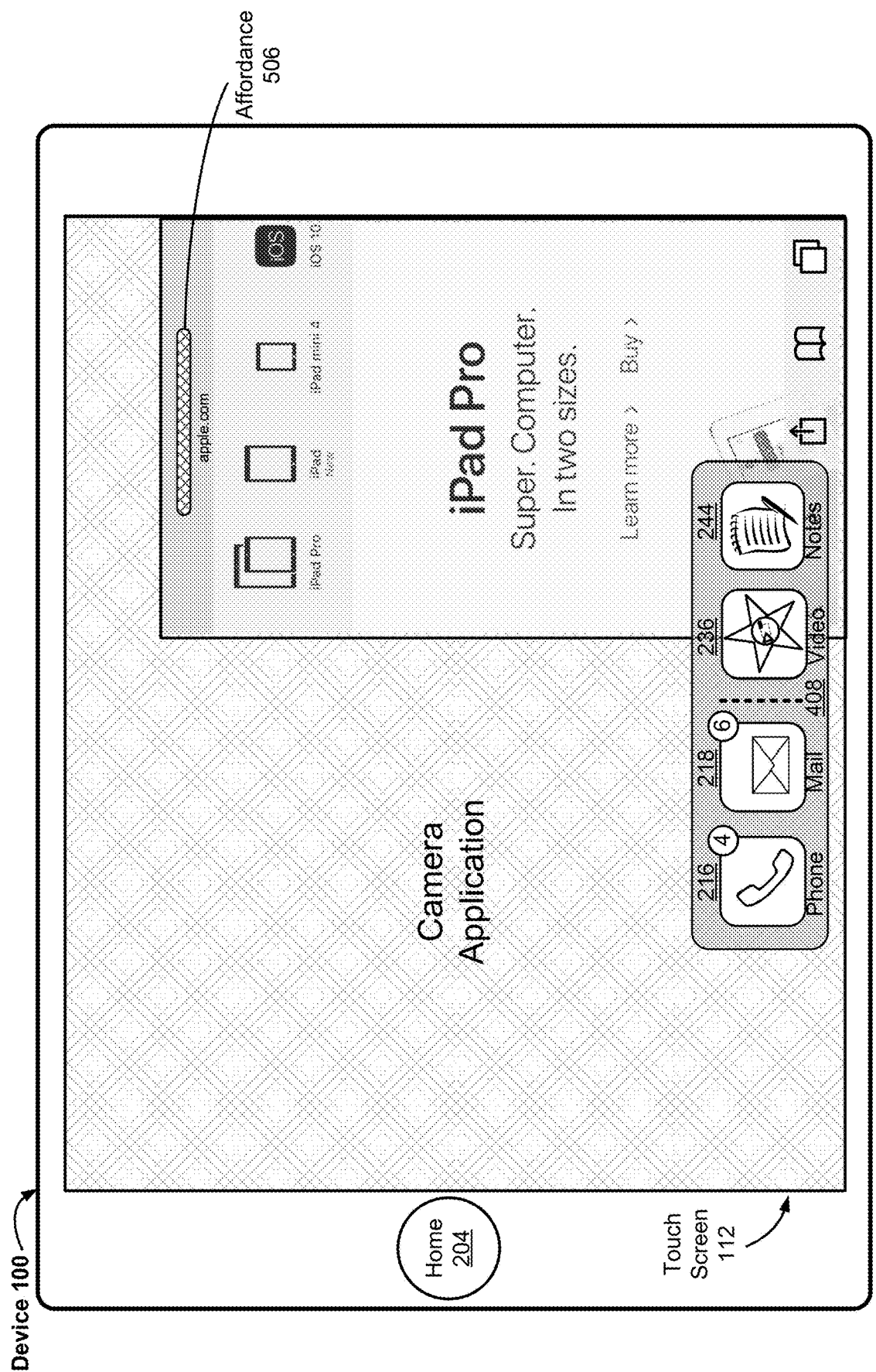
Figure 6A:
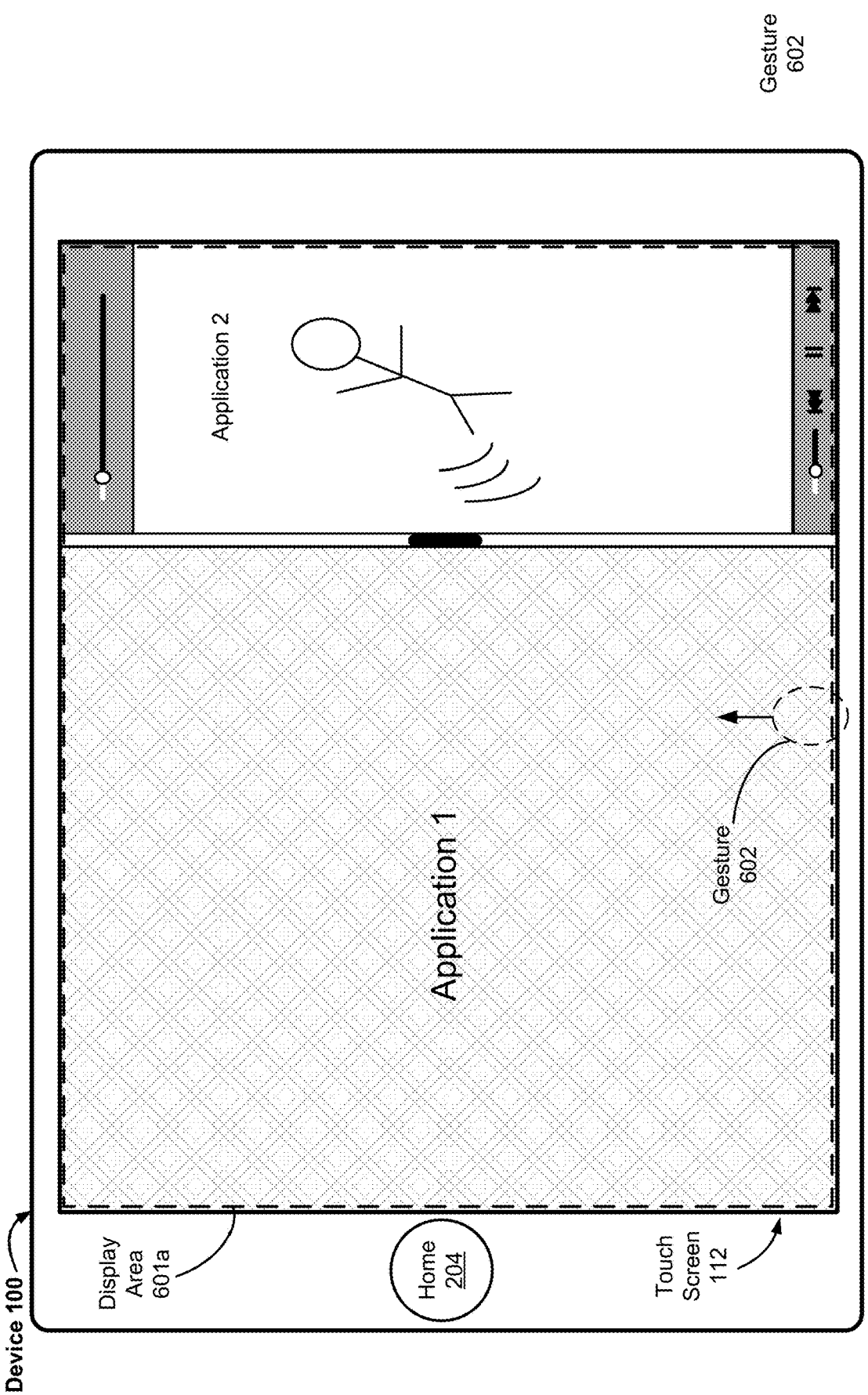
FIGS. 6A-6Q are schematics of a touch-sensitive display used to illustrate a continuous gesture that allows for first activating a dock and then activating an application-switcher user interface on the display, in accordance with some embodiments.

FIG. 5L also shows that a gesture 518 used to drag an affordance out of the dock 408 may also be used to switch which application is overlaid (e.g., switch from the video-browsing application to the web-browsing application after ending the gesture 518 while it is over the overlaid video-browsing application (FIGS. 5M-5O).

Additional descriptions regarding FIGS. 5A-5O are provided below in references to method 900.

Attention is now directed to FIGS. 6A-6Q, which are schematics of a touch-sensitive display used to illustrate a continuous gesture that allows for first activating a dock and then activating an application-switcher user interface on the display, in accordance with some embodiments.

Figure 6B:
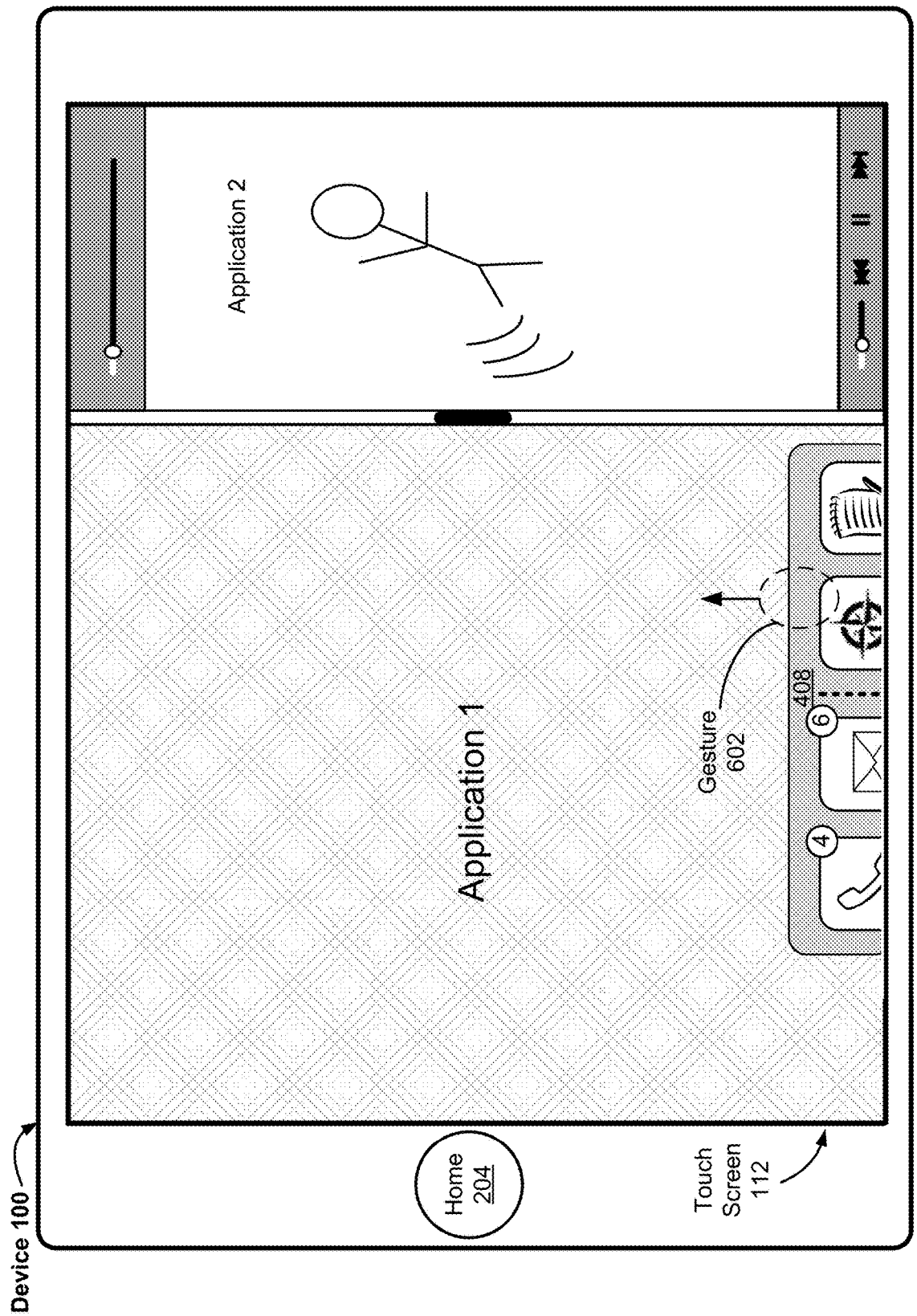
Figure 6D:
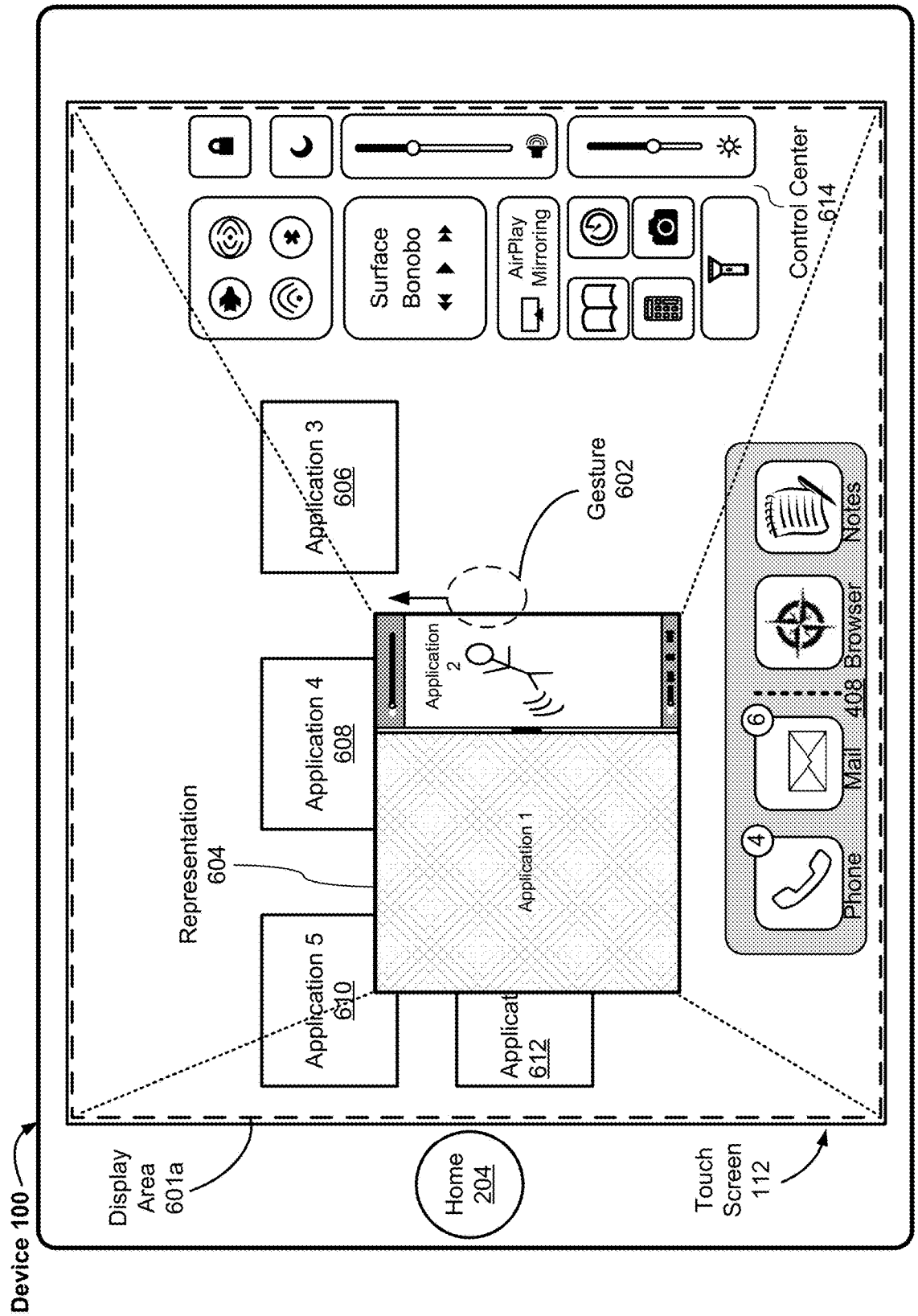

As shown in FIG. 6A, a first application (e.g., Application 1) is displayed adjacent to (or, stated another way, side-by-side/in a split-view mode with) a second application (e.g., Application 2 or the video application). Application 1 and the video application are displayed in a display area 601a that occupies substantially all available display area of the touch screen 112 of the portable multifunction device 100. While displaying the side-by-side view, the device 100 receives a user input on the touch screen 112 of the portable multifunction device 100, e.g., a substantially upward dragging, swipe, or sliding gesture 602. In response to receiving the user input 602, the device gradually displays the dock 408 from the bottom of the touch screen 112, as shown in FIG. 6B. In some embodiments, the dock 408 overlaying a portion of the display area 601a includes affordances that correspond to applications available on the device 100, e.g., a phone affordance corresponding to the phone application, a mail affordance corresponding to the mail application, a browser affordance corresponding to the web-browsing application, a notes affordance corresponding to the notes application available on the device 100. In some embodiments, after the gesture 602 moves a first threshold distance (e.g., 1-2 centimeter) across the display 112, then the dock 408 begins to follow the gesture 602 as it moves across the display 112. Then, in some embodiments, after the gesture 602 has moved a second threshold distance (e.g., 2-4 centimeter in total or an additional 1-2 centimeter beyond the first threshold distance) the dock 408 remains in a static position and no longer follows the gesture 602 (FIG. 6C). As the gesture 602 continues moving beyond the second threshold distance, then the currently displayed application (e.g., split-view mode with Application 1 and the video application) begins to scale down in size and an application-switcher user interface is displayed (FIG. 6D). In some embodiments, once the gesture moves at least a third threshold distance (e.g., 3-6 centimeter in total or an additional 1-2 centimeter beyond the second threshold distance), then the application-switcher user interface is displayed with the representation 604 displayed in its respective chronological order (FIG. 6E) (as discussed in more detail below). In some embodiments, movement between these threshold distances occurs without breaking contact with the surface of the screen, e.g., without any lift off or release of the contact.

FIG. 6D illustrates an application-switcher user interface that is displayed on the touch screen 112 in response to receiving the user input 602. In some embodiments, the application-switcher user interface displays representations of at least some applications that were recently used on the portable multifunction device 100, e.g., Application 3 (606), Application 4 (608), Application 5 (610), and Application 6 (612), etc. In some embodiments, the application-switcher user interface also includes a representation 604 of the display area 601a shown in FIG. 6A.

In some embodiments, as pictured in FIG. 6D, the display area 601a previously shown in FIG. 6A is animated to gradually decrease in size or scale to fit within the displayed representation 604. The representation 604 contains a miniaturized side-by-side view of Application 1 and the video application. In some embodiments, the representations of recently used application 606-612 are chronologically ordered. For example, Application 3 (606) is used more recently than Application 4 (608), and thus is displayed to the right of Application 4 (608). Likewise, Application 5 (610) was used more recently than Application 6 (612), and thus is displayed above Application 6. In some embodiments, the application-switcher user interface also includes a control center 614 that includes commonly used system controls like a volume control, a brightness control, etc.

Figure 6E:
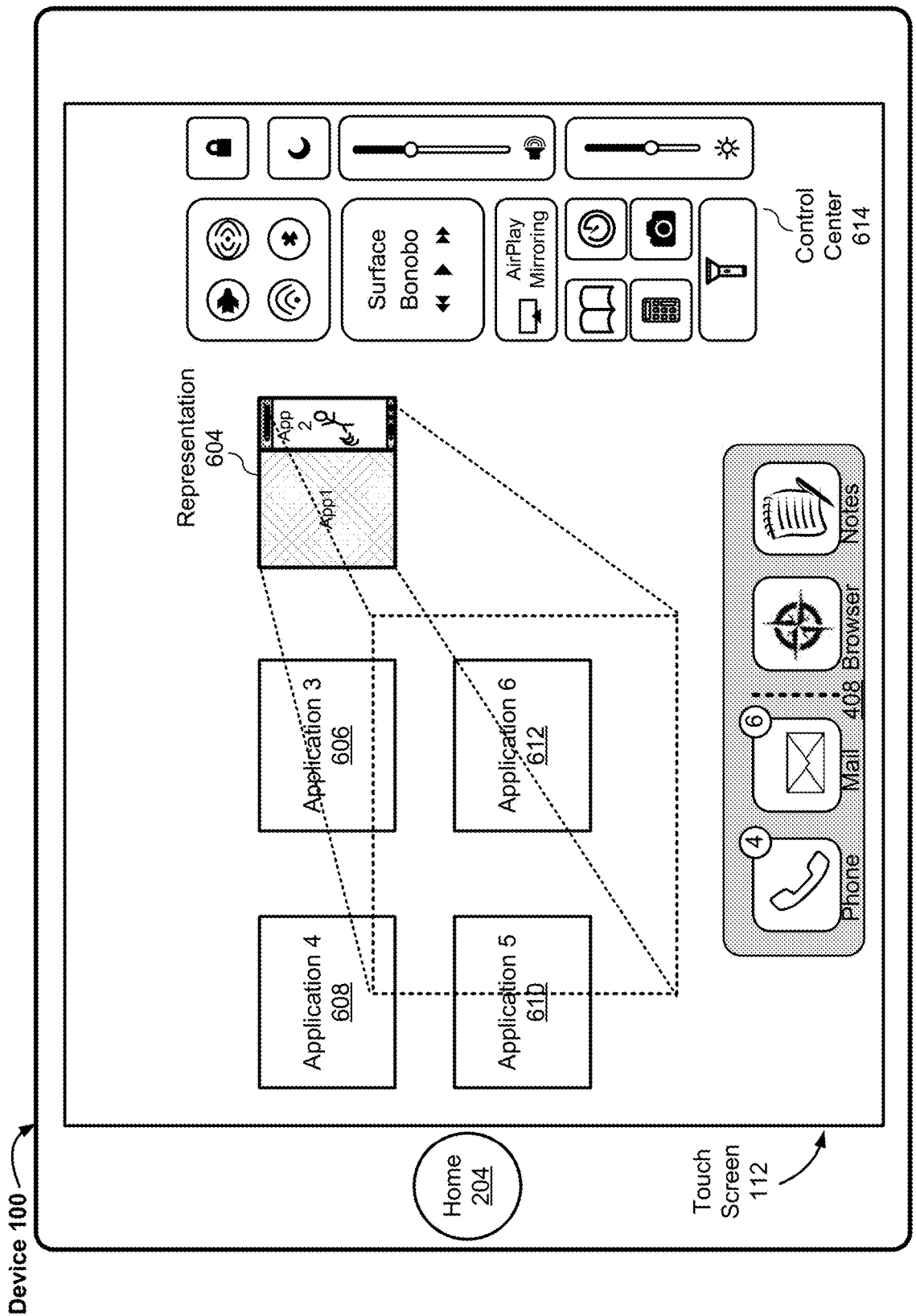

FIG. 6E illustrates that the shrinking or scaling of the representation 604 continues until the representation 604 reaches a predetermined size, e.g., the same size as representations 606-612. FIG. 6E further illustrates that the representations of recently used applications 606-612 may be re-arranged to make room for the representation 604, e.g., moving the representations 606-612 to the left and/or to a different row. Since Application 1 and Application 2 (the video application) are the most recently used applications, the representation 604 representing Application 1 and Application 2 is placed ahead of the representations 606-612.

Figure 6F:
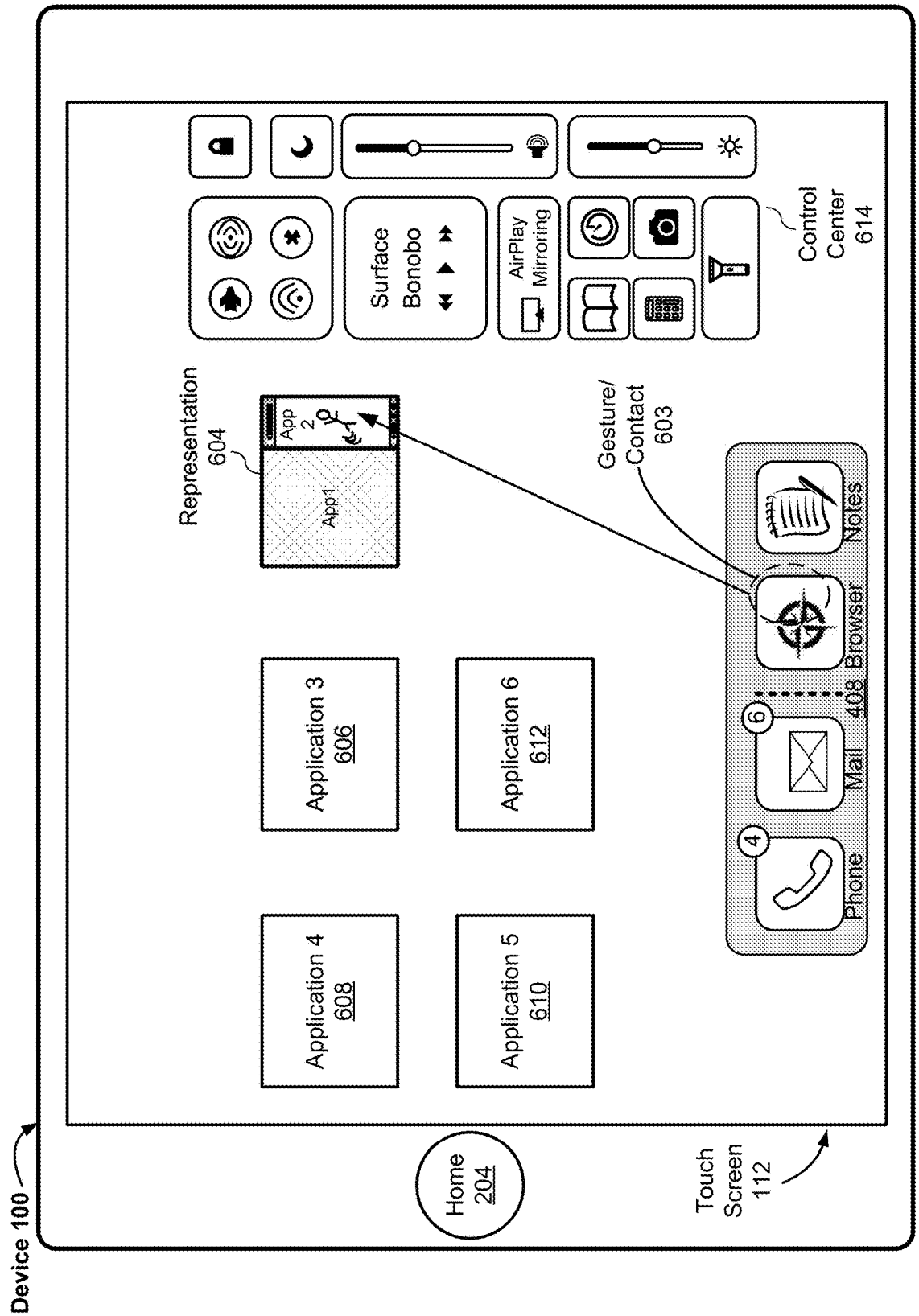
Figure 6G:
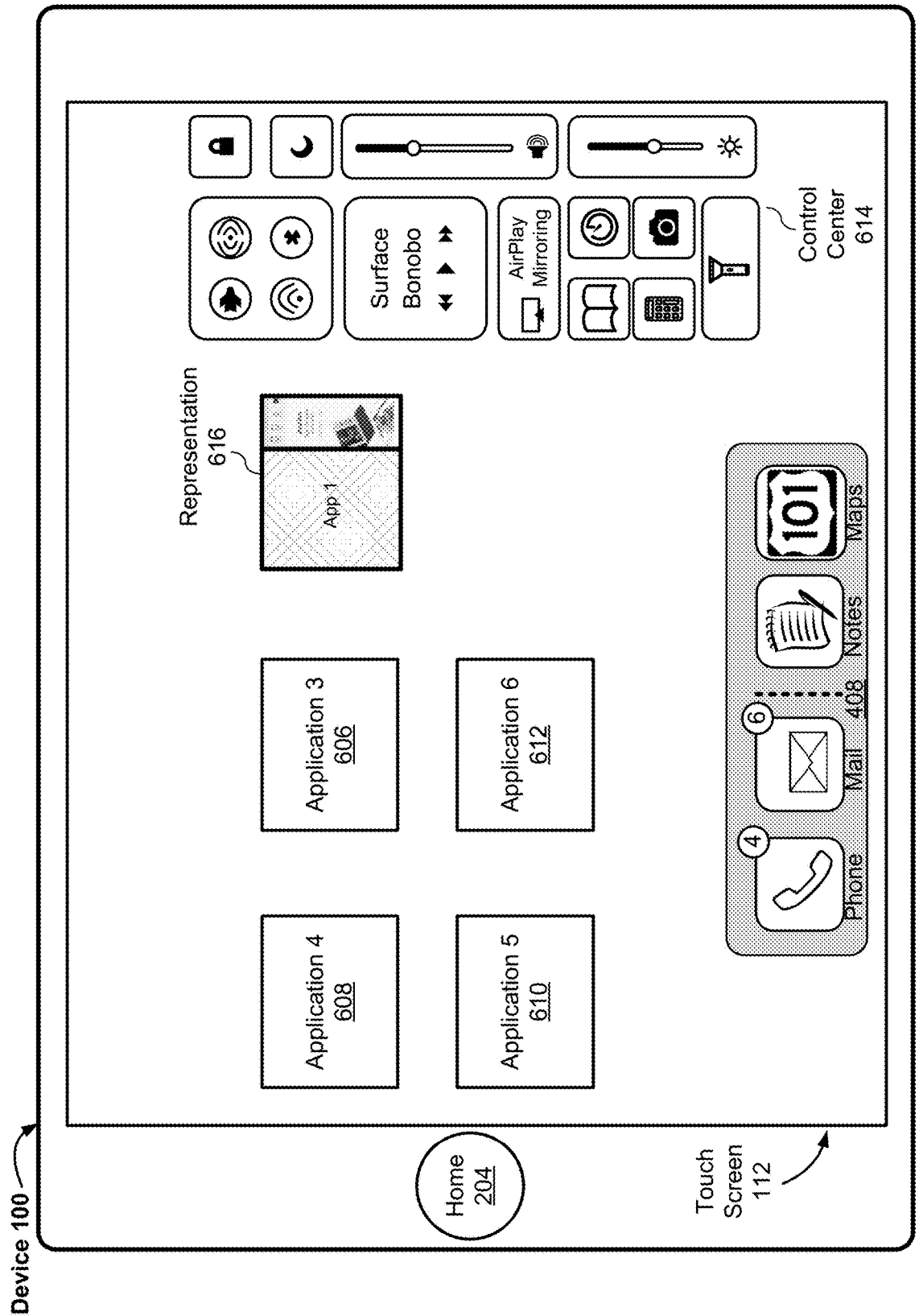

FIGS. 6F-6G illustrate switching an application displayed in the application-switcher interface, in accordance with some embodiments. While displaying the application-switcher interface that includes the dock 408 and the representation 604 corresponding to Application 1 and Application 2, the device 100 detects a contact 603 over the web-browsing affordance in the dock 408 followed by a gesture 603 (e.g., a continuous movement of the contact on the touch screen 112 towards the representation 604 displayed in the display area). In some embodiments, this gesture occurs without detecting a release or lift off between detecting the contact and the movement. The gesture 603 ends when the user lifts off the contact over Application 2 in the representation 604. Upon detecting the liftoff, as shown in FIG. 6G, the device 100 replaces Application 2 in the representation 604 with a representation of the web-browsing application. The replacement representation 616 includes the representation of Application 1 and the representation of the web-browsing application in a side-by-side view. In some embodiments, these two applications are now pinned together until either is dismissed from the pinned relationship, as described below.

Figure 6H:
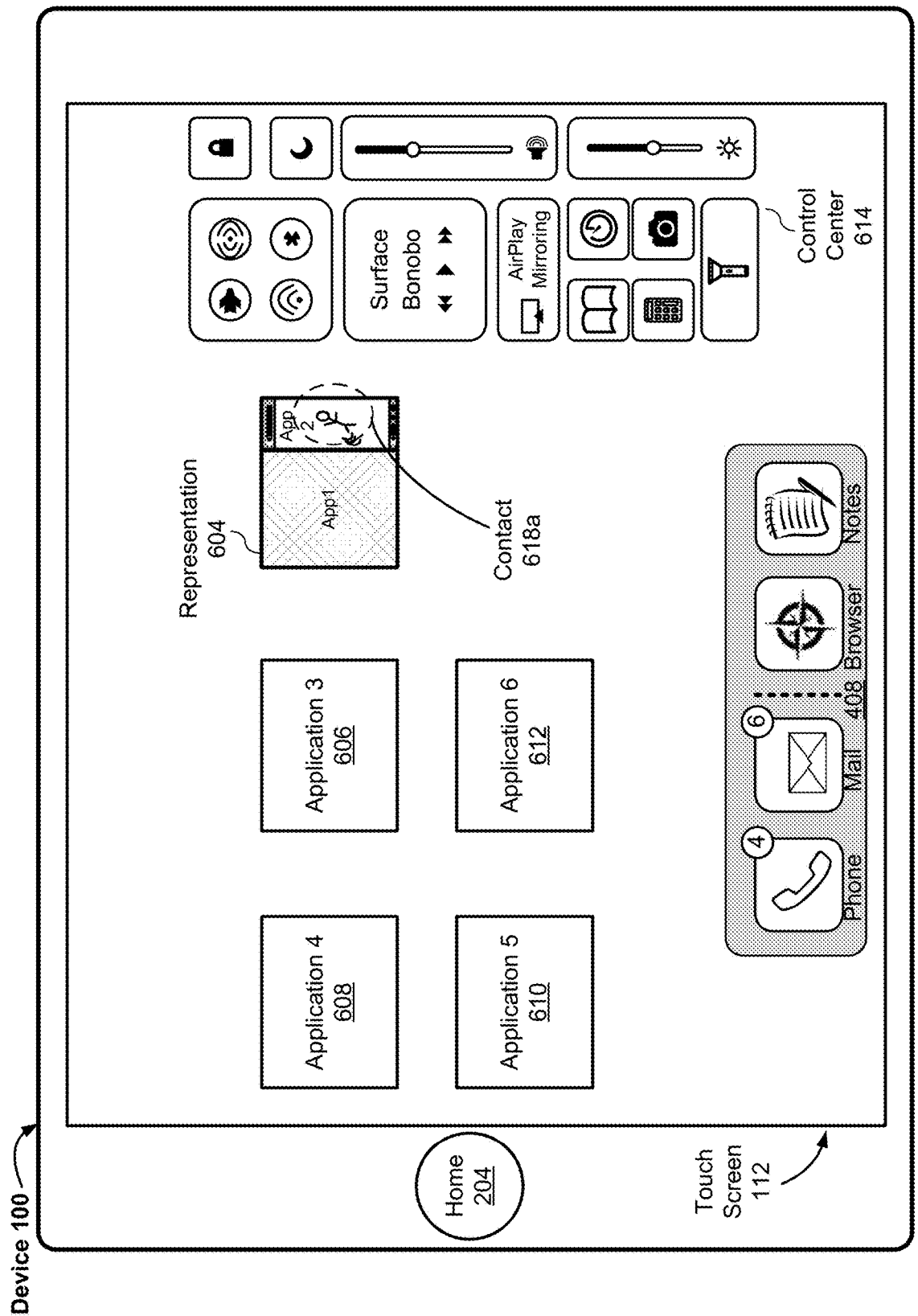

FIGS. 6H-6M illustrate dismissing an application from within the application-switcher user interface, in accordance with some embodiments. In some embodiments, while displaying the application-switcher user interface, the device 100 detects a user input, e.g., a contact 618a over Application 2 in the representation 604, as shown in FIG. 6H.

Figure 6I:
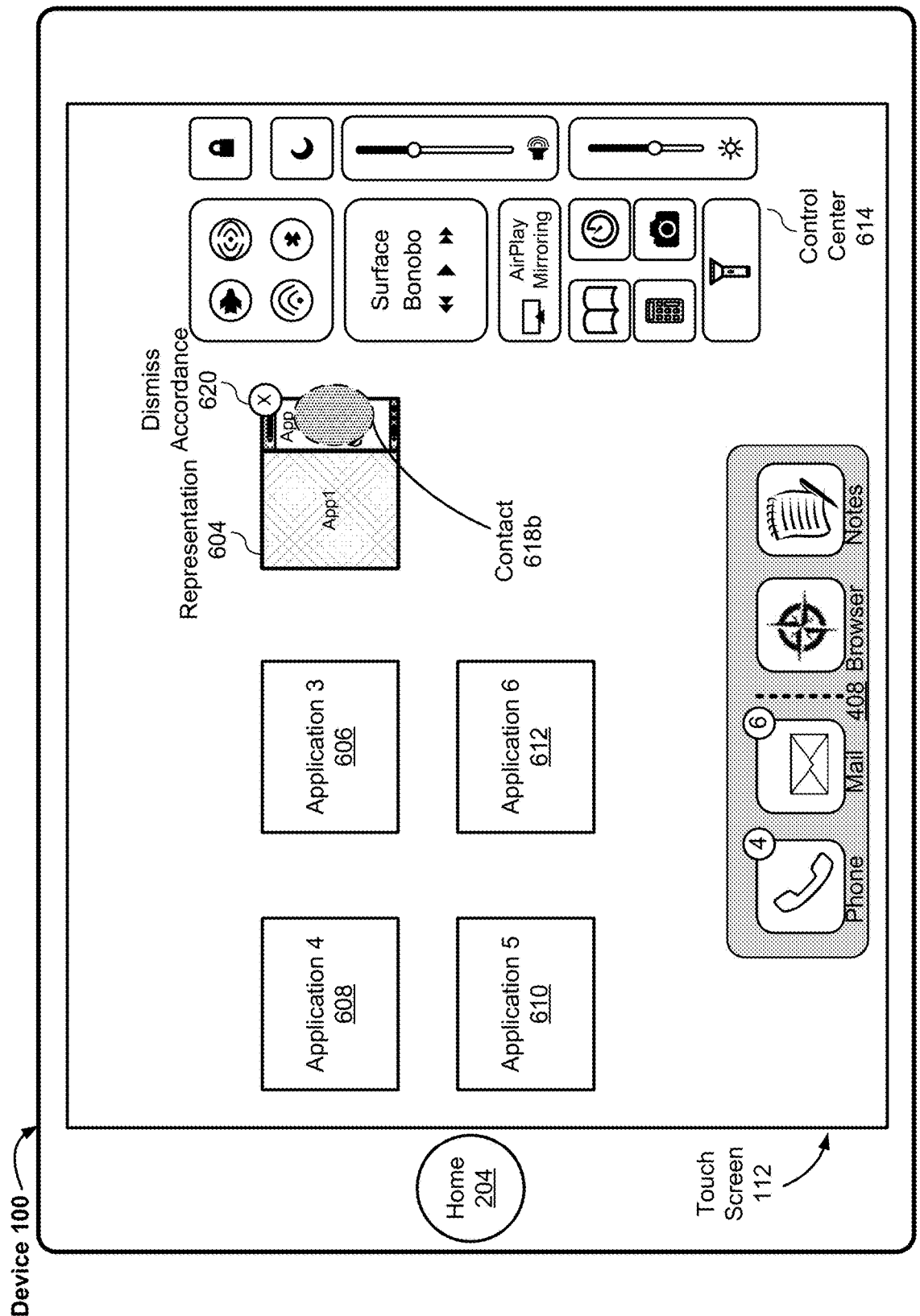
Figure 6J:
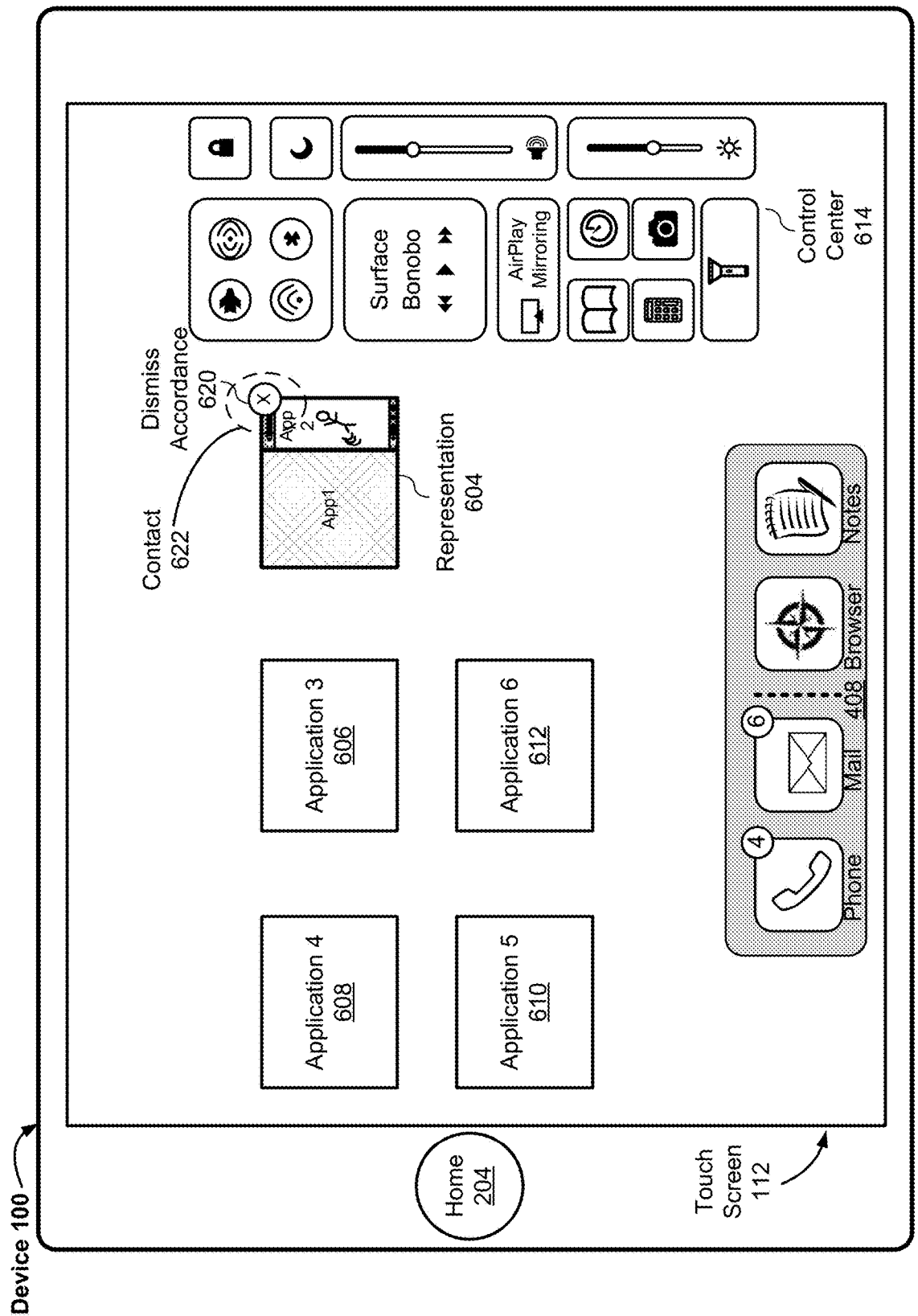
Figure 6K:
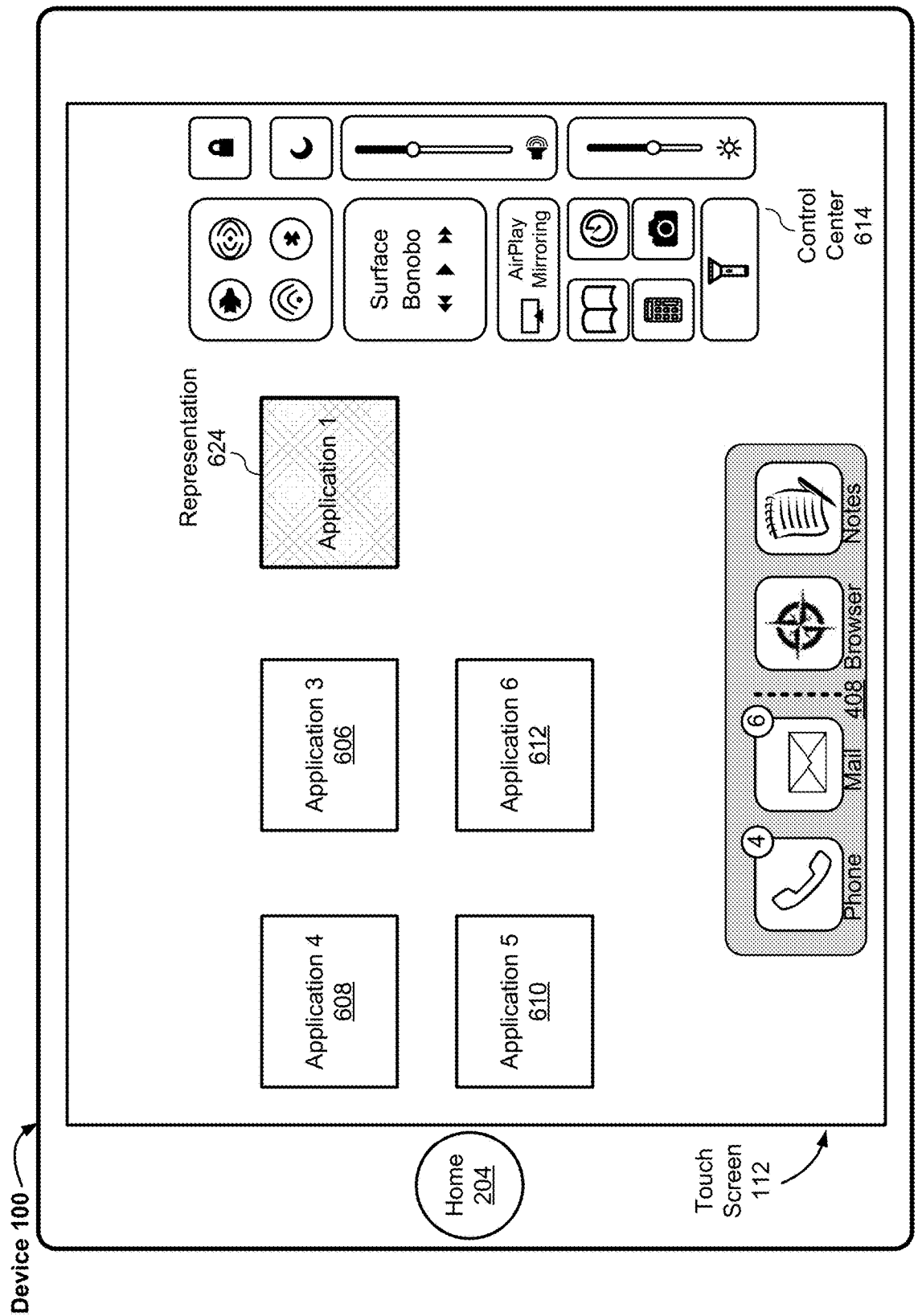

In some embodiments, as shown in FIG. 6I, the system determines if the input is of a predetermined type, e.g., a non-tap selection 618b, such as a press-and-hold contact lasting for more than a predefined amount of time or a contact with an intensity above a threshold intensity (e.g., a deep/hard press, as described in more detail above). In response to detecting that the input 618b of a predetermined type, the device 100 displays a dismiss affordance 620 over Application 2 in the representation 604. Subsequently, as shown in FIG. 6J, upon detecting a selection 622 of the dismiss affordance 620 (e.g., tapping on the dismiss affordance 620), the device 100 closes Application 2 and updates the representation 604 to no longer include Application 2, as shown in FIG. 6K. In some embodiments, representations of more than two applications that are pinned together may also be interacted with to dismiss and/or replace the more than two applications.

Figure 6L:
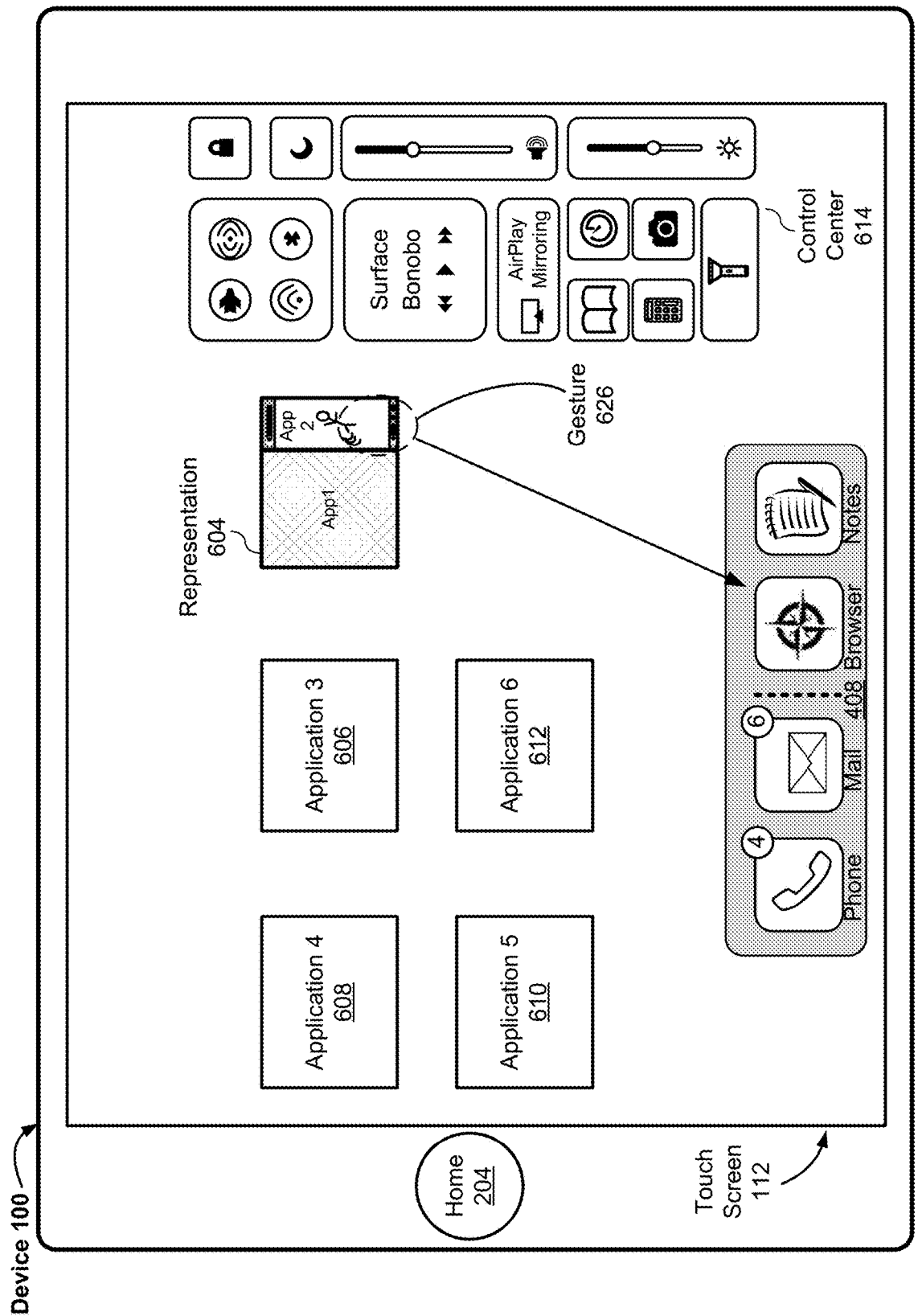
Figure 6M:
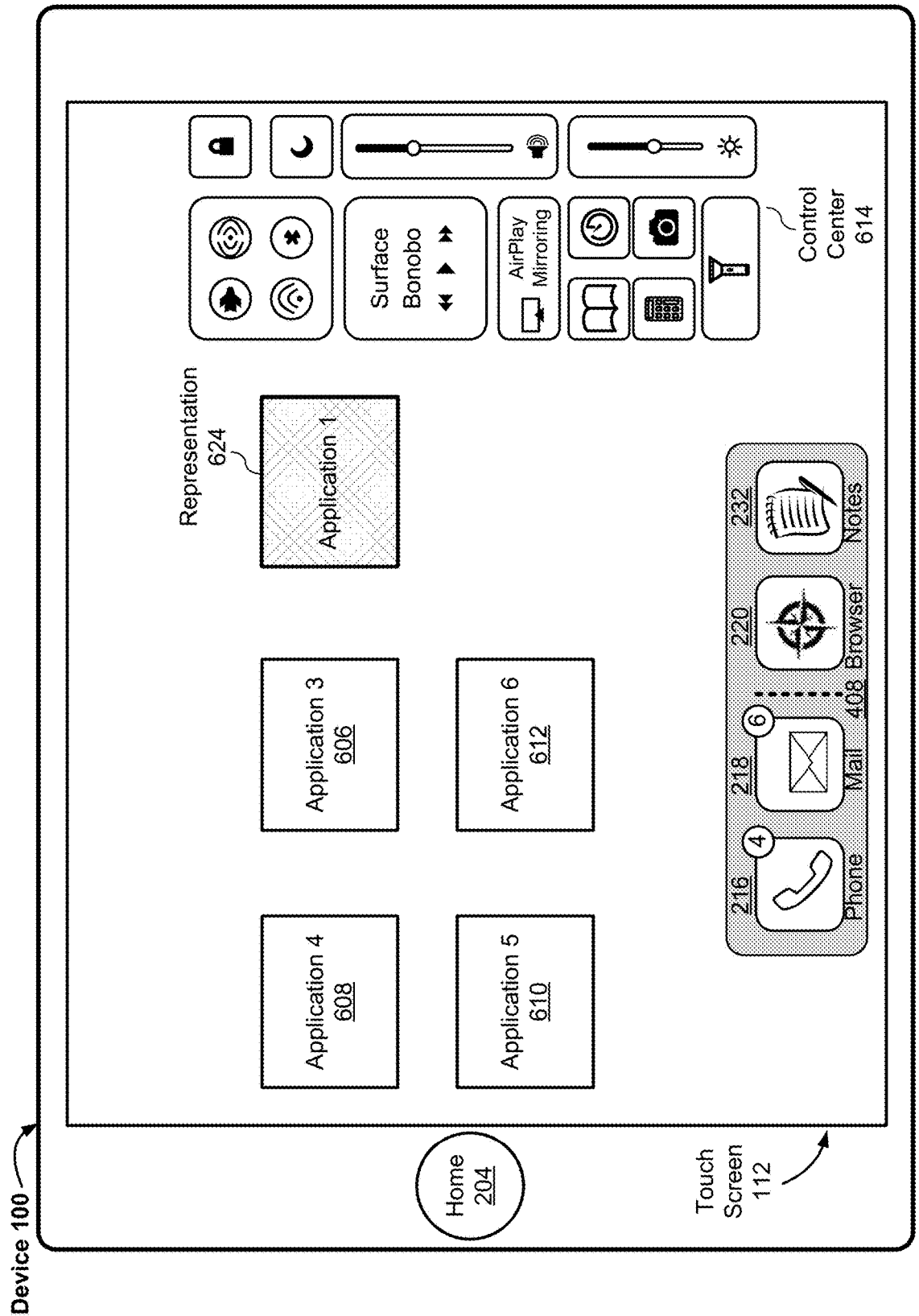

In other embodiments, as shown in FIG. 6L, the input is a drag gesture 618c. The drag gesture 626 includes a contact over Application 2 in the representation 604 followed by a movement of the contact away from the representation 604. In some embodiments, the drag gesture 626 includes an initial contact that lasts for more than a predefined amount of time (e.g., a press-and-hold). In some embodiments, the initial contact is substantially stationary. In response to detecting the contact 626 moving to a predefined area (e.g., the dock 408) or moving more than a predetermined distance from the representation 604, the device 100 closes Application 2 and updates the representation 604 to no longer include Application 2, as shown in FIG. 6M.

FIGS. 6N-6Q illustrate a gesture to activate an application-switcher user interface that is received over a slide-over display mode, where a representation of the slide-over display mode is not included in an application-switcher user interface, in accordance with some embodiments.

Figure 6N:
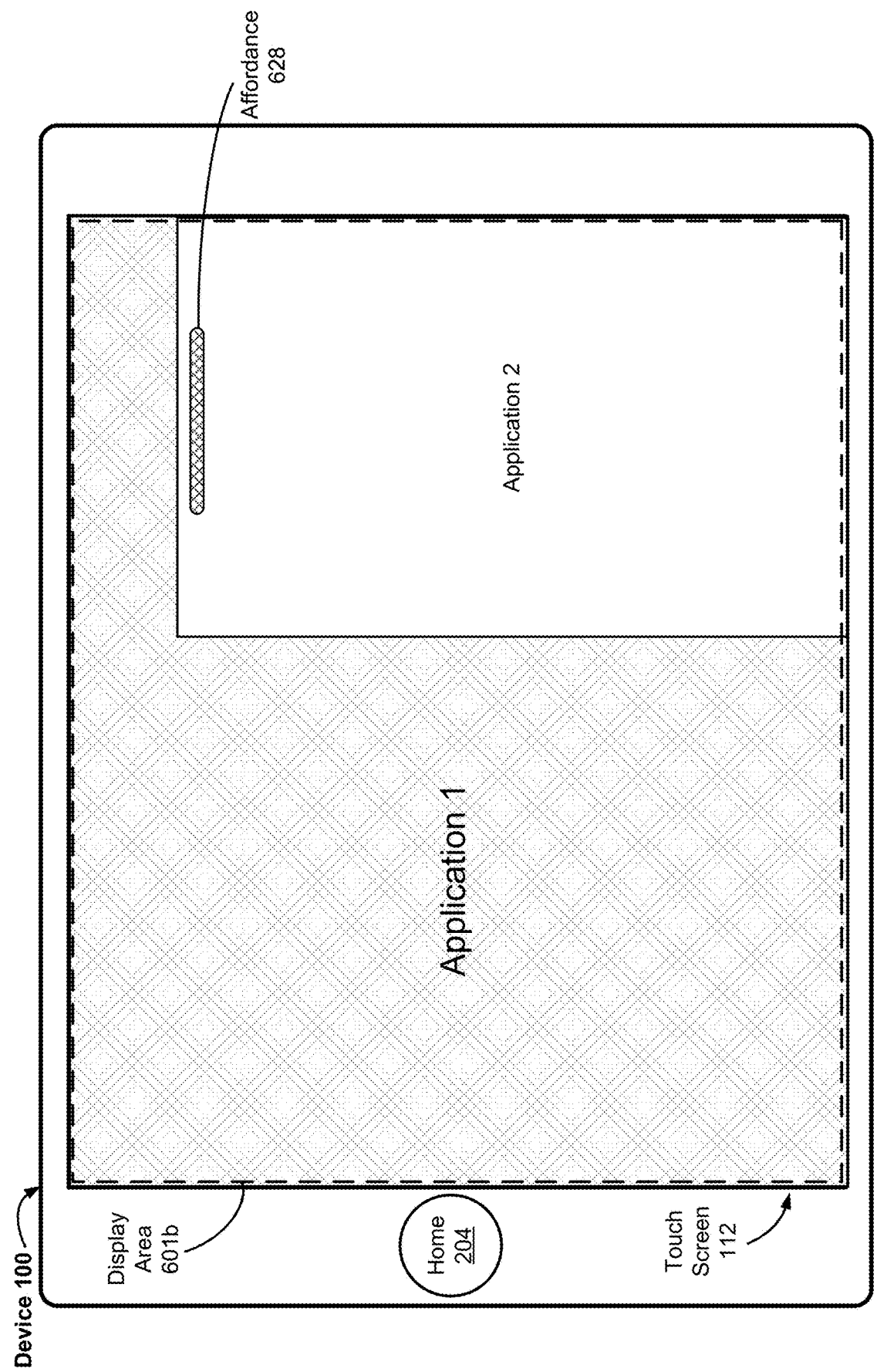
Figure 6O:
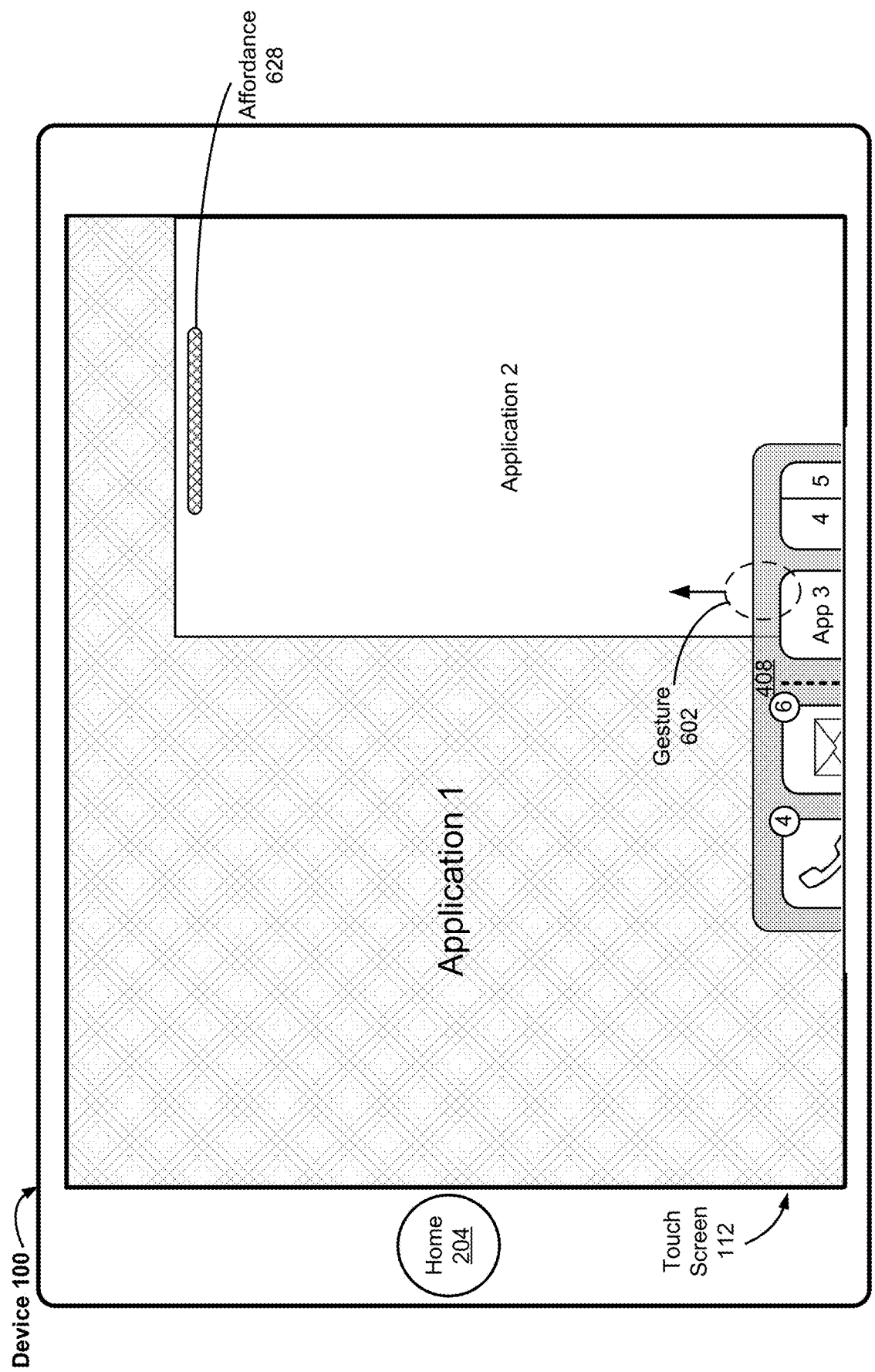
Figure 6P:
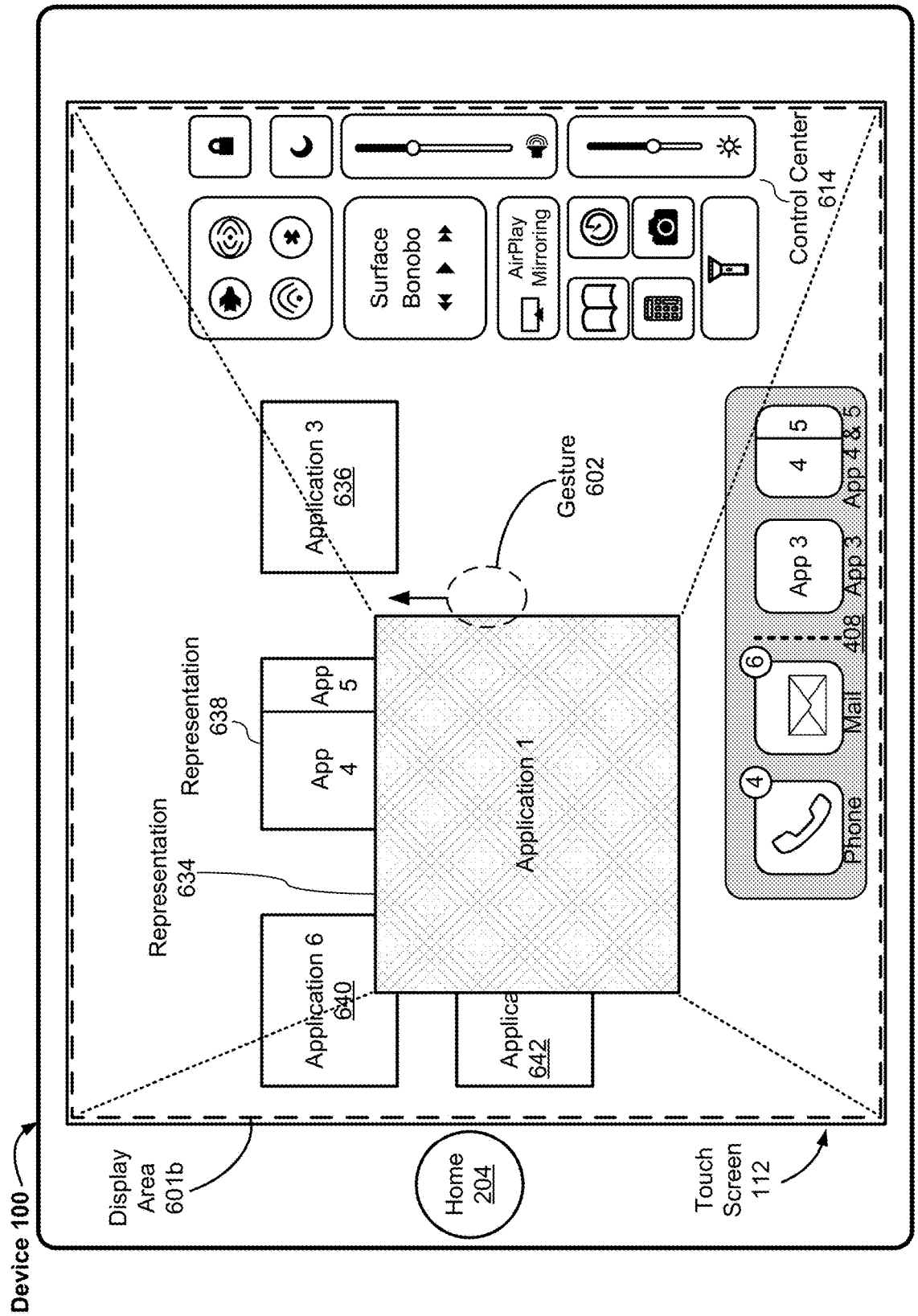
Figure 6Q:
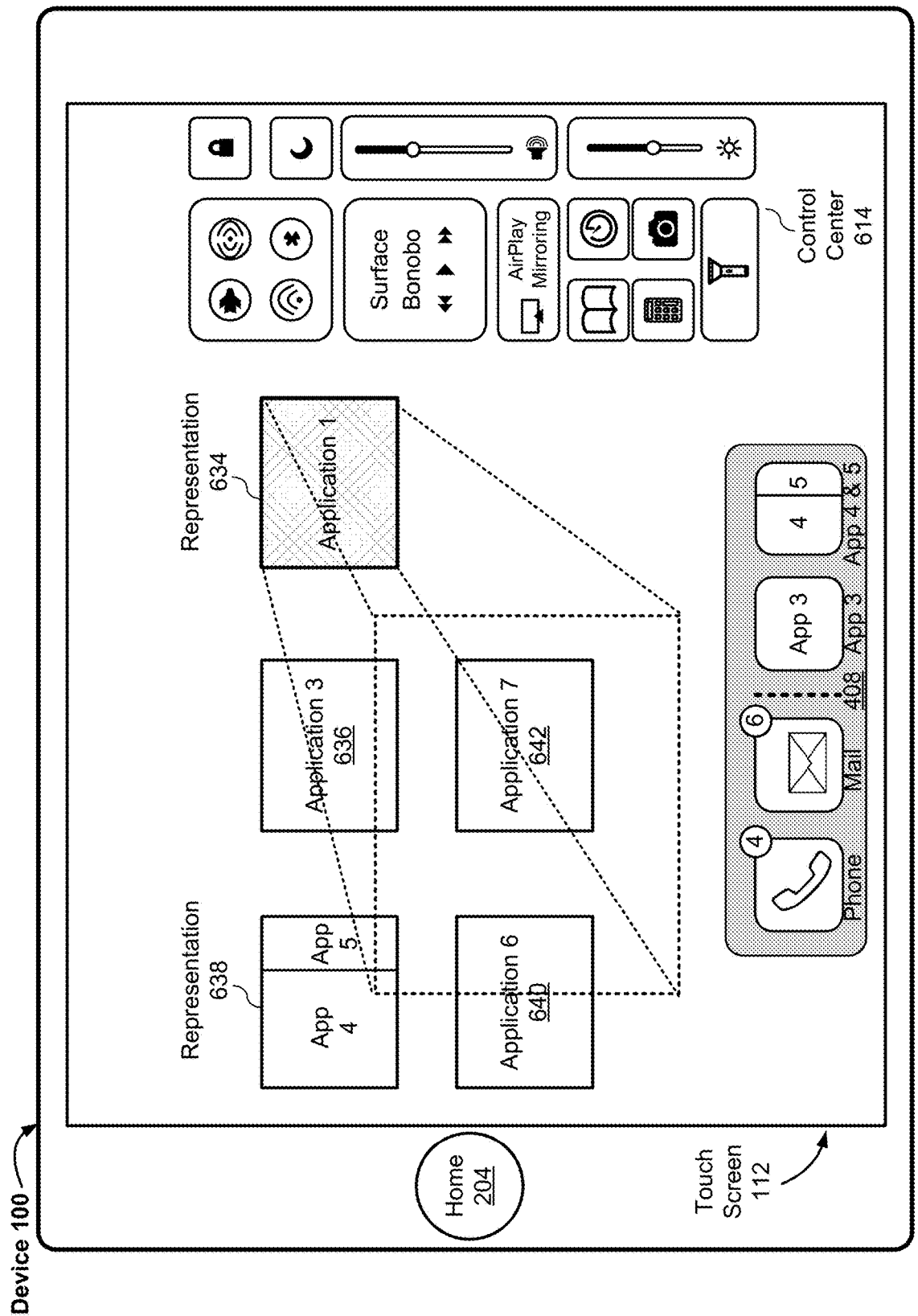

In FIG. 6N, Application 1 is displayed in the display area 601*b*, while Application 2 is displayed as an overlay in the display area 601*b*. In some embodiments, the display of the overlaid Application 2 includes a handle near the top edge of Application 2, e.g., the affordance 628. The display area 601*b* occupies substantially all available display area of the touch screen 112. FIG. 6O illustrates that while displaying the overlaid view, the device 100 receives a user input on the touch screen 112 of the portable multifunction device 100, e.g., a substantially dragging, swipe, or sliding gesture 602 away from an edge of the screen (e.g., an upward drag). In response to receiving the user input 602, the device gradually displays dock 408 from the bottom of the touch screen 112 and the dock 408 overlays the display area 601*b* (e.g., at the bottom of the touch screen 112). When in position, the dock 408 will no longer move even if the gesture continues, and the dock thus remains in a stationary position. However, as the continuous gesture 602 continues to move further away from the edge (e.g., upward) after the dock 408 has stopped moving, an application-switcher interface is displayed, as shown in FIG. 6P.

As the gesture continues, the display area 601*b* shown in FIG. 6N gradually decreases in size or scales to fit within representation 634. The representation 634 includes a representation of Application 1 but does not include a representation of the overlaid Application 2. FIG. 6Q illustrates that the shrinking of the representation 634 continues until the representation 634 is the same size as representations of recently used applications 636-642, which may be re-arranged to make room for representation 634. In some embodiments, three different threshold distances (e.g., first, second, and third threshold distances discussed above in reference to FIGS. 6A-6E) are used to determine when to begin revealing the dock 408, when the dock should be placed in its stationary position, and when the application-switcher user interface should be displayed.

Additional descriptions regarding FIGS. 6A-6Q are provided below in references to methods 1000 and 1200.

FIGS. 7A-7L are schematics of a touch-sensitive display used to illustrate example user interfaces and gestures for activating two or more instances of the same application. An instance is a concrete single occurrence of an object, existing usually during the runtime of a computer program, e.g., each time a program or application runs it is an instance of that program.

Figure 7A:
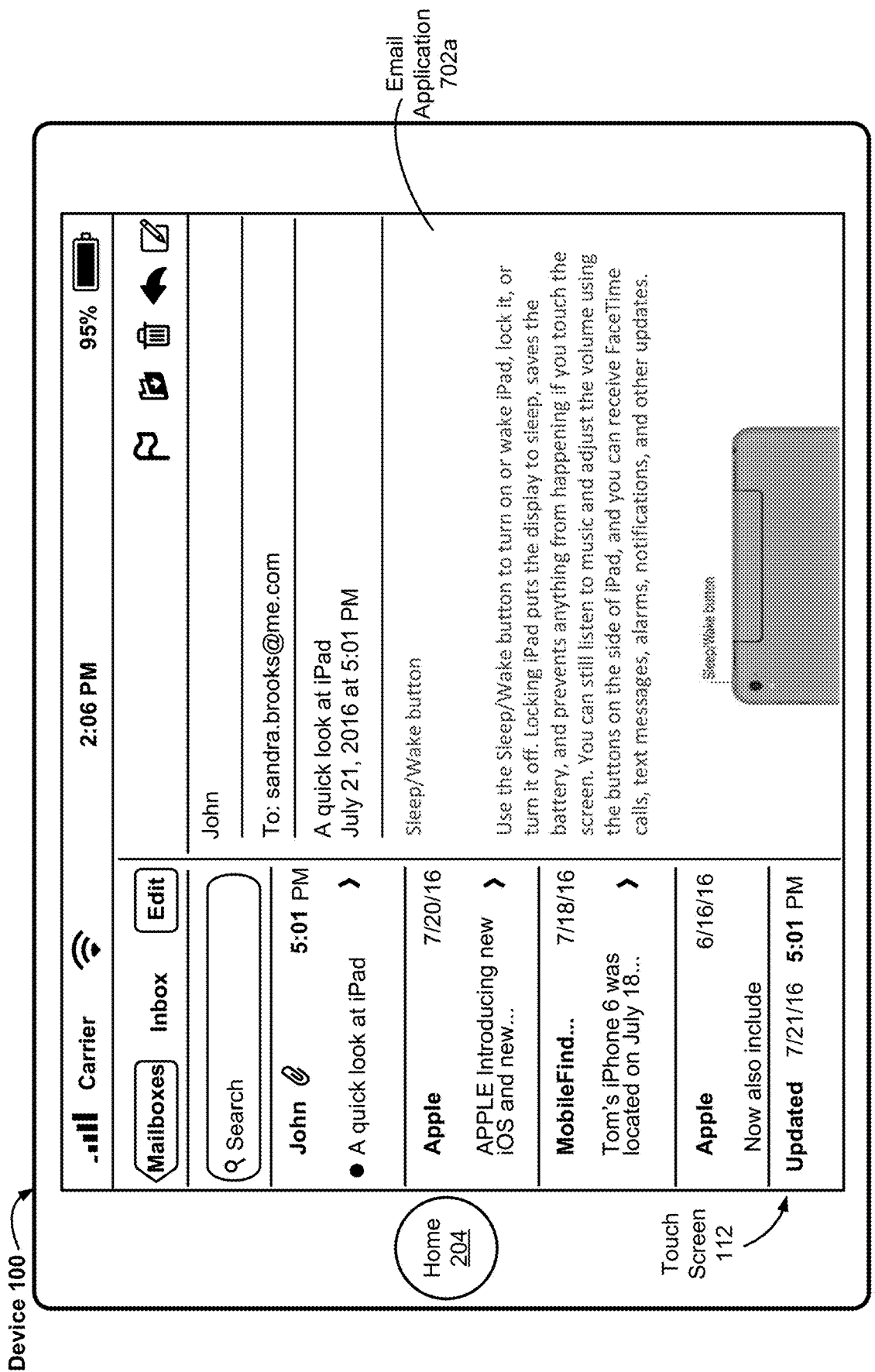

In some embodiments, methods for activating two or more instances of the same application is performed at an electronic device (e.g., portable multifunction device 100, FIG. 1A) with a touch-sensitive display (e.g., touch screen 112) and one or more processors (122 FIG. 1A). For example, FIG. 7A shows a first instance of an application 702*a* running on the electronic device 100 with the touch-sensitive display 112 and the one or more processors (122 of FIG. 1A). As shown, the first instance of the application is displayed on substantially all of the touch-sensitive display 112.

In this example, the application 702*a* is an electronic mail, e-mail, or mail application, but in other embodiments, the application can be any application that is capable of running more than one instance on the electronic device 100 and is capable of displaying more than one instance of the application on the touch screen 112 (e.g., any of the applications discussed above in reference to FIGS. 1A and 2).

As shown in FIG. 7A, an inbox of a first instance of the mail application is displayed on the touch screen 112. In this example, the displayed inbox includes a left panel and a right panel. The left panel lists individual emails received by the mail application and a right panel shows one of the received emails in more detail.

Figure 7B:
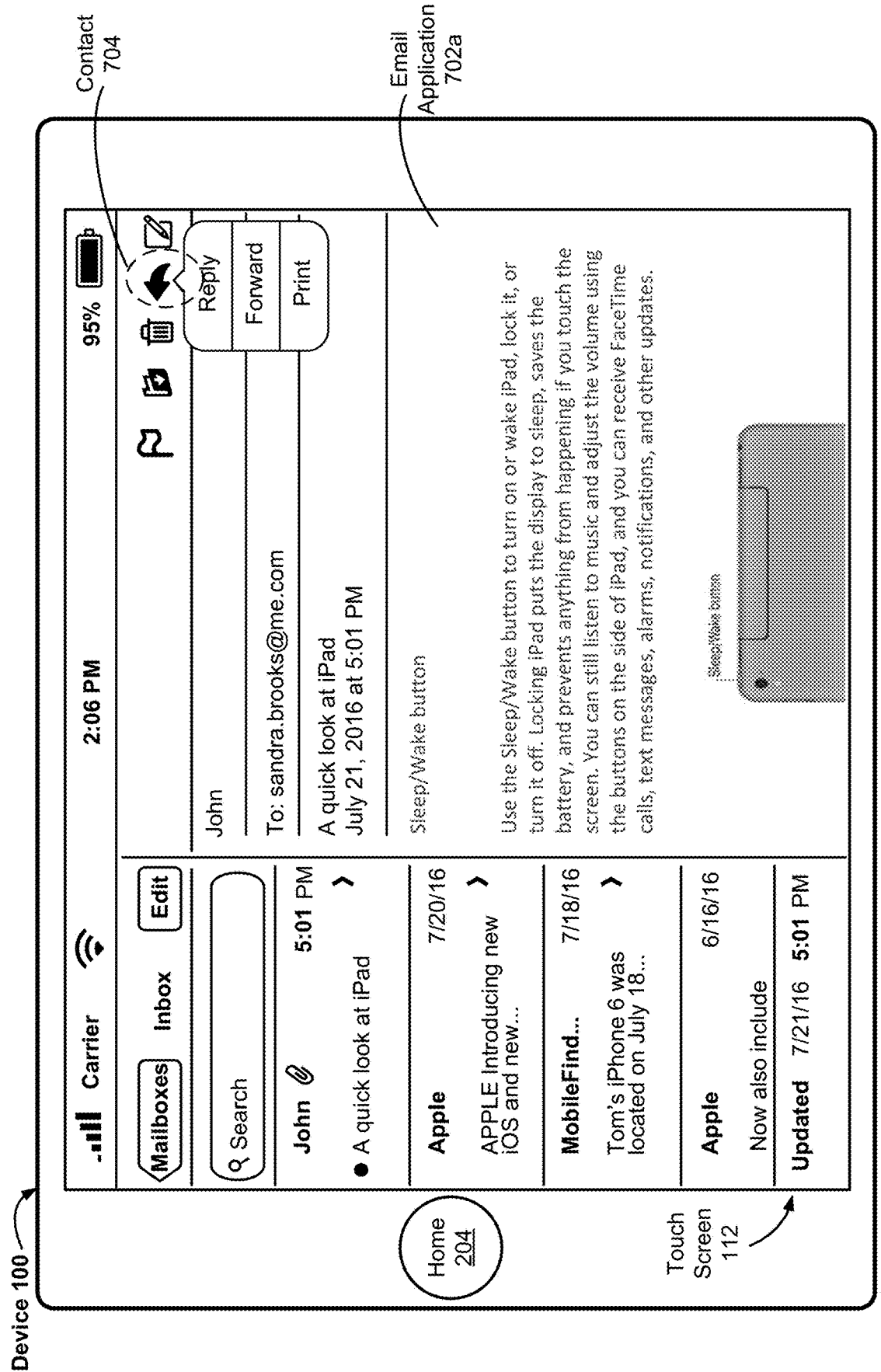

FIG. 7B shows a user input (e.g., a contact like a tap or a press) 704 on the touch screen 112. Here, the user input or contact 704 is on or over an arrow affordance used to reply, forward, or print the open email shown in the right panel. On contact with the touch screen 112 (also referred to herein as the touch-sensitive display or touch-sensitive screen or touch-sensitive display screen) at the arrow affordance, the system, including the touch screen 112 and processors (122 of FIG. 1A), determine that the user has selected the arrow affordance, and displays affordances for replying to the email, forwarding the email or printing the email. In this example, as shown in FIG. 7B, these affordances are displayed in a pop-up window overlaying the opened email.

Figure 7C:
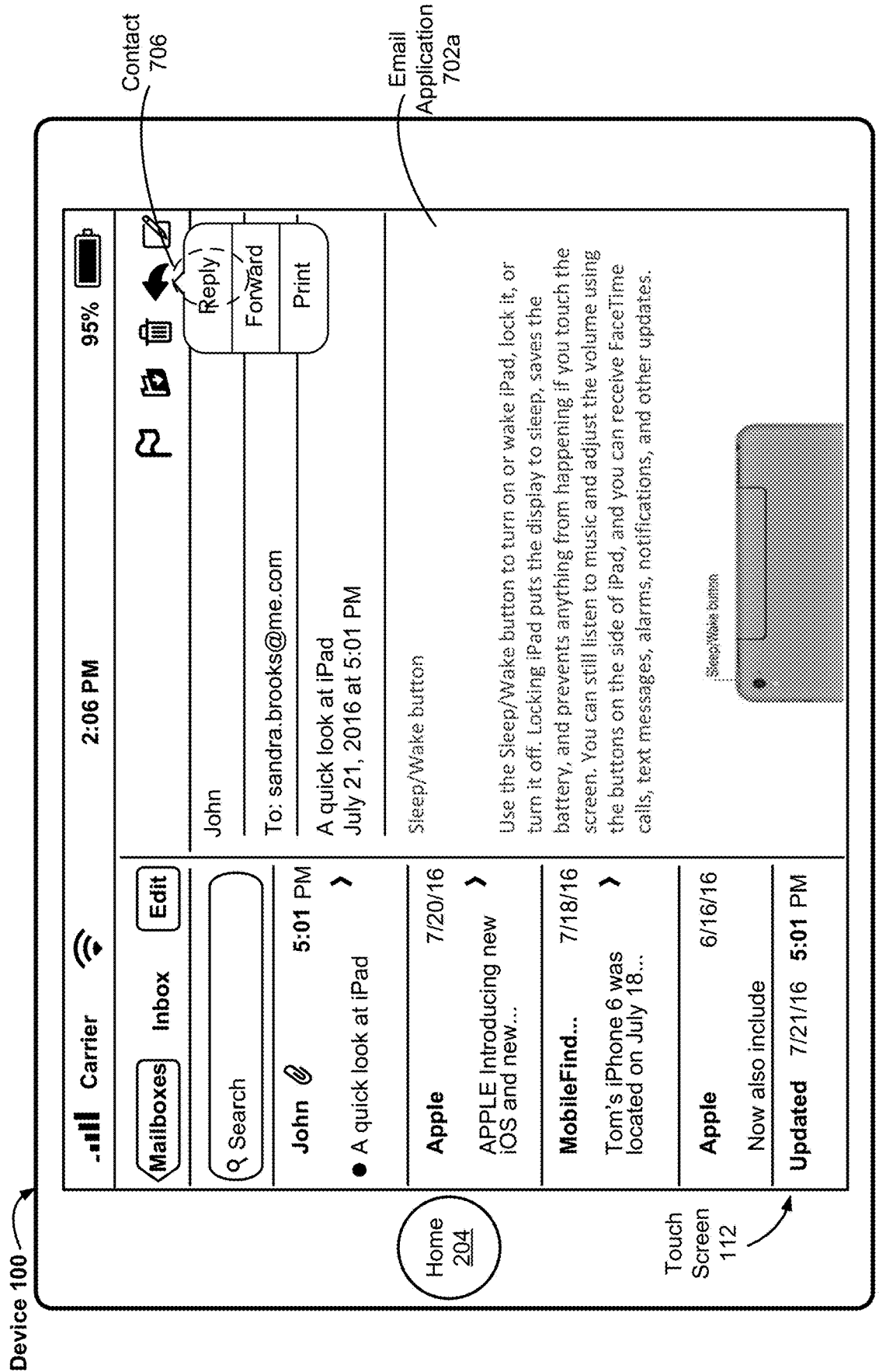

FIG. 7C shows another user input (e.g., a contact or a gesture) 706 on the touch screen 112. Here, the user input (e.g., contact or gesture) 706 is on or over a reply affordance used to reply to the open email. In some embodiments, the user input (e.g., contact or gesture) 706 is not a simple tap or touch, but, instead, is a deep or hard press (e.g., a press with a contact that exceeds a predetermined contact force or intensity—see description relating to FIGS. 3A-3C) or a press-and-hold for longer than a predetermined amount of time (e.g., 1 second).

Figure 7D:
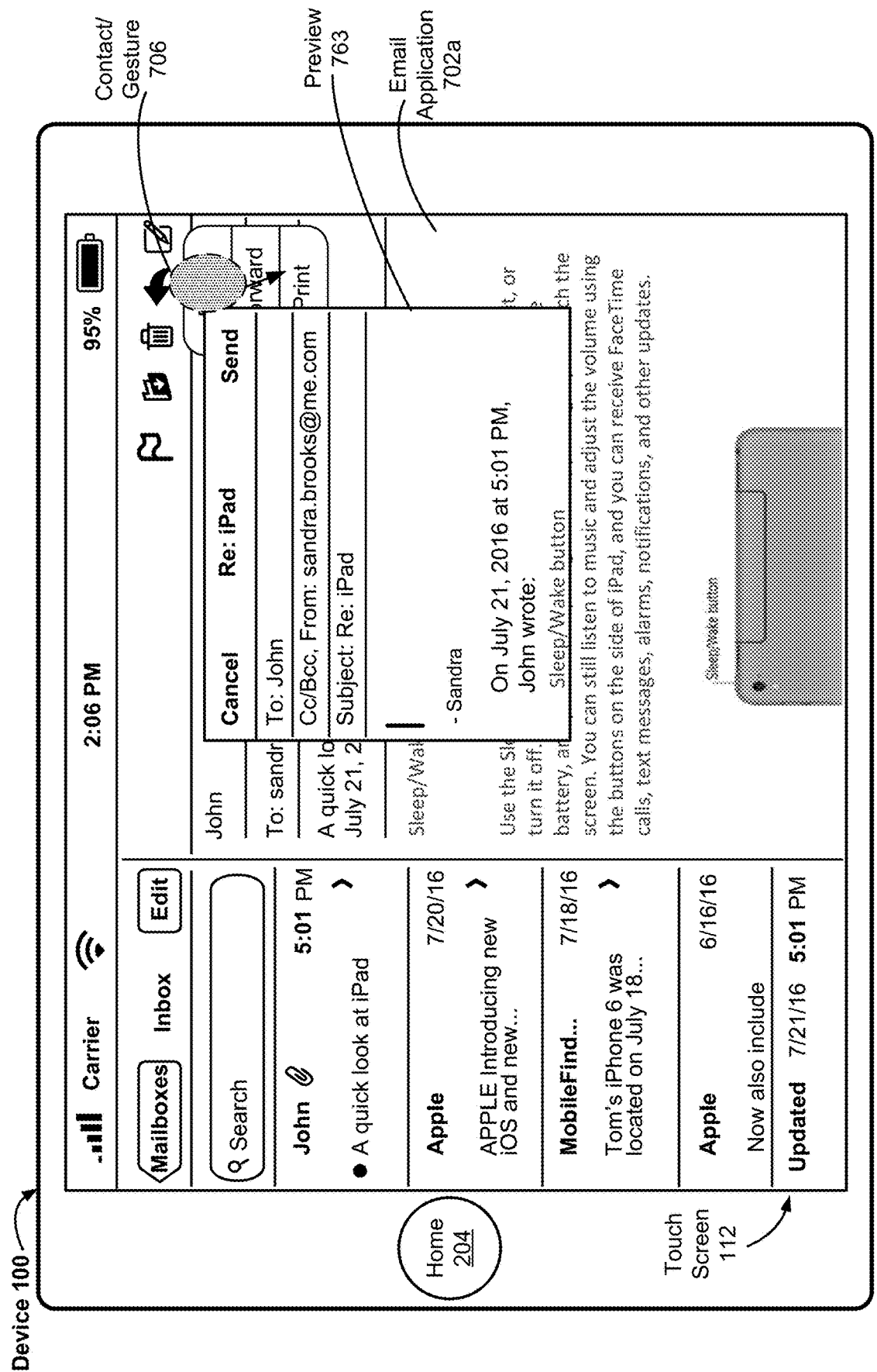

The system, including, for example, the touch screen 112, processors (122 of FIG. 1A), contact intensity sensors (165 of FIG. 1), and/or the intensity sensor controller (159 of FIG. 1), determine whether the user input (e.g., contact or gesture) 706 is of the predetermined type (e.g., deep-press or press-and-hold) over the reply affordance. Upon determining that the user input 706 is of the predetermined type over the reply affordance, the touch screen 112 displays a preview 763 of a new email replying to the prior email, as shown in FIG. 7D. In this example, the preview 763 of the new email replying to the prior email is displayed in a pop-up window overlaying the prior email.

Figure 7E:
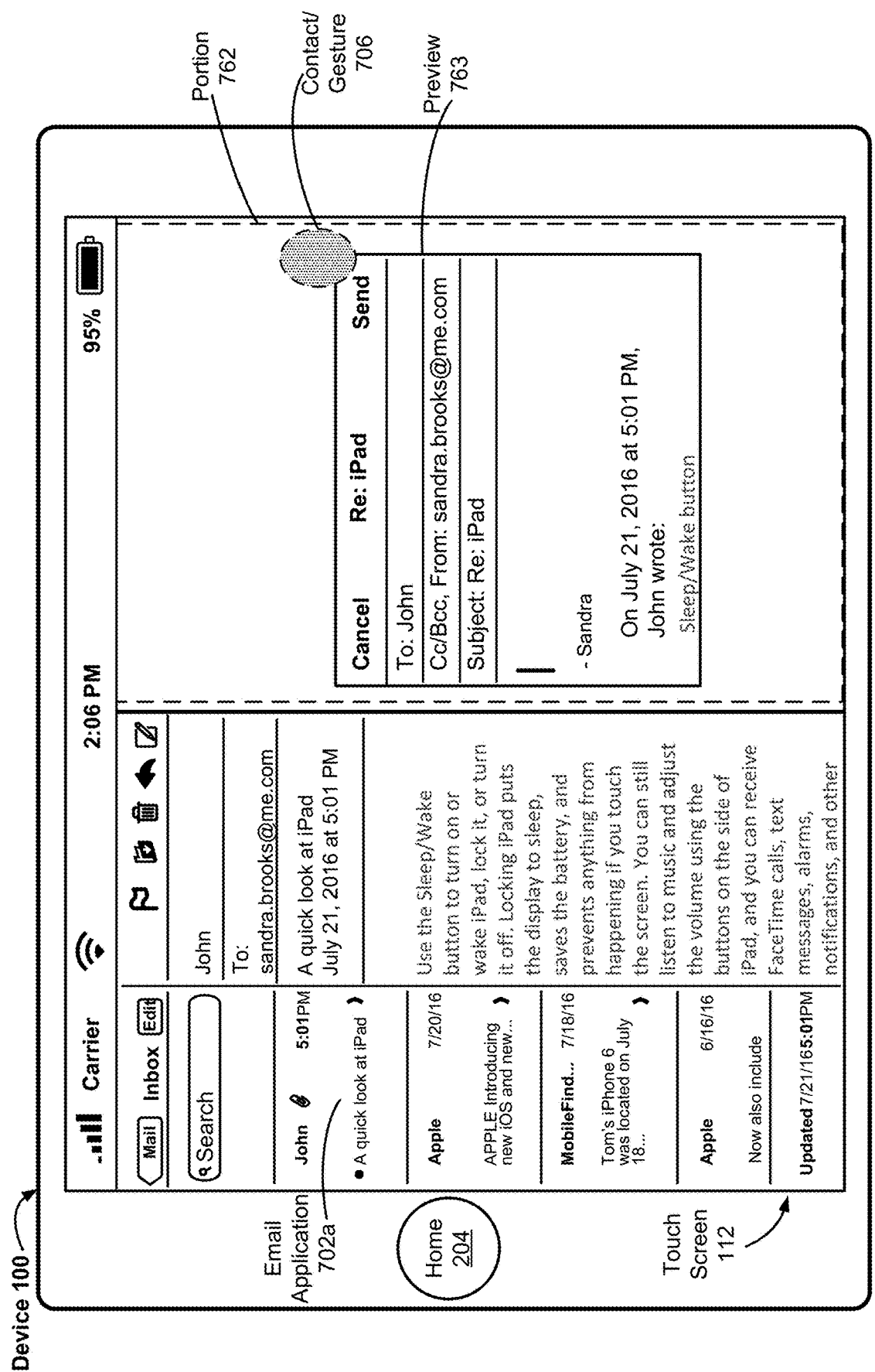

FIG. 7E continues with the example shown in FIG. 7D. Here, without detecting any lift-off of the input or contact with the reply affordance after detecting that the user input 706 was of the predetermined type (e.g., deep-press or press-and-hold), the touch screen 112 and processors (122 of FIG. 1A) detect a gesture 706 of a predetermined type. In some embodiments, the predetermined type of gesture is a movement of the contact by (or greater than) a certain distance (e.g., 1-2 centimeters). In other embodiments, the predetermined type of gesture is a movement of the contact to a predefined second portion of the touch screen (e.g., the right third to half of the screen). This gesture or movement of the contact 706 is depicted by an arrow extending from the contact 706 in FIG. 7D.

Upon detecting that the gesture 706 is of a predetermined type, the first instance of the application is resized into a first portion of the touch-screen display, as shown in FIG. 7E. In this example shown in FIG. 7E, the first portion is the left half of the touch screen. At the same time, the remainder of the touch screen (e.g., the entire touch screen area less the first portion) is emptied of content other than the preview 763 to provide an indication to the user of the area that the new email replying to the prior email (as depicted by the preview 763) will ultimately occupy if the user releases or lifts off their contact with the screen. In some embodiments, this remainder of the touch screen is the second portion 762 referred to above.

Figure 7F:
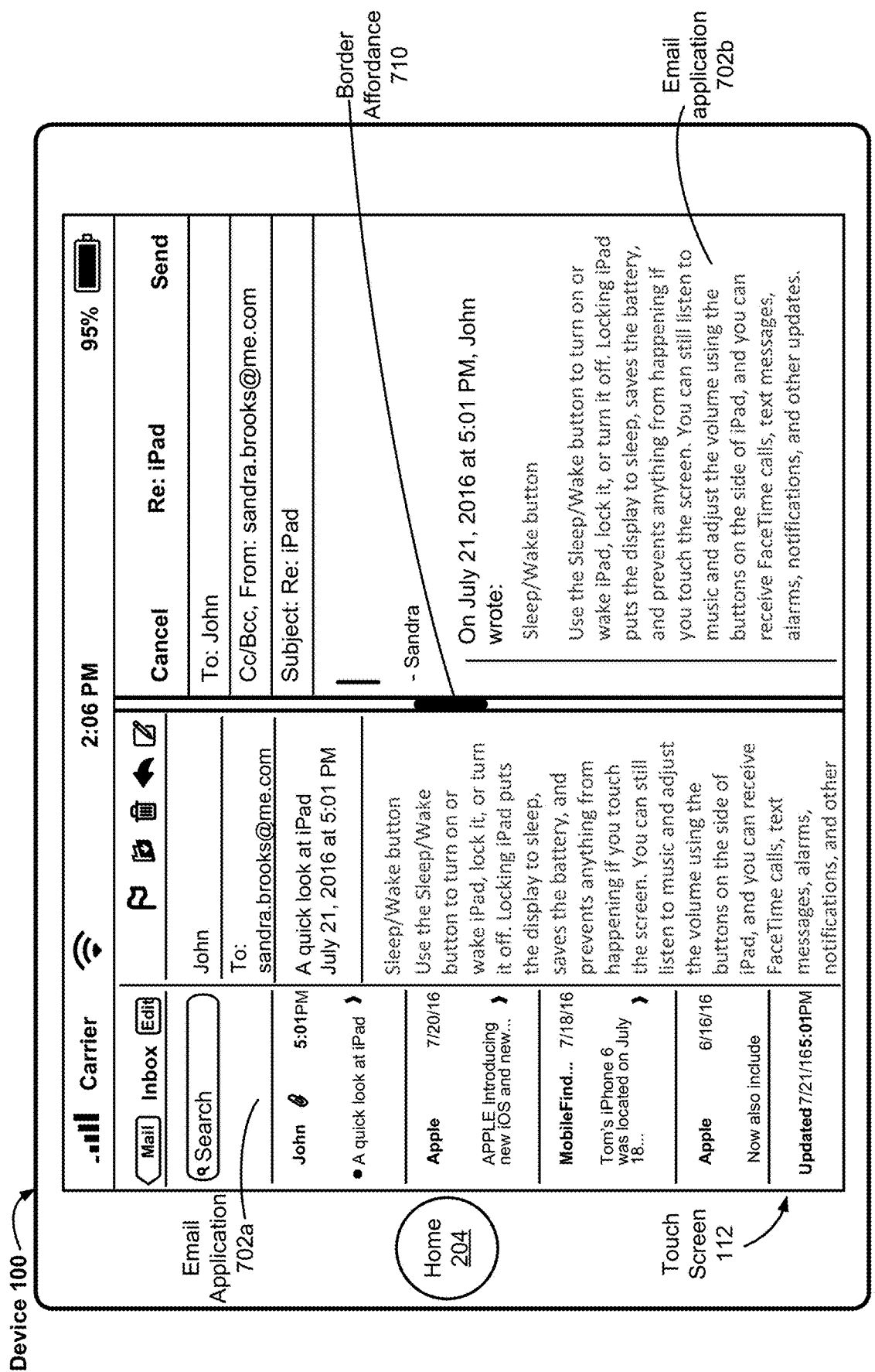
Figure 7G:
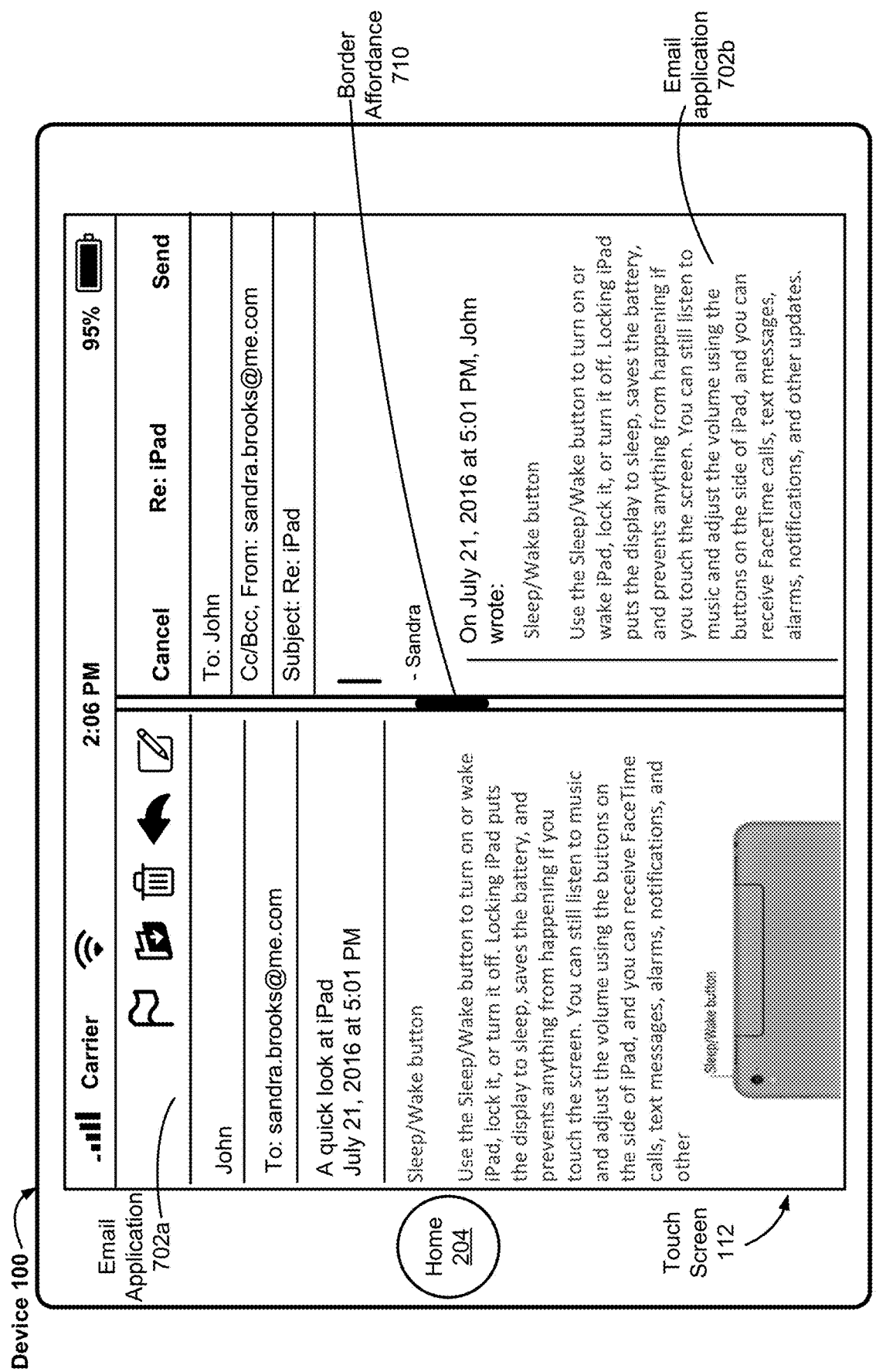

If the user does not want to open the new email replying to the prior email in split-view mode, e.g., next to the first instance of the mail application, then the user can move the contact back to over the reply affordance and lift-off or release the contact from the surface of the touch screen. However, if the user lifts off or releases the contact with the touch screen after the gesture or contact of the predetermined type (see FIG. 7D above), then the new email replying to the prior email is displayed in the second portion 762 of the touch screen as shown in FIG. 7F or 7G. In some embodiments, upon detecting the lift-off or release of the contact, the preview 763 (FIG. 7E) is expanded to occupy the entire second portion 762 (FIG. 7E). In some embodiments, this expansion is animated.

In some embodiments, once the preview 763 (FIG. 7E) is expanded to occupy the entire second portion 762, the first instance of the mail application is displayed in the first portion, as shown in FIG. 7F. In other embodiments, once the preview 763 (FIG. 7E) is expanded to occupy the entire second portion 762, the prior email (to which the new email shown in the second portion is replying) is displayed in the first portion, as shown in FIG. 7G. In some embodiments related to FIG. 7G, while the preview 763 (FIG. 7E) is expanded to occupy the entire second portion 762, the first instance of the mail application is slid off the screen (e.g., to the left) while the prior email is slid into the first portion (e.g., from the right) in an animated sequence.

Figure 7H:
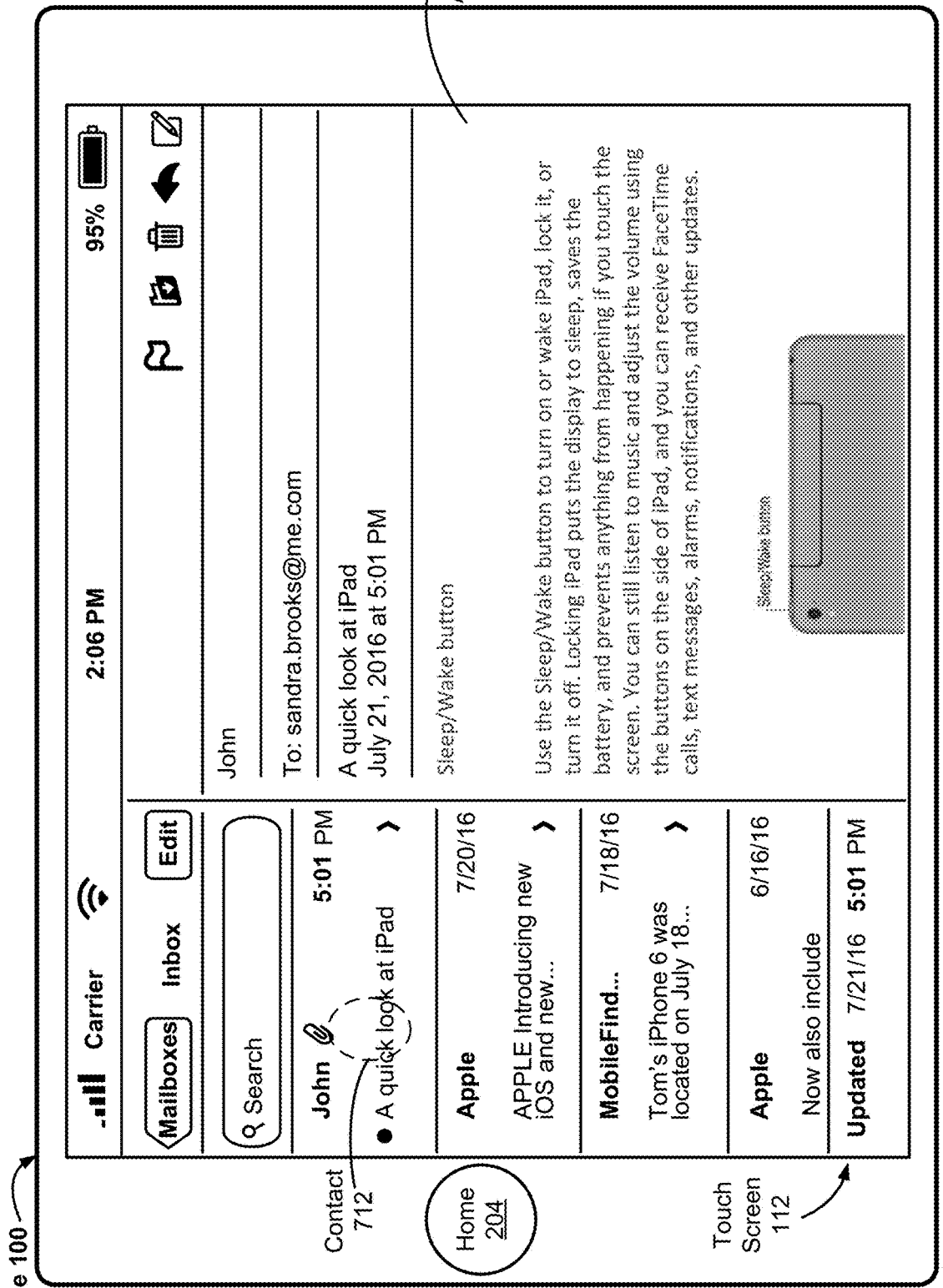

FIG. 7H shows another example of user interfaces and gestures for activating two or more instances of the same application (here a mail application). As with FIG. 7A a first instance of an application is displayed that occupies substantially all of the displayable area of the touch screen. As shown, a user input or contact 712 is detected at a selectable affordance (here an individual email in a list of received emails displayed in an inbox).

Figure 7I:
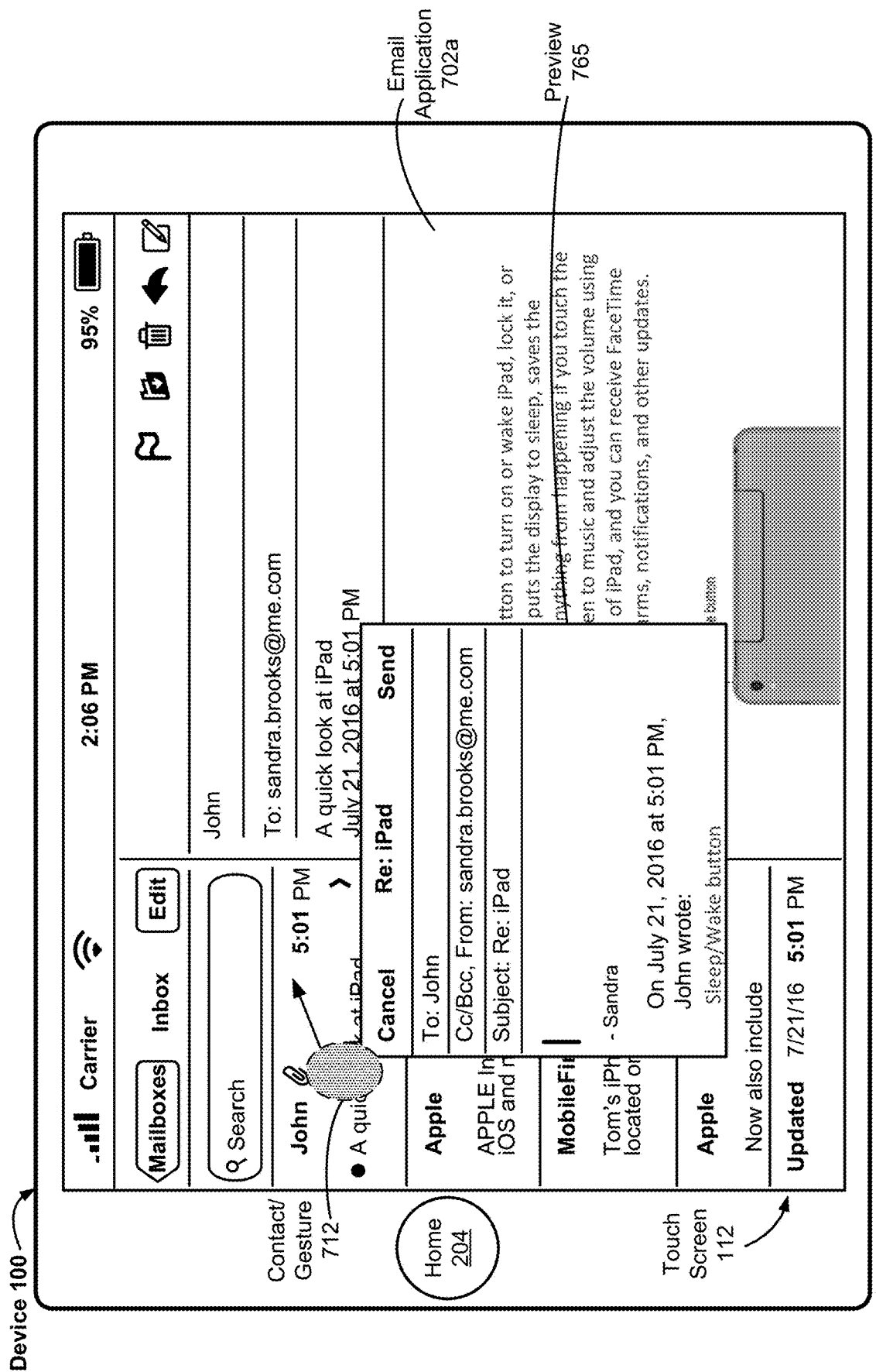

The system, including, for example, the touch screen 112, processors (122 of FIG. 1A), contact intensity sensors (165 of FIG. 1), and/or the intensity sensor controller (159 of FIG. 1), determine whether the user input (e.g., contact or gesture) 712 is of a predetermined type (e.g., deep-press or press-and-hold; see description above incorporated here) over the reply affordance. Upon determining that the user input 712 is of a predetermined type over the affordance, the touch screen 112 displays a preview 765 of a new instance of the application (here an email replying to the selected email in the inbox) as shown in FIG. 7I. In this example, the preview 765 is displayed in a pop-up window overlaying the first instance of the application (e.g., the mail application).

As shown in FIG. 7I, without detecting any lift-off of the input or contact 712, and after detecting that the user input 712 was of a predetermined type, the system, including, for example, the touch screen 112 and processors (122 of FIG. 1A), detects a gesture 712 of a predetermined type. In some embodiments, the predetermined type of gesture is movement of the contact by (or greater than) a certain distance (e.g., 1-2 centimeters). In other embodiments, the predetermined type of gesture is a movement to a predefined second portion of the touch screen (e.g., the right ⅓ of the screen). This gesture or movement of the contact 706 is depicted by an arrow in FIG. 7I.

Figure 7J:
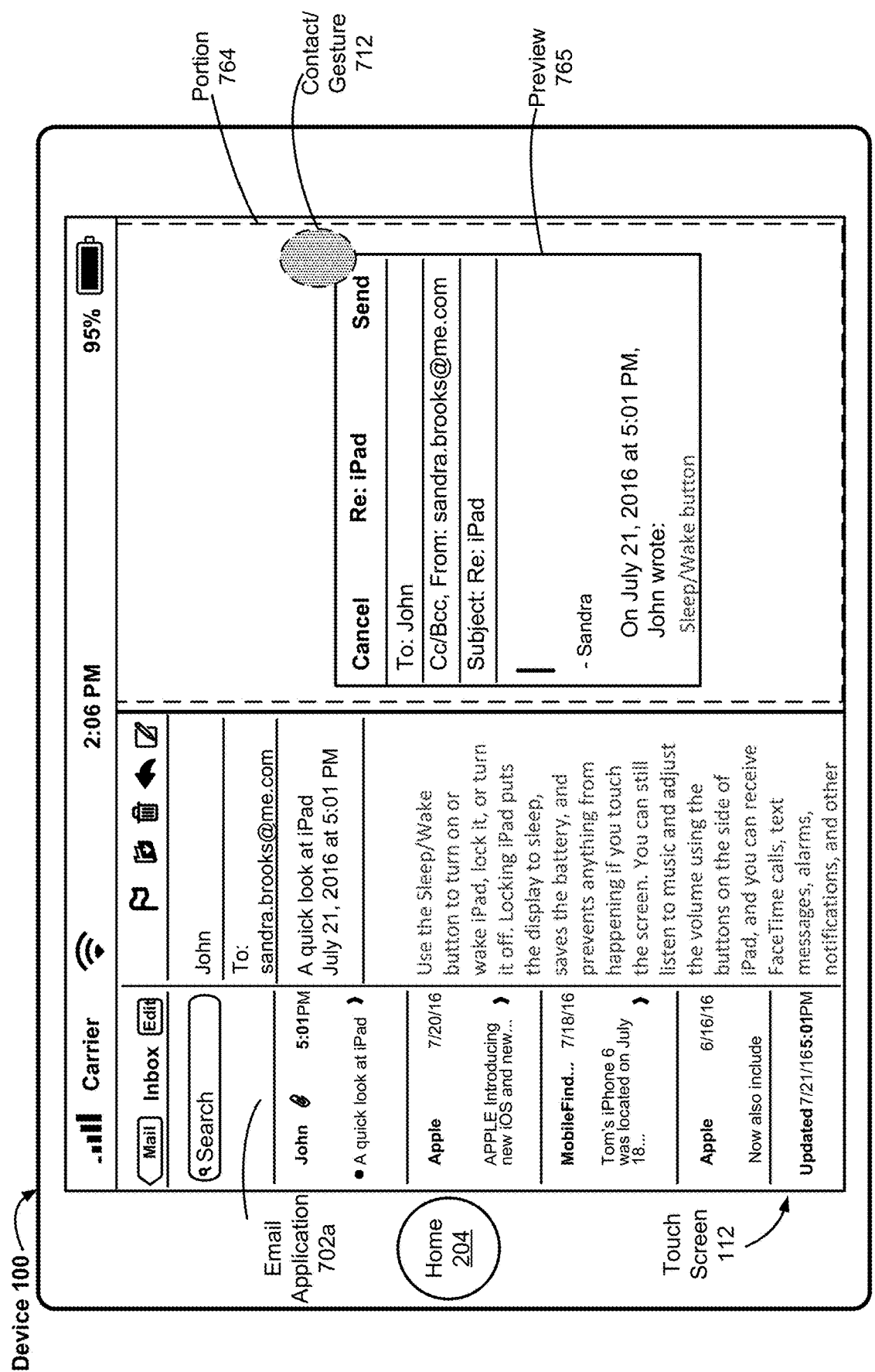

Upon detecting that the gesture 712 is of a predetermined type, the first instance of the application (e.g., the mail application displaying an inbox) is resized into a first portion of the touch-screen display, as shown in FIG. 7J. In this example shown in FIG. 7J, the first portion is the left half of the touch screen. At the same time, the remainder of the touch screen (e.g., the entire touch screen area less the first portion) is emptied of content other than the preview 765 to provide a visual indication to the user of the area that the new reply email (as depicted by the preview 765) will ultimately occupy if the user lifts off their contact with the screen. In some embodiments, this remainder of the touch screen is the second portion 764 referred to above.

If the user does not want to open the new reply email in split view mode next to the first instance of the mail application, then the user can move the contact back to where it started from and lift-off or release the contact from the surface of the touch screen. However, if the user lifts off or releases the contact with the touch screen after the gesture or contact of the predetermined type (see FIG. 7I above), then the new email replying to the prior email is displayed in the second portion 762 of the touch screen as shown in FIG. 7K. In some embodiments, upon detecting the lift-off or release of the contact, the preview 765 (FIG. 7J) is expanded to occupy the entire second portion 764 (FIG. 7J). In some embodiments, this expansion is animated.

Figure 7L:
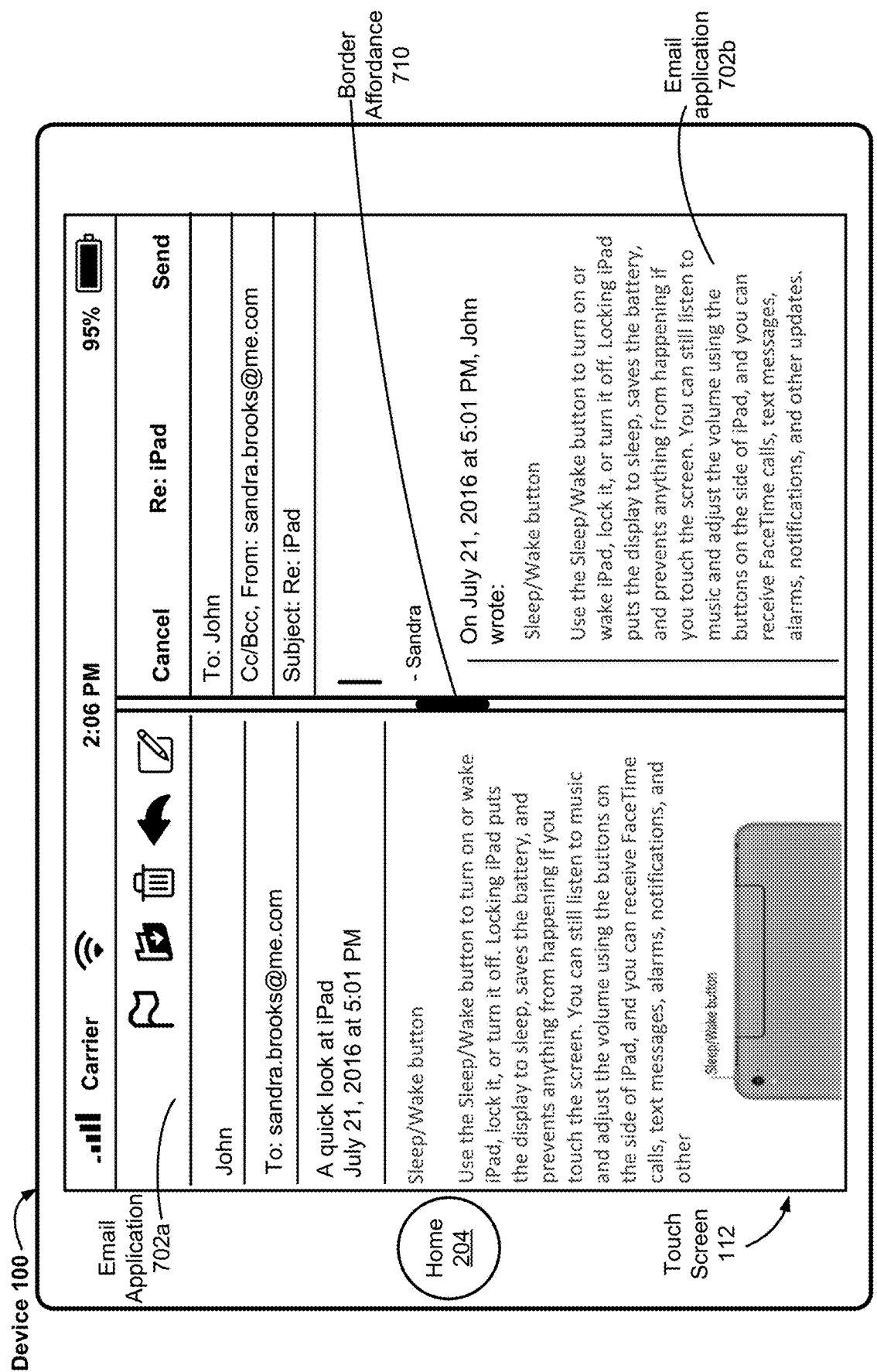

In some embodiments, once the preview 765 (FIG. 7J) is expanded to occupy the entire second portion 764, the first instance of the mail application is displayed in the first portion, as shown in FIG. 7K. In other embodiments, once the preview 765 (FIG. 7J) is expanded to occupy the entire second portion 764, the prior email (to which the new email shown in the first portion is replying) is displayed in the first portion as shown in FIG. 7L. In some embodiments related to FIG. 7L, while the preview 765 (FIG. 7J) is expanded to occupy the entire second portion 764, the first instance of the mail application is slid off the screen (e.g., to the left) while the prior email is slid into the first portion (e.g., from the right) in an animated sequence.

As described above in relation to FIGS. 7A-7G and 7H-7K, a second instance of an application (e.g., an email reply of a mail application) can be opened adjacent a first instance of the same application (e.g., displaying an inbox of a mail application) side-by-side on a touch screen in a split screen mode. Other embodiments are used to display more than two instances of an application side-by-side in a split-view mode, while still further embodiments display multiple applications together with multiple instances of the same application side-by-side in a split-view mode.

In some embodiments, the combination of all displayed applications, instances of applications, or a combination of applications and multiple instances of applications are displayed so that they occupy substantially the entire displayable area of the touch screen.

In some embodiments, as shown in FIGS. 7F, 7G, 7K, and 7L a border affordance 710 is displayed between the two displayed instances of the application, e.g., between the first and second portions. This border affordance can be used to drag the border between the two instances, e.g., to the left or right. Dragging the border affordance 710 resizes the respective instances of the application and upon lift-off maintains the respective instances at their respective sizes when the lift-off occurred. Further details can be found in commonly owned U.S. application Ser. No. 14/732,618 (e.g., at FIGS. 37H-37M, and in the associated paragraphs describing these figures), which has been incorporated by reference in its entirety above.

In some embodiments, the first and second instances of the application are distinct executable processes executing on the one or more processors (122 of FIG. 1A) of the electronic device (e.g., two distinct instantiations of the application that are both separately executing on the one or more processors of the electronic device).

In some instances, users of computing systems lose access to certain features of an application after selecting to open other features within an application (e.g., users may be unable to view a received email after selecting an option to reply to that received email). Opening multiple instances of a single application allows users to continue viewing and using these certain features. Enabling users to continue viewing and using these certain features enhances operability of the device and makes the human-machine interface more efficient (e.g., by enabling the users to use these certain features without having to provide multiple inputs in order to re-open these certain features after they have been closed). Additionally, this enables a sustained interaction with the touch-sensitive display that would not otherwise be possible due to having to employ multiple gestures or inputs to figure out how to re-open or access these certain features after they have been closed or are no longer displayed.

Additional descriptions regarding FIGS. 7A-7L are provided below in reference to method 1100.

Figure 8A:
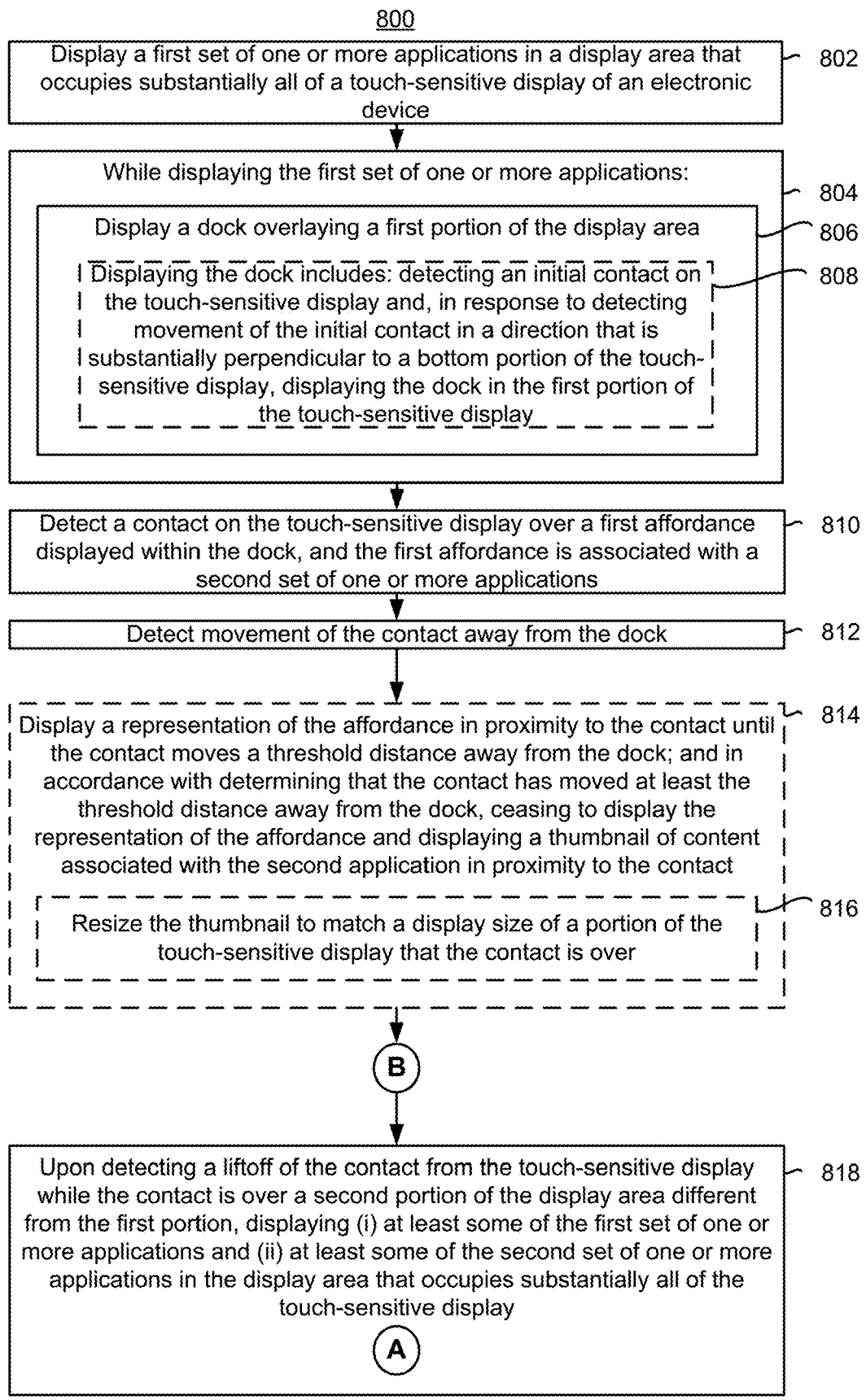

FIGS. 8A-8C are a flowchart representation of a method of activating a split-view mode (in which multiple applications are simultaneously displayed and available for use) by dragging an affordance out of a dock, in accordance with some embodiments. FIGS. 4A-4AA are used to illustrate the methods and/or processes of FIGS. 8A-8C. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 800 is performed by an electronic device (e.g., portable multifunction device 100, FIG. 1A and/or one or more components of the electronic device (e.g., I/O subsystem 106, operating system 126, etc.). In some embodiments, the method 800 is governed by instructions that are stored in a non-transitory computer-readable storage medium and that are executed by one or more processors of a device, such as the one or more processors 122 of device 100 (FIG. 1A). For ease of explanation, the following describes method 800 as performed by the device 100. In some embodiments, with reference to FIG. 1A, the operations of method 800 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 2200 are, optionally, combined and/or the order of some operations is, optionally, changed.

As described below, the method 800 provides intuitive ways to activate a split-view mode using a gesture at a dock and then interact with applications displayed in the split-view mode on a touch-sensitive display. The method reduces the number of inputs required from a user to activate the split-view mode (e.g., users need only provide a simple drag gesture instead of performing multiple inputs) and, thereby, ensures that battery life of an electronic device implementing the method 800 is extended, since less power is required to process the fewer number of inputs (and this savings will be realized over and over again as users become increasingly familiar with the more intuitive and simple gesture). As is also explained in detail below, the operations of method 800 help to ensure that users are able to engage in sustained interactions (e.g., they do not need to frequency undo behaviors, which interrupts their interactions with their devices) and the operations of method 800 help to produce more efficient human-machine interfaces.

In some embodiments, a device configured to perform the method 800 first displays (802) a first set of one or more applications in a display area that occupies substantially all of a touch-sensitive display. For example, the first set of one or more applications may include a single application (e.g., the maps application shown in FIG. 4A) that occupies substantially all of the touch-sensitive display 112) or, as shown in FIG. 4I, the first set of one or more applications may include more than one application (e.g., Application 1 on a left portion of the display 112 and a video-browsing application on a right portion of the display 112, such that these two applications are displayed in a split-view mode together in FIG. 4I, and the combination of the two applications occupies substantially all of the touch-sensitive display).

While displaying the first set of one or more applications (804), the device displays (806) a dock (e.g., dock 408, FIG. 4A) overlaying a first portion of the display area. Displaying the dock may include (808) detecting an initial contact on the touch-sensitive display and, in response to detecting movement of the initial contact in a direction that is substantially perpendicular (e.g., within +/−5 degrees of perpendicular) to a bottom edge of the touch-sensitive display, displaying the dock in the first portion of the touch-sensitive display. In other words, the dock is activated by dragging in a substantially upward direction as shown for gesture 450 in FIGS. 4A-4C, and described in more detail below in reference to method 1000.

In some embodiments, the dock (e.g., dock 408, FIG. 4A) is a user interface object that includes a plurality of affordances, each corresponding to a respective set of one or more applications. The respective sets of one or more applications may include a single application (e.g., affordance 220, FIG. 4C, which corresponds to a web-browsing application) or may include multiple applications (e.g., multiple applications that are displayed/pinned together in a split-view mode, such as the affordance 492 shown in FIG. 4S that corresponds to a maps application pinned next to a video-browsing application.). In some embodiments, the dock includes two different sets of affordances, a first set of default affordances (e.g., affordances corresponding to phone and mail applications on a left side of a divider displayed in the dock) and a second set of recently used affordances (e.g., affordances corresponding to a web-browsing and a video-browsing application on a right side of the divider). In some embodiments, the dock includes a predetermined number (e.g., 2, 3, 4, or 5) of recently used applications in the second set of recently used affordances.

The device then detects (810) a contact (distinct from the initial contact used to activate the dock) on the touch-sensitive display over a first affordance displayed within the dock, and the first affordance is associated with a second set of one or more applications. For example, an example contact associated with gesture 452 is received over affordance 232 corresponding to a video-browsing application, as is shown in FIG. 4E. As another example, as shown in FIG. 4V, another example contact associated with a gesture 468 is received over affordance 468, and the affordance 468 is associated with a split-view mode in which a maps application is displayed adjacent to messaging application and a web-browsing application are displayed in a side-by-side view that occupies substantially allow of the touch-sensitive display.

Movement of the contact away from the dock is then detected (812). In some embodiments, the movement is a continuous movement that is detected without detecting any liftoff of the contact from the touch-sensitive display.

In some embodiments, before detecting any liftoff of the contact, displaying (814) a representation of the affordance in proximity to the contact until the contact moves a threshold distance (e.g., 1-2 centimeters) away from the dock. For example, the representation of the affordance is displayed within very close proximity of the contact (e.g., 1px or 2px) or directly underneath the contact, so the user is able to view the representation of the affordance moving across the touch-sensitive display while moving the contact (as is shown in FIG. 4E-4F, the affordance 232 is shown as following a contact associated with the gesture 452 as it moves away from the dock 408).

In accordance with determining that the contact has moved at least the threshold distance away from the dock, the device ceases displaying the representation of the affordance and displays a thumbnail of content associated with the second application in proximity to the contact (e.g., the preview/thumbnail 456 is shown underneath the contact once the contact has moved beyond the threshold distance away from a border surrounding the dock). A thumbnail of content corresponds to a miniaturized preview of content associated with the second application, the miniaturized preview including content that would be displayed within the second application when it is opened, and that content is displayed at approximately ⅕th to ¹⁄₁₀th of its size when the second application is opened. In this way, the user is provided with additional visual feedback that helps them appreciate and understand changes that will occur after they release (or liftoff) the contact. Providing this additional visual feedback enhances operability of the device and makes the human-machine interface more efficient (e.g., by enabling the users to better understand changes that will occur and to avoid having to reverse unwanted changes). Additionally, this enables a sustained interaction with the touch-sensitive secondary display that would not otherwise be possible due to users having to repeatedly undo or reverse undesired changes that they were not able to anticipate.

In some embodiments, the device also resizes the thumbnail to match a display size of a portion of the touch-sensitive display that the contact is over. For example, a preview 498 (FIG. 4S) may have a first display size while the contact associated with gesture 466 is over a first portion of the display 112 in which Application 1 is displayed. And, the preview 498 may have a second display size distinct from the first display size while the contact associated with gesture 466 is over a second portion of the display 112 in which the video-browsing application is displayed. In this way, the user is provided with further visual feedback that helps them appreciate and understand changes that will occur after they release (or liftoff) the contact. Providing this further visual feedback enhances operability of the device and makes the human-machine interface more efficient (e.g., by enabling the users to better understand changes that will occur and to avoid having to reverse unwanted changes).

Additionally, this enables a sustained interaction with the touch-sensitive secondary display that would not otherwise be possible due to users having to repeatedly undo or reverse undesired changes that they were not able to anticipate.

In some embodiments, instead of providing a thumbnail of content a user interface object (e.g., UI objects 473-A, 473-B, and/or 473-C) is displayed that includes a representation of an application-specific affordance that is being dragged. The features described above regarding use of these thumbnails also application to embodiments in which user interface objects are provided instead of thumbnails. Examples of the use of user interface objects are illustrated in FIGS. 4AB-4AE, 4AG-4AH, 4AJ-4AK, 4AO-4AQ, and descriptions of these examples are also provided above.

Therefore, in some embodiments, method operation 814 may be replaced (or a new method operation may be added as an alternative to method operation 814) by an operation that includes displaying a representation of the first affordance in proximity to the contact until the contact moves a threshold distance away from the dock; and in accordance with determining that the contact has moved at least the threshold distance away from the dock, displaying a user interface object surrounding the representation of the first affordance in proximity to the contact. For example, in FIGS. 4AB-4AC, the video-browsing affordance 232 is surrounded by a user interface object 473-A (and this shape may change as the contact moves over the first and second portions, so that the UI object then has a shape substantially similar to that shown for UI objects 473-B and 473-C in FIGS. 4AP and 4AQ, respectively).

Upon detecting a liftoff of the contact from the touch-sensitive display while the contact is over a second portion of the display area different from the first portion (e.g., liftoff of a contact associated with gesture 452 between FIGS. 4H-4I or liftoff of a contact associated with gesture 466 between FIGS. 4T-4U, the device then (simultaneously) displays (818) (i) at least some of the first set of one or more applications and (ii) at least some of the second set of one or more applications in the display area that occupies substantially all of the touch-sensitive display. In some embodiments, the first portion of the display area is a portion used to display the first set of one or more applications (e.g., Application 1 in FIG. 4E) and the second portion of the display area is a portion of the display area that is available for displaying the second set of one or more affordances (e.g., the predefined area 454, FIG. 4F is available for displaying the second set of one or more applications upon detecting the liftoff of the contact).

In some instances, users of computing systems must employ inefficient and time-consuming interactions to operate two or more applications. Allowing a user to use a single and simple gesture (e.g., dragging an affordance from a dock and on to a main display area using a single finger, as detailed above regarding at least operations 804-812 and 818 of method 800) enables users to easily and efficiently activate a mode in which two or more applications are displayed and operated simultaneously. Enabling users to easily and efficiently activate this mode enhances operability of the device and makes the human-machine interface more efficient (e.g., by enabling the users to activate the mode using a single gesture). Additionally, this enables a sustained interaction with the touch-sensitive display that would not otherwise be possible due to having to employ multiple gestures to access two or more applications.

Turning now to FIG. 8B, in some embodiments, before detecting any liftoff of the contact from the touch-sensitive display and after the contact moves at least a threshold distance away from the dock, the device resizes (820) the first set of one or more applications to reveal the second portion of the display area adjacent to the resized first set of one or more applications. In some embodiments, the first set of one or more applications is resized to occupy a predetermined percentage of the display area (e.g., approximately 75% or 66% of the display area), and the second portion (e.g., predetermined area 454 or a portion of the display area that is used to display a pinned application, such as that portion used to display the video-browsing application in FIG. 4T) then occupies a predetermined remaining percentage of the display area (e.g., approximately 25% or 34% of the display area).

As a specific example, as shown in FIGS. 4E-4H, when the first set of one or more applications corresponds to a single application (e.g., Application 1 of FIG. 4E), the single application is reduced in size to make room for displaying the second set of one or more affordances adjacent to the resized single application (e.g., a preview of the predefined area is presented, in some embodiments this preview includes temporarily showing a wallpaper associated with a home screen).

When the first set of one or more applications corresponds to multiple applications (e.g., a first pinned Application 1 and a second pinned video-browsing application, as shown in FIG. 4N), then one of the multiple applications may no longer be displayed (FIG. 4T), to make room for display of a preview of the predefined area 454 (which may include displaying a wallpaper associated with a home screen of the device). In some other embodiments, when the first set of one or more applications corresponds to multiple applications, then both of the multiple application may remain displayed (e.g., as shown in FIG. 4W) and one of the multiple application is only removed from the display after a liftoff of a contact associated with the gesture (e.g., gesture 468, FIG. 4W).

In some instances, users of electronic devices may not appreciate the changes that will result from certain interactions on the touch-sensitive display. Providing clear visual feedback (e.g., resizing the first set of one or more applications to reveal the second portion of the display area) gives the user an opportunity to preview changes that will occur after they release (or liftoff) the contact. Providing this clear visual feedback enhances operability of the device and makes the human-machine interface more efficient (e.g., by enabling the users to understand changes that will occur and to avoid having to reverse unwanted changes). Additionally, this enables a sustained interaction with the touch-sensitive display that would not otherwise be possible due to users having to repeatedly undo or reverse undesired changes that they were not able to anticipate.

In some embodiments, before detecting liftoff of the contact and after the contact moves to within a threshold distance (e.g., 1-2 centimeters, such as the thresholds 464, 465 of FIG. 4AB) from an edge of the touch-sensitive display that borders at least some of the first set of one or more applications or at least some of the second set of one or more applications, the method includes (820A) resizing the first set of one or more applications to reveal the second portion of the display area adjacent to the resized first set of one or more applications (e.g., as shown in FIGS. 4AD and 4AE).

In one particular example embodiment, when the first set of one or more applications corresponds to a single application (e.g., Application 1, FIG. 4AB), the single applications is only reduced in size to make room for revealing a preview of the predefined area upon determining that a gesture that is dragging an application-specific affordance out of the dock 408 (e.g., gesture 472, FIG. 4AB) has crossed over a threshold, such as threshold 464 or 465 of FIG. 4AB. Examples are shown in FIGS. 4AB-4AF and described in more detail above.

In some embodiments (such as the one particular example embodiment described above), when the first set of one or more applications corresponds to multiple applications, then the multiple applications may not be resized to display the preview of the predefined area 454. Instead, a user is able to either drag an application-specific affordance on top of a border between the multiple applications to overlay another application on top of the multiple applications (as shown in FIGS. 4AJ-4AL) or to drag an application-specific affordance on top of a particular application of the multiple applications to replace that particular application with a new application corresponding to the application-specific affordance (e.g., as shown in FIGS. 4AP-4AR). Examples of such embodiments are provided in more detail above in reference to FIGS. 4AJ-4AL and 4AP-4AR.

As is also shown in FIG. 8B, in some embodiments, displaying (i) at least some of the first set of one or more applications and (ii) at least some of the second set of one or more applications in the display area that occupies substantially all of the touch-sensitive display includes (822 and 822A): displaying the at least some of the second set of one or more applications in the second portion of the display area (e.g., displaying the web-browsing application in the predefined portion, as shown in FIG. 4U), and displaying the at least some of the first set of one or more applications in a remaining portion of the display area that is adjacent to the second portion of the display area (e.g., displaying Application 1 in the remaining portion adjacent to the second portion/predefined area). In some embodiments, the second portion of the display area is separated from the remaining area of the display area by a drag-able border that runs along a length of the second and remaining portions. In some embodiments, a contact over the drag-able border (e.g., over border affordance 460, FIG. 4R) allows a user to resize portions of the display area allocated to the first and second sets of one or more applications (as is also discussed above in reference to FIGS. 4L-4M).

Referring now to FIG. 8C, in various embodiments or circumstances, the first and second sets may include one or multiple applications and the liftoff of the contact may cause different replacement behaviors. Different examples are provided below in reference to 824-830.

For example, at 824, the first set contains one first application, the second set contains one second application, the affordance is associated with the one second application, and upon detecting the lift-off of the contact, the first and second applications are displayed side-by-side in the display area. One example of this is shown in FIGS. 4E-4I. In some embodiments, lift-off of the contact is detected while the contact is located within a threshold distance of an edge of the touch-sensitive display that borders the one first application (e.g., while the contact is located beyond one of the thresholds 464, 465 shown in FIGS. 4AB-4AE, and descriptions of which are provided above). In instances in which the first set comprises one first application and the second set comprises one second application, users of computing systems are able to activate a split-view mode in which the first application and the second application are displayed together by simply dragging an affordance corresponding to the second application over the second portion of the display. Providing clear visual feedback (e.g., revealing the second portion of the display area, e.g., after the contact moves the threshold distance) gives the user an opportunity to preview changes that will occur after they release (or liftoff) the contact. Providing this clear visual feedback enhances operability of the device and makes the human-machine interface more efficient (e.g., by enabling the users to understand that releasing the contact will activate a split-view mode that includes the first and second applications). Additionally, this enables a sustained interaction with the touch-sensitive display that would not otherwise be possible due to users having to repeatedly undo or reverse undesired changes that they were not able to anticipate.

In some embodiments, if the lift-off of the contact is instead detected while the contact is located over the one first application (and not while the contact is located within the threshold distance of the edge of the display 112, such as one of the thresholds 464, 465), then the second application is displayed in an overlay mode instead of side-by-side with the first application. For example, upon detecting the lift-off of the contact while the contact is located over the one first application (825) (e.g., lift-off occurs over the first application as is shown in FIG. 4AH), the second application is displayed overlaying the first application in the display area (as is shown in FIG. 4AI).

As another example at 826, the first set contains at least a first application and a second application, the second set contains one third application, and the affordance is associated with the one third application (e.g., as shown in FIGS. 4Q-4U). In instances in which the first set comprises a first application and a second application and the second set comprises one second application, then users of computing systems are able to add a new application to a split-view mode in which the first application and the second application are displayed together by simply dragging an affordance corresponding to a third application on to the display. Providing clear visual feedback (e.g., revealing the second portion of the display area after the contact moves the threshold distance) gives the user an opportunity to preview changes that will occur after they release (or liftoff) the contact. Additionally, this enables a sustained interaction with the touch-sensitive display that would not otherwise be possible due to users having to repeatedly undo or reverse undesired changes that they were not able to anticipate.

In the example at 826, in accordance with determining that the liftoff of the contact occurs over the second application, the device replaces the second application with the third application on the touch-sensitive display. One example of this is shown in FIGS. 4Q-4U. In this way, users are provided with the ability to replace the second application with the third application in the split-view mode, thereby enabling a sustained interaction in which the user is able to quickly and easily substitute in a new application to be viewed simultaneously with the first application.

In some embodiments, if the liftoff of the contact occurs at a border between the first and second applications, then instead of replacing one of the pinned applications, the third application is instead overlays one of the first or second applications. For example, as shown in FIG. 4AJ-4AK, liftoff of a contact associated with gesture 484 occurs over a border between Application 1 and the video-browsing application and, in accordance with determining that the liftoff of the contact occurs over this border, the device displays (827) the one third application (e.g., the video-browsing application of FIG. 4AL) overlaying the first application or the second application on the touch-sensitive display (e.g., the video-browsing application overlays the web-browsing application in FIG. 4AL). In some embodiments, the third application always overlays the right-most application after it is determined that liftoff has occurred over the border between the first and second applications.

One more example is described at 828, in which the first set contains a first group of at least two pinned applications, the second set contains a second group of at least two pinned applications, and the affordance is associated with the second group of at least two pinned applications (e.g., as shown in FIGS. 4V-4X). In instances in which the first and second sets each comprise groups of pinned applications, then users of computing systems are able to add a new group of pinned applications to a split-view mode by simply dragging an affordance corresponding to the second group on to the display. Providing clear visual feedback (e.g., revealing the second portion of the display area after the contact moves the threshold distance) gives the user an opportunity to preview changes that will occur after they release (or liftoff) the contact. Additionally, this enables a sustained interaction with the touch-sensitive display that would not otherwise be possible due to users having to repeatedly undo or reverse undesired changes that they were not able to anticipate.

In the example at 828, in accordance with a determination that liftoff of the contact occurs over the first group of applications, the device replaces the first group of at least two pinned applications with the second group of at least two pinned applications (e.g., as shown in FIG. 4X). In this way, the users are provided with the ability to quickly switch a first group of pinned applications for a second group of pinned applications, thereby enabling a sustained interaction in which the user is able to quickly and easily substitute in new groups of pinned applications on to the display.

One final example is at 830, in which the first set of one or more applications contains an instance of a first application, the second set of one or more applications contains an additional instance of the first application, and the instance and the additional instance are distinct instances of the first application. In instances in which the first and second sets each comprise different instances of the same first application, then users of computing systems are able to pin two different instances of a single application next to each other. Allowing pinning of two different instances together, offers users an improved man-machine interface (e.g., by ensuring that users are able to interact with different features of a single application simultaneously, such as, e.g., editing a message in a messaging application while also copying content from a different message in that same messaging application). Additionally, this enables a sustained interaction with the touch-sensitive display that would not otherwise be possible due to users having to repeatedly undo or reverse undesired changes that they were not able to anticipate.

In some embodiments, and as explained in more detail below in reference to method 900, the second application is displayed with a handle (e.g., affordance 462, FIG. 4J) that may be used to activate a slide-over mode or to drag the second application to be displayed in a different part of the touch-sensitive display. As such, aspects/operations of methods 800 and 900 may be interchanged, substituted, and/or added between these methods. For brevity, these details are not repeated here.

Additionally, in some embodiments, and as explained in more detail below in reference to method 1000, representations shown in the application-switcher user interface include representations of split-view modes. As such, aspects/operations of methods 800 and 1000 may also be interchanged, substituted, and/or added between these methods. For brevity, these details are not repeated here.

Furthermore, in some embodiments, and as explained in more detail below in reference to method 1100, the first set of one or more applications may include two different instances of a same application. As such, aspects/operations of methods 800 and 1100 may be interchanged, substituted, and/or added between these methods. For brevity, these details are not repeated here.

Figure 9A:
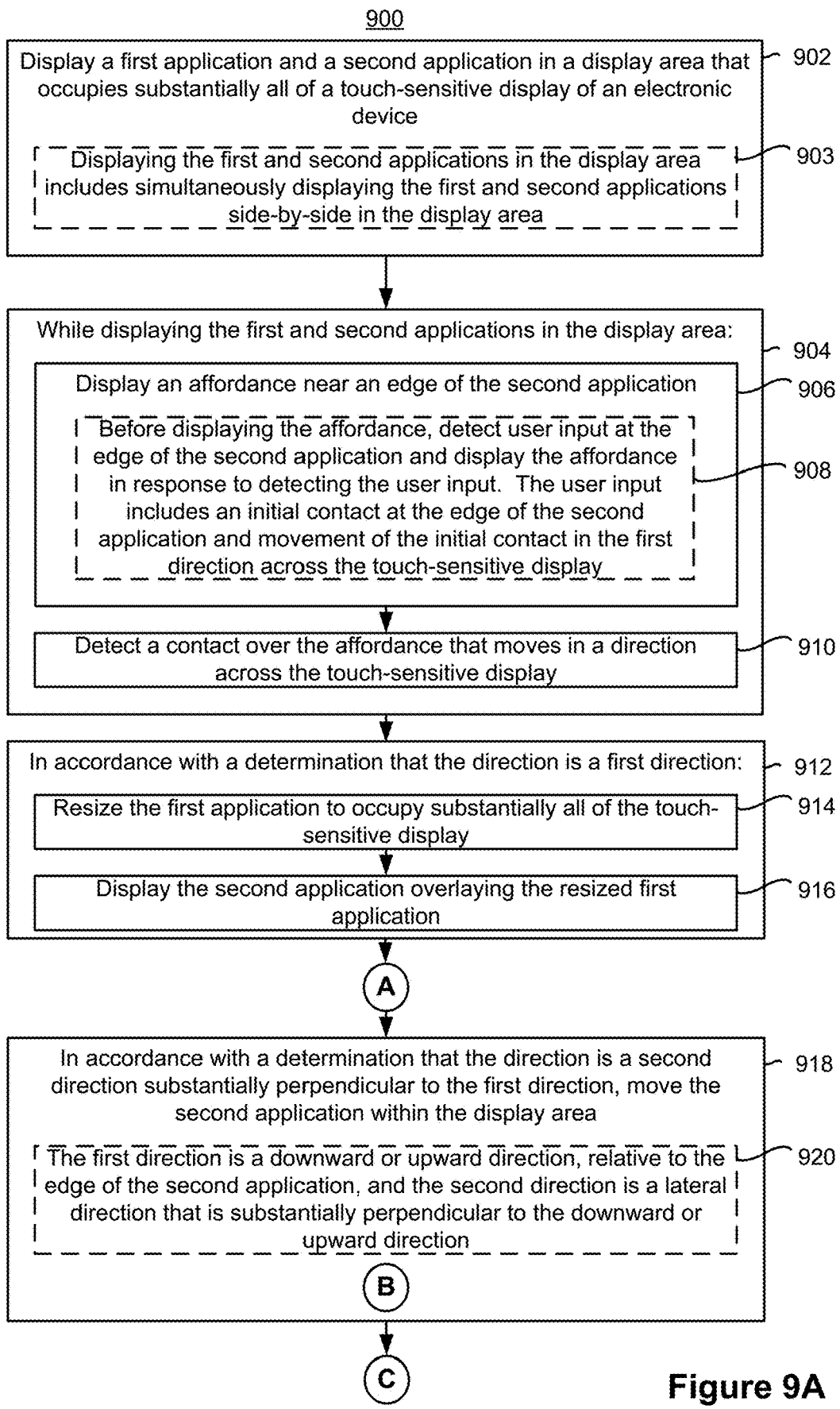

FIGS. 9A-9B are a flowchart representation of a method of interacting with a single affordance to switch between a split-view mode (in which two applications are pinned together and displayed side-by-side on the display) and a slide over mode (in which one application is displayed overlaying another application on the display), in accordance with some embodiments. FIGS. 5A-5O are used to illustrate the methods and/or processes of FIGS. 9A-9B. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 900 is performed by an electronic device (e.g., portable multifunction device 100, FIG. 1A and/or one or more components of the electronic device (e.g., I/O subsystem 106, operating system 126, etc.). In some embodiments, the method 800 is governed by instructions that are stored in a non-transitory computer-readable storage medium and that are executed by one or more processors of a device, such as the one or more processors 122 of device 100 (FIG. 1A). For ease of explanation, the following describes method 900 as performed by the device 100. In some embodiments, with reference to FIG. 1A, the operations of method 800 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 900 are, optionally, combined and/or the order of some operations is, optionally, changed.

As described below, the method 900 provides an intuitive way to switch between split-view and slide-over modes, and also to manipulate locations at which multiple applications are simultaneously displayed. The method reduces the number of inputs required from a user to switch between these modes (e.g., users need only provide a simple gesture instead of performing multiple inputs) and, thereby, ensures that battery life of an electronic device implementing the method 900 is extended, since less power is required to process the fewer number of inputs (and this savings will be realized over and over again as users become increasingly familiar with the more intuitive and simple gesture). As is also explained in detail below, the operations of method 900 help to ensure that users are able to engage in sustained interactions (e.g., they do not need to frequency undo behaviors, which interrupts their interactions with their devices) and the operations of method 900 help to produce more efficient human-machine interfaces.

In some embodiments, a device performing method 900 first displays (902) a first application and a second application in a display area that occupies substantially all of a touch-sensitive display. In some embodiments, the first application is a primary application that is displayed as occupying approximately ⅔ (roughly 66%) of an available display area of the display 112 (e.g., Application 1 displayed as occupying a right side of the display 112, FIG. 5A) and the second application is a side application that is pinned next to the primary application and is displayed as occupying a remaining ⅓ (roughly 33%) of the available display area of the display 112 (e.g., the video-browsing application displayed as occupying a left side of the display 112, and pinned next to Application 1 in a split-view mode).

In some embodiments, displaying the first and second applications in the display area includes (903) simultaneously displaying the first and second applications side-by-side in the display area.

While displaying the first application and the second application in the display area (904), the device may perform operations 906, 908, and 910. At operation 906, the device displays an affordance near an edge of the second application. For example, the affordance is a user interface object (e.g., handle 506, FIG. 5B) that is displayed near a top-most portion of the second application and the handle is displayed in response to an activation gesture (as is discussed in reference to operation 908). At 908, in some embodiments, before displaying the affordance, the device detects user input at the edge of the second application (e.g., a contact associated with gesture 508, FIG. 5A) and displays the affordance in response to detecting the user input (FIG. 5B). In this way, the users are provided with a simple gesture that is used to activate display of the handle, thereby enhancing operability of the device (e.g., by ensuring that the handle is only displayed when it is needed by a user).

In some embodiments, also at operation 908, the user input may include an initial contact (e.g., associated with gesture 508) at the edge of the second application and movement of the initial contact in the first direction across the touch-sensitive display. In some embodiments, the device detects that the contact has moved at least a threshold distance, such as 1-2 centimeters, away from the edge before displaying the affordance. As discussed above, this provides users with a simple gesture that is used to activate display of the handle, thereby enhancing operability of the device (e.g., by ensuring that the handle is only displayed when it is needed by a user).

At 910 (which is also performed while displaying the first and second applications in the display area), the device detects (910) a contact (distinct from the initial contact discussed above, such as a contact associated with gesture 509, FIG. 5B) over the affordance that moves in a direction across the touch-sensitive display. In accordance with a determination that the direction is a first direction (912) (e.g., the contact associated with gesture 509 is shown as moving in a substantially downward direction relative to the top-most edge of the second application, FIG. 5B), the device performs operations 914 and 916. Operation 914 includes resizing the first application to occupy substantially all of the display area (e.g., as shown in FIG. 5C, Application 1 now occupies substantially all of the display area for the touch-sensitive display 112); and operation 916 includes displaying the second application overlaying the resized first application (e.g., as is also shown in FIG. 5C, the video-browsing application is displayed as overlaying the now-resized Application 1).

The method 900 also checks whether the direction is a second direction, instead of the first direction discussed above and, if so, the method proceeds to move an application over which the affordance 506 is displayed (instead of switching between split-view and slide-over modes). Specifically, in accordance with a determination that the direction is a second direction, substantially perpendicular to the first direction (e.g., within +/−5 degrees of perpendicular from the first direction), the device moves (918) the second application within the display area. For example, a contact associated with gesture 512 is shown in FIGS. 5F-5G as moving in the second direction (e.g., a substantially left-to-right direction across the touch-sensitive display), and the second application is then moved laterally within the display area (e.g., from a right-most position, FIG. 5F, to a leftmost position in FIG. 5H). In some instances, users of computing systems must employ inefficient and time-consuming interactions to operate two or more applications. Allowing a user to interact with an affordance (such as a handle, in conjunction with at least operations 902, 904, 906, 910, 912, 914, 916, and 918) to either activate a slide-over mode or move a particular application within the display area enables users to easily and efficiently move applications around and switch between a side-by-side view or a slide-over view. Enabling users to easily and efficiently move applications around and to switch between different modes of using two or more applications at the same time enhances operability of the device and makes the human-machine interface more efficient (e.g., by enabling the users to choose how to interact with the two or more applications at the same time, e.g., using a side-by-side view or using a slide-over/overlay mode). Additionally, this enables a sustained interaction with the touch-sensitive display that would not otherwise be possible due to having to employ multiple gestures to customize simultaneous interactions with two or more applications.

As briefly mentioned above, in some embodiments, the first direction is a downward direction, relative to the edge of the second application (e.g., the direction travelled by gesture 508, FIG. 5A), and the second direction is a lateral direction that is substantially perpendicular to the downward direction (e.g., the direction travelled by gesture 512, FIGS. 5F-5G). Allowing users to move a handle in different directions helps to offer users additional and simple ways to flexibly customize how they want to simultaneously interact with two applications that are displayed at the same time. Enabling users to customize their user experiences in this way enhances operability of the device and makes the human-machine interface more efficient (e.g., their customized selections with respect to where each application should be displayed allows them to use various features more efficiently instead of having to make a default arrangement work). Additionally, this enables a sustained interaction with the touch-sensitive display that would not otherwise be possible due to users being forced to interact with two or more applications that are displayed together in a default way and without any user-specific customizations.

Turning now to FIG. 9B, before performing operation 918, the device detects (922) user input at the resized first application while the second application is overlaying the resized first application (e.g., a contact 510 over link 504 is received, FIG. 5C). The device then responds (924) to the user input via the first application (e.g., content associated with the link 504 is opened, FIG. 5D). In other words, the first application is still usable while the second application overlays it (e.g., the first application is still usable as features of the first application are still functional even during the overlay/slide-over mode). In some embodiments, both of the first and second applications are usable at the same time, allowing users to simultaneously interact with various features of each of the two applications, even when the second application is overlaying the first application. Allowing users to interact with the first application, even while the second application is overlaid on top of the first application enables users to customize how they want to simultaneously interact with two applications that are displayed at the same time. Enabling users to customize their user experiences in this way enhances operability of the device and makes the human-machine interface more efficient (e.g., their customized selections will allow them to use various features more efficiently instead of having to make a default arrangement work). Additionally, this enables a sustained interaction with the touch-sensitive display that would not otherwise be possible due to users being forced to interact with two or more applications that are displayed together in a default way and without any user-specific customizations.

In some embodiments, after performing operations 922 and 924 (or, alternatively, before performing these operations) the device, in response to a request to open a third application (e.g., a contact 516 over a camera application, FIG. 5K), distinct from the first and the second applications, displays (926): (i) the third application in a portion of the display area previously occupied by the first application and (ii) the second application overlaying the third application. For example, as shown in FIGS. 5K-5L, a user activates their home screen and requests to open the third application by clicking on an affordance corresponding to the third application. In response to that request, the third application is then displayed in a portion of the display area previously occupied by the first application and the second application is displayed overlaying the third application. In other words, the overlaying application (e.g., the second application) remains even after the user switches to open up a new application. Allowing an overlaid application to remain displayed after users have opened up a new application helps to ensure that a sustained interaction is maintained with features of the electronic device (e.g., features accessed by the user through the overlaid application that may have to be re-opened again if the overlaid application did not remain displayed). Because users are also able to avoid having to re-open features of the overlaid application, the operability of the device is improved and the human-machine interface is also made to operate more efficiently.

Referring back to the descriptions of operation 918 in which it is determined that the direction (travelled by the contact that is over the affordance) is the second direction, in some embodiments, additional operations shown at 928 are also performed. First, the second application is initially displayed as bordering a first edge of the touch-sensitive display (e.g., the video-browsing application shown in FIG. 5F is shown as bordering a right-most edge of the touch-sensitive display 112). Also, moving the second application within the display area may include: moving the second application in the second direction until the second application borders a second edge, opposite to the first edge, of the touch-sensitive display (e.g., the video-browsing application follows the gesture 512 as it moves across the touch-sensitive display 112, as is shown in FIG. 5G and then the video-browsing application ceases moving upon reaching the second edge). In these embodiments, moving the second application within the display area may also include: displaying the first application in a remaining portion of the display area, distinct from a portion occupied by the second application, so that the first application borders the first edge of the touch-sensitive display (as is shown in FIG. 5H). Allowing users to move around an application by dragging the affordance 506) helps to enable users to customize how they want to simultaneously interact with two applications that are displayed at the same time. Enabling users to customize their user experiences in this way enhances operability of the device and makes the human-machine interface more efficient (e.g., their customized selections with respect to where each application should be displayed allows them to use various features more efficiently instead of having to make a default arrangement work). Additionally, this enables a sustained interaction with the touch-sensitive display that would not otherwise be possible due to users being forced to interact with two or more applications that are displayed together in a default way and without any user-specific customizations.

In the embodiments described above in reference to 928, before moving the second application until the second application borders the second edge, a preview of the portion occupied by the second application is revealed next to the first application (930). In some instances, users of computing systems may not appreciate the changes that will result from certain interactions on the touch-sensitive display. Providing clear visual feedback (e.g., showing a preview of where the second application will be move to) gives the user an opportunity to preview changes that will occur after they release (or liftoff) the contact. Providing this clear visual feedback enhances operability of the device and makes the human-machine interface more efficient (e.g., by enabling the users to understand changes that will occur and to avoid having to reverse unwanted changes). Additionally, this enables a sustained interaction with the touch-sensitive display that would not otherwise be possible due to users having to repeatedly undo or reverse undesired changes that they were not able to anticipate.

Turning now to FIG. 9C, additional interactions that are available after an overlaid application is displayed are shown in operations 932, 934, and 936. For instance, at operation 932, after resizing the first application and displaying the second application overlaying the resized first application (e.g., as shown in FIG. 4AI, the web-browsing application is overlaying Application 1): the device detects an additional contact over the affordance (e.g., a contact associated with gesture 482, FIG. 4AI) and movement of the additional contact in a third direction that is opposite to the first direction (e.g., in a substantially upward direction as shown in FIG. 4AI). In response to detecting that the additional contact has moved the threshold distance (e.g., 1-2 centimeters) in the third direction, the device ceases to display the second application overlaying the resized first application and re-displays the first application and the second application in the display area that occupies substantially all of the touch-sensitive display (e.g., as shown in FIG. 4AJ, the web-browsing application is now pinned next to Application 1, so that the two applications occupy substantially all of the touch-sensitive display and are displayed in a side-by-side/split-view format).

With continuing reference to FIG. 9C, in some embodiments, after resizing the first application and displaying the second application overlaying the resized first application (e.g., as shown in FIG. 4AI, the web-browsing application is overlaying Application 1): the device detects (934) an additional contact over the affordance and movement of the additional contact in the first direction (e.g., a contact associated with gesture 487, FIG. 4AO, is over the affordance 467 and moves in the first direction). Although the example in FIG. 4AO shows that two applications are displayed side-by-side and another application is overlaying those two applications, the gesture 487 may be available when an overlaid application is displayed over a single application as well (e.g., the gesture 487 may be performed over the affordance 467 of FIG. 4AI as well). In response to detecting that the additional contact has moved a second threshold distance (e.g., 1-2 centimeters) across the touch-sensitive display, the device scales down content associated with the second application in accordance with movement of the additional contact until a user interface object with a representation of an affordance corresponding to the second application is displayed (e.g., the content is scaled down until the content is no longer displayed and instead the UI object 473-B is displayed, as is shown in FIG. 4AP).

In some embodiments, users are then able to move the UI object 473-B to dismiss the second application completely or to pin the second application next to the first application. For example, in accordance with a determination that the additional contact moves over a dock and is lifted off from the touch-sensitive display (e.g., a contact associated with gesture 488, FIGS. 4AO-4AQ, is dragged on top of the dock 408 and is then lifted off (not pictured)), the device dismisses the second application and displays the first application occupying substantially all of the touch-sensitive display (e.g., the user interface shown in FIG. 4AG is displayed in which Application 1 occupies substantially all of the touch-sensitive display); and, in accordance with a determination that the additional contact moves to within a threshold distance of an edge of the touch-sensitive display (e.g., to within one of the thresholds 464, 465 pictured in FIGS. 4AB-4AE) and is lifted off from the touch-sensitive display, the device re-displays the first application and the second application in the display area that occupies substantially all of the touch-sensitive display (e.g., displays the user interface shown in FIG. 4AJ, in which Application 1 is displayed side-by-side in a split-view mode with the web-browsing application).

Although the examples provided above are generally with reference to overlaying a second application on top of a currently displayed first application, in some embodiments, an application may be overlaid on top of two applications that are pinned in a side-by-side display format. Examples of this are provided in FIGS. 4AJ-4AR, and descriptions are also provided above. Aspects of these examples may supplement and/or replace certain operations described above regarding method 900.

It should be understood that the particular order in which the operations in FIGS. 9A-9B have been described is merely one example and is not intended to indicate that the described order is the only order in which the operations could be performed. One of ordinary skill in the art would recognize various ways to reorder the operations described herein. Additionally, the method 900 may be supplemented (or various operations reordered) to incorporate aspects of, e.g., method 800 relating to using a dock to activate the split-view mode. For brevity, these details are not repeated here.

Figure 10A:
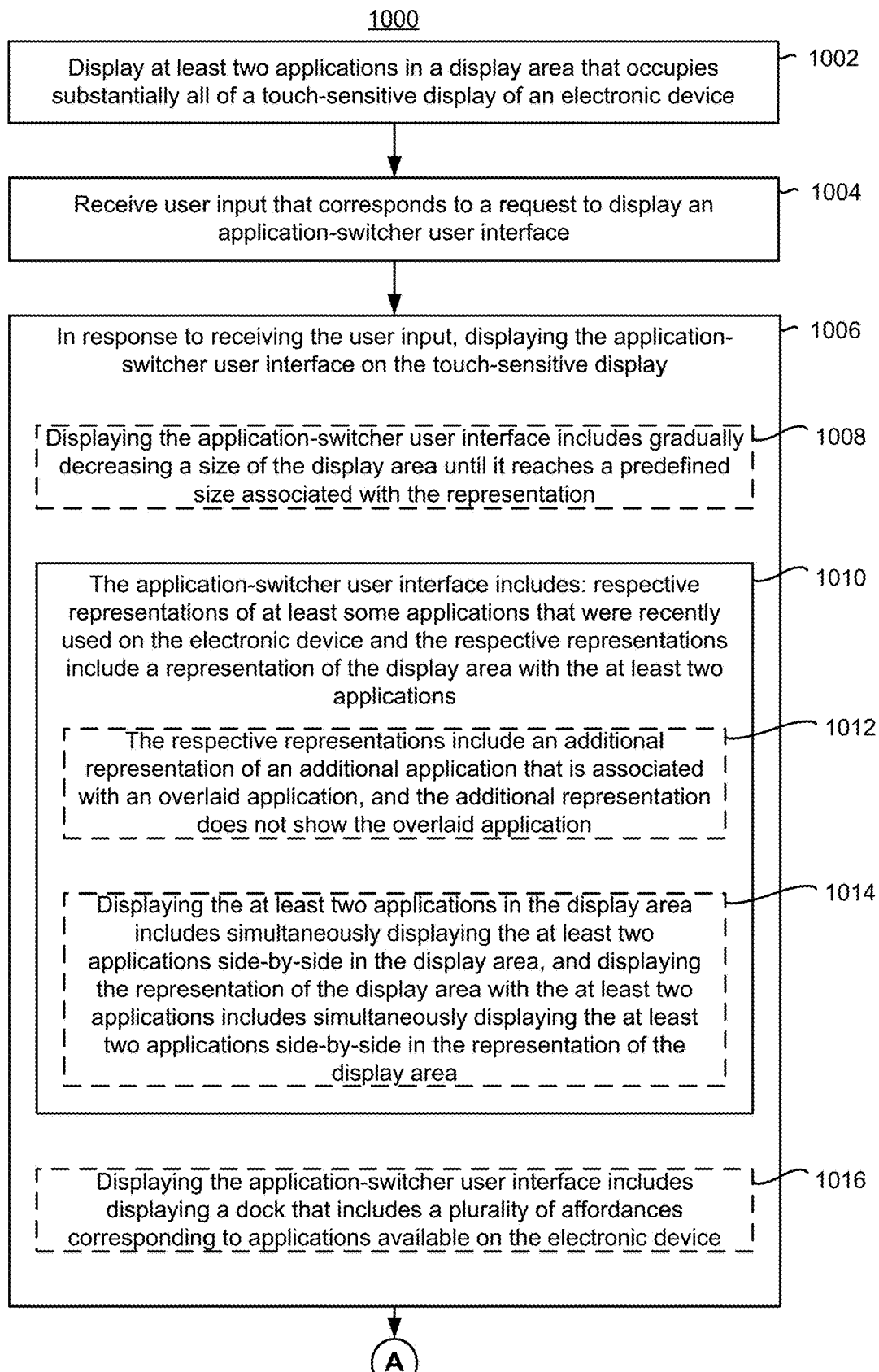
FIGS. 10A-10C are a flowchart representation of a method of utilizing an application-switcher user interface to display representations of applications that are pinned together, in accordance with some embodiments.
Figure 10B:
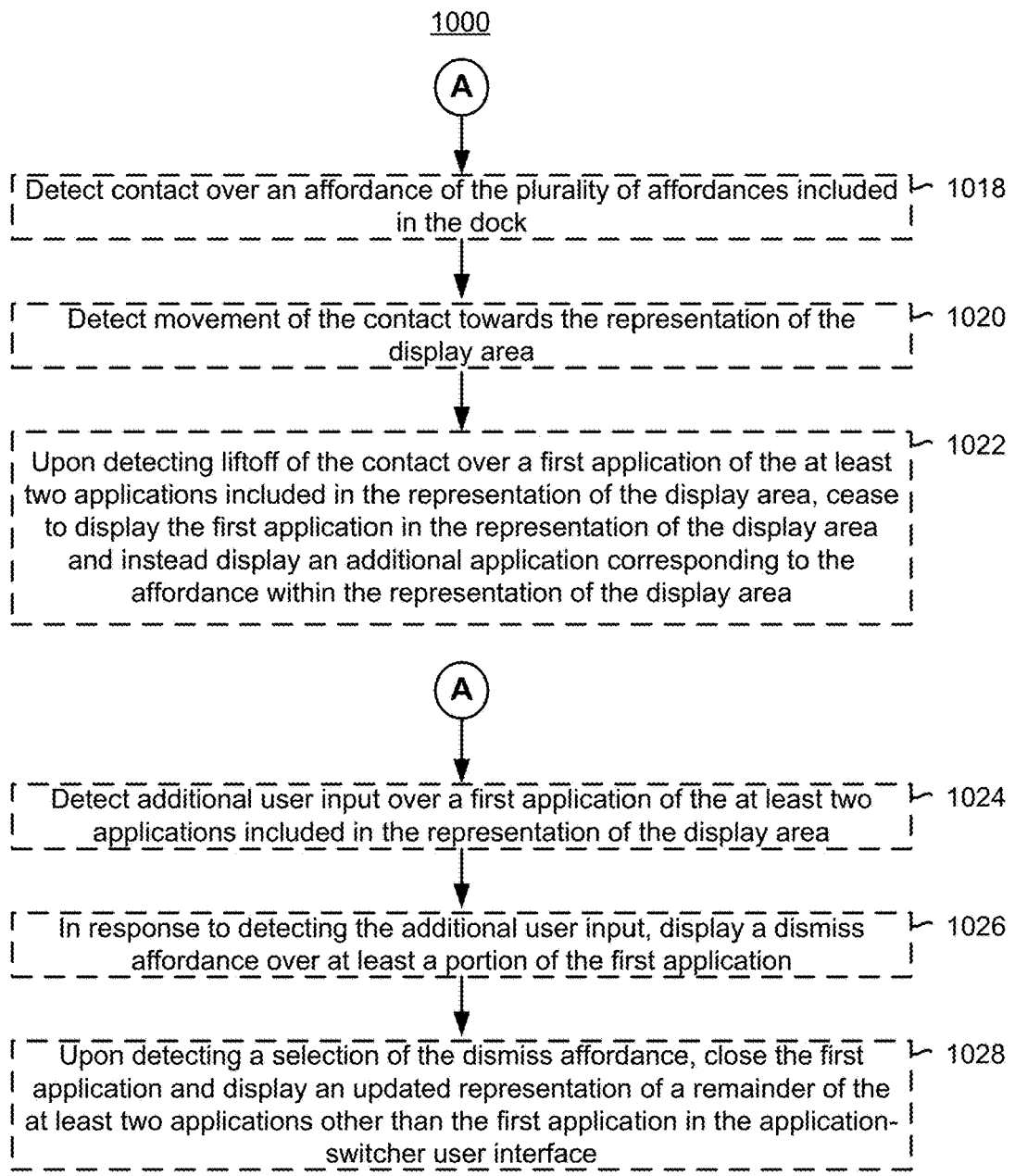
Figure 10C:
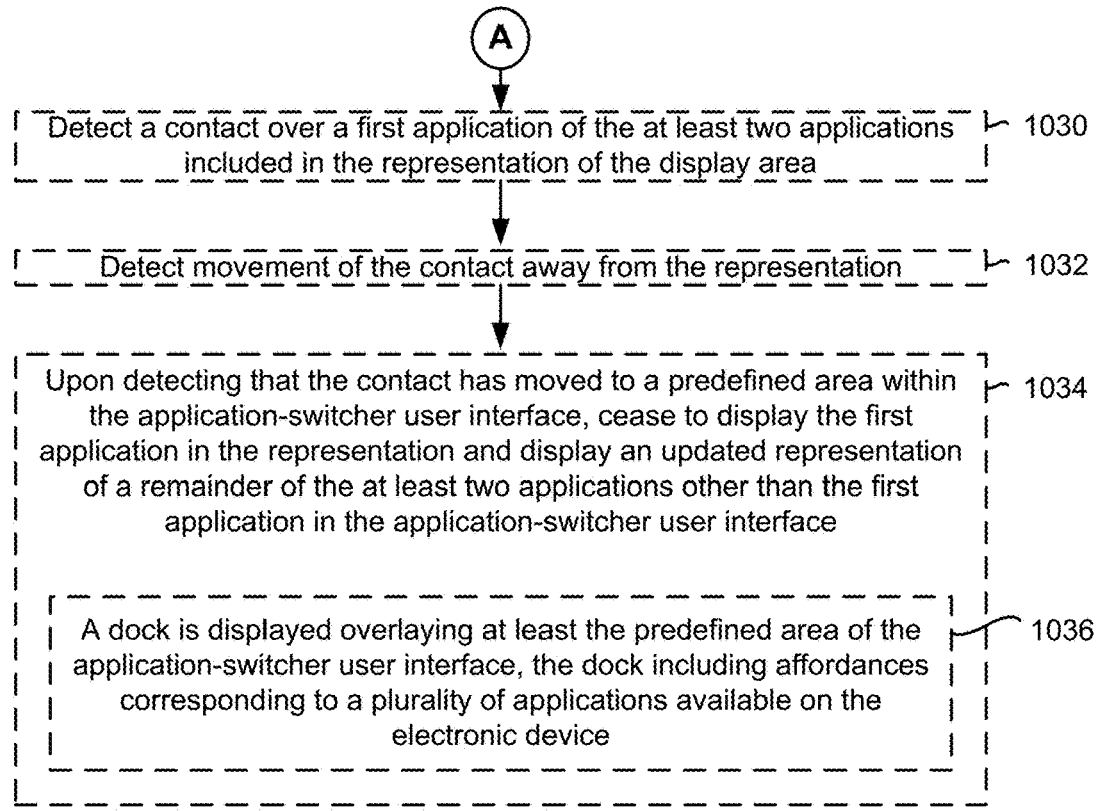

FIGS. 10A-10C are a flowchart representation of a method 1000, in accordance with some embodiments. FIGS. 6A-6Q are used to illustrate the methods and/or processes of FIGS. 10A-10C. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 1000 is performed by an electronic device (e.g., portable multifunction device 100, FIG. 1A and/or one or more components of the electronic device (e.g., I/O subsystem 106, operating system 126, etc.). In some embodiments, the method 1000 is governed by instructions that are stored in a non-transitory computer-readable storage medium and that are executed by one or more processors of a device, such as the one or more processors 122 of device 100 (FIG. 1A). For ease of explanation, the following describes method 1000 as performed by the device 100. In some embodiments, with reference to FIG. 1A, the operations of method 1000 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 1000 are, optionally, combined and/or the order of some operations is, optionally, changed.

As described below, the method 1000 provides intuitive and seamless interactions for multitasking on a handheld electronic device. The method 1000 reduces the number of inputs from a user in order to display multiple applications and switch to different applications on the device, thereby creating a more efficient human-machine interface. For battery-operated electronic devices, providing interactions for multitasking both conserves power and increases the time between battery charges (e.g., by saving the time and energy-draining operations when a user has to close one application and open another application).

Referring now to FIG. 10A, in performing the method 1000, the device simultaneously displays (1002) at least two applications in a display area that occupies substantially all of the touch-sensitive display. For example, in FIG. 6A, a first application (Application 1) is displayed adjacent to/side-by-side with a second application (Application 2 or video application) and the two applications are displayed in the display area 601a that occupies substantially all of the touch screen 112.

The device receives (1004) user input that corresponds to a request to display an application-switcher user interface. In some embodiments, the application-switcher user interface may refer to a user interface in which representations of recently used applications are displayed (e.g., applications that were opened and used in a foreground of the electronic device, and have not yet been closed by a user of the device). In some embodiments, the user input may correspond to a double tap input at a physical or solid-state home button of the electronic device or may alternatively correspond to a continuous upward gesture across the touch-sensitive display (e.g., the gesture 602, FIGS. 6A-6D and 6O-6P). For example, in some embodiments, a gesture from an edge of the screen to a first threshold distance (e.g., 1-2 centimeter) displays the dock and it begins to follow the gesture as it moves across the display; after the gesture has moved a second threshold distance (e.g., 2-4 centimeter in total or an additional 1-2 centimeter beyond the first threshold distance) the dock remains in a static position and no longer follows the gesture; as the gesture 602 continues moving beyond the second threshold distance, then the currently displayed application begins to scale down in size and an application-switcher user interface is displayed; and once the gesture moves at least a third threshold distance (e.g., 3-6 centimeter in total or an additional 1-2 centimeter beyond the second threshold distance), then the application-switcher user interface is displayed.

In response to receiving the user input, the device displays (1006) the application-switcher user interface on the touch-sensitive display (e.g., the application-switcher user interface, FIGS. 6D-6M and 6P-6Q). In some embodiments, displaying the application-switcher user interface includes (1008) gradually decreasing a size of or scaling the display area until it reaches a predefined size associated with the representation. For example, in FIGS. 6D-6E, the size of the display area 601a shown in FIG. 6A gradually decreases, until the miniaturized view of the display 601a reaches a predefined size associated with the representation. In this way, users are provided with a clear visual indication as to where the pinned applications they were viewing will be located within the application-switcher user interface, which helps to enhance operability of the device (e.g., by ensuring that users are able to easily locate the pinned applications within the application-switcher UI and without having to waste time trying to locate their placement within this UI).

In some embodiments, the application-switcher user interface includes (1010) respective representations of at least some applications that were recently used on the electronic device, and the respective representations include a representation of the display area with the at least two applications. For example, in FIGS. 6P and 6Q, the representation 638 includes a representation of a display area with two applications, Application 4 and Application 5. In some embodiments, the respective representations show an active state (e.g., the last displayed screen for a particular application) for each of the at least some applications that were recently used on the electronic device. In some embodiments, the representation of the display area with the at least two applications is a miniaturized view of the display area that previously occupied substantially all of the touch-sensitive display. For example, in FIG. 6E, the representation 604 includes a miniaturized view of the display area 601a shown in FIG. 6A and the miniaturized view shows the display of the Application 1 and the video application side-by-side.

In some embodiments, the respective representations include (1012) an additional representation of an additional application that is associated with an overlaid application, and the additional representation does not show the overlaid application. For example, as shown in FIG. 6N, the additional application is Application 1 and Application 2, the video application is overlaid on top of Application 1. Application 1 is displayed in the display area 601b that occupies substantially all of the touch-sensitive display 112. In FIG. 6P-6Q, the additional representation 634 does not show the overlaid video application. In this way, the human-machine interface is made more efficient by only presenting representations of pinned applications (which may be interacted with directly within the application-switcher user interface) and not presenting representations of overlaid applications. To avoid cluttering the application-switcher user interface, the additional representation representing Application 1 in some embodiments does not show the overlaid second application.

In some embodiments, displaying the at least two applications in the display area includes (1014) simultaneously displaying the at least two applications side-by-side in the display area (e.g., Application 1 and the video application in FIG. 6A), and displaying the representation of the display area with the at least two applications includes simultaneously displaying the at least two applications side-by-side in the representation of the display area (e.g., the representation 604 is a miniaturized view of a split-view mode that shows Application 1 and the video application, FIGS. 6D-6F).

In some embodiments, displaying the application-switcher user interface includes (1016) displaying a dock that includes a plurality of affordances corresponding to applications available on the electronic device, e.g., the dock 408 in FIGS. 6B-6M and 6O-6Q that includes a plurality of affordances. In such embodiments, with reference to FIG. 10B, the device further detects (1018) contact (e.g., the contact 603, FIG. 6F) over an affordance of the plurality of affordances included in the dock (e.g., the contact 603 over the browser affordance in the dock 408, FIG. 6F) and detects (1020) movement of the contact towards the representation of the display area (e.g., the movement of the contact 603 away from the dock 408 and heading to the representation 604, FIG. 6F) without detecting liftoff between detecting the contact and the movement. In some embodiments, upon detecting liftoff of the contact over a first application of the at least two applications included in the representation of the display area, the device ceases (1022) to display the first application in the representation of the display area and instead displays an additional application corresponding to the affordance within the representation of the display area. For example, in FIGS. 6F-6G, after detecting the lift-off of the contact, the representation 604 is updated to show that the web-browsing application is now display side-by-side with Application 1 (and memory of the device 100 may also be update to reflect that these applications are pinned together). In the updated representation 616, the video application is dismissed from the representation 604 and replaced by the web-browsing application.

As discussed above, allowing a user to view a representation within an application-switcher user interface that shows applications that are displayed in a split-view mode enables users to easily and efficiently identify pinned applications. By also enabling users to interact with the pinned applications directly from an application-switcher user interface, operability of the device is enhanced and the human-machine interface is made to operate more efficiently (e.g., directly interacting with the pinned applications from within the application-switcher user interface ensures that users avoid having to exit the application-switcher user interface in order to perform their interactions). Additionally, this enables a sustained interaction with the touch-sensitive display that would not otherwise be possible due to having to employ multiple gestures to leave the application-switcher user interface and then start interacting with (or dismissing/replacing) the pinned applications.

In some embodiments, while displaying the application-switcher user interface, the device detects (1024) additional user input (e.g., a non-tap selection 618b, such as a contact lasting for more than a predefined amount of time (a long-press) or a contact with an intensity increasing above a threshold intensity (e.g., a deep/hard press) as shown in FIG. 6I) over a first application of the at least two applications included in the representation of the display area. In response to detecting the additional user input, in some embodiments, the device displays (1026) a dismiss affordance over at least a portion of the first application (e.g., the dismiss affordance 620 corresponds to an "x" displayed over the portion of the first application, as shown in FIGS. 6I and 6J). Upon detecting a selection of the dismiss affordance (e.g., detecting user input 622, FIG. 6J), the device closes (1028) the first application and displaying an updated representation of a remainder of the at least two applications other than the first application in the application-switcher user interface, e.g., in FIG. 6K, the updated representation 624 shows Application 1 as the remainder of the two applications previously displayed in the representation 604.

As discussed above, allowing a user to view a representation within an application-switcher user interface that shows applications that are displayed in a split-view mode enables users to easily and efficiently identify pinned applications. By also enabling users to interact with the pinned applications directly from an application-switcher user interface, operability of the device is enhanced and the human-machine interface is made to operate more efficiently (e.g., directly interacting with the pinned applications from within the application-switcher user interface ensures that users avoid having to exit the application-switcher user interface in order to perform their interactions). Additionally, this enables a sustained interaction with the touch-sensitive display that would not otherwise be possible due to having to employ multiple gestures to leave the application-switcher user interface and then start interacting with the pinned applications.

Referring now to FIG. 10C, in some embodiments, the device detects (1030) a contact over a first application of the at least two applications included in the representation of the display area and detects (1032) movement of the contact away from the representation of the display area (e.g., the drag gesture 626 with a first portion being a contact over the video application in the representation 604 and with a second portion being a movement of the contact away from the representation 604, FIG. 6L). Upon detecting that the contact has moved to a predefined area within the application-switcher user interface, the device ceases (1034) to display the first application in the representation and displays an updated representation of a remainder of the at least two applications other than the first application in the application-switcher user interface. In such embodiments, a dock is displayed (1036) overlaying at least the predefined area of the application-switcher user interface, the dock including affordances corresponding to a plurality of applications available on the electronic device (in other words, movement of the contact to the predefined area includes movement of the contact to within the dock). For example, in FIG. 6L, the dock 408 includes the phone affordance, the mail affordance, the browser affordance, and the notes affordance that correspond to the phone, mail, web-browsing, and notes applications available on the device 100. Also shown in FIG. 6L, upon detecting the dragging 626 of the video application over the dock 408, the device dismisses the video application from the representation 604. As shown in FIG. 6M, the updated representation 624 includes Application 1 as the remainder of the two applications previously included in the representation 604. By displaying the dock (additional details and examples regarding the dock are provided above in reference to method 800) overlaying at least the predefined area, users are provided with a target towards which to drag applications that are being dismissed, thereby enhancing operability of the device (e.g., by ensuring that users may dismiss applications directly from the app-switcher UI and without having to waste inputs by leaving the app-switcher UI and dismissing applications using numerous, complicated, and difficult-to-remember combinations of inputs).

In this way, the users are provided with a simple gesture that is used to dismiss a pinned application directly from the application-switcher user interface, thereby enhancing operability of the device (e.g., by ensuring that users may dismiss applications directly from the app-switcher UI and without having to waste inputs by leaving the app-switcher UI and dismissing applications using numerous, complicated, and difficult-to-remember combinations of inputs).

It should be understood that the particular order in which the operations in FIG. 10A-10C have been described is merely one example and is not intended to indicate that the described order is the only order in which the operations could be performed. One of ordinary skill in the art would recognize various ways to reorder the operations described herein. For brevity, these details are not repeated here.

Figure 11A:
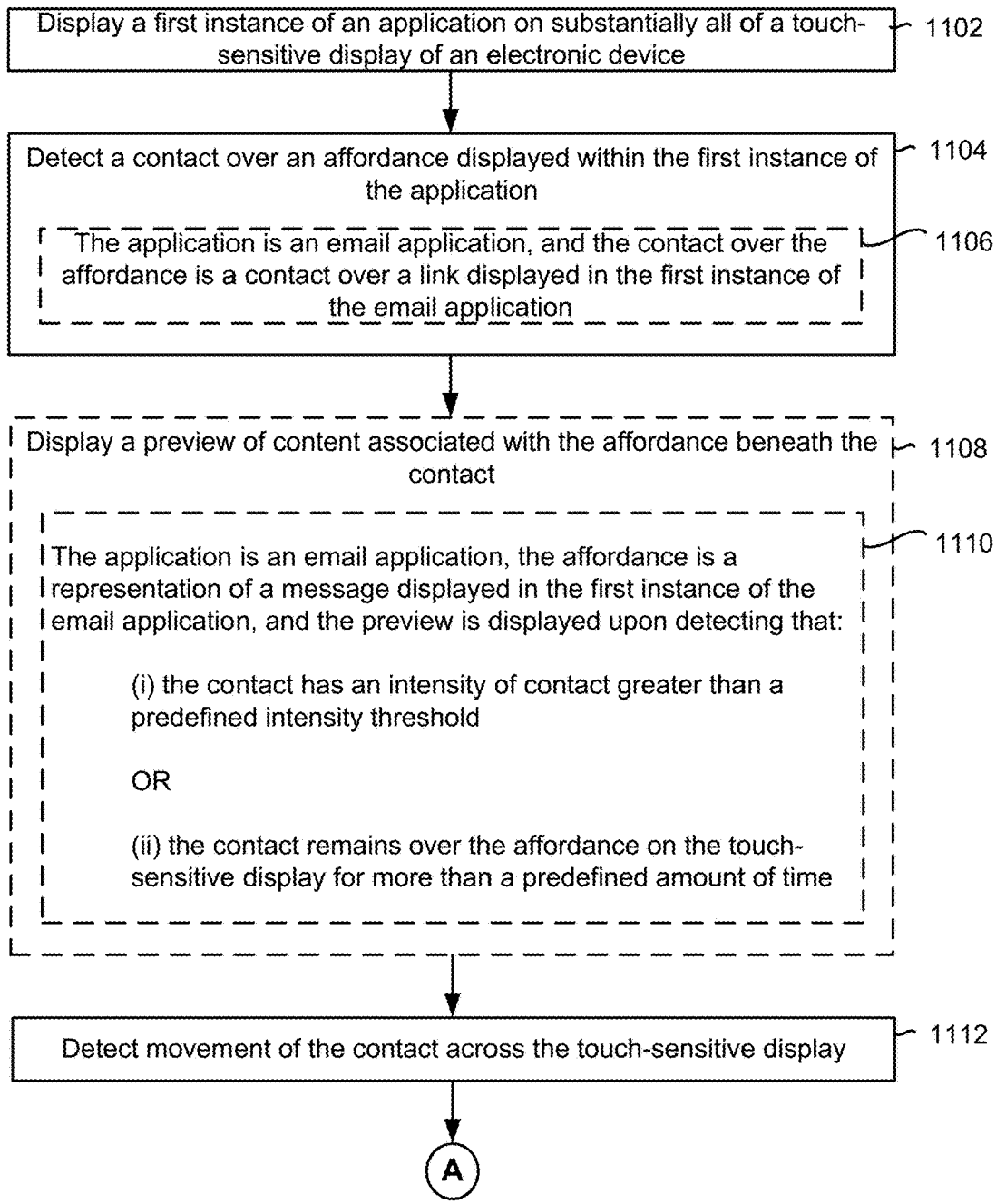
FIGS. 11A-11B are flowcharts depicting a method 1100 for activating two or more instances of the same application.
Figure 11B:
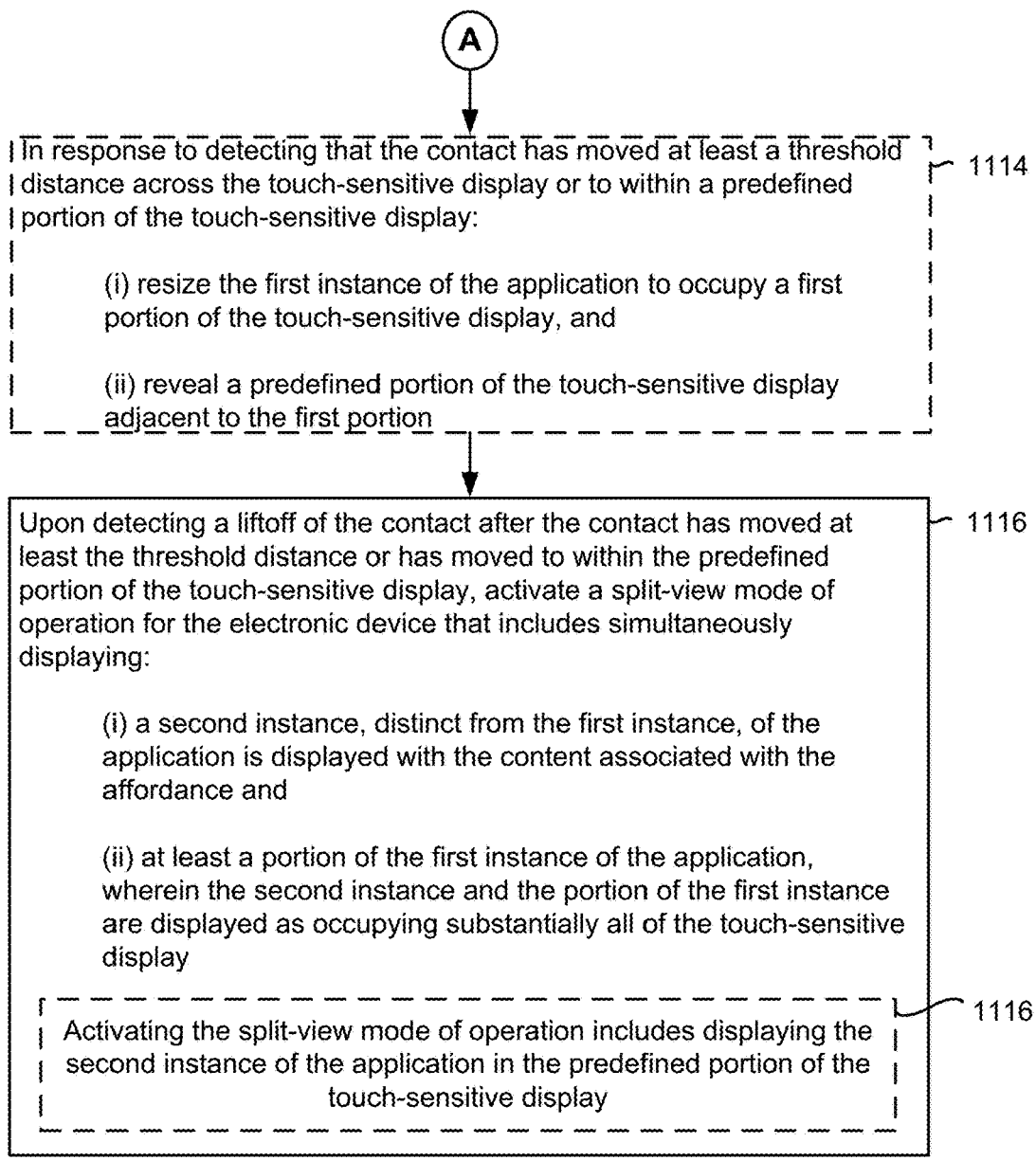

FIGS. 11A-11B are flowcharts depicting a method 1100 for activating two or more instances of the same application. FIGS. 7A-7L are used to illustrate the methods and/or processes described in relation to FIGS. 11A-11B.

In some embodiments, the method 1100 is performed by an electronic device (e.g., portable multifunction device 100, FIG. 1A and/or one or more components of the electronic device (e.g., I/O subsystem 106, operating system 126, etc.). In some embodiments, the method 1100 is governed by instructions that are stored in a non-transitory computer-readable storage medium and that are executed by one or more processors of a device, such as the one or more processors 122 of device 100 (FIG. 1A). For ease of explanation, the following describes method 1100 as performed by the device 100. In some embodiments, with reference to FIG. 1A, the operations of method 1100 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 1100 are, optionally, combined and/or the order of some operations is, optionally, changed.

As described below, the method 1100 provides an intuitive way to activate two or more instances of the same application. Occasionally, users of computing systems lose access to certain features of an application after selecting to open other features within an application (e.g., users may be unable to view a received email after selecting an option to reply to that received email). Opening multiple instances of a single application allows users to continue viewing and using these certain features. Enabling users to continue viewing and using these certain features enhances operability of the device and makes the human-machine interface more efficient (e.g., by enabling the users to use these certain features without having to provide multiple inputs in order to re-open these certain features after they have been closed). Additionally, this enables a sustained interaction with the touch-sensitive display that would not otherwise be possible due to having to employ multiple gestures or inputs to figure out how to re-open or access these certain features after they have been closed or are no longer displayed.

According to some embodiments, a method 1100 is provided for activating two or more instances of the same application. For example, a first instance of a mail application (e.g., displaying an inbox) is open on one side of the screen, while a second instance of the same mail application (e.g., displaying an individual email reply) is open on the other side of the screen. An instance is a concrete single occurrence of an object, existing usually during the runtime of a computer program, e.g., each time a program or application runs, it is an instance of that program. In some embodiments, the method is performed at an electronic device (e.g., portable multifunction device 100, FIG. 1A) with a touch-sensitive display (e.g., touch screen 112, FIG. 1C) and one or more processors.

In this embodiment, initially, a first instance of an application is displayed 1102 on substantially all of the touch-sensitive display. Then, a contact is detected 1104 over an affordance displayed within the first instance of the application. For example, at 1106, the application is an email application, and the contact over the affordance is a contact over a link or affordance (e.g., a reply arrow or affordance, a reply all affordance, a compose new message link or affordance, or a hyperlink) displayed in the first instance of the email application.

In some embodiments, the user input or contact is not a simple tap or touch, but, instead, is a deep or harder press (e.g., a press with a force or intensity above a predetermined contact force or intensity—see description relating to FIGS. 3A-3C) or a press-and-hold for over a predetermined amount of time (e.g., 1-3 second). The touch screen (112 of FIG. 1 A), processors (122 of FIG. 1A), contact intensity sensors (165 of FIG. 1), and/or the intensity sensor controller (159 of FIG. 1) determine whether the user input (e.g., contact or gesture) is of a predetermined type (e.g., deep-press or press-and-hold) over the reply affordance.

Upon detecting the contact over the reply affordance (and in some embodiments, determining that the user input or contact is of a predetermined type), the touch screen displays 1108 a preview of a new instance of the application. For example, at 1110, the application is an email application, the affordance is a representation of a message displayed in the first instance of the email application, and the preview is displayed upon detecting that the contact has an intensity of contact greater than a predefined intensity threshold or the contact remains over the affordance on the touch-sensitive display for more than a predefined amount of time (referred to as a press-and-hold contact or gesture).

Movement of the contact is then detected 1112 across the touch-sensitive display. In some embodiments, this movement needs to occur without a liftoff of the contact between the initial contact and the movement (e.g., the contact is continuous and without a liftoff of the contact from the touch-sensitive display).

Then, at 1114, in response to detecting that the contact has moved more than a threshold distance (e.g., 1-2 centimeters) across the touch sensitive display, (i) the first instance of the application is resized to occupy a first portion (e.g., a left half) of the touch-sensitive display, and (ii) a predefined portion of the touch sensitive display adjacent the first portion (e.g., the second portion) (e.g., the right third to half of the display) is revealed. In other embodiments, in response to detecting that the contact has moved to a predetermined portion (e.g., the second portion below) of the touch screen (e.g., to the right third to half of the screen), (i) the first instance of the application is resized to occupy a first portion (e.g., a left half) of the touch-sensitive display, and (ii) a predefined portion of the touch sensitive display adjacent the first portion (e.g., the second portion) (e.g., the right third to half of the display) is revealed. In yet other embodiments, either or both of these movements activates a split-view mode.

In some embodiments, the predefined portion is a blank region that occupies approximately a third to a half of the total display area of the touch-sensitive display (e.g., portion 762, FIG. 7E). In other embodiments, the blank region displays the home-screen of the device within that predefined region. In some embodiments, revealing this blank region provides the user with a visual indication that, upon a lift-off of the contact, the content (that is currently shown in the preview) will be displayed in the predefined portion, adjacent to the now-resized first instance of the application that is displayed in the first portion. In this way, users of computing systems are provided with a preview that reveals the second portion of the display, to provide them with a visual preview as to how a split-view mode will look. This enhances operability of the device as users are able to make a decision as to whether to activate the split-view mode or not after viewing the preview, thereby ensuring users are able to discover how to activate a split-view mode and ensuring that users are able to preview such a mode before activating it.

Then at 1116, upon detecting a liftoff of the contact after the contact has moved either a threshold distance across the touch sensitive display or to the predefined second portion of the display, simultaneously displaying two instances of the same application side-by-side. In particular, (i) a second instance, distinct from the first instance, of the application is displayed with content associated with the selected affordance, and (ii) at least a portion of the first instance of the application is displayed. The second instance and the first instance (or the portion thereof) are displayed as occupying substantially all of the displayable area of the touch-sensitive display.

In some embodiments, as depicted at 1118, the split-view mode of operation includes displaying the second instance of the application in the predefined portion (e.g., the second portion) of the touch-sensitive display.

In some embodiments, the first and second instances of the application are distinct executable processes that are executing on the one or more processors of the electronic device (e.g., two distinct instantiations of the application that are both separately executing on the one or more processors of the electronic device). Stated another way, after detecting the liftoff, the second instance of the application is instantiated and then displayed side-by-side with the first instance of the application, thereby enabling a user to easily/conveniently view and use content from the first instance while also interacting with the second instance.

It should be understood that the particular order in which the operations in FIG. 11A-11B have been described is merely one example and is not intended to indicate that the described order is the only order in which the operations could be performed. One of ordinary skill in the art would recognize various ways to reorder the operations described herein. For brevity, these details are not repeated here.

Figure 12:
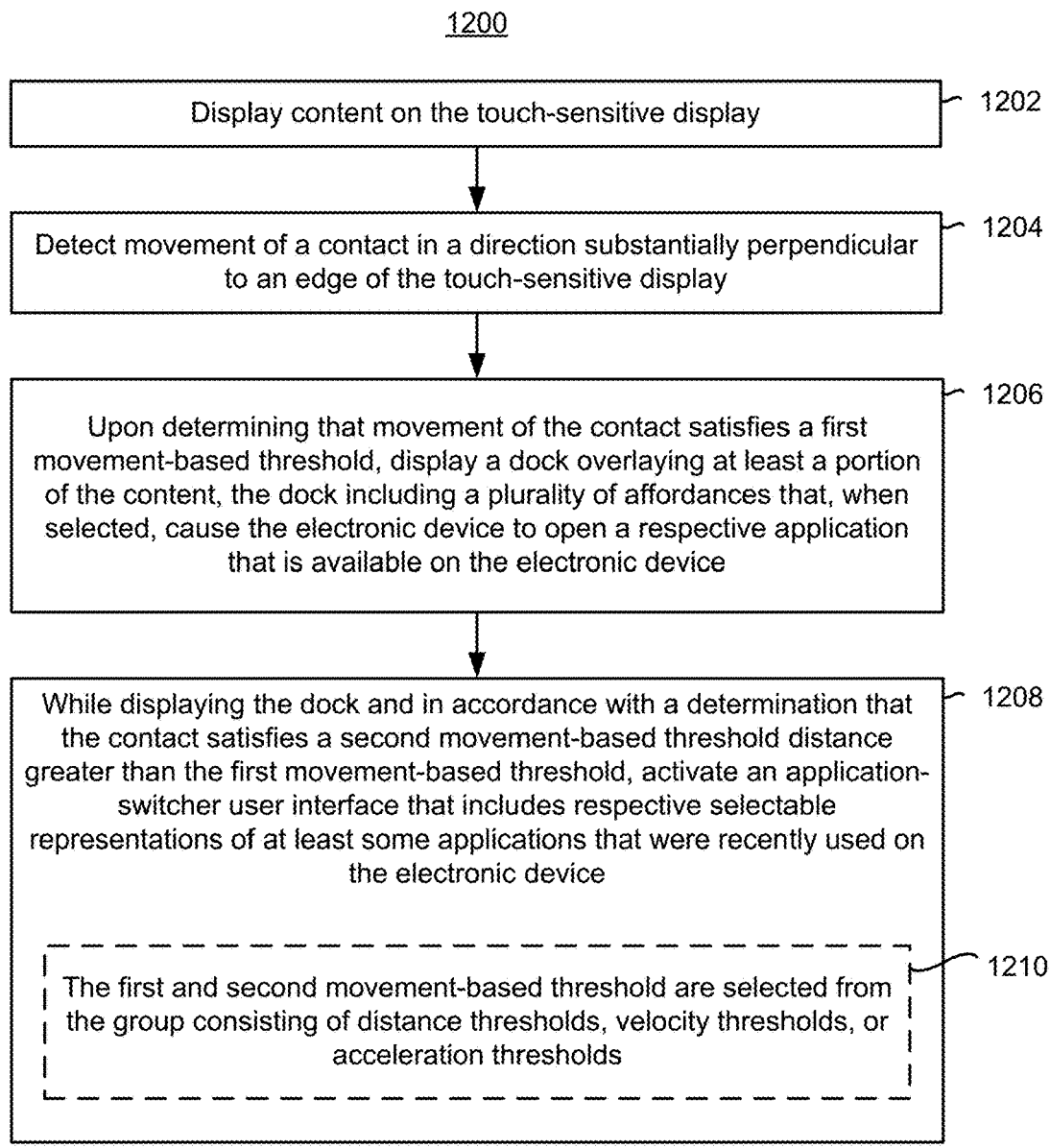
FIG. 12 is a flowchart representation of a method of utilizing a continuous gesture that allows for first activating a dock and then activating an application-switcher user interface on the display.

FIG. 12 is a flowchart depicting a method 1200 for using a continuous gesture to activate a dock and then an application-switcher user interface. FIGS. 6A-6Q are used to illustrate the methods and/or processes described in relation to FIG. 12.

In some embodiments, the method 1200 is performed by an electronic device (e.g., portable multifunction device 100, FIG. 1A and/or one or more components of the electronic device (e.g., I/O subsystem 106, operating system 126, etc.). In some embodiments, the method 1200 is governed by instructions that are stored in a non-transitory computer-readable storage medium and that are executed by one or more processors of a device, such as the one or more processors 122 of device 100 (FIG. 1A). For ease of explanation, the following describes method 1200 as performed by the device 100. In some embodiments, with reference to FIG. 1A, the operations of method 1100 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 1200 are, optionally, combined and/or the order of some operations is, optionally, changed.

As described below, the method 1200 provides users with a single continuous gesture that allows for activating a dock and then an application-switcher user interface. The method reduces the number of inputs required from a user to activate a dock and an application-switcher user interface (e.g., users need only provide a simple gesture instead of performing multiple inputs) and, thereby, ensures that battery life of an electronic device implementing the method 1200 is extended, since less power is required to process the fewer number of inputs (and this savings will be realized over and over again as users become increasingly familiar with the more intuitive and simple gesture). As is also explained in detail below, the operations of method 1200 help to ensure that users are able to engage in sustained interactions (e.g., they do not need to frequency undo behaviors, which interrupts their interactions with their devices) and the operations of method 1200 help to produce more efficient human-machine interfaces.

In some embodiments, a device configured to perform method 1200 displays (1202) content on the touch-sensitive display (e.g., the device 100 displays an Application 1 and also displays a video-browsing application in a split-view mode on the touch-sensitive display, FIG. 6A). The device then detects (1204) movement of a contact (e.g., a contact associated with a gesture 602, FIG. 6A) in a direction substantially perpendicular (e.g., within +/−5 degrees) to an edge of the touch-sensitive display (e.g., the contact moves in a substantially vertical direction relative to a bottom-most edge (relative to a user looking down towards the touch-sensitive display) of the touch-sensitive display). Upon determining that movement of the contact satisfies a first movement-based threshold (e.g., the has moved beyond a threshold distance away from the edge or the contact has travelled at/with or above a first threshold velocity or acceleration), the device displays (1206) a dock overlaying at least a portion of the content (e.g., as shown in FIGS. 6A-6C), the dock including a plurality of affordances that, when selected, cause the electronic device to open a respective application that is available on the electronic device. In some embodiments, the dock is revealed in accordance with movement or velocity of the contact as it travels in the direction that is substantially perpendicular to the edge (e.g., the dock is first displayed after the contact moves an initial threshold distance of, e.g., 1-2 centimeters, and the dock then reaches a stationary position are it moves a first threshold distance, e.g., 1-2 centimeters away from the initial threshold distance or 2-4 centimeters in total). The threshold distance discussed above could be the initial or the first threshold distance, or could also be a velocity or acceleration based threshold.

While displaying the dock and in accordance with a determination that movement of the contact satisfies a second movement-based threshold (e.g., the contact has moved beyond a second threshold distance such as 3-6 centimeters away from the edge or an additional 1-2 centimeters away from the first threshold distance, or the contact has travelled with a velocity of 8 centimeters/second if the first threshold velocity corresponds to a velocity of 4 centimeters/second), greater than the first movement-based threshold, the device activates (1208) an application-switcher user interface that includes respective selectable representations of at least some applications that were recently used on the electronic device (as shown in FIGS. 6C-6D). In some embodiments, as the contact moves beyond the second threshold distance away from the edge of the touch-sensitive display or travels at/with or above a second velocity or acceleration threshold, the content (e.g., content associated with a foreground application) scales down to its chronological place within the app-switching UI (e.g., as shown in FIGS. 6D-6E).

In some embodiments, first and second movement-based threshold are selected (1210) from the group consisting of distance thresholds, velocity thresholds, or acceleration thresholds.

In some embodiments, any of the distance-based thresholds described herein (e.g., determining whether a contact associated with gesture 602 travels more than a certain threshold distance before displaying a dock and then later displaying the application-switcher user interface) may be replaced with a movement-based threshold (e.g., one that is based on distance or based on movement and speed or change in speed, such as velocity or acceleration-based thresholds) that instead determine whether the contact has moved with a velocity or acceleration that is greater than a certain velocity threshold (e.g., having a velocity of at least 8 centimeters/second) or acceleration threshold before performing a particular action (e.g., displaying the dock and then the application-switcher user interface).

In some embodiments, no liftoff of the contact (e.g., the contact associated with gesture 602, FIGS. 6A-6D) is detected as the contact moves beyond the first threshold distance and then beyond the second threshold distance away from the edge of the touch-sensitive display (e.g., movement of the contact is a continuous, uninterrupted gesture that first causes the electronic device to display the dock and then causes the electronic device to display the application-switcher user interface).

By providing a single gesture that is used to activate a dock and then an application-switcher user interface, operability of the device is enhanced and the human-machine interface is made to operated more efficiently (e.g., because users are able to provide a single input to activate a dock and an application-switch user interface, instead of having to employ multiple, inefficient, and time-wasting inputs to separately access a dock and then access an application-switcher user interface at some later point in time).

It should be understood that the particular order in which the operations in FIG. 12 have been described is merely one example and is not intended to indicate that the described order is the only order in which the operations could be performed. One of ordinary skill in the art would recognize various ways to reorder the operations described herein. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with a touch-sensitive display and one or more processors:
        displaying a first application at a first size in a display area that has a first edge, a second edge different from the first edge, and a third edge opposite from the second edge;
        while displaying the first application in the display area:
            displaying a dock along at least a portion of the first edge of the display area;
            detecting a contact on the touch-sensitive display over a first affordance displayed within the dock, wherein the first affordance is associated with a second application, and the first affordance, when selected, causes display of the second application in the display area; and
            detecting movement of the contact away from the dock;
            in response to detecting a first portion of the movement of the contact away from the dock to a first position that is closer to the second edge of the display area, resizing the first application, by moving an edge of a representation of the first application away from the second edge of the display area toward the third edge of the display area by a first amount so that the display area is divided into a first portion that is occupied by the representation of the first application and a second portion that does not include the representation of the first application;
            in response to detecting a second portion of the movement of the contact away from the dock from the first position to a second position that is closer to the second edge of the display area than the first position, further resizing the first application, by further moving an edge of a representation of the first application away from the second edge of the display area toward the third edge of the display area by a second amount that is greater than the first amount, so that the display area is divided into a third portion that is occupied by the representation of the first application and a fourth portion that does not include the representation of the first application, wherein the fourth portion is larger than the second portion;
        after detecting movement of the contact away from the dock, detecting liftoff of the contact; and
        in response to detecting liftoff of the contact:
            in accordance with a determination that liftoff of the contact from the touch-sensitive display was detected while the contact was over the fourth portion of the display area, concurrently displaying the first application at a second size that is smaller than the first size and displaying the second application in the fourth portion of the display area; and
            in accordance with a determination that liftoff of the contact from the touch-sensitive display was detected while the contact was over the third portion of the display area, displaying the first application at the first size.

2. The method of claim 1, further comprising before detecting liftoff of the contact:
    displaying a representation of the first affordance in proximity to the contact until the contact moves a threshold distance away from the dock; and
    in accordance with determining that the contact has moved at least the threshold distance away from the dock, ceasing to display the representation of the first affordance and displaying a thumbnail of content associated with at least some of a second set of one or more applications in proximity to the contact.

3. The method of claim 2, further comprising:
    resizing the thumbnail of content to match a display size of the third portion or the fourth portion, as the contact is moved on top of the third portion or the fourth portion, respectively.

4. The method of claim 1, further comprising before detecting liftoff of the contact:
    displaying a representation of the first affordance in proximity to the contact until the contact moves a threshold distance away from the dock; and
    in accordance with determining that the contact has moved at least the threshold distance away from the dock, displaying a user interface object surrounding the representation of the first affordance in proximity to the contact.

5. The method of claim 4, wherein the user interface object has a first shape, and the method further comprises, before detecting the liftoff of the contact:

modifying the user interface object to have a second shape or a third shape as the contact is moved on top of the third portion or the fourth portion, respectively, wherein the first shape is distinct from the second shape and third shape.

6. The method of claim 1, wherein displaying the dock includes:
detecting an initial contact on the touch-sensitive display; and
in response to detecting movement of the initial contact in a direction that is substantially perpendicular to a bottom portion of the touch-sensitive display, displaying the dock in the first portion of the touch-sensitive display.

7. The method of claim 1, including:
upon detecting liftoff of the contact from the touch-sensitive display while the contact is located over the second portion, displaying the second application overlaying the first application in the display area.

8. The method of claim 1, further comprising, after detecting the liftoff of the contact while the contact is over the fourth portion of the display area:
in accordance with the determination that liftoff of the contact from the touch-sensitive display was detected while the contact was over the fourth portion of the display area:
continuing to display the dock along at least a portion of the first edge.

9. The method of claim 8, further comprising:
detecting a new contact on the touch-sensitive display over a second affordance displayed within the dock, wherein the second affordance is associated with a third application, and the second affordance, when selected, causes display of the third application in the display area;
detecting movement of the new contact away from the dock; and
in accordance with determining that liftoff of the new contact occurs over the second application, replacing the second application with the third application on the touch-sensitive display.

10. The method of claim 9, further comprising:
in accordance with determining that liftoff of the new contact occurs over a border between the first application and the second application, displaying the third application overlaying the first application or the second application on the touch-sensitive display.

11. The method of claim 1, wherein:
the first application and the second application are pinned together;
detecting a new contact on the touch-sensitive display over a second affordance displayed within the dock, wherein the second affordance is associated with a set of at least two pinned applications;
detecting movement of the new contact away from the dock; and
in accordance with a determination that liftoff of the new contact occurs over the first application or the second application, displaying the set of at least two pinned applications in the display area and ceasing to display the first and second applications.

12. The method of claim 1, wherein:
the first application is an instance of the first application, the second application comprises an additional instance of the first application, and
the instance and the additional instance are distinct instances of the first application.

13. A non-transitory computer-readable storage medium storing executable instructions that, when executed by an electronic device with one or more processors and a touch-sensitive display, cause the electronic device to:
display a first application at a first size in a display area that has a first edge, a second edge different from the first edge, and a third edge opposite from the second edge;
while displaying the first application in the display area:
display a dock along at least a portion of the first edge of the display area;
detect a contact on the touch-sensitive display over a first affordance displayed within the dock, wherein the first affordance is associated with a second application, and the first affordance, when selected, causes display of the second application in the display area;
detect movement of the contact away from the dock;
in response to detecting a first portion of the movement of the contact away from the dock to a first position that is closer to the second edge of the display area, resize the first application, by moving an edge of a representation of the first application away from the second edge of the display area toward the third edge of the display area by a first amount so that the display area is divided into a first portion that is occupied by the representation of the first application and a second portion that does not include the representation of the first application;
in response to detecting a second portion of the movement of the contact away from the dock from the first position to a second position that is closer to the second edge of the display area than the first position, further resizing the first application, by further moving an edge of a representation of the first application away from the second edge of the display area toward the third edge of the display area by a second amount that is greater than the first amount, so that the display area is divided into a third portion that is occupied by the representation of the first application and a fourth portion that does not include the representation of the first application, wherein the fourth portion is larger than the second portion;
after detecting movement of the contact away from the dock, detect liftoff of the contact; and
in response to detecting liftoff of the contact:
in accordance with a determination that liftoff of the contact from the touch-sensitive display was detected while the contact was over the fourth portion of the display area, concurrently display the first application at a second size that is smaller than the first size and display the second application in the fourth portion of the display area; and
in accordance with a determination that liftoff of the contact from the touch-sensitive display was detected while the contact was over the third portion of the display area, display the first application at the first size.

14. The non-transitory computer-readable storage medium of claim 13, further comprising instructions that, when executed by the electronic device, cause the electronic device to:
before detecting liftoff of the contact:
display a representation of the first affordance in proximity to the contact until the contact moves a threshold distance away from the dock; and in accordance with determining that the contact has moved at least the threshold distance away from the dock, cease to display the representation of the first affordance and displaying a thumbnail of content associated with at least some of a second set of one or more applications in proximity to the contact.

15. The non-transitory computer-readable storage medium of claim 14, wherein the one or more programs include instructions, which, when executed by the computer system, cause the computer system to:
resize the thumbnail of content to match a display size of the third portion or the fourth portion, as the contact is moved on top of the third portion or the fourth portion, respectively.

16. The non-transitory computer-readable storage medium of claim 13, wherein the one or more programs include instructions, which, when executed by the computer system, cause the computer system to:
before detecting liftoff of the contact:
display a representation of the first affordance in proximity to the contact until the contact moves a threshold distance away from the dock; and
in accordance with determining that the contact has moved at least the threshold distance away from the dock, display a user interface object surrounding the representation of the first affordance in proximity to the contact.

17. The non-transitory computer-readable storage medium of claim 16, wherein the user interface object has a first shape, and the one or more programs include instructions, which, when executed by the computer system, cause the computer system to:
before detecting the liftoff of the contact:
modifying the user interface object to have a second shape or a third shape as the contact is moved on top of the third portion or the fourth portion, respectively,
wherein the first shape is distinct from the second shape and third shape.

18. The non-transitory computer-readable storage medium of claim 13, wherein display the dock includes:
detect an initial contact on the touch-sensitive display; and
in response to detecting movement of the initial contact in a direction that is substantially perpendicular to a bottom portion of the touch-sensitive display, display the dock in the first portion of the touch-sensitive display.

19. The non-transitory computer-readable storage medium of claim 13, wherein the one or more programs include instructions, which, when executed by the computer system, cause the computer system to:
upon detecting liftoff of the contact from the touch-sensitive display while the contact is located over the second portion, display the second application overlaying the first application in the display area.

20. The non-transitory computer-readable storage medium of claim 13, wherein the one or more programs include instructions, which, when executed by the computer system, cause the computer system to:
after detecting the liftoff of the contact while the contact is over the fourth portion of the display area:
in accordance with the determination that liftoff of the contact from the touch-sensitive display was detected while the contact was over the fourth portion of the display area:
continue to display the dock along at least a portion of the first edge.

21. The non-transitory computer-readable storage medium of claim 20, wherein the one or more programs include instructions, which, when executed by the computer system, cause the computer system to:
detect a new contact on the touch-sensitive display over a second affordance displayed within the dock, wherein the second affordance is associated with a third application, and the second affordance, when selected, causes display of the third application in the display area;
detect movement of the new contact away from the dock; and
in accordance with determining that liftoff of the new contact occurs over the second application, replace the second application with the third application on the touch-sensitive display.

22. The non-transitory computer-readable storage medium of claim 21, wherein the one or more programs include instructions, which, when executed by the computer system, cause the computer system to:
in accordance with determining that liftoff of the new contact occurs over a border between the first application and the second application, display the third application overlaying the first application or the second application on the touch-sensitive display.

23. The non-transitory computer-readable storage medium of claim 13, wherein the first application and the second application are pinned together, and the one or more programs include instructions, which, when executed by the computer system, cause the computer system to:
detect a new contact on the touch-sensitive display over a second affordance displayed within the dock, wherein the second affordance is associated with a set of at least two pinned applications;
detect movement of the new contact away from the dock; and
in accordance with a determination that liftoff of the new contact occurs over the first application or the second application, display the set of at least two pinned applications in the display area and ceasing to display the first and second applications.

24. The non-transitory computer-readable storage medium of claim 13, wherein:
the first application is an instance of the first application,
the second application comprises an additional instance of the first application, and
the instance and the additional instance are distinct instances of the first application.

25. An electronic device, comprising:
one or more processors;
a touch-sensitive display; and
memory storing one or more programs that are configured for execution by the one or more processors, the one or more programs including instructions for:
displaying a first application at a first size in a display area that has a first edge, a second edge different from the first edge, and a third edge opposite from the second edge;
while displaying the first application in the display area:
displaying a dock along at least a portion of the first edge of the display area;
detecting a contact on the touch-sensitive display over a first affordance displayed within the dock, wherein the first affordance is associated with a second application, and the first affordance, when selected, causes display of the second application in the display area; and detecting movement of the contact away from the dock;

in response to detecting a first portion of the movement of the contact away from the dock to a first position that is closer to the second edge of the display area, resizing the first application, by moving an edge of a representation of the first application away from the second edge of the display area toward the third edge of the display area by a first amount so that the display area is divided into a first portion that is occupied by the representation of the first application and a second portion that does not include the representation of the first application;

in response to detecting a second portion of the movement of the contact away from the dock from the first position to a second position that is closer to the second edge of the display area than the first position, further resizing the first application, by further moving an edge of a representation of the first application away from the second edge of the display area toward the third edge of the display area by a second amount that is greater than the first amount, so that the display area is divided into a third portion that is occupied by the representation of the first application and a fourth portion that does not include the representation of the first application, wherein the fourth portion is larger than the second portion;

after detecting movement of the contact away from the dock, detecting liftoff of the contact; and in response to detecting liftoff of the contact:
in accordance with a determination that liftoff of the contact from the touch-sensitive display was detected while the contact was over the fourth portion of the display area, concurrently displaying the first application at a second size that is smaller than the first size and displaying the second application in the fourth portion of the display area; and in accordance with a determination that liftoff of the contact from the touch-sensitive display was detected while the contact was over the third portion of the display area, displaying the first application at the first size.

26. The electronic device of claim 25, wherein the one or more programs include instructions for:
before detecting liftoff of the contact:
displaying a representation of the first affordance in proximity to the contact until the contact moves a threshold distance away from the dock; and in accordance with determining that the contact has moved at least the threshold distance away from the dock, ceasing to display the representation of the first affordance and displaying a thumbnail of content associated with at least some of a second set of one or more applications in proximity to the contact.

27. The electronic device of claim 26, wherein the one or more programs include instructions for:
resizing the thumbnail of content to match a display size of the third portion or the fourth portion, as the contact is moved on top of the third portion or the fourth portion, respectively.

28. The electronic device of claim 25, wherein the one or more programs include instructions for:
before detecting liftoff of the contact:
displaying a representation of the first affordance in proximity to the contact until the contact moves a threshold distance away from the dock; and in accordance with determining that the contact has moved at least the threshold distance away from the dock, displaying a user interface object surrounding the representation of the first affordance in proximity to the contact.

29. The electronic device of claim 28, wherein the user interface object has a first shape, and the wherein the one or more programs include instructions for:
before detecting the liftoff of the contact:
modifying the user interface object to have a second shape or a third shape as the contact is moved on top of the third portion or the fourth portion, respectively,
wherein the first shape is distinct from the second shape and third shape.

30. The electronic device of claim 25, wherein displaying the dock includes:
detecting an initial contact on the touch-sensitive display; and
in response to detecting movement of the initial contact in a direction that is substantially perpendicular to a bottom portion of the touch-sensitive display, displaying the dock in the first portion of the touch-sensitive display.

31. The electronic device of claim 25, wherein the one or more programs include instructions for:
upon detecting liftoff of the contact from the touch-sensitive display while the contact is located over the second portion, displaying the second application overlaying the first application in the display area.

32. The electronic device of claim 25, wherein the one or more programs include instructions for:
after detecting the liftoff of the contact while the contact is over the fourth portion of the display area:
in accordance with the determination that liftoff of the contact from the touch-sensitive display was detected while the contact was over the fourth portion of the display area:
continuing to display the dock along at least a portion of the first edge.

33. The electronic device of claim 32, wherein the one or more programs include instructions for:
detecting a new contact on the touch-sensitive display over a second affordance displayed within the dock, wherein the second affordance is associated with a third application, and the second affordance, when selected, causes display of the third application in the display area;

detecting movement of the new contact away from the dock; and in accordance with determining that liftoff of the new contact occurs over the second application, replacing the second application with the third application on the touch-sensitive display.

34. The electronic device of claim 33, wherein the one or more programs include instructions for:
in accordance with determining that liftoff of the new contact occurs over a border between the first application and the second application, displaying the third application overlaying the first application or the second application on the touch-sensitive display.

35. The electronic device of claim 25, wherein the one or more programs include instructions for:
- the first application and the second application are pinned together;
- detecting a new contact on the touch-sensitive display over a second affordance displayed within the dock, wherein the second affordance is associated with a set of at least two pinned applications;
- detecting movement of the new contact away from the dock; and
- in accordance with a determination that liftoff of the new contact occurs over the first application or the second application, displaying the set of at least two pinned applications in the display area and ceasing to display the first and second applications.

36. The electronic device of claim 25, wherein the one or more programs include instructions for:
- the first application is an instance of the first application,
- the second application comprises an additional instance of the first application, and
- the instance and the additional instance are distinct instances of the first application.

* * * * *

UNITED STATES PATENT AND TRADEMARK OFFICE
CERTIFICATE OF CORRECTION

PATENT NO. : 11,221,698 B2
APPLICATION NO. : 15/939122
DATED : January 11, 2022
INVENTOR(S) : Dellinger et al.

Page 1 of 1

It is certified that error appears in the above-identified patent and that said Letters Patent is hereby corrected as shown below:

In the Claims

Claim 29, Column 86, Line 13, delete "and the wherein the one" and insert --and the one--.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*